United States Patent [19]

Rush

[11] 4,208,717
[45] Jun. 17, 1980

[54] PROGRAM STOP CONTROL OF TRAIN VEHICLES

[75] Inventor: Donald L. Rush, Penn Hills, Pa.

[73] Assignee: Westinghouse Electric Corp., Pittsburgh, Pa.

[21] Appl. No.: 920,318

[22] Filed: Jun. 28, 1978

[51] Int. Cl.² .................. B61L 3/22; B61L 27/04
[52] U.S. Cl. .................. 364/426; 246/182 B; 246/187 B; 364/424
[58] Field of Search .................. 364/424, 426; 246/182 B, 182 C, 187 B

[56] References Cited

U.S. PATENT DOCUMENTS

| | | | |
|---|---|---|---|
| 3,519,805 | 7/1970 | Thorne-Booth | 364/426 |
| 3,639,754 | 2/1972 | Kovalcik et al. | 324/426 |
| 3,727,046 | 4/1973 | Woods et al. | 246/187 B |
| 3,728,539 | 4/1973 | Thorne-Booth | 246/182 B |
| 3,740,549 | 6/1973 | Thorne-Booth | 246/122 |
| 3,974,992 | 8/1976 | Matty | 246/182 B |
| 4,005,838 | 2/1977 | Grundy | 364/426 |
| 4,066,230 | 1/1978 | Nohmi et al. | 364/426 |
| 4,066,877 | 1/1978 | Virnot et al. | 364/426 |
| 4,093,162 | 6/1978 | Takaoka et al. | 364/426 |
| 4,095,764 | 6/1978 | Osada et al. | 246/182 B |

FOREIGN PATENT DOCUMENTS

| | | | |
|---|---|---|---|
| 2433666 | 1/1976 | Fed. Rep. of Germany | 46/182 B |
| 467690 | 3/1969 | Switzerland | 246/182 B |
| 978559 | 12/1964 | United Kingdom | 246/182 B |

OTHER PUBLICATIONS

Bollinger: The BARTD Train Control System: Railway Signalling and Communications, Dec. 1967, pp. 18-23.

Thorne-Booth: Signalling of Remotely Controlled Railway Trains, IEEE Transactions on Communications Technology, vol. Com-16, No. 3, Jun. 1968, pp. 369-374.

Brownson et al: Computers Will Supervise Train Operations in Bay Area Railway Signalling and Communications, Jul. 1969, pp. 27-38.

Gibson: Bay Area Transit System Will Have. Automated Central, Control-Westinghouse Engineer, Mar. 1970, pp. 51-54.

Hoyler: Design Techniques for Automatic Train Control, Westinghouse Engineer, Jul. 1972, pp. 98-103.

Hoyler: Automatic Train Control Concepts are Implemented by Modern Equipment, Westinghouse Eng., Sep. 1972, 145-151.

Costa et al: IAS Annual Meetings, IEEE Industry Applications Society, Oct. 1977, pp. 1105-1109, SAO--Pauls Metro E-W Line Innovations.

*Primary Examiner*—Felix D. Gruber
*Attorney, Agent, or Firm*—R. G. Brodahl

[57] ABSTRACT

There is disclosed a passenger vehicle operation control apparatus and method, including programmed microprocessor control apparatus for determining an improved and more precise stopping of each vehicle in relation to a station platform.

14 Claims, 17 Drawing Figures

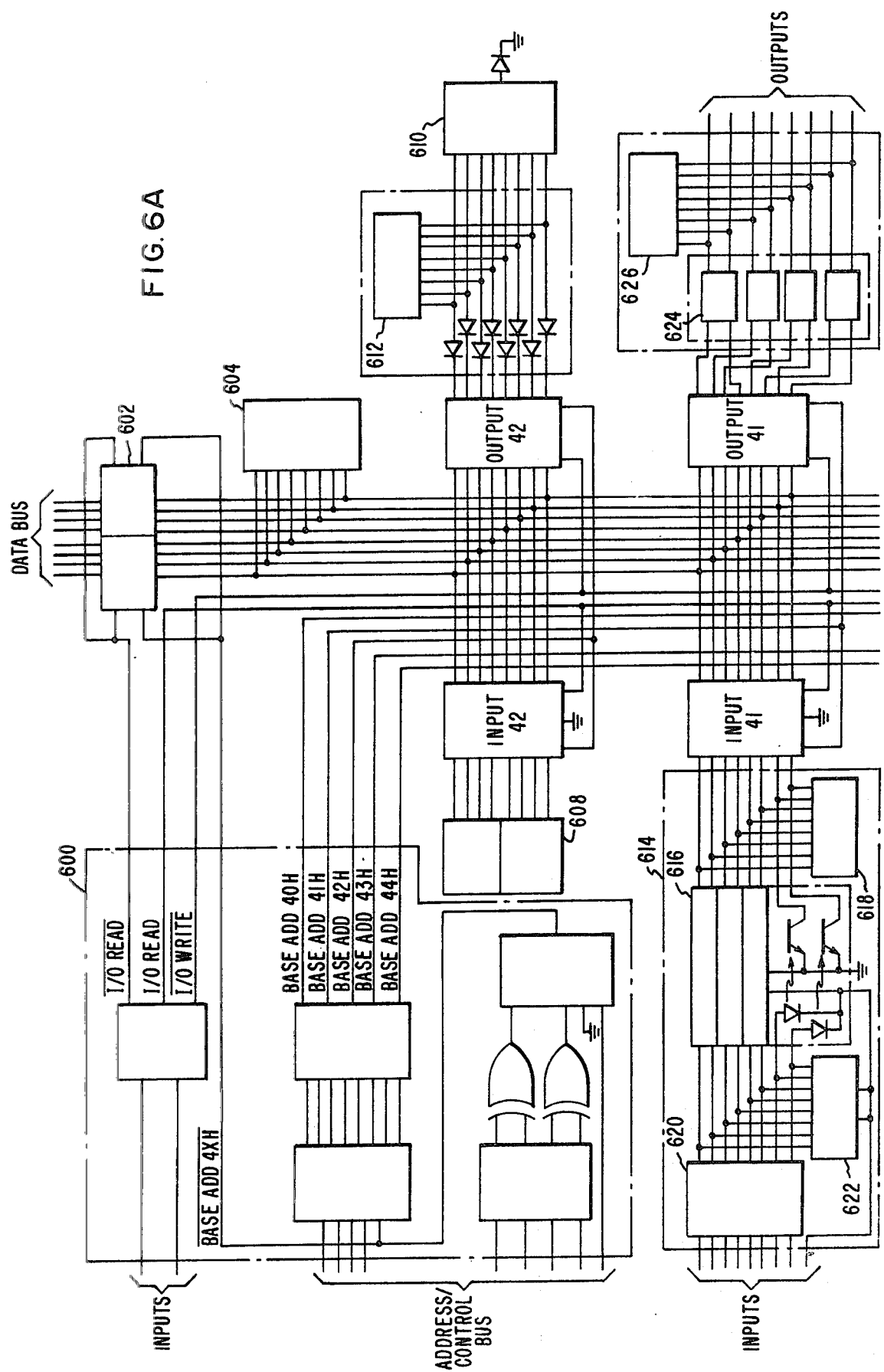

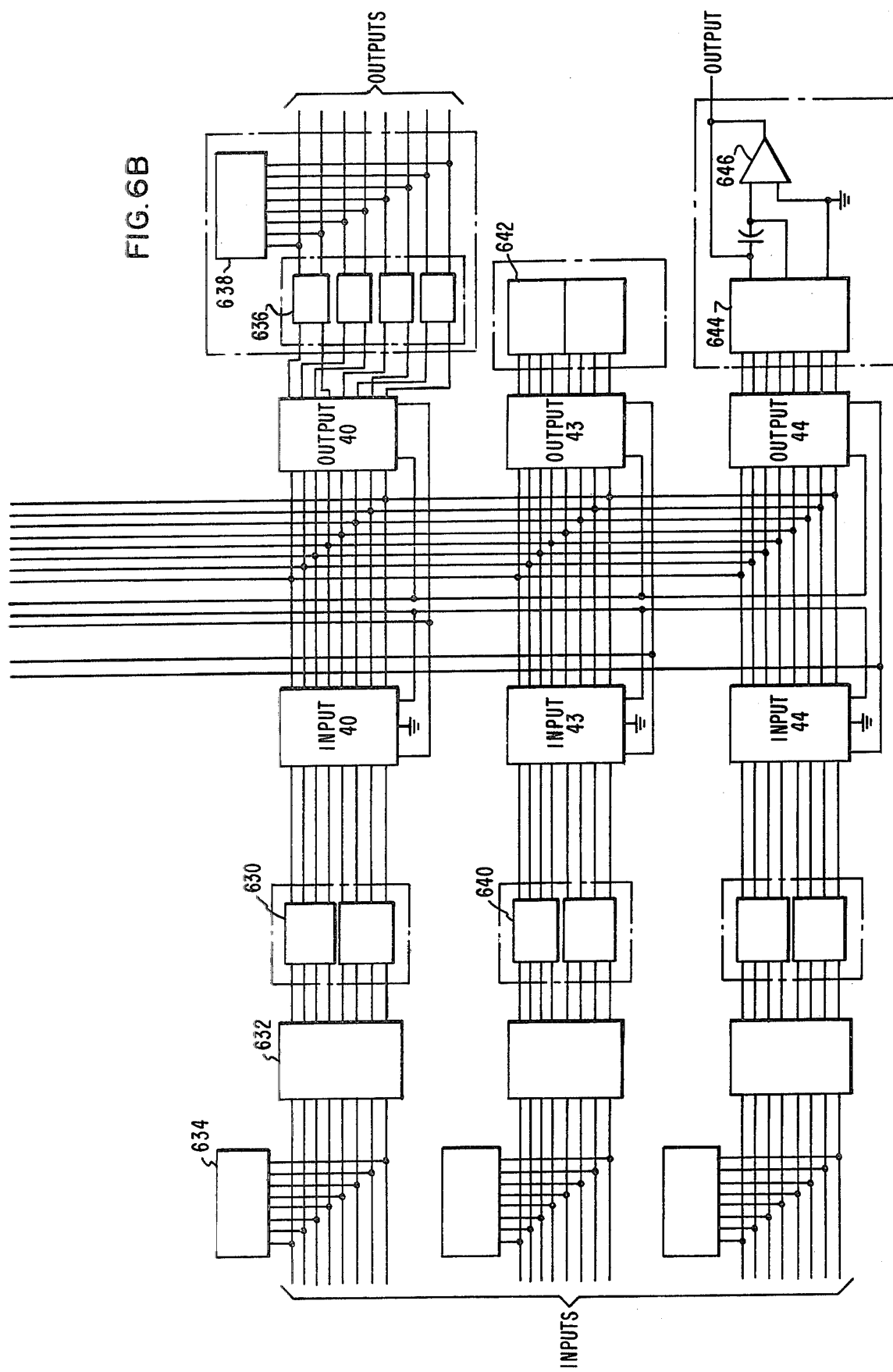

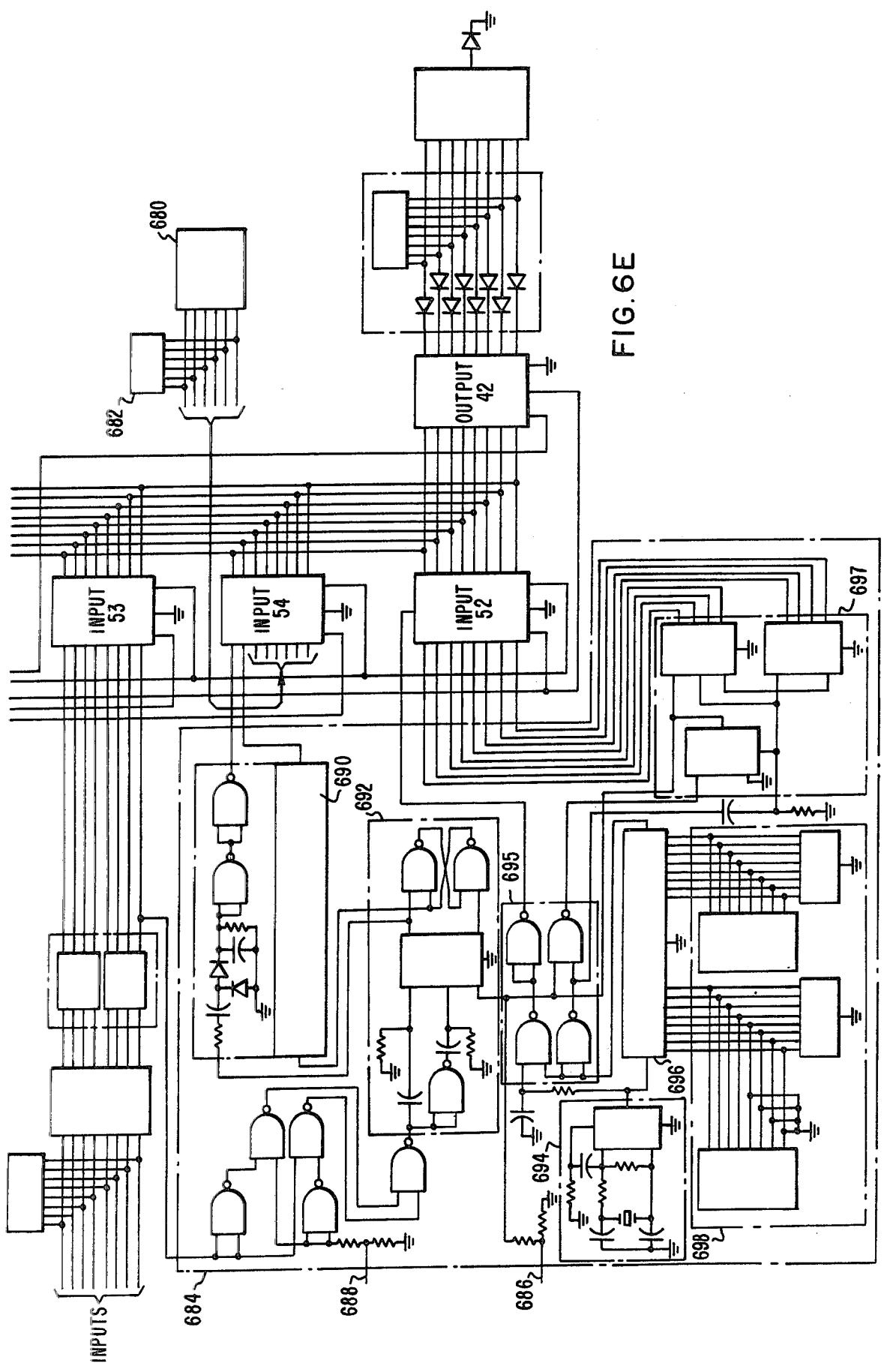

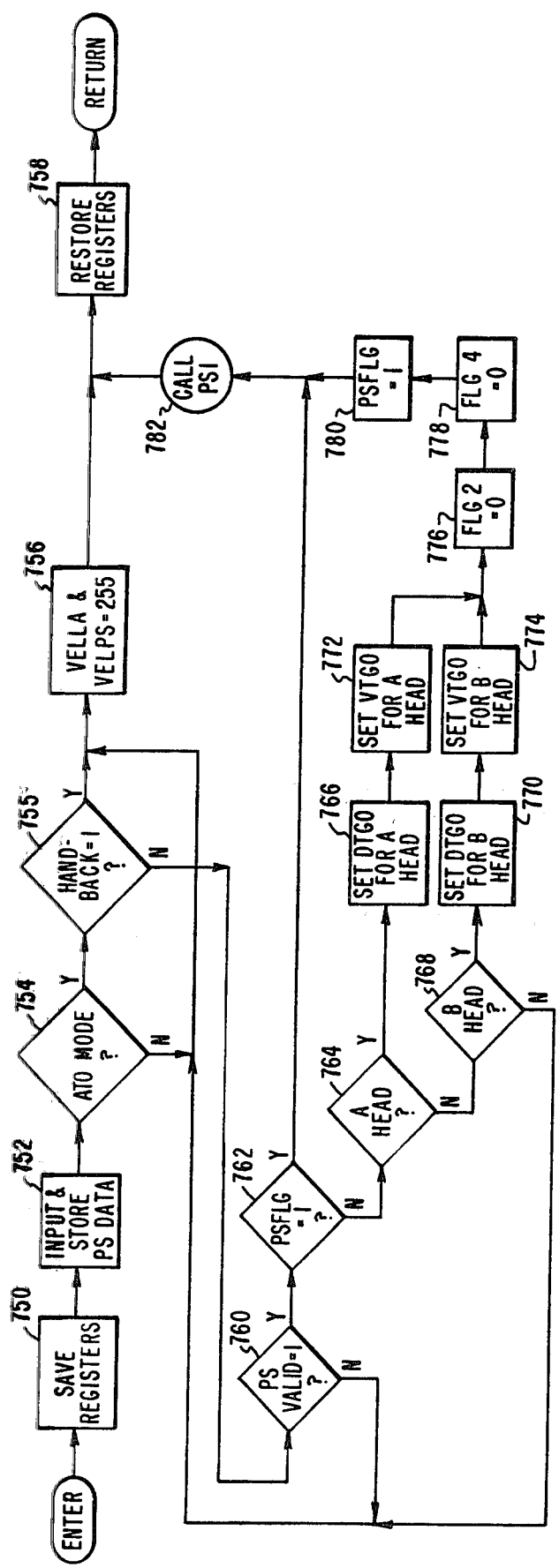

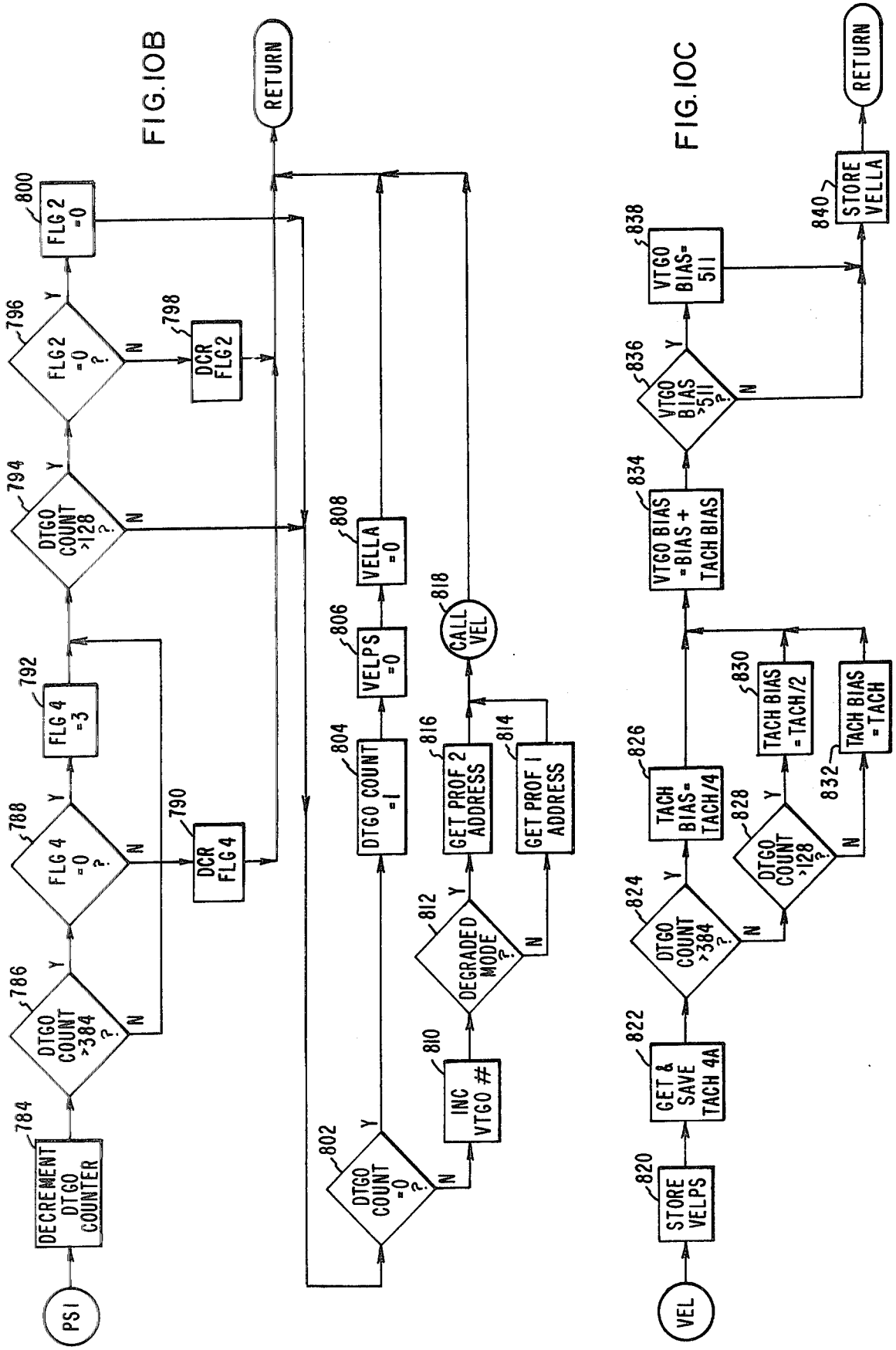

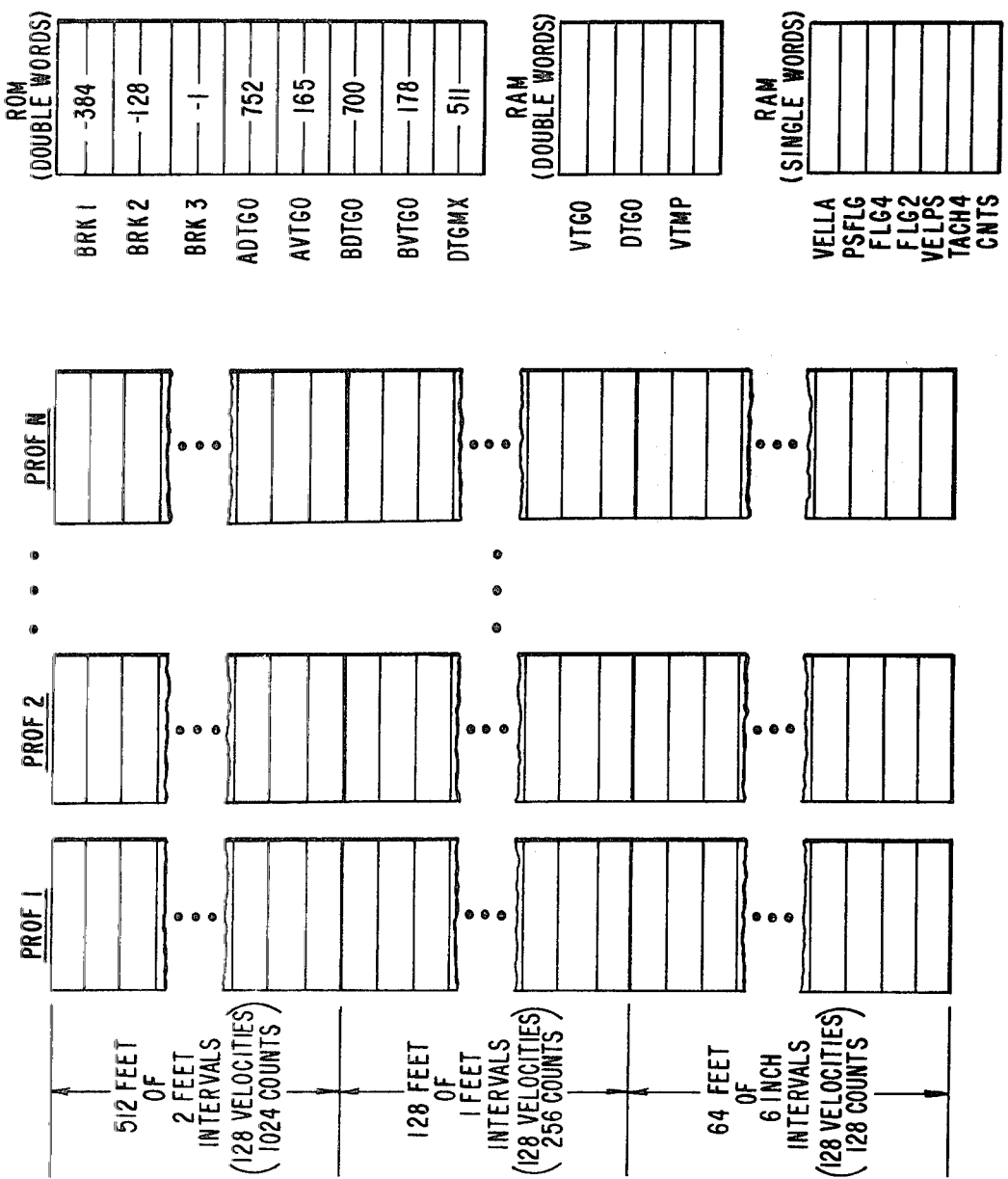

PROGRAM STOP CONTROL OF TRAIN VEHICLES

CROSS-REFERENCE TO RELATED APPLICATIONS

The present application is related to the following concurrently filed patent applications which are assigned to the same assignee as the present application; and the respective disclosures of which are incorporated herein by reference:

1. Ser. No. 920,319, which was filed on June 28, 1978 by L. W. Anderson and A. P. Sahasrabudhe and entitled "Speed Maintaining Control of Train Vehicles";
2. Ser. No. 920,317, which was filed on June 28, 1978 by D. L. Rush, L. W. Anderson and M. P. McDonald and entitled "Speed Decoding And Speed Error Determinating Control Apparatus and Method";
3. Ser. No. 920,043, which was filed on June 28, 1978 by M. P. McDonald, T. D. Clark and R. H. Perry and entitled "Train Vehicle Control Multiplex Train Line";
4. Ser. No. 920,104, which was filed on June 28, 1978 by D. L. Rush and J. K. Kapadia and entitled "Door Control For Train Vehicles";
5. Ser. No. 920,316 which was filed on June 28, 1978 by L. W. Anderson and M. P. McDonald and entitled "Train Vehicle Control Microprocessor Power Reset"; and
6. Ser. No. 920,315, which was filed on June 28, 1978 by D. L. Rush and A. P. Sahasrabudhe entitled "Desired Velocity Control For Passenger Vehicles".

BACKGROUND OF THE INVENTION

The present invention relates to the automatic control of passenger vehicles, such as mass transit vehicles or the like, and including speed control and speed maintenance while moving along a track, precise stopping of the vehicles in relation to passenger loading and unloading stations and the operation of the vehicle doors.

In an article entitled The BARTD Train Control System published in Railway Signaling and Communications for December 1967 at pages 18 to 23, the train control system for the San Francisco Bay Area Rapid Transit District is described. Other articles relating to the same train control system were published in the IEEE Transactions On Communication Technology for June 1968 at pages 396 to 374, in Railway Signaling and Communications for July 1969 at pages 27 to 38, in the Westinghouse Engineer for March 1970 at pages 51 to 54, in the Westinghouse Engineer for July 1972 at pages 98 to 103, and in the Westinghouse Engineer for September 1972 at pages 145 to 151. A general description of the train control system to be provided for the East-West line of the Sao Paulo Brazil Metro is provided in an article published in IAS 1977 Annual of the IEEE Industry Applications Society at pages 1105 to 1109.

It is known in the prior art to provide a predetermined stopping profile for controlling a passenger vehicle as disclosed in U.S. Pat. No. 3,519,805 and as disclosed in U.S. Pat. No. 3,727,046. It is known to control a vehicle in relation to a known travel distance to a stopping position as disclosed in U.S. Pat. No. 3,728,539. It is known to provide a transposed cable along a vehicle travel path and antennas onboard the vehicle to determine the travel distance of the vehicle and provide a stopping signal lower than the normal speed command signal for determining the stop position of the vehicle as disclosed in U.S. Pat. No. 3,974,992.

A general description of the microprocessors and the related peripheral devices as shown in FIGS. 3 and 4 of the drawings is provided in the Intel 8080 Microcomputer Systems Users Manual currently available from Intel Corp., Santa Clara, Calif. 95051.

SUMMARY OF THE INVENTION

An improved passenger vehicle operation control apparatus and method are provided for stopping the vehicle in relation to predetermined station locations in accordance with a plurality of desired stopping profiles as determined by approaching a station from different directions, different track grades, and in response to vehicle failure conditions. A given profile includes selected discontinuities in relation to the vehicle speed of operation. One or more look-ahead velocities are provided to better smooth out the vehicle speed control during the making of a station stop. A plurality of stopping positions within a given station may be provided. An adjustable flare out of the vehicle speed is provided before an actual stop.

BRIEF DESCRIPTION OF THE DRAWINGS

FIGS. 6A, 6B, 6C, 6D and 6E illustrate the input-output hardware circuits to provide the input and output ports shown in FIGS. 4 and 5.

FIGS. 10A, 10B, and 10C set forth flow chart illustrations of the program routines of the present invention; and FIG. 11 illustrates the information data tables operative with the program routines of the present invention.

DESCRIPTION OF A PREFERRED EMBODIMENT

Figure 1:
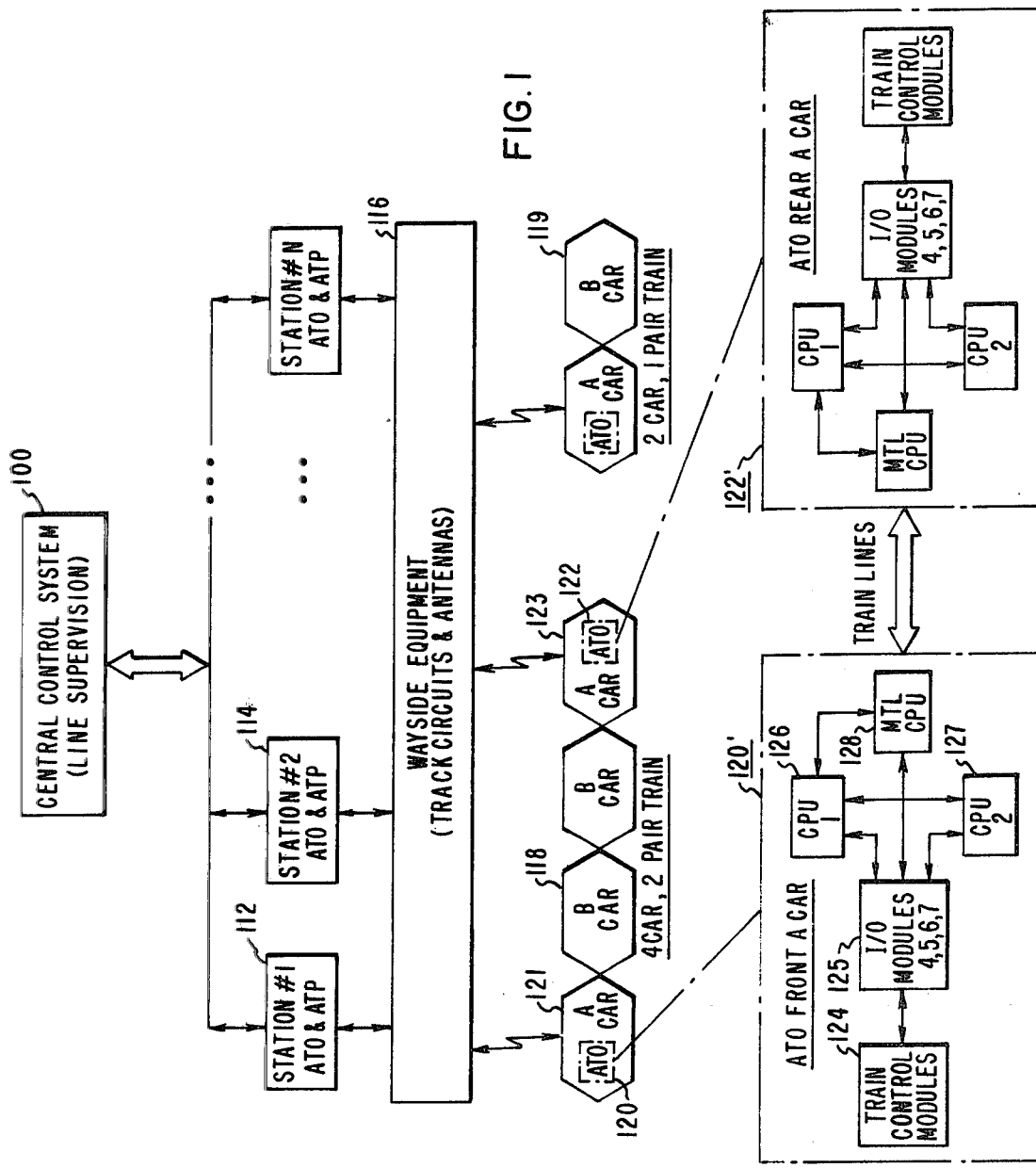
FIG. 1 is a schematic showing of the overall transit system including the passenger vehicle-carried portion of the control system operative in accordance with the present invention.

As shown in FIG. 1, the central control system 100, which is usually located in a headquarters building or the like, receives information about the transit system and individual vehicle train operation to apply desired performance adjustments to the individual vehicle trains. The central control supervises the schedules, and spacing and routing of the trains. The passenger loading and unloading stations 112, 114 and so forth are provided to operate with the central control 100 as desired for any particular transit system. The wayside equipment 116, including track circuits and antennae, is located along the vehicle track between the stations and is provided to convey information in relation to the passenger vehicles passing along the track. A first train 118 is shown including four vehicle cars in the arrangement of an A type car at each end of the train with intermediate B type cars. A second train 119 is shown including two vehicle cars, with one being an A type car including computer control apparatus and one being a B type car which includes no train control equipment. The train control apparatus 120 carried by the front A type car 121 of the first train 118 is shown in greater detail in the phantom showing 120' of the front car 121. Similarly, the train control apparatus 122 carried by the rear A type car 123 is shown in greater detail in the phantom showing 122' of the rear car 123. The train control modules 124 in the train control apparatus 120' includes the program stop receiver module, the speed code receiver module, the vital interlock board, power supplies and all the modules required to interface with the other equipment carried by the train vehicle 121. Information is sent in relation to the input/output modules 125, which are shown in greater detail in FIGS. 4, 5, 7 and 8 and the microprocessor computers 126, 127 and 128. There is a direct communication link through the input-/output modules 125 between the CPU 1 computer 126 and the CPU 2 computer 127. There is a direct communication link from the CPU 1 computer 126 to the multiplex train line MTL CPU computer 128. A similar train control apparatus 122 is provided for the rear car 123. The front car 121 and the rear car 123 are connected together through well-known train lines, which go through the couplers and the individual train vehicles. The multiplex train line connected between the front multiplex CPU and the rear multiplex CPU is one pair of lines in the train line.

Figure 2:
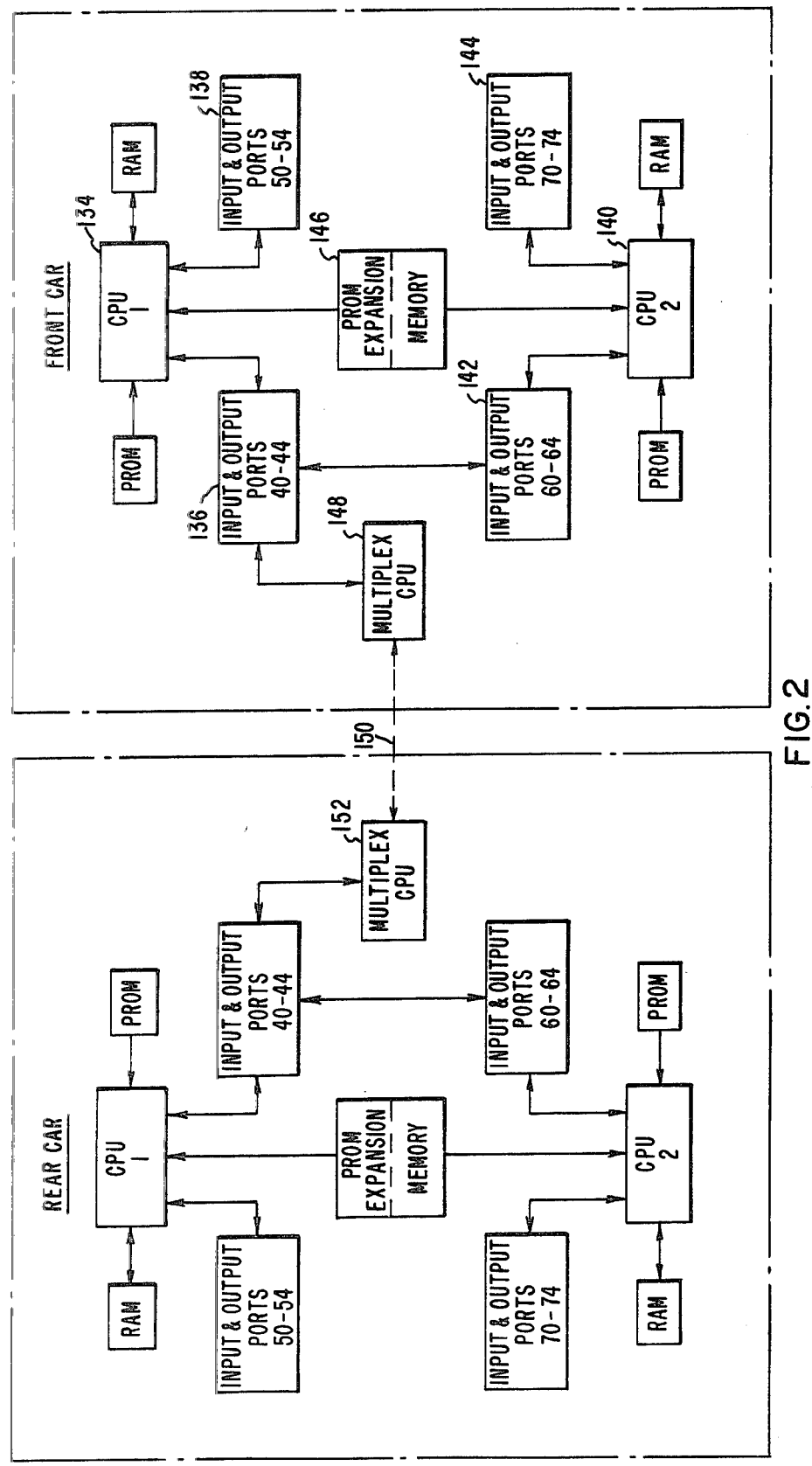
FIG. 2 illustrates in greater detail the microprocessor ontrol apparatus shown in FIG. 1 and provides for the front head-end and the rear tail-end car of a given passenger vehicle train.

The microprocessor 134 shown in FIG. 2 corresponds to CPU 1 in the front A car 121 and in each A car of the train and operates with the input and output module ports 136 and 138. The microprocessor 140 corresponds to CPU 2 in the front A car 121 and in each A car of the train, and operates with the input and output module ports 142 and 144. An expansion memory 146, which can comprise an Intel 1702A memory, operates with each of the microprocessors 134 and 140 as shown. An additional multiplex microprocessor 148 is coupled with the microprocessor 134 through the input and output ports 136 and is coupled with the well-known train line 150 going through all passenger vehicles in the train to the microprocessor 152 in the rear vehicle car of the train.

Figure 3A:
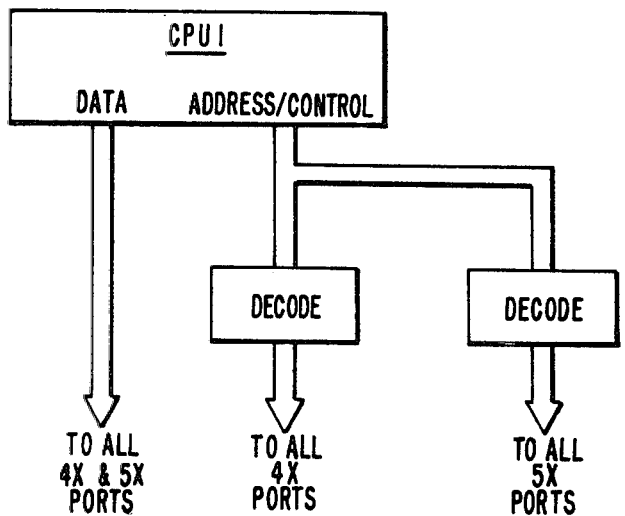
FIGS. 3A and 3B functionally illustrate the data flow between the individual microprocessors CPU 1 and CPU 2 with their respective input-output port modules.
Figure 3B:
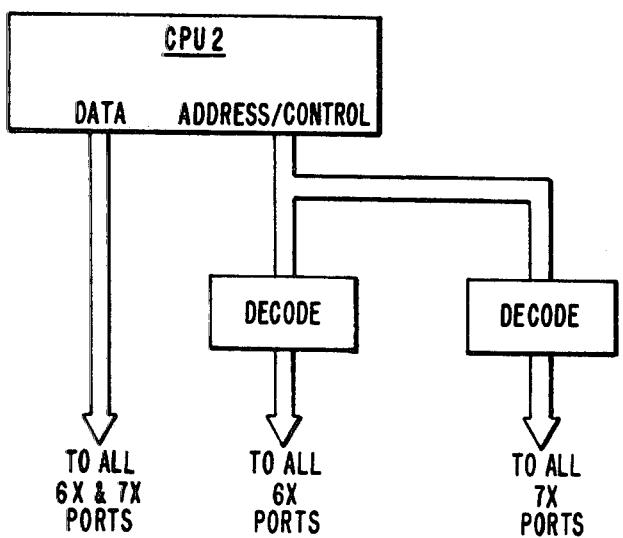

In FIG. 3A and 3B there are illustrated the information data flow from each of CPU 1 and CPU 2 with their respective input ports and output ports.

Figure 4:
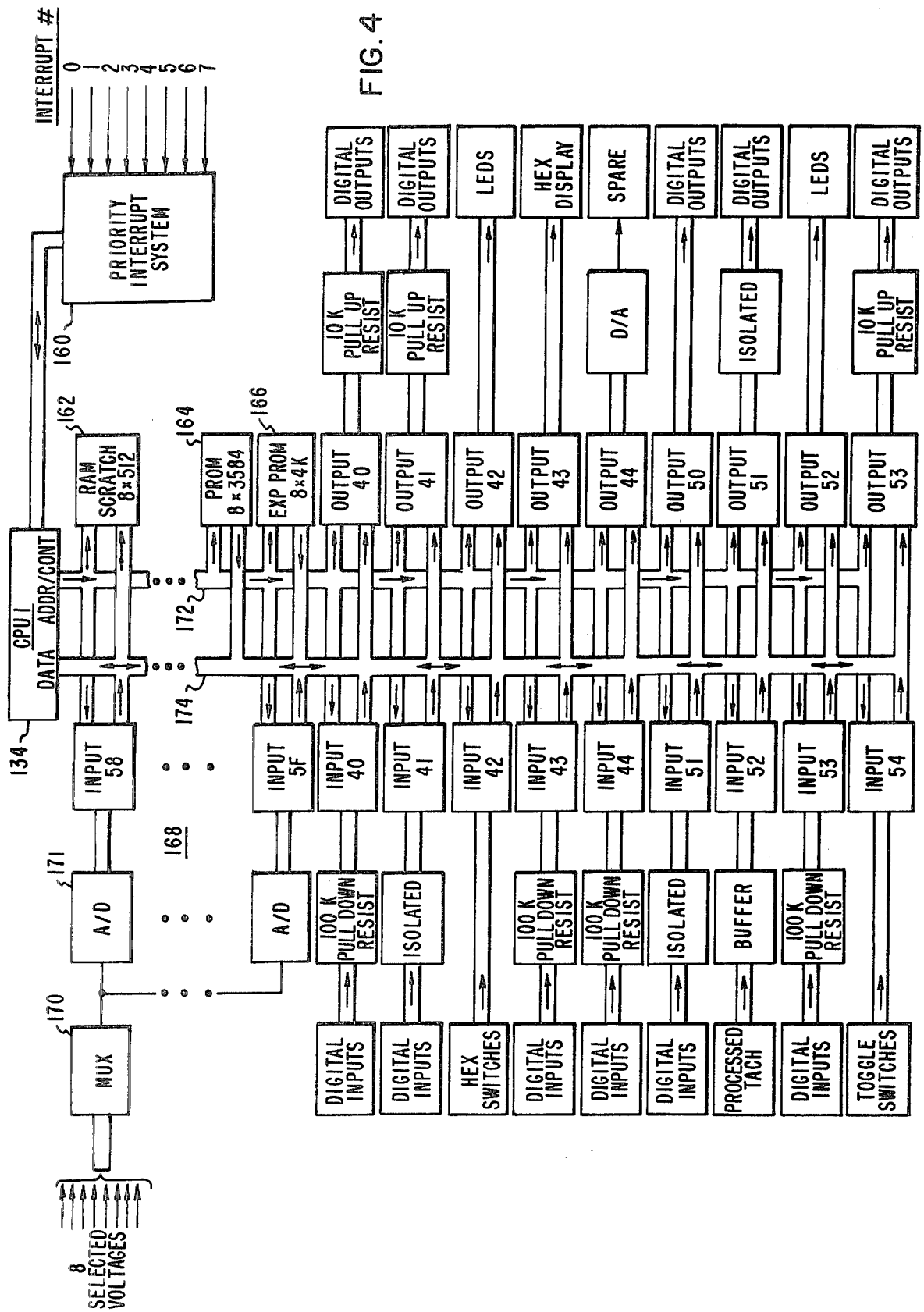
FIG. 4 shows in greater detail the data flow provided between the microprocessor CPU 1 with the input and output ports provided to control the operation of a passenger vehicle.

In FIG. 4, the CPU 1 can be the Intel 8080A, with the 8224 clock generator 8228 status latch and data buffer. The priority interrupt system 160 can be in the Intel 8214 with provision for 8 interrupts to provide restarting instructions for the CPU 134. RAM memory 162 includes the 518 8-bit bytes on the CPU board and can be the Intel 8101, although if a higher speed version is desired then the Intel 2101 can be used. The PROM memory 164 can be the 1702 A, with provision for 14 PROMS on the CPU board, to give 3584 8-bit bytes of programmed storage memory on the CPU board. The memory expansion board 166 has provisions for 16 1702-A's per half, with the memory expansion board having two identical halves; one half is used for CPU1 and the other half is used for CPU2. The board itself only has sockets on it, and the PROM memories 164 are added as necessary. The CPU 134 with the priority interrupt system 160, the RAM 162 and the PROM 164 and 166 is the computer which works with the input-/output ports. The RAM 162 is used to provide variable storage for values which change through the execution of the program, as well as to keep track of the program counter for calls to subroutines and interrupts to store the return address, so the control computer knows where to go back to when exiting from a subroutine. The PROM 164 is the program storage, and the variables reside in the RAM 162 although some of the variables are preset on "power up" and based on constants stored in the PROM 164. A data bus 174 and an address-/control bus 172 are coupled with each of the input ports and each of the output ports. There are eight 168 analog input ports, which are numbered 58 to 5F, although physically there is one port with a multiplexer 170 to select the one of eight analog inputs. Any one of the ports 58 through 5F in CPU 1 or 78 through 7F in CPU 2 can be addressed, and the appropriate one of the 8 analog voltages will be read. The analog voltage inputs are buffered and rescaled in hardware with various scalings for the 8 different inputs, so that the normal full scale range of the signal is approximately full scale range of that analog input to allow maximum resolution. Input ports 40, 41, 42, 43, 44, 51, 52, 53 and 54 are digital inputs. Input ports 40, 43, 44 and 53 are logic level inputs, with 100 K pull-down resistors such that normally 0 volts is a logic zero, and anything above two volts is a logic 1; however, the logic 1 can be anything up to 15 volts which allows interfacing with CMOS logic having 15 volt levels without damaging the input port. The input ports 41 and 51 are optically isolated inputs, through opto-isolator MCT-2 type devices, such that the 8 input lines all have the same common line which is taken off the board, but isolated from any of the computer power supplies to allow a large common mode voltage differential between the input signal and the computer power supply. The isolated inputs have 1 K in series with the opto isolator such that the nominal input current is 10 milliamps and the nominal input voltage is approximately 10 volts. On the termination boards there is provision for additional series resistance to allow sensing essentially battery volts of nominally 36 volts, but any battery voltage above 10 volts can be accepted without changing the input PC boards. Tach input 52 is a logic level frequency, which is proportional to wheel rotation speed, coming into the PC board; it gets converted to a digital word through a tach processor which is essentially a gated counter, with the gating time set such that with normal wheel size, the counter will count two counts for every one KPH of wheel speed; the gating time is adjustable for wheel size, such that the variable wheel size can be removed by settings from switches on the board to maintain the relationship of two counts per KPH independent of wheel size. The processed tach signal is input through input port 52 as a digital word, such that the computer can measure the vehicle speed. Input port 42 is connected to two hexadecimal rotary switches which are positioned on the board such that they can be adjusted by maintenance personnel while the system is operational, to specify an address in the range of 00 to FF. The monitor routine reads these switches as an address, and gets the data from that address and outputs it to LED's on output port 42 such that it provides for the operator a window on memory. Toggle switches go into input port 54, and there are 6 of them available with only two being used; one is for a lamp test to test the output LED in the hex display and the second is used to reset the failures detected by the diagnostic programs.

For the CPU-1 shown in FIG. 4 an extra output port is provided, which is output port 53 operative as a CMOS output, with a 10 K pull-up resistor and has 8 bits of digital output at 0 to 5 volts logic level. Output ports 40 and 41 have high power buffers capable of sinking 300 milliamps per bit with a 10 K pull-up resistor to plus 5 volts. The 10 K pull-up resistor can be connected to 15 volts instead of 5 volts, although in the present control system they are connected to 4 or 5 volts. The output port 50 is essentially the same as 40 and 41 without the pull-up resistors; it has a high power buffer with open collector outputs, and is used for lamp drivers, relay drivers, and the like. Output port 51 has opto isolators, with a separate common on the output side of the opto-isolator for that port, such that it allows the high common mode differential, and is used for relay drives, lamp drivers, etc., working off of battery voltage, so that it doesn't matter if battery voltage common is different from the CPU-0 volts. Output ports 42 and 52 drive LED's, such as if the computer outputs a logic 1, the LED is on, and if the output logic is 0 the LED is off on each of the 8 bits at that port. Output port 42 is used with the monitor function mentioned earlier to display the data that is from the memory location addressed by the hex switches on input port 42. Output port 52 is used for the failure indications as determined by diagnostic programs, which diagnostic programs will only turn those LED's on, and turning them off, once they have been turned on, is done with the failure reset switch. Output port 44 is a D/A converter, where the digital output is converted to a 0 to 10 volt analog signal, and output to the outside world and output port 64 (FIG. 5), that is the analog control of the P signal generator to control the level of the P signal and it of course is wired to the P signal generator.

Figure 5:
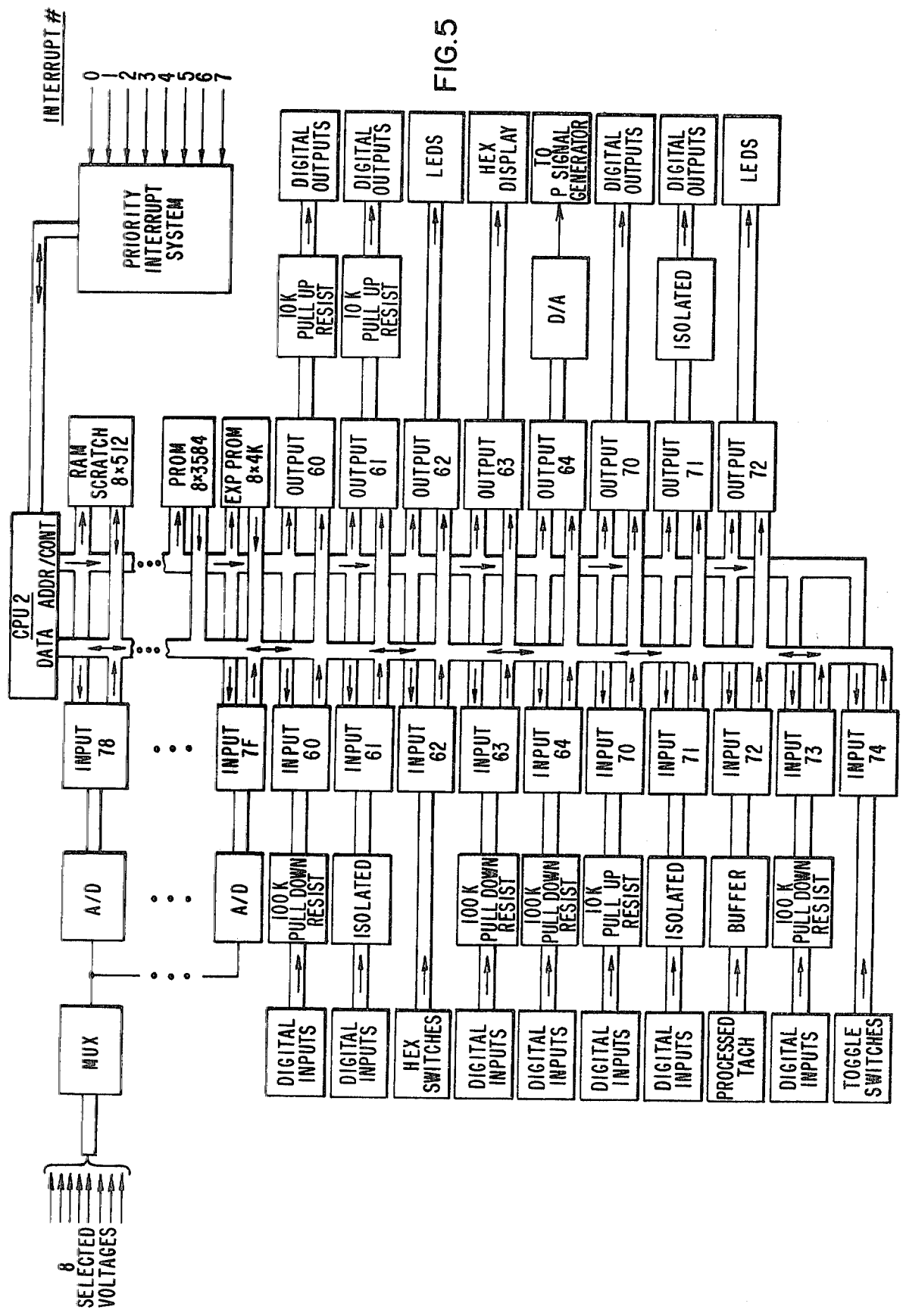
FIG. 5 shows in greater detail the data flow provided between the microprocessor CPU 2 with the input and output ports provided to control the operation of a passenger vehicle.

In FIG. 5, the CPU 2 arrangement is generally similar to that shown in FIG. 4. The input port 70 does not have a corresponding input port in FIG. 4. The CPU 2 board is configured to have an extra input port 70, having a 10 K pull-up resistor to make it either TTL 0 or CMOS compatible, but it is 5 volt only logic level. There is no protection for voltages going above 5 volts on that input port 70, such as there is on the 100 K pull-down resistor type input port.

In FIG. 6A, the dotted block 600 is the address decoding and control apparatus for all the input and output ports on the board including FIGS. 6A and 6B; it gets the address and control bus from the I/O addresses, the I/O read, and the I/O write from the CPU bus and decodes it for the individual ports on this board. The apparatus 600 is set up with a base address plus an offset such that the base address 40 could be actually decoded as 40, 50, 60, or 70. Two of the lines from the address control bus are hardwired to add the 0, 10, 20, or 30 hexadecimal to the base address. A buffer 602 is provided from an internal data bus to the external data bus to prevent loading between different ports and to cut down the capacitance effects of the involved 8 wires or 8 PC board traces shown in the drawing. A pull-up resistor 604 is shown for termination of the internal data bus, at times when the bus is floating and nothing is connected to it, to pull the bus to a known logic state. Input port 42 is a buffer that when it gets enabled it allows signals to pass through it to essentially put them on the data bus, such that when a CPU says read input port 42 it is enabled and presents its data. A pair of hexadecimal switches 608 provide a manual input into the computer through input port 42. Output port 42 is connected with LED displays 610 on it, and a pull-up resistor and diodes 612 are provided for noise immunity and to take the TTL logic signals from output port 42 and convert them to LED drive capacity. Input port 41 is substantially the same was as input port 42. Opto-isolation apparatus 614 isolate input port 41 such that when there is current flowing through the diodes, the transistors of the opto-isolators 616 are on and when there is no current flowing through the diodes, the transistors are off. Pull-up resistors 618 are provided for the opto-isolator transistors such that they operate at logic levels compatible with the input port 41. Series current limiting resistors 620 are provided to limit the current through the opto-isolator diodes and reverse protection diodes 622 are provided such that if there is a wrong polarity voltage on the inputs that this does not damage the light emitting diodes in the opto-isolators. Output port 41 is substantially the same as output port 42. The power buffers 624 take the TTL logic signals on the input and convert them to a high-current sink, higher voltage capability output. Pull-up resistors 626 are provided for the buffers, with the buffers being open collector type buffers, and the pull-up resistors 626 convert them to a logic level.

In FIG. 6B, input port 40 is provided with isolation and buffering. Input port 40 has a low input impedance, and a buffer transfer 630 operates from a high input impedance to that low input impedance. Series current limiting resistors 632 are provided such that the actual input level is now a high impedance with series current limiting such that it can go to a higher voltage than the supply voltage on buffer 630 without damaging that buffer. Pull-down resistors 634 are provided since the buffer 630 is CMOS and the input should not go open circuit because this can cause damage, so it is pulled to a known logic level. Output port 40 is substantially identical to output port 41, a high-power buffer 636 is provided and pull-up resistors 638. Input port 43 includes the input buffers 640 and is identical in operation to input port 40. Output port 43 drives a hexadecimal display 642, including two hexadecimal digits such that whatever is output at output port 43 shows up as two hexadecimal digits at the front panel. Input port 44 operates the same as input port 40. Output port 44 includes a D to A converter to output an analog voltage. The D to A converter 644 operates with an amplifier 646.

Figure 6C:
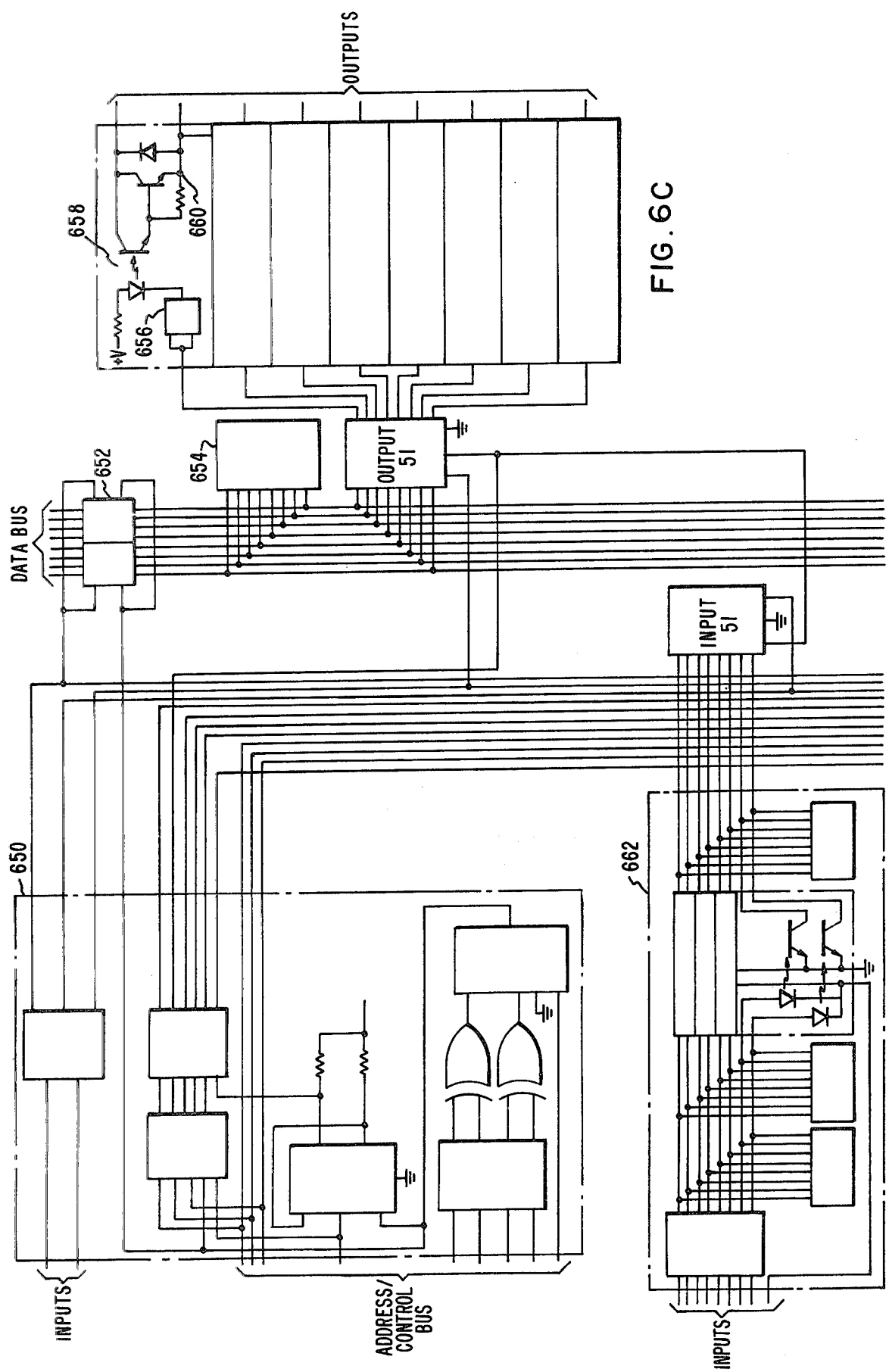
Figure 6D:
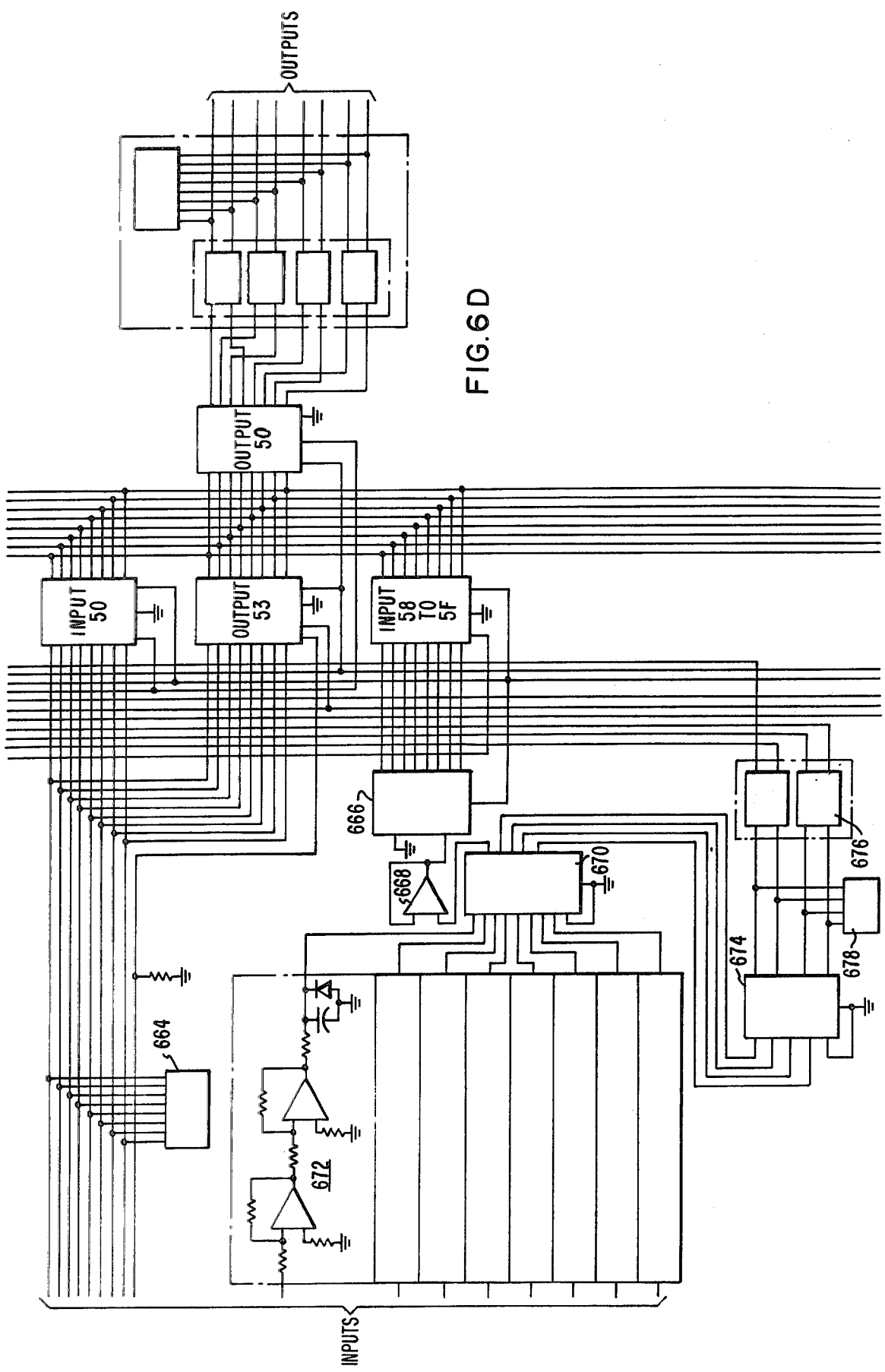

In FIGS. 6C, 6D, and 6E are the ports which are the 5X number shown on FIG. 4 so it would be for CPU 1 and then referring to these also, we have another one of these for CPU 2. FIGS. 6A and 6B would be the inputs and outputs which start with 6, and FIGS. 6C, 6D, and 6E would be inputs and outputs which start with 7. In FIG. 6C, the address control 650 is shown the same as provided in FIG. 6A and having the provisions for the base address which permits adding zero, 10, 20, or 30 hex to the output. The data bus buffer 652 is the same. The apparatus of FIGS. 6C, 6D, and 6E is on a different PC board than the apparatus of FIGS. 6A and 6B. The pull-up resistors 654 are provided to terminate the internal data bus. Output port 51 is operative with opto-isolated output drivers, where a driver 656 takes the output from port 51 and drives the opto-isolator 658 including a diode and the transistor, and a transistor buffer 660 provides higher current capability than what the opto-isolators normally can handle. There are eight of these drivers, with one for each bit of the output port 51. Input port 51, includes an opto-isolated input 662 which is the same as shown for input port 41 in FIG. 6A.

In FIG. 6D is shown input port 50, including a pull-up resistor 664 on the input lines. In relation to CPU 1 in FIG. 4, input port 50 does not get used and instead output port 53 does get used as shown in FIG. 6D. The board is set up to provide an additional input or an additional output. Output port 50 is the same as output port 41 on FIG. 6A, and includes high-power buffers with the pull-up resistors. The analog inputs come in through inputs 58 through 5F. There is physically one port, with one A to D converter 666, a buffer 668 and a multiplexer 670. A double buffering 672 is provided for scaling the eight selected voltages. One of those eight get selected by an address latch 674 which gets addressed by device 676, operative with the pull-up resistors 678. When addressing any of the ports 58 through 5F, the input port I-58 is enabled, and the three least significant biits of the address are latched and presented to the multiplexer, which then routes the appropriate analog signal through to the A to D converter 666. Input port 53 is substantially the same as input port 40. Input port 54 gets part of its information from 6 toggle switches 680 which are mounted on the front panel and includes pull-up resistors 682 so that those toggle switches are essentially at desired logic levels. The two least significant bits for input port 54 come from a frequency to digital converter 684 with the two bits of information being activity detectors and phase detector of the two frequencies which come into the converter 684 to indicate that one of them is active and that the other one is in a certain phase relationship to the first one. Input port 52 receives the digital word which is the processed tach information that is the result of the frequency to digital conversion. The tach B signal at input 686 is the one that gets converted to a digital word, and the tach signal at input 688 is used to determine the phase relationship between A and B and that is the one that comes from the phase detection 690. A direction change-over 692 assures that the result of the direction is always the same independent which way the vehicle is going. Since when the vehicle is going towards one end of the vehicle, the tachs are phased one way and when the vehicle is moving toward the other end, the tachs are phased the other way, a direction input comes in through input port 53 and does a phase inversion on tach A so that the input to the compter indicates the vehicle is going the correct way not which way it is going. The circuitry 692 actually does the phase check and is a standard phase detector type circuitry. A reference oscillator 694 of 20 kHz gets divideed by counter 696 to a gate period. The circuit 698 includes switches, pull-up resistors, to pre-set the counter 696, this again is all part of that processed tach to permit making the gate period different for different systems and to adjust for different wheel sizes. The gates 695 allow the tach signal through for the period determined by the counter 696 such that this permits counting the tach for a known period, also this has an output which resets the counter 697 at the start of the counting interval, and then it counts for the interval, and then the interval starts all over again. The frequency to digital converter 684 provides a digital output, which gets read by the computer. Output port 42 operates with TTL logic to drive an LED display the same as display 610 in FIG. 6A. The circuit apparatus shown in FIGS. 4, 5, 6A, 6B, 6C, 6D and 6E is well known to persons skilled in this art and is set forth in the Intel 8080 Microcomputer Systems Users Manual above referenced.

Figure 7:
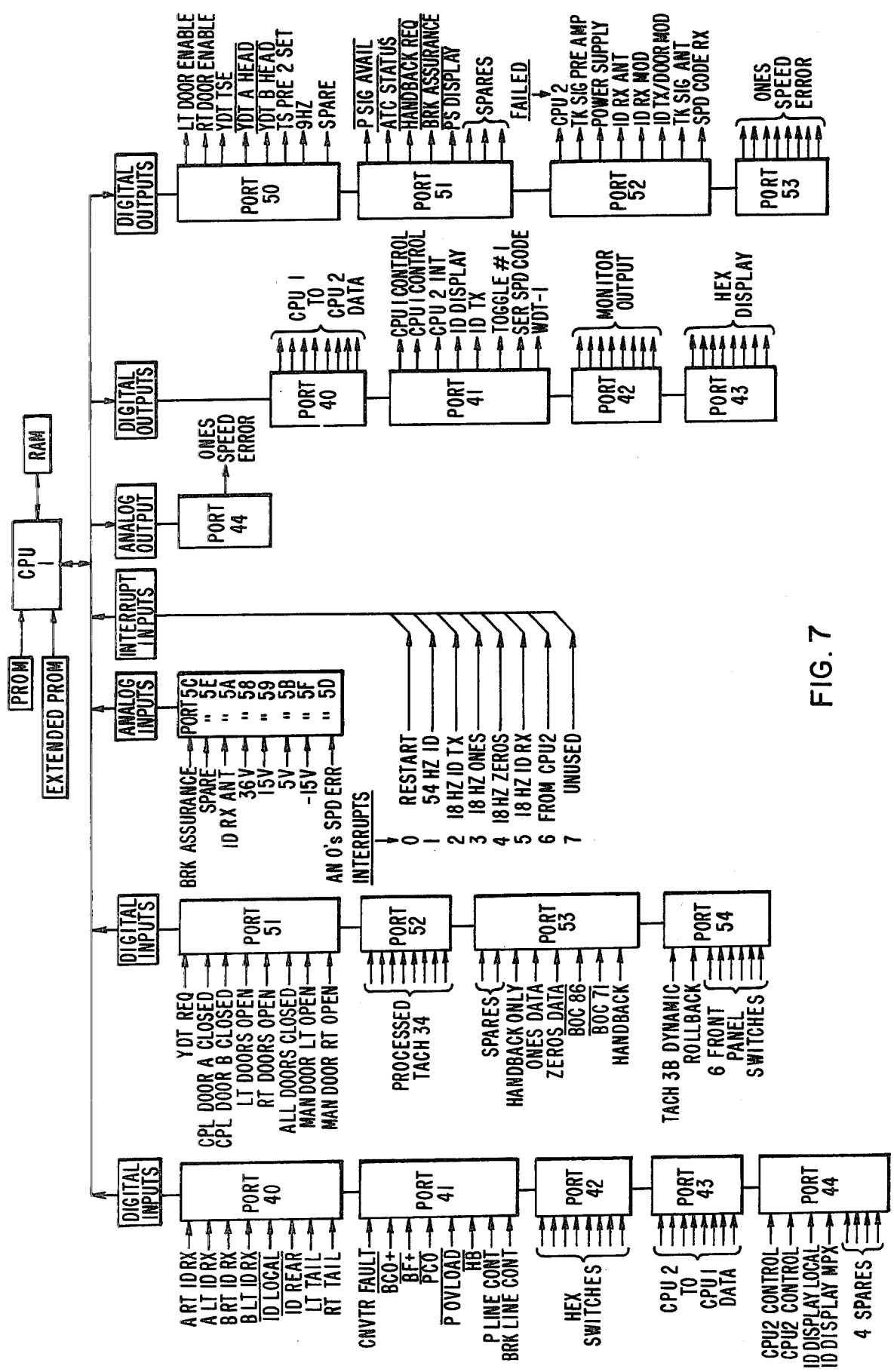
FIG. 7 illustrates the input signals supplied to the CPU 1 computer on each A car and the output signals from that computer system.

FIG. 7 SIGNAL IDENTIFICATION
CPU 1 Input/Output Signal Definitions

Digital Input Port 40

| | |
|---|---|
| A RT ID RX | - 18Hz data bit from A car right side ID receiver. This signal comes from the ID receiver module. |
| A LT ID RX | - 18Hz data bit from A car left side ID receiver. This signal comes from the ID receiver module. |
| B RT ID RX | - 18Hz data bit from B car right side ID receiver. This signal comes from the ID receiver module. |
| B LT ID RX | - 18Hz data bit from B car left side ID receiver. This signal comes from the ID receiver module. |
| $\overline{\text{ID LOCAL}}$ | - ID data is not present from the front end. This signal comes from the ID receiver module. |
| $\overline{\text{ID REAR}}$ | - ID data is not present from the rear end. This signal comes from the MTL module. |
| LT TAIL | - ID data bit from the left receiver of the tail end. This signal comes from the MTL module. |
| RT TAIL | - ID data bit from the right receiver of the tail end. This signal comes from the MTL module. |

Digital Input Port 41

| | |
|---|---|
| CNVTR FAULT | - A converter fault has been detected. |

-continued

| | |
|---|---|
| $\overline{\text{BCO +}}$ | This signal comes from the trainlines.<br>- No cars are in brake cutout operation. This signal comes from the trainline. |
| $\overline{\text{BF +}}$ | - No air conditioning fault has been detected. This signal comes from the trainline. |
| $\overline{\text{PCO}}$ | - No cars are in propulsion cutout operation. This signal comes from the trainline. |
| $\overline{\text{P OVERLOAD}}$ | - No propulsion overload has been detected. This signal comes from the trainline. |
| $\overline{\text{HB}}$ | - No hand brakes have been applied. This signal comes from the trainline. |
| P LINE CONT | - The P line is continuous. This signal comes from the trainline. |
| BRK LINE CONT | - The brake line is continuous. This signal comes from the trainline. |

Digital Input Port 42

| | |
|---|---|
| HEX SWITCHES | - 2 hexadecimal digit inputs form 2 rotary switches on the I/O module itself. |

Digital Input Port 43

| | |
|---|---|
| CPU 2 to CPU 1 data | - A full 8 bit port input from CPU #2 output port 60. |

Digital Input Port 44

| | |
|---|---|
| CPU 2 CONTROL | - These two bits are received from CPU #2 to tell this CPU the status of the information to be transferred between CPU's. These bits come from CPU #2 output port 61. |
| ID display local | - Data bit from the local ID display. |
| ID display MPX | - Data bit from the rear ID display. |
| 4 spares | - To be used if required. |

Digital Input Port 51

| | |
|---|---|
| YDT req | - Yard Departure Test request. This signal comes from the operator's console. |
| CPL DOOR A closed | - The coupler door on the A car is closed. This signal comes from the trainline. |
| CPL DOOR B closed | - The coupler door on the B car is closed. This signal comes from the trainline. |
| LT DOORS OPEN | - The doors on the left side of the train are fully open. This signal is from the trainline. |
| RT DOORS OPEN | - The doors on the right side of the train are fully open. This signal comes from the trainline. |
| ALL DOORS closed | - All doors on the train are fully closed. This signal is from the trainline. |
| MAN DOOR LT OPEN | - A manual door open request for left side of the train has been made. This signal comes from the console. |
| MAN DOOR RT OPEN | - A manual door open request for right side of the train has been made. This signal comes from the console. |

Digital Input Port 52

| | |
|---|---|
| Processed TACH 3B | - An 8-bit number representing 2 times the speed on the train in KPH. This signal is from its own module. |

Digital Input Port 53

| | |
|---|---|
| HANDBACK ONLY | - INPUT from HANDBACK switch rather than processed info. involving rollback and B car assignments. |
| ONES data | - 18Hz data bit representing a 6-bit comma-free code from the ones decoder on the speed code receiver module. |
| ZEROS data | - 18Hz data bit representing a 6-bit |

|  |  |
|---|---|
|  | comma-free code from the zeros decoder on the speed code receiver module. |
| $\overline{\text{BOC 86}}$ | - The 86% cutout car signal is not present. This signal comes from a switch in the propulsion equipment. |
| $\overline{\text{BOC 71}}$ | - The 71% cutout car signal is not present. This signal comes from a switch in the propulsion equipment. |
| handback | - The handback switch has been turned on by the operator. Control will be handed back to the rear car. |
| Digital Input Port 54 | |
| TACH 3B dynamic | - Tachometer 3B is dynamic, this means the tach has not dropped out. The signal comes from logic associated with reading tach 3B on the input module itself. |
| rollback | - The train has been detected to be rolling backward. This is determined by phase checks of the tachs on the module. |
| 6 front panel switches | - These six signals come from 6 on/off switches mounted on the front of the module. |
| Analog Input Ports 58-5F | |
| BRK assurance (5C) | - This is for a future brake assurance accelerometer input to a new brake assurance program. |
| spare (5E) | - to be used if required. |
| ID TX Ant. sense (5A) | - This voltage is derived from the output signal level from the ID transmitter antenna. It is used for diagnostics. |
| +36V(58) | - Input from +36 volt supply to be used for diagnostics. |
| +15V unreg. (59) | - Input from +15 volt supply to be used for diagnostics. |
| +5V unreg. (5B) | - Input from +5 volts, Bus #2, to be used for diagnostics. |
| −15V unreg. (5F) | - Input from −15 volt supply to be used for diagnostics. |
| An ZEROS SPD err(5D) | -Analog speed errors from CPU #2 and vital interlock module. |
| Interrupt Inputs | |
| RESTART | - Interrupt 0, highest priority, used only to reset computer system. |
| 54Hz ID | - Interrupt 1, second highest priority, this interrupt comes from the ID display system and is used for the ID display inputs and outputs. |
| 18Hz ID TX | - Interrupt 2, third highest priority, 18Hz clock input used for ID transmitter output. |
| 18Hz Ones | - Interrupt 3, fourth highest priority, 18Hz input from speed decoding module signifying it is time to read the ones data bit. |
| 18Hz ZEROS | - Interrupt 4, fifth highest priority, 18Hz input from speed decoding module signifying it is time to read the zeros data bit. |
| 18Hz ID RX | - Interrupt 5, sixth highest priority, 18Hz input from ID receiver module signifiying it is time to read the receiver data bits. |
| FROM CPU 2 | - Interrupt 6, seventh highest priority, comes from CPU #2 whenever information from CPU #2 is ready to be read into CPU #1. |
| UNUSED | - Interrupt 7, eighth highest or lowest priority, will be used if necessary. |
| Analog Output Port 44 | |
| Ones Speed Error | - The analog value of the speed error |

-continued

| | |
|---|---|
| | determined by the ones speed decoding program. |
| Digital Output Port 40 | |
| CPU 1 to CPU 2 data | - This 8-bit channel is used to transfer information to CPU #2 input port 63. |
| Digital Output Port 41 | |
| CPU 1 control | - These two bits are sent to CPU #2 to tell it the status of the information being transferred between CPU's. These bits go to input port 64. |
| CPU 2 int | - This bit is connected to interrupt 6 on CPU #2 to tell the other computer information is ready. |
| ID display | - This data bit is used to send information to the ID display at a 54Hz rate. |
| ID TX | - This data bit is used to send information to the ID transmitter at an 18Hz rate. |
| Toggle #1 | - This bit toggles at an 18Hz rate and goes to the 304 board and inhibits a computer reset bit as long as it continues to toggle. |
| Serial SPD code | - This data bit goes to the MTL CPU. It contains a serial code representing the speed code cab signal information for the operator's console. |
| WDT-1 | - Watchdog timer #1. This bit toggles at an 18Hz rate for the vital interlock board when the ones speed decoding subsystem is being executed. |
| Digital Output Port 42 | |
| Monitor Port | - This 8-bit port is used to display the contents of the memory location specified by input port 42. |
| Digital Output Port 43 | |
| Hex Display | - This port is for a two hexadecimal digit display on the module front panel. |
| Digital Output Port 50 | |
| Lt door enable | - 18Hz toggle bit enables the door module to allow the doors on the left side to open if requested. |
| RT door enable | - 18Hz toggle bit to the door module to allow the doors on the right side to open if requested. |
| YDT TSE | - This bit turns on the YDT tachometer simulator enable signal. |
| $\overline{\text{YDT A head}}$ | - This bit disables the YDT A head signal. |
| $\overline{\text{YDT B head}}$ | - This bit disables the YDT B head signal. |
| $\overline{\text{Ts Pre 2set}}$ | - This bit disables the track signal preamp #2 selection. |
| 9Hz | - The CPU has detected a 9Hz code from the tail of the train and will allow the doors to open. |
| spare | - To be used if required. |
| Digital Output Port 51 | |
| $\overline{\text{P sig avail}}$ | - Goes to status light on operator's console. |
| $\overline{\text{ATC status}}$ | - Goes to status light on operator's console. |
| $\overline{\text{handback req}}$ | - Goes to status light on operator's console. |

-continued

| | |
|---|---|
| BRK assurance | - Goes to status light on operator's console. |
| PS display | - Goes to status light on operator's console. |
| spares | - To be used if requred. |
| Digital Output Port 52 | |
| CPU 2 failed | - to LED on module front panel if CPU #2 has had a detected failure. |
| TK Sig Pre Amp | - to LED on module front panel if one of the track signal pre-amps has failed. |
| Power Supply | - to LED on module front panel if one of the analog voltages measured is out of tolerance. |
| ID RX Ant | - to LED on module front panel if a failure has been detected in the ID Receiving Antenna. |
| ID RX Module | - to LED on module front panel if a failure has been detected in the ID receiver module. |
| ID Tx/Door Module | - to LED on module front panel if a failure has been detected in the ID transmitter/door module. |
| TK sig. Ant. | - to LED on module front panel if a TK signal antenna failure is detected. |
| SPD Code Rx | - to LED on module front panel if a failure is detected in the speed code receiver module. |
| Digital Output Port 53 | |
| ONES speed error | - This 8-bit output port sends the enhanced ones speed error to the vital interlock board. |

Figure 8:
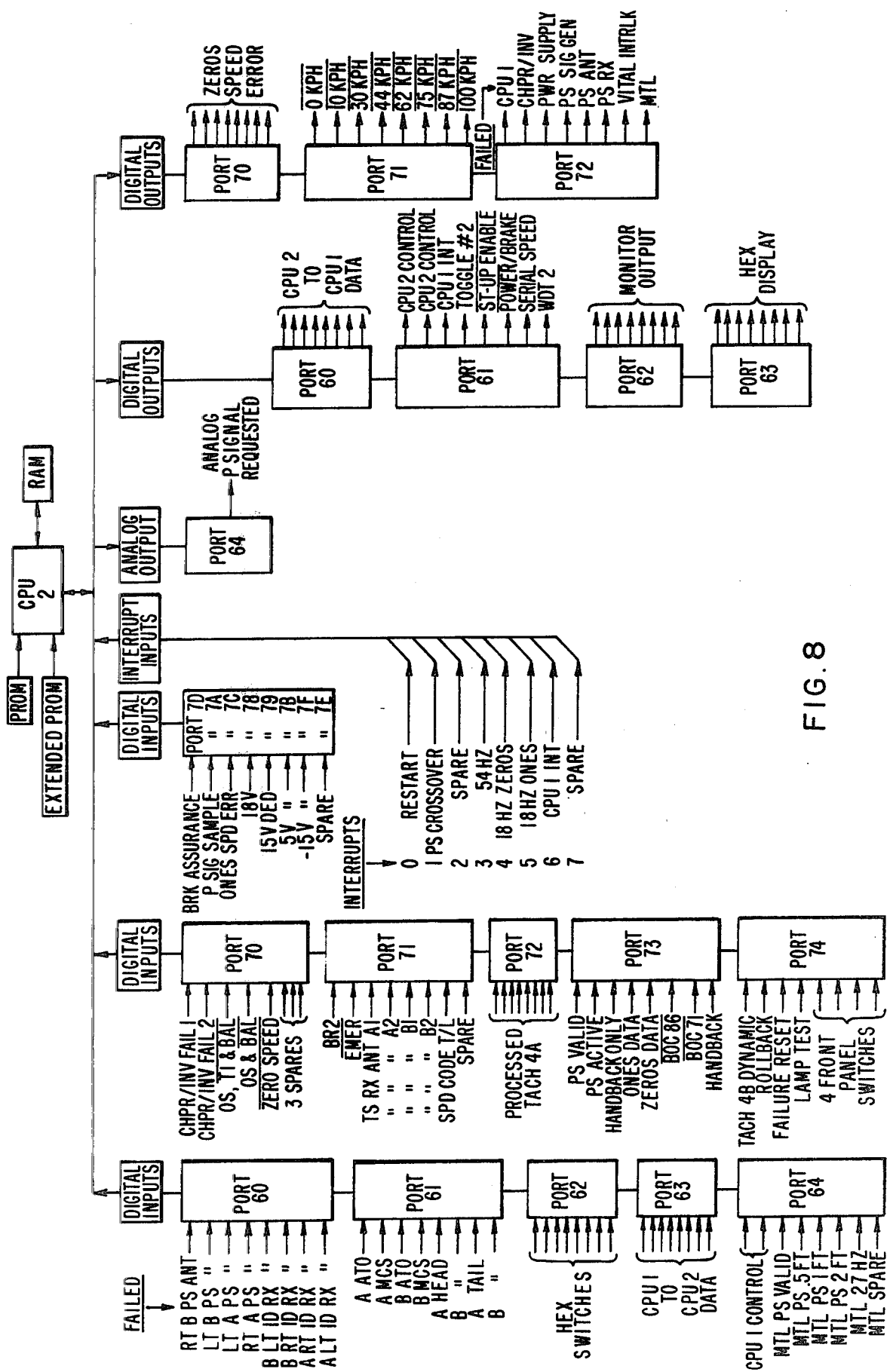
FIG. 8 illustrates the input signals supplied to the CPU 2 computer on each A car and the output signals from that computer system.

FIG. 8 SIGNAL IDENTIFICATION
CPU 2 Input/Output Signal Definitions

| | |
|---|---|
| Digital Input Port 60 | |
| RT B PS Ant. fail | - The program stop antenna on the right side of the B car has failed. Signal comes from PS receiver module. |
| LT B PS Ant. fail | - The program stop antenna on the left side of the B car has failed. Signal comes from PS receiver module. |
| LT A PS Ant. fail | - The program stop antenna on the left side of the A car has failed. Signal comes from PS receiver module. |
| RT A PS Ant. fail | - The program stop antenna on the right side of the A car has failed. Signal comes from PS receiver module. |
| B LT ID RX Ant. fail | - The ID receiver antenna on the left side of the B car has failed. Signal comes from the ID receiver module. |
| B RT ID RX Ant. fail | - The ID receiver antenna on the right side of the B car has failed. Signal comes from the ID receiver module. |
| A RT ID RX Ant. fail | - The ID receiver antenna on the right side of the A car has failed. Signal comes from the ID receiver. |
| A LT ID RX Ant. fail | - The ID receiver antenna on the left side of the A car has failed. Signal comes from the ID receiver module. |
| Digital Input Port 61 | |
| A ATO | - The A car controller is in the ATO position. Signal comes from vehicle supplied equipment. |
| A MCS | - The A car controller is in the MCS position. Signal comes from vehicle supplied equipment. |
| B ATO | - The B car controller is in the ATO position. Signal comes from vehicle |

-continued

| | |
|---|---|
| | supplied equipment. |
| B MCS | - The B car controller is in the MCS position. Signal comes from vehicle supplied equipment. |
| A head | - The A car is the controlling car on the front end of the train. Signal comes fom vehicle supplied equipment. |
| B head | - The B car is the controlling car on the front end of the train. Signal comes from vehicle supplied equipment. |
| A tail | - The A car is the tail end car in the train. Signal comes from vehicle supplied equipment. |
| B tail | - The B car is the tail end car in the train. Signal comes from vehicle supplied equipment. |
| Digital Input Port 62 | |
| Hex switches | -This 8-bit input port comes from two hexadecimal switches on the front panel of the module. |
| Digital Input Port 63 | |
| CPU 1 to CPU 2 | - A full 8-bit input port from CPU 1 output port 40. |
| Digital Input Port 64 | |
| CPU 1 control | - Two data bits from CPU 1 to tell this CPU the status of the information to be transferred between CPU's. These bits come from CPU 1 output port 41. |
| MTL PS valid | - Signal from the multiplex train line CPU that the Program Stop information is valid. |
| MTL PS .5 ft. | - Signal from the multiplex train line CPU that one count (.5 ft. of distance) has passed since the last 54Hz interrupt. |
| MTL PS 1 ft. | - Signal from the multiplex train line CPU that two counts (1 ft. of distance) have passed since the last 54Hz interrupt. |
| MTL PS 2 ft. | - Signal from the multiplex train line CPU that four counts (2 ft. of distance) have passed since the last 54Hz interrupt. |
| MTL 27 Hz | - Signal from the mutliplex train CPU that is toggled on the 54Hz interrupt causing a 27Hz pulse whenever everything is operational. |
| MTL spare | - Signal from the multiplex train line CPU to be used if required. |
| Digital Input Port 70 | |
| CHPR/INV fail 1 | - Chopper/Inverter #1 has a detected failure. |
| CHPR/INV fail 2 | - Chopper/Inverter #2 has a detected failure. |
| OS, $\overline{\text{TI \& bal}}$ | - The system is in overspeed without tach integrity and balance. Signal comes from the vital interlock module. |
| OS & $\overline{\text{Bal}}$ | - The system is in overspeed condition because the ones and the zeros commands do not balance. Signal comes from the vital interlock module. |
| $\overline{\text{zero speed}}$ | - The train has not achieved zero speed. Signal comes from the vital interlock module. |
| 3 spares | - To be used as required. |
| Digital Input Port 71 | |
| BR2 | - A propulsion request has been made. Signal comes from propulsion equipment to be used for start-up enable. |

-continued

| | |
|---|---|
| $\overline{\text{EMER}}$ | - The emergency brakes are not on. Signal comes from brake system. |
| TS RX Ant. A1 | - The A1 track signal antenna has failed. Signal comes from the track signal preamp box. |
| TS RX Ant. A2 | - The A2 track signal antenna has failed. Signal comes from the track signal preamp box. |
| TS RX Ant. B1 | - The B1 track signal antenna has failed. Signal comes from the track signal preamp box. |
| TS RX Ant. B2 | - The B2 track signal antenna has failed. Signal comes from the track signal preamp box. |
| SPD Code T/L | - The speed code train line is continuous. The signal comes from the train line. |
| spare | -To be used if required. |

Digital Input Port 72

| | |
|---|---|
| Procesed tach 4A | - An 8-bit number representing 2 times the speed of the train in KPH. The signal comes from the I/O Module itself. |

Digital Input Port 73

| | |
|---|---|
| PS valid | - A signal present when the crossover counts are detected by both channels. Signal comes from PS receiver module. |
| PS active | - A signal present when the crossover count is detected by one of the channels. Signal comes from PS receiver module. |
| handback only | - The handback request switch is in the handback position. |
| Ones data | - 18Hz data bit representing a 6-bit comma-free code from the ones decoder on the speed code receiver module. |
| Zeros data | - 18Hz data bit representing a 6-bit comma-free code from the zeros decoder on the speed code receiver module. |
| $\overline{\text{BOC 86}}$ | - The 86% cutout car signal is not present. This signal comes from a switch in the propulsion equipment. |
| $\overline{\text{BOC 71}}$ | - The 71% cutout car signal is not present. This signal comes from a switch in the propulsion equipment. |
| handback | - This processed handback bit is on when the TC equipment has acknowledged the handback request. |

Digital Input Port 74

| | |
|---|---|
| Tach 4B dynamic | - Tachometer 4B is dynamic, the tach has not dropped out. The signal comes from logic associated with reading tach 4B on the input itself. |
| rollback | - The train has been detected to be rolling backward. This is determined by phase checks of the tachs done on the module itself. |
| failure reset | - Input bit from toggle switch on the front panel of the module. |
| lamp test | - Input bit from toggle switch on the front panel of the module. |
| 4 other switches | - 4 front panel switches to be used as desired. |

Analog Input Ports 78-7F

| | |
|---|---|
| BRK assurance (7D) | - This is for a future brake assurance accelerometer input to a new brake assurance program. |
| P sig. sample (7A) | - Analog input from the P signal to be used for diagnostics. |
| Ones speed error (7C) | - Analog speed error from CPU 1 vital interlock module. |

-continued

| | |
|---|---|
| +18V (78) | - Input from +18 volt supply to be used for diagnostics. |
| +15V ded (79) | - Input from the +15 volt dedicated supply to be used for dignostics. |
| +5V ded (7B) | - Input from the +5 volt dedicated supply to be used for diagnostics. |
| −15V ded (7F) | - Input from the −15 volt dedicated supply to be used for diagnostics. |
| spare (7E) | - to be used if required. |

INTERRUPT INPUTS

| | |
|---|---|
| restart | - Interrupt 0, highest priority, used only to reset computer system. |
| PS crossover | - Interrupt 1, second highest priority, occurs whenever the train passes a crossover on the program stop tape. |
| spare | - Interrupt 2, third highest priority, will be used if required. |
| 54Hz | - Interrupt 3, fourth highest priority, used for clock and periodic timers. |
| 18Hz zeros | - Interrupt 4, fifth highest priority, 18Hz input from speed decoding module signaling it is time to read the zeros data bit. |
| 18Hz Ones | - Interrupt 5, sixth highest priority, 18Hz input from speed decoding module signifying it is time to read the ones data bit. |
| CPU 1 int | - Interrupt 6, seventh highest priority, comes from CPU 1 whenever information from CPU 1 is ready to be read into CPU 2. |
| spare | - Interrupt 7, eighth highest or lowest priority, will be used if necessary. |

Analog Output Port 64

| | |
|---|---|
| Analog Psig | - Analog P signal requested, output is the same value as that sent to the propulsion logic. |

Digital Output Port 60

| | |
|---|---|
| CPU 2 to CPU 1 data | - This 8-bit channel is used to transfer information to CPU 1 input port 43. |

Digital Output Port 61

| | |
|---|---|
| CPU 2 Control | - These two bits are sent to CPU 1 to tell it the status of the information being transferred between CPU's. These bits go to input port 44. |
| CPU 1 Interrupt | - This bit is connected to interrupt 5 on CPU 1 to tell the computer information is ready. |
| toggle 2 | - This bit toggles at an 18Hz rate and goes to the 304 board to inhibit a computer reset as long as the bit continues to toggle. |
| $\overline{\text{start-up enable}}$ | - This bit is set whenever the start-up enable initial conditions are not satisfied. |
| $\overline{\text{power}}$ /brake | - Request to put train into brake and out of power mode. |
| serial speed | - Bit to multiplex training module to send the cab signals and status information serially for the operator's console. |
| WDT2 | - Watchdog timer, 18Hz toggle sent to the vital interlock module to signify that the zeros speed decoding has been executed. |

Digital Output Port 62

| | |
|---|---|
| Monitor | - This 8-bit port is used to display on the front panel LED the contents of the memory location specified on input port 62. |

-continued

| | |
|---|---|
| Digital Output Port 63 | |
| Hex display | - This port is for a two hexadecimal digit display on the module front panel. |
| Digital Output Port 70 | |
| Zeros speed error | - This 8-bit output port sends the enhanced zeros speed error to the vital interlock board. |
| Digital Output Port 71 | |
| $\overline{\text{0 KPH}}$ | - Not zero speed command bit to the speed display on the operator's console. |
| $\overline{\text{10 KPH}}$ | - Not 10 KPH speed command bit to the speed display on the operator's console. |
| $\overline{\text{30 KPH}}$ | - Not 30 KPH speed command bit to the speed display on the operator's console. |
| $\overline{\text{44 KPH}}$ | - Not 44 KPH speed command bit to the speed display on the operator's console. |
| $\overline{\text{62 KPH}}$ | - Not 62 KPH speed command bit to the speed display on the operator's console. |
| $\overline{\text{75 KPH}}$ | - Not 75 KPH speed command bit to the speed display on the operator's console. |
| $\overline{\text{87 KPH}}$ | - Not 87 KPH speed command bit to the speed display on the operator's console. |
| $\overline{\text{100 KPH}}$ | - Not 100 KPH speed command bit to the speed display on the operator's console. |
| Digital Output Port 72 | |
| CPU 1 | - to LED on module front panel if a failure is detected in CPU 2. |
| CHPR/INV | - to LED on module front panel if a failure is detected in the chopper/inverter. |
| power supply | - to LED on module front panel if one of the analog voltages measured is out of tolerance. |
| P sig. gen. | - to LED on module front panel if the analog P sig. sample is not what was expected. |
| PS Ant | - to LED on module front panel if a failure is detected in either program stop antenna. |
| PS RX | - to LED on module front panel if a failure is detected in the program stop receiver module. |
| Vital Interlock | - to LED on module front panel if a failure is detected in the vital interlock module. |
| MTL | - to LED on module front panel if a failure is detected in the Multiplex Train Line System |

The central control sends a signal to the local station indicating whether a particular train is to stop at that station or not. The prior art practice was to include one program stop tape physically along the track ahead of each station. In accordance with the present invention a plurality of sections of program stop tape may be provided for each station, and the station equipment operates to selectively energize one of these tape sections. Each of these tapes provides a different stopping speed pattern as well as a different stopping location for the moving train. A train that has run through a previous station may be travelling faster at the present station and require a longer program stop tape. The program stop tape is a transmitting antenna tape that does not receive signals, but instead provides an output signal to the train which is to be stopped. The crossover points on the program stop antenna tape are located at a predetermined distance, such as every six inches, and as the moving train passes over the program stop antenna, pulse signals are provided for each of these crossover points and this provides reference points or counts to initiate the program stop operation as well as to keep track of the train position and the velocity changes of the train moving along the program stop antenna to control the train in a predetermined slow-down pattern. The program stop here disclosed uses a distance versus velocity table, and once the vehicle senses the energized program stop antenna, the control operation enters the program table. The table lists the velocity that the vehicle is supposed to be going at each individually sensed location of the vehicle, which desired velocity is obtained from the table and is compared with the actual velocity from the wheel tachometers of the vehicle to provide an error signal which corrects the actual vehicle velocity in relation to the desired reference speed control signal. The program stop antennas on the vehicle provide signals corresponding to crossovers on the tape, for the program stop receiver module. Out of that module comes three signals, the program stop valid, program stop active, and the individual crossovers. These signals go into input modules on the microprocessor CPU 2 on each A car.

Figure 9:
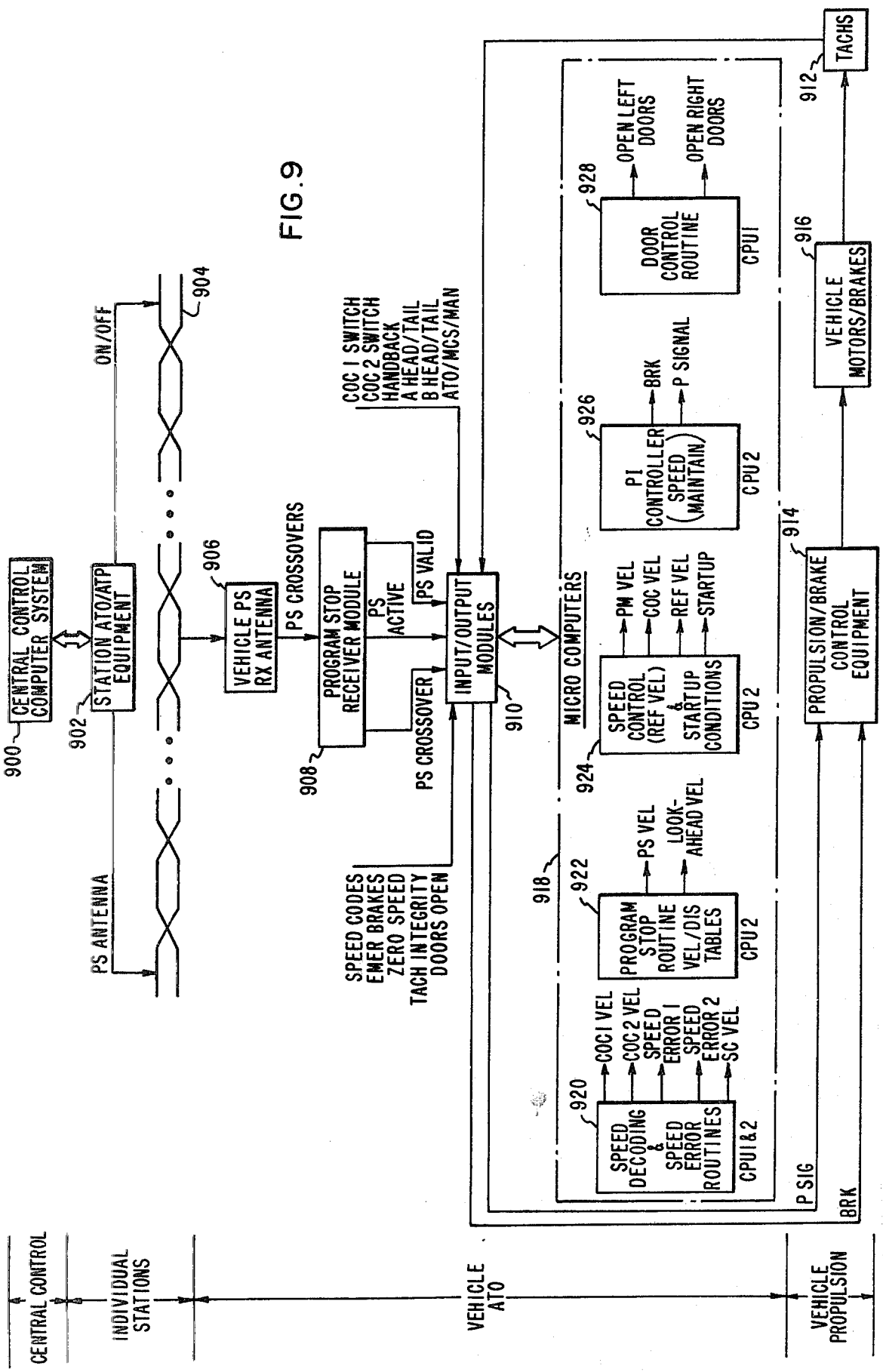
FIG. 9 illustrates the operational relationships of the program routines disclosed in accordance with the present invention and the inventions covered by the above cross-referenced and concurrently filed applications.

The purpose of the program stop subsystem is to bring a moving train to a smooth stop at a predetermined location, usually at a passenger station. The program stop subsystem is shown in FIG. 9 by block diagram. It shows an overall view of the entire subsystem. It starts off at central control 900, which is located in one location on each system and contains the consoles and displays. The output of the central control 900 is a signal in relation to each station which tells the train to stop or to run through the given station. It is one signal having an ON or OFF value. Each station includes ATO equipment 902, which receives the signal whether a particular train should stop or not, which goes through the ATO equipment and turns on the program stop antenna 904. The antenna 904 is the greek wire or tape antenna actually mounted along the track in front of each station. When this program stop tape antenna is turned on, power is applied to it and it causes an induced output signal phase shift to occur when the train antenna passes over each of the crossovers which are six inches apart along the length of the antenna 904. On board the train are the program stop receiver antennas 906. These antennas pick up phase shift signals as the train passes over the crossovers. The crossover signals then are fed on board the train to the program stop receiver module 908. This module 908 has three outputs to the computer system; the first one is program stop PS active which signal is present any time the train is passing over a transmitting antenna 904 which is energized. The second signal program stop is a PS valid, which signal is present any time that the train is detecting phase changes. The third signal is the program stop PS crossover and a pulse is generated each time one of the crossovers in antenna 904 is passed. This portion of the control apparatus shown in FIG. 9 was used in the BART and Sao Paulo train control systems described in the above-referenced published articles.

In FIG. 9 there is shown the microprocessors CPU 1 and CPU 2 including the input and output modules. There are four of these I/O modules for each CPU, including the input ports and the output ports involved with the present program stop control operation. The specific signal inputs and outputs to the I/O modules 910 are shown in FIG. 9.

A closed loop control system is established, where the input signals from the train come into an input module, go through the computer system and output control signals come out through an output module to close the loop and control the train. The main control loop includes the tachometers 912, which supply the actual velocity of the train vehicles to an input module. An output module signal from block 910 provides to the propulsion brake control equipment 914 the P signal request and a brake signal. By monitoring the difference between the desired speed and the actual speed, the loop is closed through the propulsion and brake control equipment 914. The vehicle 916 responds to the propulsion equipment signals and in turn operates with the tachs 912.

The microcomputer control system 918 consists of the two microprocessor boards CP1 and CP2 and the expansion memory module previously described. Inside the microcomputer control system 918 are five blocks, which represent software control programs.

The five programs within the computer. The first program 920 is the speed decoding and the speed error routine which is described in more detail in the second above cross-referenced patent application Ser. No. 920,317, and which includes one program in CPU 1 and another program in CPU 2. Two individual programs were independently written to assure that the respective program routines operated differently for safety purposes. The inputs to each of these are the one's and the zero's speed codes, the outputs are the speed code velocity plus one's and zero's speed errors. These two errors are compared and used in the overspeed module. The speed decoding in the CPU-1 program calculates how fast the vehicle is supposed to be going from the input speed codes that are received from the station ATO equipment 902, and calculates how fast the vehicle is going by looking at the tachs 912 and comes up with the speed error 1. This speed error 1 signal of 8 bits is sent directly to the overspeed module. The speed decoding in CPU-2 does the same operation and calculates how fast the vehicle is supposed to be going, how fast it is going and calculates an error; the speed error 2 is sent to the overspeed module. The speed error 1 and speed error 2 signals are compared in a fail safe manner to determine if the vehicle is going overspeed or not.

The second program 922 in accordance with the present invention is the program stop routine in the computer CPU 2, and it contains both the program itself and the program stop profile tables, which are velocity versus distance tables. These tables are shown in the listing included in the Appendix.

The third program 924 within the computer CPU 2 is described in greater detail in the sixth above cross-referenced patent application, Ser. No. 920,315, and is called speed control and start-up conditions, which uses inputs from the other programs and provides a speed code velocity which is generated from the two speed decoding routines, and these are modified by the cut-out car switches shown in the inputs above to the input-/output modules 910. A performance modification number is determined from the ID system and the PM velocity is calculated in program 924. The program stop velocity is input from the program stop routine 922. The speed control routine checks these input conditions and selects the reference velocity from these possibilities, which reference velocity is then set to the PI controller 926 to determine the speed at which the train will be maintained. Thusly, the primary output from the speed control 924 is the reference velocity. Another portion of this routine checks the start-up conditions, such as if the train is stopped in a station it requires special logic to tell the train to start; it monitors again all the different inputs and if the vehicle is ready to start it will issue a start-up signal.

The fourth program 926 is a PI controller which is the speed maintaining routine described in greater detail in the first above cross-referenced patent application Ser. No. 920,319. The input signal to this routine 926 is reference velocity. The output from this routine 926 is a brake signal and a P signal which goes to the propulsion and brake control equipment 914. The program 926 checks what speed the train is supposed to be going, it checks what speed the train is going and fits a curve to the difference between where the train is and where it should be.

The fifth program 928 is the door control routine 928 described in greater detail in the fourth above cross-referenced patent application Ser. No. 920,104, and which controls the opening and closing of the doors on the train. The inputs to this routine are the door open signals from the receiving antennas and certain control signals from the vehicle such as zero speed. The outputs from this program are two dynamic signals to the door module requesting the doors to open on the left side or right side. Doors are only allowed to open when a train is completely within the station area. Doors open only where a platform is present. When platforms are located on both sides of the train, the door opening can be staggered, one side opens before the other to allow passengers to depart before allowing new passengers to board.

DETAILED DESCRIPTION OF A PREFERRED EMBODIMENT

Each A car has a specific antenna that picks up the program stop crossovers. It has its own antenna that monitors the program stop, so as soon as the car gets over the end of the tape a signal is generated by one channel and input to the CPU 2 computer and says Program Stop Active. As the car continues to move along the tape, the other channel starts picking up a signal. These two signals are "ANDED" together, and there is a new signal that comes into the CPU 2 computer that says Program Stop Valid to indicate both channels are receiving signals. Each time the car crosses one of the crossover points, there is an interrupt generated and sent into the CPU 2 computer on the car. So, three signals are provided, the first is Program Stop Active which means one channel is receiving signals; the second is Program Stop Valid, which means both channels are picking up signals, and then every time the car passes a crossover an interrupt is provided. The program counts those interrupts to determine the position of the car.

The amount of information stored in a profile table is limited by the table length, and the profile tables PROF 1 to PROF N have 256 entries in them. There are 1412 crossovers in a typical program stop tape. The program only counts every fourth interrupt for the first 512 feet or 1024 crossovers. As the car gets down a little closer to the station, the program counts every other one for the next 128 feet and then for the remainder of the tape the program counts every point.

The normal running speed for a train is 100 KPH. However, approaching a station, the wayside equipment knows that 44 KPH is the maximum train speed allowed at the beginning of a program stop tape. So the signal block speed decoding equipment will force the train to reduce its speed as required to be going 44 KPH at the start of the tape.

The program stop is the highest priority routine in the CPU-2 computer because it is the fastest and the top priority. No matter what the CPU-2 computer is doing, when the program stop interrupts occur, the computer runs this program, and then returns to other things it has to do.

The car can come into the profile stop tape at 68 KPH and still stop at the station. But if the train is coming in at over 68 KPH, the car overshoots the station. The car will stop, but it will be outside the station and the doors cannot be opened.

If the speed error is four KPH underspeed, for example, the provided P signal would be the value required to get rid of this four KPH error at the jerk-limited rate. If the actual speed is 15 KPH now, and the speed error is four, it is possible that one second from now the train should be at 11 KPH. The prior art control apparatus would try to correct the wrong 4 KPH underspeed by requesting acceleration right now to try to get to the desired 15 KPH but one second from now the train should be at 11 KPH where it is already, so the present control operation saves a shoot-up and a shoot-down and works the same way on both sides of the curve, and that smooths out the operation of the speed controller. The reference velocity is still at 15 KPH, and then in another place in the program, there is a look-ahead velocity which is 11 KPH. So the control operation looks at where the train is, looks at where the train is going to be, and adjusts the control operation accordingly.

The program stop routine is called by the program stop interrupt itself, it has the highest priority in the CPU-2 computer and will interrupt any of the other programs that is in operation. At step 750 in FIG. 10A the registers are saved since the program stop has interrupted some other program in the CPU 2 computer, at step 750 all the information the computer was working on at that time is saved. At step 752 the program stop valid and the program stop active data is input to indicate that a program stop is actually being made. At step 754 a check is made to see if this is the ATO mode of operation. At step 755 a check is made to see if the hand-back signal is present. If not ATO, the CPU 2 computer does not perform programmed stop, and then at step 756 a reset occurs to set the velocity look-ahead and the program stop velocity to the maximum number; this guarantees that the program stop will not be used in relation to the speed control program that follows.

The speed control program selects the minimum of the program stop velocity, the look-ahead velocity, the speed-code velocity, the cutout car velocities, and the performance modification, and step 756 sets maximum values to guarantee they will not be used.

Step 758 restores the registers that we stored in step 750 and the CPU 2 returns to whatever it was doing before.

Step 760 checks the program stop valid signal which was input initially to start the program stop routine and if it is not a (1), that says that this was a fault interrupt, and the program goes to step 756 and out.

Step 762 is a software program stop flag, which is set on the first pass through this routine and says the initialization has been accomplished. The first time through the program, the PSFLG will not be (1), so the program goes to step 764 and checks whether this is a A-head end car; there is a possibility of several cars making up a train, and one of the cars on that train will be an A-head end. The particular car sensing the program stop tape can be a head end, a tail end, or it can be in the middle of the train. The CPU 2 computer doesn't known which position its car has in these operations, it may even be in the center, since the CPU 2 for each A car is on and running all the time, so when a program interrupt occurs the CPU 2 has to check and see if it is controlling and involved. The front A car does control the program stop for the train and that is why the check is here. There are two possible heads; if the train is going forward the front A car is "A" head; if the train is going in reverse the car will be a "B" head requiring a different length to stop. So at step 764 the check is made to see if this car is an A-head end to establish it is controlling the train. An A car is physically different from a B car with the antennas mounted in different locations; and that is the reason for setting different stopping points.

The train is made up of A and B pairs, with an A car having to be connected to a B car and each AB pair has one set of control equipment per pair. So, if the car is a head end and is controlling the train, and is an A car, the program goes to step 766 which sets the distance to go for an A car, since the antennas are relatively different than on a B car, count is started in a different place. There is a look-up table, which has the number, for an A head. Step 768 checks is it a B head, and if it is not a B head, the program exits through step 756 since it is not in control. Only the head end controls, so it has to be an A car in control, or a B car in control, with an in-between car or tail end car being ignored because it is not controlling anything. Step 770 sets the distance to go to a different count which is preset for the B head car in control.

Steps 772 and 774 use the velocity tables to preset the respective velocities to go for the A head car or the B head car.

This is the initialization process that the program stop flag permits only once. Steps 776, 778 and 780 are counter flags which are set to one or zero. The flag called Flag 4, as the program goes through, counts up—1, 2, 3, 4 and says use it, zero out; 1,2,3,4, use it, and zero out; and this guarantees that it always starts at zero. And then we set the PSFLG flag itself to (1) to indicate the program is initialized, and do not go through this path again. Step 782 calls the PSI routine.

Step 784 is the DTGO decrement counter which was preset in steps 766 or 770—in an A car it was set to 752 and for a B car was set to 700.

Only about half of the program stop tape is used so the velocity of the train will hold 44 KPH half-way through the tape length.

Step 786 checks how low the car speed is on the table, and if it is above 384, the program uses every fourth point in the table. Step 788 checks the flag FLG 4, which allows counting to four (4), to see if it is zero (0). The count operation is down rather than up, so if it is not zero, decrement it at step 790 and leave.

For counts above 384 a number is picked out of the profile table every fourth count; at the end of the first four counts is the first location; at the end of 8 counts is the next location, and so forth. The first time the program goes through here the count is going to be one (1), so it is not proper to read a number from the table yet.

The program stop interrupts come in the first time, the second time, the third time, and on the fourth time it is proper to take a number out of this velocity profile table.

The steps 786, 788, 790 and 792 are used to pick out every fourth count velocity in the table as long as the count is greater than 384. Steps 794, 796, 798 and 800 are used to pick out at every other count a velocity in the table for all counts between 384 and 128. Step 802 checks to see if the distance to go is at the end, and if it is at the end, it is zero which is the stopping point; you then set the distance to go counter arbitrarily to (1), and the reason for that is earlier at step 784 the counter is always decremented before making a check, and this holds this count to zero as the program comes through; otherwise, the counter would just keep running. At step 804 you increment the counter which holds it to zero in fact. At step 806 the program stop velocity is set to zero, and the look-ahead velocity at step 808 is set to zero, and it is held there while going through this program. At step 810, the program has passed through the sequence which says at step 786 that it is every fourth interrupt; at step 794 it is every other interrupt; 26, and at step 802 it is every interrupt count. Step 810 increments the velocity table to go one location down from the present point in the velocity profile. Step 810 says to take the next velocity out of the table. Step 812 checks to see if the degraded mode operation is present. Step 814, if in the normal profile, sets the address of the table. Step 816, if in a degraded mode, sets the address on the other table. Step 818 calls the subroutine VEL. Step 820 stores the program stop velocity from the profile table after executing step 810. Starting at the top of the table, every time the program operation goes through step 810, this goes down one location. Step 820 goes to the table and just picks that number out and stores it away for the speed control program. This then is the current Program Stop Velocity in KPH. Step 822 reads the tach 4A, brings in the signal and stores it; and that gives the actual car velocity to use for the looking ahead; the present speed is used to determine the velocity the car will be going one second from now. The desired speed is obtained in step 820 and the actual speed is obtained in step 822. At step 824 a check is made to see if the counts are greater than 384, such that the velocity table only has every fourth point in it. At step 826 the tach speed is divided by 4, to determine the tach bias. Step 828 makes a check to see if the counts are greater than 128 to separate the other table. Step 830 takes the tach reading and divides it by 2 because every other location is now used, and step 832 uses the tach reading direct because every location is being used, so if the tach says the car is going 4 KPH, the program looks ahead 4 counts in the table. Step 834 uses these numbers, which have been stored; it takes the regular bias, which is the relative location in the table of the velocity, adds to it this new bias which was calculated in step 826, 830, or 832, and gets that table. That is the look-ahead velocity. In order for the look-ahead velocity to not overrun the table; one second from the end might be going out of the table so step 836 is strictly a check to make sure that there is no overrun of the table with the look-ahead velocity. It checks to see if the number of counts exceeds 511, and at step 838 it limits the count to 511. Step 840 stores the last location which is zero in look-ahead, and then the program returns.

There are several improved functional operations provided by the present control apparatus and method. Any reasonable number of profiles can be provided in the form of different tables as shown in PROF-1 and PROF-2 up to PROF-N, in FIG. 11. More than one profile is desired to permit different stopping positions coming into stations from different directions, or in relation to different track grades. In the prior art program stop control system, two profiles are used, with one being used in all cases where there are no known failures in the propulsion and brake equipment, and the second is used whenever there is a known failure, as shown by the cutout car switches to indicate a brake failure on one or more cars, as controlled by the operator. With the present control apparatus one profile could be used for cutout car 1, another for cutout car 2, and so forth.

Another improvement is to provide adjustable break points within a given profile table, as shown in FIG. 11 to give desired discontinuities inside of the profile tables. A reason to have adjustable break points is that different speeds require different accuracies on the known stopping position. In the present control system, for the first 512 feet of crossover counts only every 4 counts are counted, which is at 2 feet intervals, for the next 128 feet every other count is used or 1 foot intervals, and for the last 64 feet every count is used to update at 6-inch intervals. The breakpoints reduce the memory storage required to otherwise store every count. The breakpoints in the tables are shown at the right-hand side of FIG. 11 under the ROM double word tables. BRK-1 is the number of counts from the top of the table to the first breakpoint. BRK-2 is the number of counts for the second interval. BRK-3 is the number of counts to the end. If desired, by adding BRK-4, BRK-5 up to however many are desired the profile tables can be broken into any number N of segments dependent upon the accuracy required and related to speed and the amount of memory available, to set tables up to the optimum operation.

A further improvement is to provide look-ahead velocities to allow more fine-tuning of the speed control, which is specifically the velocity at which the train should be running at some predetermined point in time in the future, such as one second. The two outputs of the program stop program are the desired velocity at the present time, which is directly taken out of one of the profile tables, and the desired look-ahead velocity one second from now. The program should know what speed the train is supposed to be running now and what speed the train is supposed to be running one second from now, and this can instead be carried ahead 3 seconds, 4 seconds, 5 seconds, or 10 seconds from now as may be desired.

An additional improvement is to have more than one station-stopping position, with each station-stopping position being determined by a known number of counts from the beginning of the program stop antenna. This number can be any number from 0 to the total number of crossovers on the antenna itself. In the present control system it is shown as the distance to go numbers in the ROM double-word table, as an example: ADTGO means the distance to go with an A car as a controlling car and it is shown as 752 counts. The number can be any number from 0 to 1406, with the BDTGO being the distance to go when a B car is the controlling car and it is shown as 700 counts. It is different for a B car compared to an A car because of the location of the antennas on the car, which are not symmetrical. On the B car the antenna is closer to the front than it is on an A car.

A still further improvement is to provide an adjustable number of counts before a stop. In the ROM double-word table, ADTGO is the distance to go, as previously described, and AVTGO is the number of velocities to go. The number of velocities is related to the breakpoints so when either BRK-1, 2 or 3 changes, AVTGO is the number of velocities go or the number of points remaining in the table. The last number in the table is DTGMX, which is the distance to go max; it is shown as 511 since there are 511 entries in the table.

A still additional improvement is to provide an adjustable speed flareout before the vehicle stops. The flareout time period is before the train makes its stop, where the brakes are released momentarily to allow a smooth stop without getting a sudden jerk. The here disclosed control system can adjust the flareout if a more smooth stop is desired for one train by going into the memory and adjusting the location slightly, and if desired a different actual flareout can be provided for each of the trains running on the system. Also, field adjustment of the stop in profile can be provided PROF-1, PROF-2 can be changed in the field and adjusted to a specific train, since each train does have different running characteristics.

GENERAL DESCRIPTION OF INSTRUCTION PROGRAM LISTING

In Appendix A there is included an instruction program listing that has been prepared to control a process operation, such as a transit passenger vehicle in accordance with the here disclosed control system and method. The instruction program listing is written in the assembly language of the Intel 8080 microprocessor computer system. Many of these computer systems have already been supplied to customers, including customer instruction books and descriptive documentation to explain to persons skilled in this art the operation of the hardware logic and the executive software of this digital computer system. This instruction program listing is included to provide an illustration of one suitable embodiment of the present control system and method that has actually been prepared. This instruction program listing at the present time is a more or less development program and has not been extensively debugged through the course of practical operation of vehicles on a transit system. It is well known by persons skilled in this art that real time process control application programs may contain some bugs or minor errors, and it is within the skill of such persons and takes varying periods of actual operation time to identify and correct the more critical of these bugs.

A person skilled in the art of writing computer instruction program listings, particularly for an invention such as the present transit vehicle control system must generally go through the following determinative steps:
  Step One—Study the transit vehicle operation to be controlled, and then establish the desired control system and method concepts.
  Step Two—Develop an understanding of the control system logic analysis, regarding both hardware and software.
  Step Three—Prepare the system flow charts and/or the more detailed programmer's flow charts.
  Step Four—Prepare the actual computer instruction program listings from the programmer's flow charts.

This instruction program listing included in the Appendix was prepared in relation to the programmer's flow charts.

```
ISIS 8080 MACRO ASSEMBLER, V1.1                        PAGE 1
CONT1B

;       JAN 24, 1978 SUB 0
                    ;       MAY 12, 1978 SUB ?

;ADD INITP,MEM. TEST,SLIM DOWN

TITLE   'CONT1B'

;INTERUPT HANDLER MACRO ROUTINE

INTER   MACRO   RESAR,ADDR
                            PUSH    PSW
                            MVI     A,10H*(7-RESAR)+8
                            OUT     0FH
                            JMP     ADDR
                            ENDM

;PRESET MEMORY AND OUTPUTS MACRO ROUTINE
                    ;INVERTING PORTS

PREST   MACRO   PORT
                            LDAX    D
                            MOV     M,A
                            CMA
                            OUT     PORT
                            INR     L
                            INX     D
                            ENDM

;NONINVERTING PORTS

PRSTN   MACRO   PORT
                            LDAX    D
                            MOV     M,A
                            NOP
                            OUT     PORT
                            INR     L
                            INX     D
                            ENDM

;MAIN CONTROL PROGRAM FOR CPU 1

;FEB 11,77

0000                        ORG     0
0000 F3                     DI
0001 31FF0F                 LXI     SP,0FFFH       ;SET STACK TO TOP OF PAGE F
0004 00                     NOP
0005 C34B00                 JMP     INIT

ISIS 8080 MACRO ASSEMBLER, V1.1                        PAGE 2
CONT1B

;RESTART 1

+         INTER   1,IDIDS
0008 F5           +         PUSH    PSW
0009 3E68         +         MVI     A,10H*(7-00001H)+8
000B D30F         +         OUT     0FH
000D C3F006       +         JMP     006F0H

;RESTART 2

+         INTER   2,IDOTR
0010 F5           +         PUSH    PSW
```

```
0011 3E58      +         MVI     A,10H*(7-00002H)+8
0013 D30F      +         OUT     0FH
0015 C3B009    +         JMP     009B0H

;RESTART 3

+         INTER   3,SD1
0018 F5        +         PUSH    PSW
0019 3E48      +         MVI     A,10H*(7-00003H)+8
001B D30F      +         OUT     0FH
001D C3A002    +         JMP     002A0H

;RESTART 4

+         INTER   4,SD0
0020 F5        +         PUSH    PSW
0021 3E38      +         MVI     A,10H*(7-00004H)+8
0023 D30F      +         OUT     0FH
0025 C35703    +         JMP     00357H

;RESTART 5

+         INTER   5,IDRX
0028 F5        +         PUSH    PSW
0029 3E28      +         MVI     A,10H*(7-00005H)+8
002B D30F      +         OUT     0FH
002D C3B0A     +         JMP     00A3BH

;RESTART 6

+         INTER   6,CPUI0
0030 F5        +         PUSH    PSW
0031 3E18      +         MVI     A,10H*(7-00006H)+8
0033 D30F      +         OUT     0FH
```

ISIS 8080 MACRO ASSEMBLER, V1.1                              PAGE 3
CONT16

```
0035 C33002    +         JMP     00230H

;RESTART 7

0038 C30000              JMP     0          ;START OVER
003B 00                  NOP
003C 00                  NOP
003D 00                  NOP
003E 00                  NOP
003F 00                  NOP

;INITIALIZE ROUTINE
                         ;CLEAR MEMORY

0040 F3        INITP:    DI                 ;REINITIALIZE, FROM ERROR DETECT
0041 31FF0F              LXI     SP,0FFFH
0044 21AF0E              LXI     H,0EAFH    ;CLEAR LOWER MEMORY
0047 AF                  XRA     A
0048 C34F00              JMP     INIT1

004B 21FF0E    INIT:     LXI     H,0EFFH    ;POINT TO TOP OF MEMORY
004E AF                  XRA     A
004F 77        INIT1:    MOV     M,A        ;CLEAR MEMORY
0050 2D                  DCR     L          ;POINT TO NEXT
0051 C24F00              JNZ     INIT1      ;CLEAR NEXT
0054 77                  MOV     M,A        ;CLEAR BYTE 0
```

; TEST CONFUSION TIMER MEMORY LOCATION

```
0055 3E55            MVI     A,55H
0057 32020E          STA     TIME1
005A AF              XRA     A
005B 3A020E          LDA     TIME1
005E FE55            CPI     55H
0060 C24000          JNZ     INITP
0063 3EAA            MVI     A,0AAH
0065 32020E          STA     TIME1
0068 AF              XRA     A
0069 3A020E          LDA     TIME1
006C FEAA            CPI     0AAH
006E C24000          JNZ     INITP
0071 AF              XRA     A       ; REZERO TIME1
0072 32020E          STA     TIME1
```

; PRESET OUTPUT WORDS AND PORTS

```
0075 11F300          LXI     D,TBLPS ; POINT TO PRESET DATA
0078 21F00E          LXI     H,OUT50 ; POINT TO MEMORY WORDS
              +      PREST   50H
```

ISIS 8080 MACRO ASSEMBLER, V1.1                PAGE 4
CONT1B

```
007B 1A       +      LDAX    D
007C 77       +      MOV     M,A
007D 2F       +      CMA
007E D350     +      OUT     00050H
0080 2C       +      INR     L
0081 13       +      INX     D

+      PREST   51H
0082 1A       +      LDAX    D
0083 77       +      MOV     M,A
0084 2F       +      CMA
0085 D351     +      OUT     00051H
0087 2C       +      INR     L
0088 13       +      INX     D 0089 2C              INR     L       ; SKIP OUT52 MEM LOCATION
              +      PRSTN   53H
008A 1A       +      LDAX    D
008B 77       +      MOV     M,A
008C 00       +      NOP
008D D353     +      OUT     00053H
008F 2C       +      INR     L
0090 13       +      INX     D 0091 2EF8            MVI     L,OUT40 AND 0FFH        ; POINT TO MEMORY
              +      PREST   40H
0093 1A       +      LDAX    D
0094 77       +      MOV     M,A
0095 2F       +      CMA
0096 D340     +      OUT     00040H
0098 2C       +      INR     L
0099 13       +      INX     D

+      PREST   41H
009A 1A       +      LDAX    D
009B 77       +      MOV     M,A
009C 2F       +      CMA
009D D341     +      OUT     00041H
009F 2C       +      INR     L
00A0 13       +      INX     D

00A1 2C              INR     L       ; SKIP OUT42 MEM LOCATION
              +      PRSTN   44H
```

```
00A2 1A              LDAX    D
00A3 77              MOV     M,A
00A4 00              NOP
00A5 D344            OUT     00044H
00A7 2C              INR     L
00A8 13              INX     D
```

ISIS 8080 MACRO ASSEMBLER, V1.1                        PAGE 5
CONT1B

```
                     ; PRESET MEMORY

00A9 CD0001          CALL    MPS

; CLEAR INTERUPTS

00AC 3E60            MVI     A,60H
00AE D610   RESET:   SUI     10H
00B0 D30F            OUT     0FH
00B2 C2AE00          JNZ     RESET
00B5 3E68            MVI     A,68H
00B7 D30F            OUT     0FH
00B9 C3C000          JMP     START

; DUMMY RETURNS
                     ; FROM INTERUPTS
00BC F1     RETRN:   POP     PSW
00BD FB              EI
00BE C9              RET

; FROM CALLS
00BF C9     NONE:    RET

; MAIN PROGRAM LOOP

00C0 FB     START:   EI
00C1 00              NOP
00C2 CDE300          CALL    MONT    ; DO MONITER ROUTINE
00C5 CD1701          CALL    TRDY
00C8 CD6701          CALL    INSTR
00CB CD8010          CALL    CHKSM
00CE CDBF00          CALL    NONE
00D1 CD9601          CALL    ANUN1
00D4 CDBF00          CALL    NONE
00D7 00              NOP             ; FUTURE DIOG   ; DIAGONISTICS
00D8 00              NOP
00D9 00              NOP
00DA CDBF00          CALL    NONE
00DD CDBF00          CALL    NONE
00E0 C3C000          JMP     START

00E3 DB54   MONT:    IN      54H
00E5 E608            ANI     08H     ; SKIP IF SWITCHES NOT OK
00E7 C0              RNZ
00E8 260E            MVI     H,0EH   ; POINT TO PAGE E
00EA DB42            IN      42H     ; GET ADDRESS
00EC 6F              MOV     L,A     ; POINT TO DATA
00ED 7E              MOV     A,M     ; GET DATA
00EE D342            OUT     42H     ; DISPLAY DATA
```

ISIS 8080 MACRO ASSEMBLER, V1.1                        PAGE 6
CONT1B

```
00F0 D344            OUT     44H     ; D TO A CONVERTER
00F2 C9              RET
```

```
                         ; TABLE OF PRESET CONSTANTS

00F3 3C         TBLPS:   DB      3CH      ; OUT50 DATA
00F4 FF                  DB      0FFH     ; OUT51
00F5 FF                  DB      0FFH     ; OUT53
00F6 00                  DB      0        ; OUT40
00F7 00                  DB      0        ; OUT41
00F8 00                  DB      0        ; OUT44

06F0            IDIDS    EQU     06F0H    ; ID DISPLAY ROUTINE, 54HZ
09B0            IDOTR    EQU     09B0H    ; ID TX ROUTINE
02A0            SD1      EQU     02A0H    ; ONES SPEED DECODING
0357            SD0      EQU     0357H    ; ZEROS SPEED DECODING
0A3B            IDRX     EQU     0A3BH    ; ID RECEIVER ROUTINE
0230            CPUI0    EQU     0230H    ; TRANSFER ROUTINE
0117            TRDY     EQU     0117H    ; TRAIN READY ROUTINE
0167            INSTR    EQU     0167H    ; MISC INPUT ROUTINE
0100            MPS      EQU     0100H    ; ID INITIALIZATION
0196            ANUN1    EQU     0196H    ; ANNUNICATOR ROUTINE

0EF0            OUT50    EQU     0EF0H    ; OUTPUT PORT 50 DATA
0EF8            OUT40    EQU     0EF8H    ; OUTPUT PORT 40 DATA

0E02            TIME1    EQU     0E02H    ; CONFUSION ZONE TIMER

1080            CHKSM    EQU     1080H
1000            DIOG     EQU     1000H

0000                     END     0

ISIS 8080 MACRO ASSEMBLER, V1.1                       PAGE 7
CONT1B

ANUN1 0196     CHKSM 1080    CPUI0 0230    DIOG  1000
IDIDS 06F0     IDOTR 09B0    IDRX  0A3B    INIT  004B
INIT1 004F     INITP 0040    INSTR 0167    INTER 7F85
MONT  00E3     MPS   0100    NONE  00BF    OUT40 0EF8
OUT50 0EF0     PREST 7F51    PRSTN 7F1D    RESET 00AE
RETRN 00BC     SD0   0357    SD1   02A0    START 00C0
TBLPS 00F3     TIME1 0E02    TRDY  0117

ISIS 8080 MACRO ASSEMBLER, V1.1                       PAGE 1
MISC1

;       JAN 24, 1978 SUB 0
                ;       MAY 12, 1978 SUB ?

; RELOCATE, ADD CHECKSUM
                ; FLASH STATUS ON CROSSCHECK ERROR

TITLE   'MISC1'

; INITIALIZE ROUTINE TO SET PM NUMBER TO 1
                ; AND FORMAT ID FOR TX AND DISPLAY

0100                    ORG     100H 0100 3E01       MPS:    MVI     A,01H    ; SET PM NO. TO 1
0102 32E00E             STA     PMNO
0105 CDD507             CALL    IDTS     ; DO ID TRANSFORM
0108 3EE5               MVI     A,0E5H   ; PRESET CHECK IN/OUT TO OUT
010A 32080E             STA     CICO0
010D 3E9B               MVI     A,09BH
```

```
010F 32090E          STA    CICO1
0112 AF              XRA    A        ;RESET TRANSFER COUNTER
0113 32D70E          STA    TCNTR
0116 C9              RET

;TRAIN READY ROUTINE
                     ; SETS PM NO. TO 1
                     ; SETS ID DESTINATION TO 00

0117 F3      TRDY:   DI
0118 3AF90E          LDA    OUT41
011B E6DF            ANI    0DFH     ;CLEAR RESET TOGGLE
011D 32F90E          STA    OUT41
0120 2F              CMA
0121 D341            OUT    41H
0123 3AD80E          LDA    IN51
0126 E630            ANI    30H      ;EITHER HEAD END ?
0128 CA5C01          JZ     TRDY1    ;NO
012B 3A0F0E          LDA    RDYFG
012E B7              ORA    A        ;WAS HEAD END ?
012F 321F0E          STA    CLOK8    ;RESET TIME FILTER
0132 C0              RNZ             ;YES
0133 3A920E          LDA    IDIN+2
0136 E6C0            ANI    0C0H     ;CLEAR DESTINATION
0138 32920E          STA    IDIN+2
013B 3E01            MVI    A,01     ;SET PMNO. TO 1
013D 32E00E          STA    PMNO
0140 320F0E          STA    RDYFG    ;SET WAS HEAD END
```

ISIS 8080 MACRO ASSEMBLER, V1.1                PAGE 2
MISC1

```
0143 CDD507          CALL   IDTS     ;DO ID TRANSFORM
0146 3AF20E          LDA    OUT52
0149 E642            ANI    42H      ;PREAMP OR ANT. FAILURE ?
014B C0              RNZ             ;YES, LEAVE PREAMP SELECTION UNCHANGED
014C C34F01          JMP    TRDY2    ;NO SELECT OTHER PREAMP 014F 3AF00E  TRDY2:  LDA    OUT50
0152 EE20            XRI    20H      ;SELECT OTHER PREAMP
0154 32F00E          STA    OUT50
0157 2F              CMA
0158 D350            OUT    50H
015A FB              EI
015B C9              RET 015C 3A1F0E  TRDY1:  LDA    CLOK8    ;TIME FILTER
015F FE09            CPI    9        ;MORE THAN .5 SEC
0161 D8              RC
0162 AF              XRA    A        ;SET WAS NOT HEAD END
0163 320F0E          STA    RDYFG
0166 C9              RET

;MISC INPUT AND STORAGE ROUTINE

0167 DB51    INSTR:  IN     51H
0169 2F              CMA
016A 32F40E          STA    IN51
016D 32E10E          STA    IN51T    ;DOOR DATA TO OTHER COMP.
0170 DB54            IN     54H
0172 00              NOP
0173 32F70E          STA    IN54
0176 32E20E          STA    IN54T    ;ROLLBACK TO OTHER COMP.
0179 DB40            IN     40H
017B 2F              CMA
```

```
017C 32FC0E           STA     IN40
017F DB41             IN      41H
0181 2F               CMA
0182 32FD0E           STA     IN41
0185 F3               DI
0186 DB52             IN      52H     ;READ SPEED
0188 47               MOV     B,A
0189 DB52             IN      52H
018B B8               CMP     B       ;SAME ?
018C CA9101           JZ      STORE   ;YES SAVE IT
018F DB52             IN      52H     ;NO, READ AGAIN
0191 32F50E  STORE:   STA     IN52    ;SAVE ACTUAL SPEED
0194 FB               EI
0195 C9               RET
```

ISIS 8080 MACRO ASSEMBLER, V1.1                           PAGE 3
MISC1

```
0196 3ADC0E  ANUN1:   LDA     SEFLG   ;GET CROSSCHECK CPU2
0199 4F               MOV     C,A
019A 3AD0E            LDA     VSEFG   ;GET CROSSCHECK CPU1
019D B1               ORA     C       ;TEST BOTH
019E C2F601           JNZ     SEERR   ;CROSSCHECK ERROR IN ONE OR BOTH
01A1 0600             MVI     B,0
01A3 3ADA0E           LDA     OU72T
01A6 57               MOV     D,A
01A7 3AF20E           LDA     OUT52
01AA 4F               MOV     C,A
01AB B7               ORA     A       ;CHECK FOR ANY FAILURE
01AC C2B401           JNZ     STAT1   ;FAILURE IN CPU1
01AF 7A               MOV     A,D
01B0 B7               ORA     A
01B1 CAC401           JZ      ANCNT   ;NO FAILURE IN EITHER CPU
01B4 0602   STAT1:    MVI     B,02H   ;SET STATUS LIGHT
01B6 79               MOV     A,C
01B7 E6B4             ANI     10110100B       ;CHECK FOR HANDBACKABLE FAILURE
01B9 C2C201           JNZ     HDB1    ;HAVE ONE
01BC 7A               MOV     A,D
01BD E64C             ANI     01001100B       ;CHECK FOR HANDBACKABLE FAILURE
01BF CAC401           JZ      ANCNT   ;NO HANDBACKABLE FAILURE
01C2 0606   HDB1:     MVI     B,06    ;SET STATUS AND HANDBACK LIGHT
01C4 3ADF0E  ANCNT:   LDA     TANN1   ;GET DATA FROM OTHER CPU
01C7 B0               ORA     B
01C8 47               MOV     B,A
01C9 3AF10E           LDA     OUT51
01CC A8               XRA     B       ;SAME AS BEFORE ?
01CD CAD801           JZ      ANUN2   ;YES
01D0 3A1E0E           LDA     CLOK7
01D3 FE04             CPI     4       ;DIFFERENT FOR > .2 SEC ?
01D5 DAE801           JC      TSET    ;NO
01D8 78     ANUN2:    MOV     A,B
01D9 32F10E           STA     OUT51
01DC 32E70E           STA     OU51T
01DF D351             OUT     51H
01E1 AF               XRA     A       ;RESET TIMER
01E2 321E0E           STA     CLOK7
01E5 C3E801           JMP     TSET

01E8 F3     TSET:     DI
01E9 3AF90E           LDA     OUT41
01EC F620             ORI     020H    ;SET RESET TOGGLE
01EE 32F90E           STA     OUT41
01F1 2F               CMA
01F2 D341             OUT     41H
01F4 FB               EI
01F5 C9               RET

01F6 3AF10E  SEERR:   LDA     OUT51
```

ISIS 8080 MACRO ASSEMBLER, V1.1         PAGE 4
MISC1

```
01F9 EE02              XRI     02      ; COMPLEMENT STATUS
01FB F604              ORI     04      ; SET HANDBACK REQUEST
01FD E606              ANI     06H     ; MASK OFF OLD TANN1 DATA
01FF 47                MOV     B,A
0200 C3C401            JMP     ANCNT   ; CONTINUE

; CHECKSUM ROUTINE
               ;    CHECKS ONE MEM. LOC PER CALL
               ;    CHECK SUM IS ON PER PAGE (256 BYTES)

1080                   ORG     1080H
1080 3A3F0E   CHKSM:   LDA     SUM     ; GET PRESENT SUM
1083 0F                RRC
1084 2A3D0E            LHLD    POINT   ; POINT TO PRESENT MEM. LOC.
1087 AE                XRA     M       ; UPDATE CHECKSUM
1088 323F0E            STA     SUM
108B 7D                MOV     A,L     ; TEST FOR END OF PAGE
108C FEFF              CPI     0FFH
108E C2B910            JNZ     NEXT    ; NOT END OF PAGE
1091 5C                MOV     E,H     ; POINT TO PROPER SUM FOR PAGE
1092 1600              MVI     D,0
1094 21B00E            LXI     H,STOR  ; STORE ACTUAL CHECKSUMS
1097 19                DAD     D
1098 3A3F0E            LDA     SUM
109B 77                MOV     M,A
109C 21001E            LXI     H,CSTBL ; START OF PROPER SUM TABLE
109F 19                DAD     D
10A0 BE                CMP     M       ; SAME AS PROPER
10A1 C2211E            JNZ     ERROR   ; NO
10A4 AF       NEXT2:   XRA     A       ; CLEAR SUM FOR NEXT PAGE
10A5 323F0E            STA     SUM
10A8 2A3D0E            LHLD    POINT   ; TEST FOR END OF MEMORY
10AB 3A201E            LDA     LAST
10AE BC                CMP     H
10AF C2BE10            JNZ     NEXT1   ; NOT LAST PAGE
10B2 210000            LXI     H,0     ; WAS LAST, START OVER
10B5 223D0E            SHLD    POINT
10B8 C9                RET
10B9 23      NEXT:     INX     H       ; POINT TO NEXT MEM. LOC.
10BA 223D0E            SHLD    POINT
10BD C9                RET

10BE 3E0D   NEXT1:     MVI     A,0DH   ; TEST FOR END OF PAGE D
10C0 BC                CMP     H
10C1 C2B910            JNZ     NEXT    ; NOT PAGE D, CONTINUE
10C4 210010            LXI     H,1000H ; WAS PAGE D, SLIP TO PAGE 10
10C7 223D0E            SHLD    POINT
10CA C9                RET

1E00                   ORG     1E00H
```

ISIS 8080 MACRO ASSEMBLER, V1.1         PAGE 5
MISC1

```
1E00 00     CSTBL:     DB      0       ; PROPER CHECKSUM TABLE
1E01 00                DB      0
1E02 00                DB      0
1E03 00                DB      0
1E04 00                DB      0
1E05 00                DB      0
1E06 00                DB      0
1E07 00                DB      0
1E08 00                DB      0
1E09 00                DB      0
```

```
1E0A 00             DB      0
1E0B 00             DB      0
1E0C 00             DB      0
1E0D 00             DB      0
1E0E 00             DB      0
1E0F 00             DB      0
1E10 00             DB      0
1E11 00             DB      0
1E12 00             DB      0
1E13 00             DB      0
1E14 00             DB      0
1E15 00             DB      0
1E16 00             DB      0
1E17 00             DB      0
1E18 00             DB      0
1E19 00             DB      0
1E1A 00             DB      0
1E1B 00             DB      0
1E1C 00             DB      0
1E1D 00             DB      0
1E1E 00             DB      0
1E1F 00             DB      0
1E20 1F    LAST:    DB      31      ;LAST PAGE (1F HEX)

;ERROR ROUTINE
           ;  NORMALLY WILL JUMP TO INITP
           ;  CAN CONTINUE

1E21 00    ERROR:   NOP
1E22 00             NOP             ;SPACE FOR JUMP TO INITP
1E23 00             NOP
1E24 C3A410         JMP     NEXT2

0EF4                IN51    EQU     0EF4H
0EE1                IN51T   EQU     0EE1H
0EF5                IN52    EQU     0EF5H
0EF7                IN54    EQU     0EF7H
```

ISIS 8080 MACRO ASSEMBLER, V1.1                           PAGE 6
MISC1

```
0EE2                IN54T   EQU     0EE2H
0EFC                IN40    EQU     0EFCH
0EFD                IN41    EQU     0EFDH
0ED8                IN61    EQU     0ED8H
0E90                IDIN    EQU     0E90H

0EE0                PMNO    EQU     0EE0H
0E0F                RDYFG   EQU     0E0FH
07D5                IDTS    EQU     07D5H

0EDF                TANN1   EQU     0EDFH
0EE7                OU51T   EQU     0EE7H
0EF1                OUT51   EQU     0EF1H
0EF9                OUT41   EQU     0EF9H
0EF6                IN53    EQU     0EF6H
0E1F                CLOK8   EQU     0E1FH
0E1E                CLOK7   EQU     0E1EH
0EF2                OUT52   EQU     0EF2H
0EF0                OUT50   EQU     0EF0H
0EDA                OU72T   EQU     0EDAH

0EB0                STOR    EQU     0EB0H   ;STORAGE OF ACTUAL CHECKSUMS
0E3D                POINT   EQU     0E3DH   ;MEM. LOC. POINTER FOR SUM CAL.
0E3F                SUM     EQU     0E3FH   ;SUM OF CURRENT PAGE
```

```
0E08            CIC00       EQU     0E08H
0E09            CIC01       EQU     0E09H
0ED7            TCNTR       EQU     0ED7H

0EDC            SEFLG       EQU     0EDCH
0E0D            VSEFG       EQU     0E0DH

0040            INITP       EQU     0040H

0000                        END
```

ISIS 8080 MACRO ASSEMBLER, V1.1                          PAGE 7
MISC1

```
ANCNT 01C4    ANUN1 0196    ANUN2 01D8    CHKSM 1080
CIC00 0E08    CIC01 0E09    CLOK7 0E1E    CLOK8 0E1F
CSTBL 1E00    ERROR 1E21    HDB1  01C2    IDIN  0E90
IDTS  07D5    IN40  0EFC    IN41  0EFD    IN51  0EF4
IN51T 0EE1    IN52  0EF5    IN53  0EF6    IN54  0EF7
IN54T 0EE2    IN61  0ED8    INITP 0040    INSTR 0167
LAST  1E20    MPS   0100    NEXT  10B9    NEXT1 10BE
NEXT2 10A4    OU51T 0EE7    OU72T 0EDA    OUT41 0EF9
OUT50 0EF0    OUT51 0EF1    OUT52 0EF2    PMNO  0EE0
POINT 0E3D    RDYFG 0E0F    SEERR 01F6    SEFLG 0EDC
STAT1 01B4    STOR  0EB0    STORE 0191    SUM   0E3F
TANN1 0EDF    TCNTR 0ED7    TRDY  0117    TRDY1 015C
TRDY2 014F    TSET  01E8    VSEFG 0E0D
```

ISIS 8080 MACRO ASSEMBLER, V1.1                          PAGE 1
TNSFR1

```
                ;       JAN 24, 1978 SUB 0
                ;       MAY 15, 1978 SUB ?

;RELOCATE

TITLE   'TNSFR1'

;TRANSFER DATA TO CPU2 AND FROM CPU2
                ;RESIDES IN CPU1

;ALL IS IN INTERUPT

0230                    ORG     230H 0230 3AF90E     CPUI0:  LDA     OUT41
0233 F602               ORI     02H         ;SET CONT 2 TO 1
0235 32F90E             STA     OUT41
0238 2F                 CMA
0239 D341               OUT     41H
023B C5                 PUSH    B
023C E5                 PUSH    H
023D 21D70E             LXI     H,TCNTR     ;POINT TO COUNT
0240 DB44               IN      44H         ;GET CONTROL
0242 2F                 CMA
0243 32FF0E             STA     IN44
0246 E601               ANI     01H         ;CONTROL = 1 ?
0248 CA4D02             JZ      CPUI1       ;NO
024B AF                 XRA     A           ;YES, RESET COUNT
024C 77                 MOV     M,A
024D 7E         CPUI1:  MOV     A,M         ;GET COUNTER
024E 47                 MOV     B,A
024F 85                 ADD     L           ;POINT TO INPUT DATA LOCATION
0250 3C                 INR     A           ; (START + COUNT)
```

```
0251 6F              MOV     L,A
0252 DB43            IN      43H         ;GET DATA
0254 77              MOV     M,A         ;STORE IT
0255 3E08            MVI     A,08        ;POINT TO OUTPUT DATA
0257 85              ADD     L
0258 6F              MOV     L,A
0259 7E              MOV     A,M         ;GET DATA
025A D340            OUT     40H         ;OUTPUT IT
025C 78              MOV     A,B         ;GET COUNT
025D E6FF            ANI     0FFH
025F 3AF90E          LDA     OUT41
0262 CA8902          JZ      CPUI2       ;COUNT = 0
0265 E6FE            ANI     0FEH        ;SET CONTROL = 0
0267 4F              MOV     C,A
0268 78              MOV     A,B         ;GET COUNT
0269 FE07            CPI     07          ;COUNT > MAX - 1 ?
026B DA8C02          JC      CPUI3       ;NO
```

ISIS 8080 MACRO ASSEMBLER, V1.1                    PAGE 2
TNSFR1

```
026E AF              XRA     A           ;ZERO COUNTER
026F 32D70E  CPUI4:  STA     TCNTR       ;SAVE COUNTER
0272 79              MOV     A,C         ;GET CONTROL WORD
0273 2F              CMA
0274 E6FB            ANI     0FBH        ;TOGGLE INTERUPT
0276 D341            OUT     41H
0278 F606            ORI     06H         ;CLEAR CONT 2
027A D341            OUT     41H
027C 2F              CMA
027D 32F90E          STA     OUT41       ;SAVE OUTPUT WORD
0280 E1              POP     H
0281 C1              POP     B
0282 3E18            MVI     A,18H       ;CLEAR PENDING CPU2 INT.
0284 D30F            OUT     0FH
0286 F1              POP     PSW
0287 FB              EI
0288 C9              RET

0289 F601   CPUI2:   ORI     01H         ;SET CONTROL = 1
028B 4F              MOV     C,A
028C 04     CPUI3:   INR     B           ;INCREMENT COUNT
028D 78              MOV     A,B
028E C36F02          JMP     CPUI4
```

;VARIABLE DEFINITION

```
0EF9            OUT41   EQU     0EF9H       ;OUTPUT PORT 41 DATA
0ED7            TCNTR   EQU     0ED7H       ;COUNT STORAGE
0EFF            IN44    EQU     0EFFH       ;INPUT PORT 44 DATA
```

;16 LOCATIONS FOLLOWING TCNTR ARE FOR DATA STORAGE
                    ;   8 FOR DATA FROM CPU2
                    ;   8 FOR DATA TO CPU2

```
0000                    END
```

ISIS 8080 MACRO ASSEMBLER, V1.1                    PAGE 3
TNSFR1

```
CPUI0 0230      CPUI1 024D      CPUI2 0289      CPUI3 028C
CPUI4 026F      IN44  0EFF      OUT41 0EF9      TCNTR 0ED7
```

ISIS 8080 MACRO ASSEMBLER, V1.1 PAGE 1
SPCODE (CPU1) MAY 11,78

```
                ;       JAN 24, 1978 SUB 0
                ;       MAY 11, 1978 SUB 7

;ADD CHECK IN/OUT, SPEED ERROR DONE ON ZEROS
                ;DOUBLE STORE CONFUSION ZONE TIMER
                ;SPEED ERROR CROSS CHECK

TITLE   'SPCODE (CPU1) MAY 11,78'
                ; SPEED DECODING CPU 1

; DECODE 1'S DATA

02A0                        ORG     2A0H

02A0 C5         SD1:        PUSH    B
    02A1 D5                     PUSH    D
    02A2 E5                     PUSH    H
    02A3 3A090E                 LDA     CICO1   ;CHECK CHECK IN/CHECK OUT
    02A6 FE9B                   CPI     9BH
    02A8 C24000                 JNZ     INITP   ;WAS NOT CHECK OUT VALUE
    02AB 3EB2                   MVI     A,0B2H  ;WAS OK, SET CHECK IN VALUE
    02AD 32090E                 STA     CICO1
    02B0 210A0E                 LXI     H,ONECK
    02B3 34                     INR     M       ;DIAGONISTIC CLOCK
    02B4 DB53                   IN      53H     ;GET DATA
    02B6 2F                     CMA             ;TRUE DATA
    02B7 32060E                 STA     IN53
    02BA 47                     MOV     B,A     ;TEMP SAVE
    02BB E660                   ANI     60H     ;MASK FOR COC BITS
    02BD FE60                   CPI     60H
    02BF C21803                 JNZ     N1001   ;NOT 100 %
    02C2 212D03                 LXI     H,TBL1A ;POINT TO 100% TABLE
    02C5 78         SHFT1:      MOV     A,B     ;GET INPUT
    02C6 E608                   ANI     08H     ;MASK OFF BIT
    02C8 CACC02                 JZ      SFT11   ;BIT IS ZERO
    02CB 37                     STC
    02CC 3A040E     SFT11:      LDA     ONESR   ;SHIFT BIT INTO REG.
    02CF 1F                     RAR
    02D0 47                     MOV     B,A     ;TEMP
    02D1 32040E                 STA     ONESR
    02D4 0E05                   MVI     C,05H   ;COUNT = 5
    02D6 E68C      ALGN1:       ANI     08CH    ;MASK FOR FORMAT
    02D8 FE84                   CPI     084H
    02DA CAEE02                 JZ      GOT1    ;DATA IS ALIGNED
    02DD 0D                     DCR     C
    02DE FA2903                 JM      MISS1   ;NO FORMAT RECONIZED
    02E1 78                     MOV     A,B     ;DO 6 BIT SHIFT
    02E2 E604                   ANI     04H
    02E4 CAE802                 JZ      ALN11
```

ISIS 8080 MACRO ASSEMBLER, V1.1 PAGE 2
SPCODE (CPU1) MAY 11,78

```
    02E7 37                     STC
    02E8 78         ALN11:      MOV     A,B
    02E9 1F                     RAR
    02EA 47                     MOV     B,A
    02EB C3D602                 JMP     ALGN1
    02EE 0E06       GOT1:       MVI     C,06H   ;SET COUNT = 6
    02F0 78                     MOV     A,B
    02F1 E6FC                   ANI     0FCH    ;MASK FOR 6 BITS
    02F3 BE         TEST1:      CMP     M
```

```
02F4 CA0003            JZ     MATC1    ;DATA IS A VALID CODE
02F7 0D                DCR    C
02F8 FA2903            JM     MISS1    ;DATA NOT VALID CODE
02FB 23                INX    H        ;POINT TO NEXT CODE
02FC 23                INX    H
02FD C3F302            JMP    TEST1
0300 23       MATC1:   INX    H        ;POINT TO SPEED VALUE
0301 7E                MOV    A,M      ;GET IT
0302 32000E   SAVE1:   STA    SPED1    ;SAVE SPEED VALUE
0305 3A090E            LDA    CICO1    ;CHECK CHECK-OUT
0308 FEB2              CPI    0B2H
030A C24000            JNZ    INITP    ;WAS NOT CHECK IN VALUE
030D 3E9B              MVI    A,9BH
030F 32090E            STA    CICO1    ;SET CHECK OUT VALUE

0312 E1                POP    H        ;RESTORE REGS.
0313 D1                POP    D
0314 C1                POP    B
0315 F1                POP    PSW
0316 FB                EI
0317 C9                RET

0318 FE40     N1001:   CPI    40H
031A C22303            JNZ    N861     ;NOT 86%
031D 213B03            LXI    H,TBL1B  ;POINT TO 86% TABLE
0320 C3C502            JMP    SHFT1
0323 214903   N861:    LXI    H,TBL1C  ;POINT TO 71% TABLE
0326 C3C502            JMP    SHFT1
0329 AF       MISS1:   XRA    A        ;SET SPED1 = 0
032A C30203            JMP    SAVE1

;SPEED DECODE TABLES FOR ONE'S DATA

;100% TABLE 032D 84       TBL1A:   DB     10000100B
032E 14                DB     2*10     ;10 KPH SPEED
032F 94                DB     10010100B
0330 3C                DB     2*30     ;30 KPH SPEED
0331 A4                DB     10100100B
0332 58                DB     2*44
```

ISIS 8080 MACRO ASSEMBLER, V1.1                       PAGE 3
SPCODE (CPU1) MAY 11,78

```
0333 C4                DB     11000100B
0334 7B                DB     123
0335 D4                DB     11010100B
0336 94                DB     2*74
0337 E4                DB     11100100B
0338 AE                DB     2*87
0339 F4                DB     11110100B
033A C8                DB     2*100    ;100 KPH SPEED

;86% TABLE 033B 84       TBL1B:   DB     10000100B
033C 11                DB     17       ;86% OF 10KPH
033D 94                DB     10010100B
033E 33                DB     51
033F A4                DB     10100100B
0340 4B                DB     75
0341 C4                DB     11000100B
0342 6A                DB     2*53
0343 D4                DB     11010100B
0344 7F                DB     127
0345 E4                DB     11100100B
0346 95                DB     149
```

```
0347 F4                    DB      11110100B
0348 AC                    DB      2*86        ;86% OF 100 KPH

;71% TABLE 0349 84       TBL1C:       DB      10000100B
034A 0E                    DB      2*7         ;71% OF 10 KPH
034B 94                    DB      10010100B
034C 2A                    DB      2*21
034D A4                    DB      10100100B
034E 3E                    DB      2*31
034F C4                    DB      11000100B
0350 56                    DB      2*43
0351 D4                    DB      11010100B
0352 68                    DB      2*52
0353 E4                    DB      11100100B
0354 7A                    DB      2*61
0355 F4                    DB      11110100B
0356 8D                    DB      141         ;71% OF 100 KPH

;DECODE ZERO'S DATA

0357 C5       SD0:         PUSH    B
0358 D5                    PUSH    D
0359 E5                    PUSH    H
035A 3A080E                LDA     CIC00       ;CHECK CHECK-IN
```

ISIS 8080 MACRO ASSEMBLER, V1.1                              PAGE 4
SPCODE (CPU1) MAY 11, 78

```
035D FEE5                  CPI     0E5H
035F C24000                JNZ     INITP       ;WAS NOT CHECK OUT VALUE
0362 3E4C                  MVI     A,4CH       ;SET CHECK IN VALUE
0364 32080E                STA     CIC00
0367 210B0E                LXI     H,ZROCK
036A 34                    INR     M           ;DIAGONISTIC CLOCK
036B DB53                  IN      53H         ;GET DATA
036D 2F                    CMA
036E 32F60E                STA     IN53
0371 47                    MOV     B,A         ;TEMP SAVE
0372 E660                  ANI     60H         ;MASK FOR COC BITS
0374 FE60                  CPI     60H
0376 C2D303                JNZ     N1000       ;NOT 100%
0379 21E803                LXI     H,TBL0A     ;POINT TO 100% TABLE
037C 78       SHFT0:       MOV     A,B         ;GET INPUT
037D E610                  ANI     10H         ;MASK OFF BIT
037F CA8303                JZ      SFT01       ;BIT IS ZERO
0382 37                    STC
0383 3A050E   SFT01:       LDA     ZRSR0       ;SHIFT INTO REG NEW
0385 1F                    RAR
0386 32050E                STA     ZRSR0
038A E680                  ANI     80H         ;GET BIT
038C CA9003                JZ      SFT02       ;BIT IS ZERO
038F 37                    STC
0390 3A060E   SFT02:       LDA     ZRSR1       ;SHIFT BIT INTO REG OLD
0393 1F                    RAR
0394 32060E                STA     ZRSR1
0397 47                    MOV     B,A         ;TEMP SAVE
0398 0E05                  MVI     C,05H       ;COUNT = 6
039A E646    ALGN0:        ANI     46H         ;MASK FOR FORMAT
039C FE04                  CPI     04H
039E CAB903                JZ      GOTO        ;DATA IS ALIGNED
03A1 0D                    DCR     C
03A2 FAE403                JM      MISS0       ;NO FORMAT RECONIZED
03A5 78                    MOV     A,B
03A6 E602                  ANI     02H         ;DO 6 BIT SHIFT
03A8 CAB103                JZ      ALN01       ;
```

```
03AB 78              MOV    A,B
03AC F680            ORI    80H
03AE C3B403          JMP    ALN02
03B1 78      ALN01:  MOV    A,B
03B2 E67F            ANI    7FH
03B4 1F      ALN02:  RAR
03B5 47              MOV    B,A
03B6 C39A03          JMP    ALGN0
03B9 0E06    GOT0:   MVI    C,06H    ;SET COUNT = 7
03BB 78              MOV    A,B
03BC E67E            ANI    07EH     ;MASK FOR 6 BITS
03BE BE      TEST0:  CMP    M
03BF CACB03          JZ     MATC0    ;DATA IS A VALID WORD
```

ISIS 8080 MACRO ASSEMBLER, V1.1                    PAGE 5
SPCODE (CPU1) MAY 11,78

```
03C2 0D              DCR    C
03C3 FAE403          JM     MISS0    ;DATA NOT VALID CODE
03C6 23              INX    H        ;POINT TO NEXT CODE
03C7 23              INX    H
03C8 C3BE03          JMP    TEST0
03CB 23      MATC0:  INX    H        ;POINT TO SPEED VALUE
03CC 7E              MOV    A,M
03CD 32010E  SAVE0:  STA    SPED0    ;SAVE SPEED VALUE

03D0 C31204          JMP    SC1      ;GO DO COMPARISON AND SPEED ERROR

03D3 FE40    N1000:  CPI    40H
03D5 C2DE03          JNZ    N860     ;NOT 86%
03D8 21F603          LXI    H,TBL0B  ;POINT TO 86% TABLE
03DB C37C03          JMP    SHFT0

03DE 210404  N860:   LXI    H,TBL0C  ;POINT TO 71% TABLE
03E1 C37C03          JMP    SHFT0

03E4 AF      MISS0:  XRA    A        ;SET SPED0 = 0
03E5 C3CD03          JMP    SAVE0

;SPEED CODE TABLES FOR ZEROS DATA

;100% TABLE

03E8 3C      TBL0A:  DB     00111100B
03E9 14              DB     2*10      ;10 KPH SPEED
03EA 34              DB     00110100B
03EB 3C              DB     2*30
03EC 2C              DB     00101100B
03ED 58              DB     2*44
03EE 1C              DB     00011100B
03EF 7B              DB     123
03F0 14              DB     00010100B
03F1 94              DB     2*74
03F2 0C              DB     00001100B
03F3 AE              DB     2*87
03F4 04              DB     00000100B
03F5 C8              DB     2*100     ;100 KPH SPEED

;86% TABLE

03F6 3C      TBL0B:  DB     00111100B
03F7 11              DB     17        ;86% OF 10 KPH
03F8 34              DB     00110100B
03F9 33              DB     51
03FA 2C              DB     00101100B
```

ISIS 8080 MACRO ASSEMBLER, V1.1                                PAGE 6
SPCODE (CPU1) MAY 11, 78

```
03FB 4B                      DB      75
03FC 1C                      DB      00011100B
03FD 6A                      DB      2*53
03FE 14                      DB      00010100B
03FF 7F                      DB      127
0400 0C                      DB      00001100B
0401 95                      DB      149
0402 04                      DB      00000100B
0403 AC                      DB      2*86      ;86% OF 100 KPH

;71% TABLE 0404 3C          TBL0C:      DB      00111100B
0405 0E                      DB      2*7,      ;71% OF 10 KPH
0406 34                      DB      00110100B
0407 2A                      DB      2*21
0408 2C                      DB      00101100B
0409 3E                      DB      2*31
040A 1C                      DB      00011100B
040B 56                      DB      2*43
040C 14                      DB      00010100B
040D 68                      DB      2*52
040E 0C                      DB      00001100B
040F 7A                      DB      2*61
0410 04                      DB      00000100B
0411 8D                      DB      141       ;71% OF 100 KPH

;SPEED COMPARISON AND SPEED ERROR
                     ;    CPU 1

0412 DB52        SC1:        IN      52H       ;GET REAL SPEED
0414 47                      MOV     B,A
0415 DB52                    IN      52H       ;GET SPEED AGAIN
0417 B8                      CMP     B         ;SAME ?
0418 CA1D04                  JZ      SPSAV     ;YES
041B DB52                    IN      52H       ;NOT SAME, GET AGAIN
041D 32F50E      SPSAV:      STA     ACTSP     ;SAVE REAL SPEED 0420 21000E                  LXI     H,SPED1   ;POINT TO SPEED 1
0423 7E                      MOV     A,M       ;GET IT
0424 2C                      INR     L         ;POINT TO SPEED 0
0425 BE                      CMP     M
0426 C22805                  JNZ     DIFF      ;SPED1 NOT SAME AS SPED0
0429 FE00                    CPI     00H
042B CA2805                  JZ      DIFF      ;SPED1 = 0
042E 47                      MOV     B,A       ;SAVE SPED1
042F 3A0E0E                  LDA     TIME3     ;INCREMENT TIMER 3
0432 3C                      INR     A
0433 320E0E                  STA     TIME3
0436 2C                      INR     L         ;POINT TO TIME1
```

ISIS 8080 MACRO ASSEMBLER, V1.1                                PAGE 7
SPCODE (CPU1) MAY 11, 78

```
0437 34                      INR     M
0438 2C                      INR     L         ;POINT TO TIME2
0439 34                      INR     M
043A 7E                      MOV     A,M       ;GET TIME2
043B FE02                    CPI     02H
043D DA5A04                  JC      SPER      ;SAME LESS THAN TWICE
0440 3604                    MVI     M,04H     ;SET TIME2 OVER
0442 3A0E0E                  LDA     TIME3     ;DECREMENT TIMER 3
0445 D602                    SUI     2
0447 320E0E                  STA     TIME3
```

```
044A 2D              DCR    L           ; POINT TO TIME1
044B 7E              MOV    A, M
044C D602            SUI    02H         ; TIME1 = TIME1 - 2
044E D25504          JNC    SC2         ; TIME1 NOT < 0
0451 AF              XRA    A
0452 320E0E          STA    TIME3
0455 77        SC2:  MOV    M, A
0456 78              MOV    A, B        ; SPEED = SPED1
0457 32070E   SC3:   STA    SPEED 045A 3A0E0E   SPER:  LDA    TIME3       ; COMPARE TIME1 AND TIME3
045D 21020E          LXI    H, TIME1
0460 BE              CMP    M
0461 C24000          JNZ    INITP       ; NOT SAME START OVER
0464 3A070E          LDA    SPEED
0467 0600            MVI    B, 00       ; SET ACT < COMM FLAG
0469 2EF5            MVI    L, ACTSP AND 0FFH
046B 34              INR    M           ; ADD 0.5 TO ACT. SPEED
046C 96              SUB    M           ; TEMP=COMM - ACT
046D D27504          JNC    SPER1       ; ACT <, = COMM
0470 2F              CMA
0471 C601            ADI    01H         ; TEMP = ACT - COMM
0473 06FF            MVI    B, 0FFH     ; SET COMM < ACT FLAG
0475 35        SPER1: DCR   M           ; RETURN ACT SPEED TO NORMAL
0476 FE0A            CPI    10          ; TEMP < 5 KPH
0478 DA0D05          JC     SEL         ; YES
047B FE1E            CPI    30          ; TEMP <15 KPH
047D DA1605          JC     SEM         ; YES
0480 D61E     SEH:   SUI    30
0482 1F              RAR
0483 E67F            ANI    7FH
0485 4F              MOV    C, A        ; TEMP1 = 0.5(TEMP - 15 KPH)
0486 1628            MVI    D, 40       ; TEMP2 = 40
0488 3E8A     SPER2: MVI    A, 138      ; ZERO SPEED ERROR
048A 04              INR    B
048B CA1C05          JZ     OS1         ; ACTUAL > COMMAND
048E 92              SUB    D
048F 91              SUB    C           ; SPEED ERROR = 128 - TEMP2 - TEMP1
0490 D29404          JNC    SPER3       ; >, = 00
0493 AF              XRA    A           ; 00 IF UNDER
```

ISIS 8080 MACRO ASSEMBLER, V1.1                    PAGE 8
SPCODE (CPU1) MAY 11, 78

```
0494 32F30E   SPER3: STA    SPDER
0497 00              NOP
0498 D353            OUT    53H

; SPEED ERROR CROSS CHECK

049A DB5D    COMP:   IN     5DH         ; GET OTHER SPEED ERROR
049C DB5D            IN     5DH
049E DB5D            IN     5DH
04A0 DB5D            IN     5DH
04A2 2F              CMA
04A3 32ED0E          STA    IN5D
04A6 00              NOP
04A7 47              MOV    B, A        ; TEMP SAVE
04A8 3AF30E          LDA    SPDER       ; GET THIS CPU SPEED ERROR
04AB 4F              MOV    C, A
04AC FEE5            CPI    229         ; CHECK LIMITING VALUE
04AE D2E704          JNC    COMP1       ; ABOVE LIMITING VALUE
04B1 D632            SUI    50          ; LOW TOL:
04B3 D2B704          JNC    COMP2
04B6 AF              XRA    A
04B7 57       COMP2: MOV    D, A
04B8 78              MOV    A, B
04B9 92              SUB    D           ; SEFB-SE1
```

```
04BA DAD004              JC       NOK          ;OTHER LESS THAN LOWER LIMIT
04BD 79                  MOV      A,C
04BE C632                ADI      50           ;HIGH TOL.
04C0 D2C504              JNC      COMP3
04C3 3EFF                MVI      A,0FFH
04C5 90         COMP3:   SUB      B            ;SE1-SEFB
04C6 DAD004              JC       NOK          ;OTHER MORE THAN HIGHER LIMIT

04C9 AF         OK:      XRA      A            ;CLEAR ERROR TIMER
04CA 32170E              STA      TIME4
04CD C3F004              JMP      SPER4        ;DONE

04D0 3A170E     NOK:     LDA      TIME4        ;INC ERROR TIMER
04D3 3C                  INR      A
04D4 32170E              STA      TIME4
04D7 FE3C                CPI      60
04D9 DAF004              JC       SPER4        ;NOT PAST TIME LIMIT
04DC 3EFE                MVI      A,0FEH       ;SET FAIL FLAG
04DE 32D00E              STA      VSEFG
04E1 32170E              STA      TIME4        ;HOLD TIME4
04E4 C3F004              JMP      SPER4

04E7 78         COMP1:   MOV      A,B          ;OTHER ABOVE MIN LIMIT?
04E8 FEB3                CPI      229-50
04EA DAD004              JC       NOK          ;NO
04ED C3C904              JMP      OK           ;YES
```

ISIS 8080 MACRO ASSEMBLER, V1.1                      PAGE 9
SPCODE (CPU1) MAY 11,78

```
04F0 2EF9     SPER4:   MVI      L,OUT41 AND 0FFH
04F2 7E                MOV      A,M          ;TOGGLE ENABLE
04F3 17                RAL
04F4 3F                CMC
04F5 1F                RAR
04F6 77                MOV      M,A
04F7 2F                CMA
04F8 D341              OUT      41H

04FA 3A080E            LDA      CICO0        ;CHECK CHECK OUT
04FD FE4C              CPI      4CH
04FF C24000            JNZ      INITP        ;NOT CHECK IN VALUE
0502 3EE5              MVI      A,0E5H       ;SET CHECK OUT VALUE
0504 32080E            STA      CICO0
0507 E1                POP      H
0508 D1                POP      D
0509 C1                POP      B
050A F1                POP      PSW
050B FB                EI
050C C9                RET 050D 17       SEL:     RAL
050E E6FE              ANI      0FEH
0510 4F                MOV      C,A          ;TEMP1 = 2*TEMP
0511 1600              MVI      D,00         ;TEMP2 = 0
0513 C38804            JMP      SPER2

0516 4F       SEM:     MOV      C,A          ;TEMP1 = TEMP
0517 160A              MVI      D,10         ;TEMP2 = 10
0519 C38804            JMP      SPER2

051C 82       OS1:     ADD      D
051D C614              ADI      20
051F 81                ADD      C            ;SPEED ERROR = 128+TEMP2+TEMP1+20
0520 D22505            JNC      OS2          ;C = MAX
0523 3EFF              MVI      A,0FFH       ;MAX IF OVER
0525 C39404   OS2:     JMP      SPER3
```

```
0528 23        DIFF:   INX     H               ;POINT TO TIME1
0529 34                INR     M
052A 3A0E0E            LDA     TIME3           ;INC TIMER 3
052D 3C                INR     A
052E 320E0E            STA     TIME3
0531 23                INX     H               ;POINT TO TIME2
0532 3600              MVI     M,00            ;ZERO IT
0534 2B                DCX     H               ;POINT TO TIME1
0535 0E10              MVI     C,16            ;T1=0.9 SEC
0537 3A070E            LDA     SPEED
053A FE3D              CPI     61              ;COMM SPEED > 30.5 KPH
```

ISIS 8080 MACRO ASSEMBLER, V1.1                                PAGE 10
SPCODE (CPU1) MAY 11,78

```
053C DA4105            JC      DIF1            ;NO
053F 0E22              MVI     C,34            ;T1=1.9 SEC
0541 7E        DIF1:   MOV     A,M             ;GET TIME 1
0542 B9                CMP     C
0543 DA5A04            JC      SPER            ;TIME1 < T1
0546 3628              MVI     M,40            ;SET TIME1 OVER
0548 3E28              MVI     A,40
054A 320E0E            STA     TIME3
054D AF                XRA     A               ;SET SPEED = 0
054E C35704            JMP     SC3

;VARIABLE DEFINITION

0E00            SPED1   EQU     0E00H           ;DECODED SPEED FROM ONE'S DATA
0E01            SPED0   EQU     0E01H           ;DECODED SPEED FROM ONE'S DATA
0E02            TIME1   EQU     0E02H           ;TIMER FOR CONFUSION MEMORY
0E03            TIME2   EQU     0E03H           ;TIMER FOR MUST SEE SAME VALID
                                                ;CODES TWICE
0EF6            IN53    EQU     0EF6H           ;INPUT PORT 53H DATA

0E04            ONESR   EQU     0E04H           ;SHIFT REG FOR ONE'S DATA
0E05            ZRSR0   EQU     0E05H           ;SHIFT REG FOR ZERO'S DATA
0E06            ZRSR1   EQU     0E06H           ;SHIFT REG FOR OLD ZERO'S DATA
                                                ;(I.E. EXTENSION OF ZRSR0)

0EF9            OUT41   EQU     0EF9H           ;DATA FOR OUTPUT PORT 41H

0E07            SPEED   EQU     0E07H           ;COMMANDED SPEED WORD
                                                ;MODIFIED FOR COC
0EF5            ACTSP   EQU     0EF5H           ;ACTUAL SPEED FROM TACH
0EF3            SPDER   EQU     0EF3H           ;SPEED ERROR FOR OVERSPEED AND BALANCE
0E0A            ONECK   EQU     0E0AH           ;DIAGONISTIC CLOCK
0E0B            ZROCK   EQU     0E0BH           ;DIAGONISTIC CLOCK

0E08            CICO0   EQU     0E08H           ;CHECK IN/OUT ZEROS
0E09            CICO1   EQU     0E09H           ;CHECK IN/OUT ONES
0E0D            VSEFG   EQU     0E0DH           ;SPEED ERRORS DIFFERENT FLAG
0E0E            TIME3   EQU     0E0EH           ;REDUNDANT CONF. TIMER
0E17            TIME4   EQU     0E17H           ;CROSS CHECT TIMER
0EED            IN5D    EQU     0EEDH           ;SPEED ERROR CROSSCHECK

0040            INITP   EQU     0040H           ;REINITIALIZE ROUTINE ON ERROR

0000                    END
```

ISIS 8080 MACRO ASSEMBLER V1.1                                 PAGE 11
SPCODE (CPU1) MAY 11,78

```
ACTSP  0EF5      ALGN0  039A      ALGN1  02D6      ALN01  03B1
ALN02  03B4      ALN11  02E8      CICO0  0E08      CICO1  0E09
COMP   049A      COMP1  04E7      COMP2  04B7      COMP3  04C5
DIF1   0541      DIFF   0528      GOT0   03B9      GOT1   02EE
```

| | | | | | | | |
|---|---|---|---|---|---|---|---|
| IN53 | 0EF6 | IN5D | 0EED | INITP | 0040 | MATC0 | 03CB |
| MATC1 | 0300 | MISS0 | 03E4 | MISS1 | 0329 | N1000 | 03D3 |
| N1001 | 0318 | N860 | 03DE | N861 | 0323 | NOK | 04D0 |
| OK | 04C9 | ONECK | 0E0A | ONESR | 0E04 | OS1 | 051C |
| OS2 | 0525 | OUT41 | 0EF9 | SAVE0 | 03CD | SAVE1 | 0302 |
| SC1 | 0412 | SC2 | 0455 | SC3 | 0457 | SD0 | 0357 |
| SD1 | 02A0 | SEH | 0480 | SEL | 050D | SEM | 0516 |
| SFT01 | 0383 | SFT02 | 0390 | SFT11 | 02CC | SHFT0 | 037C |
| SHFT1 | 02C5 | SPDER | 0EF3 | SPED0 | 0E01 | SPED1 | 0E00 |
| SPEED | 0E07 | SPER | 045A | SPER1 | 0475 | SPER2 | 0488 |
| SPER3 | 0494 | SPER4 | 04F0 | SPSAV | 041D | TBL0A | 03E8 |
| TBL0B | 03F6 | TBL0C | 0404 | TBL1A | 032D | TBL1B | 033B |
| TBL1C | 0349 | TEST0 | 03BE | TEST1 | 02F3 | TIME1 | 0E02 |
| TIME2 | 0E03 | TIME3 | 0E0E | TIME4 | 0E17 | VSEFG | 0E0D |
| ZROCK | 0E0B | ZRSR0 | 0E05 | ZRSR1 | 0E06 | | |

ISIS 8080 MACRO ASSEMBLER, V1.1    PAGE 1
YDT

```
        ;       JAN 24, 1978  SUB 0
        ;       MAY 15, 1978  SUB 2

; RELOCATED

TITLE   YDT
        ; YDT ROUTINE
        ;   RESIDES IN CPU1

; THIS GETS CALLED WHEN YDT REQUEST INPUT = 1
        ; IT IS DONE AS PART OF THE ID RECEIVER ROUTINE
        ; ENTRANCE IS AT 350 HEX
        ; RESULTS OF THIS ROUTINE
                ; YCODE BIT 7 - VAILD CODE RECEIVED
                ;       BIT 6 - OK TO TRANSMIT ID MESSAGE
                ;               (OTHERWISE TRANSMIT YDT RESPONSE)
                ; OUTTX BIT 5 - YDT RESPONSE
                ;                1 = OK, 0 = NOT OK
                ;   ABOVE IN MEMORY
                ; OUT50 BIT 2 - TACH SIMULATOR ON
                ;       BIT 3 - NOT YDT A HEAD END ASSIGN
                ;       BIT 4 - NOT YDT B HEAD END ASSIGN
                ;   ABOVE IN MEMORY AND OUTPUTED

; YDT DECODE SUBROUTINE
                ; ENTER WITH ADDRESS OF RX DATA IN H REGISTER PAIR
                ; USES A, B, C, H, L REGISTERS
                ; RETURNS WITH LATEST CODE IN A

0560                    ORG     560H
0560 7E         YDECD:  MOV     A, M    ; GET NEW RX DATA
0561 1F                 RAR
0562 1F                 RAR
0563 E63F               ANI     3FH     ; MASK FOR 6 BITS
0565 47                 MOV     B, A
0566 2D                 DCR     L
0567 7E                 MOV     A, M    ; GET OLD RX DATA
0568 E63F               ANI     3FH     ; MASK FOR 6 BITS
056A B8                 CMP     B       ; NEW SAME AS OLD ?
056B C29505             JNZ     MISS    ; NO
056E 21CD06             LXI     H, YDTTB; POINT TO DECODE TABLE
0571 0E05               MVI     C, 5    ; SET TABLE LENTH COUNTER

; COMPARE RX DATA WITH YDT TABLE

0573 BE         TEST:   CMP     M       ; DATA = CODE ?
0574 CA8105             JZ      MATCH   ; YES
0577 0D                 DCR     C
0578 FA9505             JM      MISS    ; EXHAUSTED ALL POSSIBILITES
```

```
ISIS 8080 MACRO ASSEMBLER, V1.1                    , PAGE 2
YDT 057B 23              INX     H
057C 23              INX     H
057D 23              INX     H       ;POINT TO NEXT CODE
057E C37305          JMP     TEST 0581 23       MATCH: INX     H       ;GET DECODED VALUE
0582 46              MOV     B,M
0583 23              INX     H       ;GET MAX TIME
0584 7E              MOV     A,M
0585 32120E          STA     MAX
0588 AF              XRA     A       ;RESET TIMER
0589 32180E          STA     CLOK1
058C 21110E          LXI     H,YCODE
058F 7E              MOV     A,M     ;GET OLD CODE
0590 E640            ANI     40H     ;LEAVE ID TRANSMIT FLAG AS IS
0592 B0              ORA     B       ;REPLACE OLD CODE WITH NEW
0593 77              MOV     M,A
0594 C9              RET 0595 21180E   MISS:  LXI     H,CLOK1 ;POINT TO REAL TIME
0598 3A120E          LDA     MAX
059B BE              CMP     M       ;TIMER < MAX
059C 3A110E          LDA     YCODE
059F D0              RNC             ;YES
05A0 AF              XRA     A       ;NO, CLEAR CODE
05A1 32110E          STA     YCODE
05A4 C9              RET

;YDT PROGRAM

;CHECKS OUT50 FOR PREVIOUSLY ASSIGNED HEAD END
                     ;DETERMINES WHICH CODE RECEIVED
                     ;DOES TESTS FOR THAT CODE

05A5 3AF00E   YDTRX: LDA     OUT50
05A8 E618            ANI     18H     ;MASK FOR HEAD END BITS
05AA FE10            CPI     10H     ;WAS A HEAD END ?
05AC CABF05          JZ      YDTA1   ;YES
05AF FE08            CPI     08H     ;WAS B HEAD END ?
05B1 CAA506          JZ      YDTB1   ;YES
05B4 DB51    YDTA:   IN      51H     ;GET COUPLER DOOR DATA
05B6 2F              CMA
05B7 32F40E          STA     IN51
05BA E602            ANI     02H     ;COUPLER DOOR A CLOSED ?
05BC CA9A06          JZ      YDTB    ;NO, A NOT END OF TRAIN
05BF 21710E   YDTA1: LXI     H,ALTRX + 5  ;POINT TO A LEFT DATA
05C2 CD6005          CALL    YDECD   ;DECODE DATA
05C5 E6FF            ANI     0FFH    ;CODE = 0 ?
05C7 CA9A06          JZ      YDTB    ;YES, CHECK B END

ISIS 8080 MACRO ASSEMBLER, V1.1                    PAGE 3
YDT

05CA 47              MOV     B,A     ;TEMP SAVE
05CB 3AF00E          LDA     OUT50
05CE E6E7            ANI     0E7H
05D0 F610            ORI     10H     ;ASSIGN A HEAD END
05D2 32F00E   YDT1:  STA     OUT50
05D5 2F              CMA
05D6 D350            OUT     50H
```

```
                    ; WHICH CODE DETERMINATION

05D8 21100E         LXI     H, OUTTX
05DB 7E             MOV     A, M
05DC E6DF           ANI     0DFH        ; CLEAR YDT TX DATA BIT
05DE 4F             MOV     C, A
05DF 78             MOV     A, B        ; GET CODE
05E0 E607           ANI     07H         ; MASK FOR CODE VALUE
05E2 FE01           CPI     01          ; CODE 1 ?
05E4 CA7E06         JZ      YCOD1       ; YES
05E7 78             MOV     A, B
05E8 E6BF           ANI     0BFH        ; CLEAR CODE 1 OK FLAG
05EA 32110E         STA     YCODE
05ED E607           ANI     07H         ; MASK FOR CODE VALUE
05EF FE02           CPI     2           ; CODE 2 ?
05F1 CA5606         JZ      YCOD2       ; YES
05F4 3AF00E         LDA     OUT50
05F7 F604           ORI     04H         ; SET TACH SIMULATOR OFF
05F9 32F00E         STA     OUT50
05FC 2F             CMA
05FD D350           OUT     50H
05FF 78             MOV     A, B        ; GET CODE
0600 E607           ANI     07H         ; MASK FOR CODE VALUE
0602 FE03           CPI     3           ; CODE 3 ?
0604 CA3D06         JZ      YCOD3       ; YES
0607 FE05           CPI     5           ; CODE 5 ?
0609 CA3006         JZ      YCOD5       ; YES
060C FE06           CPI     6           ; CODE 6 ?
060E CA2306         JZ      YCOD6       ; YES

; YDT CODE 7 RECEIVED, TEST SECONDARY FUNCTIONS
                    ;   PROP. OVERLOAD
                    ;   AIR CONDITIONER FAULT

0611 DB41   YCOD7:  IN      41H         ; GET SEC. FUNCTIONS
0613 2F             CMA
0614 32FD0E         STA     IN41
0617 E614           ANI     00010100B
0619 FE14           CPI     14H         ; TEST FOR SEC. FUNCTIONS
061B 79     YCDOK:  MOV     A, C
061C C22106         JNZ     YCOK1       ; NOT OK
061F F620           ORI     20H         ; OK, TX OUT = 1

ISIS 8080 MACRO ASSEMBLER, V1.1                     PAGE 4
YDT 0621 77     YCOK1:  MOV     M, A
0622 C9             RET

; YDT CODE 6 RECEIVED, TEST PRIMARY FUNCTIONS
                    ;   FRICTION BRAKE CUT OUT
                    ;   HAND BRAKE APPLIED
                    ;   PROP. CUT OUT
                    ;   CONVERTER FAULT

0623 DB41   YCOD6:  IN      41H         ; GET PRI. FUNCTIONS
0625 2F             CMA
0626 32FD0E         STA     IN41
0629 E62B           ANI     00101011B
062B FE2A           CPI     2AH         ; TEST FOR PRI FUNCTIONS
062D C31B06         JMP     YCDOK       ; IF OK ZERO FLAG IS SET

; YDT CODE 5 RECEIVED, TEST FOR ALL DOORS CLOSED

0630 DB51   YCOD5:  IN      51H         ; GET DOOR DATA
0632 2F             CMA
0633 32F40E         STA     IN51
0636 E620           ANI     20H
```

```
0638 FE20            CPI     20H         ;TEST FOR DOORS CLOSED
063A C31B06          JMP     YCDOK       ;IF OK ZERO FLAG IS SET

;YDT CODE 3 RECEIVED
                                         ;TEST FOR DOORS FULLY OPEN AND DOORS NOT ALL CLOSED

063D DB51    YCOD3:  IN      51H         ;GET DOOR DATA
063F 2F              CMA
0640 32F40E          STA     IN51
0643 5F              MOV     E,A
0644 E618            ANI     18H
0646 CA5406          JZ      YC3B        ;NEITHER SIDE DOORS FULLY OPEN
0649 7B              MOV     A,E         ;GET DOOR DATA
064A E620            ANI     20H
064C C25406          JNZ     YC3B        ;ALL DOORS CLOSED
064F 79      YC3A:   MOV     A,C
0650 F620            ORI     20H         ;TX DATA = 1
0652 77              MOV     M,A
0653 C9              RET
0654 71      YC3B:   MOV     M,C
0655 C9              RET

;YDT CODE 2 RECEIVED, TEST FOR UNDERSPEED
                                         ;   80MA < P-SIGNAL < 120MA
                                         ;

0656 3AF00E  YCOD2:  LDA     OUT50
0659 E6FB            ANI     0FBH        ;TURN ON TACH SIMULATOR
```

ISIS 8080 MACRO ASSEMBLER, V1.1                     PAGE 5
YDT

```
065B 32F00E          STA     OUT50
065E 2F              CMA
065F D350            OUT     50H
0661 3AD90E          LDA     IN79        ;GET P-SIGNAL
0664 FE55            CPI     85
0666 DA5406          JC      YC3B        ;P-SIGNAL < 80MA
0669 FE80            CPI     128
066B D25406          JNC     YC3B        ;P-SIGNAL > 120MA
066E 00              NOP
066F 00              NOP
0670 00              NOP
0671 00              NOP
0672 00              NOP
0673 00              NOP
0674 00              NOP
0675 00              NOP
0676 00              NOP
0677 00              NOP
0678 00              NOP
0679 00              NOP
067A 00              NOP
067B C34F06          JMP     YC3A        ;ALL OK

;YDT CODE 1 RECEIVED
                                         ;TEST FOR P AND BRK LINE CONTINOUS
                                         ;IF OK, ID TRANSMITER ROUTINE WILL TRANSMIT ID 067E 71      YCOD1:  MOV     M,C         ;SET YDT RESPONSE = 0
067F DB41            IN      41H         ;GET TRAIN LINE CONT.
0681 2F              CMA
0682 32FD0E          STA     IN41
0685 E6C0            ANI     0C0H
0687 FEC0            CPI     0C0H        ;TEST FOR CONTINUITY
0689 C29306          JNZ     YC1A        ;NOT OK
068C 78              MOV     A,B
```

```
068D F640              ORI    40H        ;SET OK TO TRANSMIT ID FLAG
068F 32110E            STA    YCODE
0692 C9                RET
0693 78       YC1A:    MOV    A,B
0694 E6BF              ANI    0BFH       ;CLEAR OK TO TRANSMIT ID FLAG
0696 32110E            STA    YCODE
0699 C9                RET

;B END CHECK

069A DB51     YDTB:    IN     51H        ;GET COUPLER DOOR DATA
069C 2F                CMA
069D 32F40E            STA    IN51
06A0 E604              ANI    04H        ;COUPLER DOOR B CLOSED ?
06A2 CABB06            JZ     NONE       ;NO
```

ISIS 8080 MACRO ASSEMBLER, V1.1                    PAGE 6
YDT

```
06A5 21650E   YDTB1:   LXI    H,BLTRX + 5  ;POINT TO B LEFT RX DATA
06A8 CD6005            CALL   YDECD        ;DECODE DATA
06AB E6FF              ANI    0FFH         ;CODE = 0 ?
06AD CABB06            JZ     NONE         ;YES
06B0 47                MOV    B,A
06B1 3AF00E            LDA    OUT50
06B4 E6E7              ANI    0E7H
06B6 F608              ORI    08H          ;ASSIGN B HEAD END
06B8 C3D205            JMP    YDT1

;NO VALID CODE

06BB AF       NONE:    XRA    A
06BC 32110E            STA    YCODE        ;CLEAR CODE
06BF 3AF00E            LDA    OUT50
06C2 E6E3              ANI    0E3H         ;CLEAR HEAD ENDS AND TAPE SIMULATOR
06C4 F61C              ORI    1CH
06C6 32F00E            STA    OUT50
06C9 2F                CMA
06CA D350              OUT    50H
06CC C9                RET

;YDT DECODING TABLE
                       ;CODE = 6 BIT CODE
                       ;DECODED = NUMBER OF YDT CODE
                       ;MAX = MAX TIME (IN 18THS OF SECONDS) TO REMEMBER CODE

06CD 2C       YDTTB:   DB     00101100B    ;CODE 1
06CE 81                DB     80H + 1      ;DECODED 1
06CF 6C                DB     108          ;MAX 1 = 6.0 SEC
06D0 38                DB     00111000B    ;CODE 2
06D1 82                DB     80H + 2      ;DECODED 2
06D2 12                DB     18           ;MAX 2 = 1.0 SEC
06D3 30                DB     00110000B    ;CODE 3
06D4 83                DB     80H + 3      ;DECODED 3
06D5 EA                DB     234          ;MAX 3 = 13 SEC
06D6 3E                DB     00111110B    ;CODE 5
06D7 85                DB     80H + 5      ;DECODED 5
06D8 12                DB     18           ;MAX 5 = 1.0 SEC
06D9 3C                DB     00111100B    ;CODE 6
06DA 86                DB     80H + 6      ;DECODED 6
06DB 12                DB     18           ;MAX 6 = 1.0 SEC
06DC 26                DB     00100110B    ;CODE 7
06DD 87                DB     80H + 7      ;DECODED 7
06DE 12                DB     18           ;MAX 7 = 1.0 SEC

;RAM ASSIGNMENTS

0E11          YCODE    EQU    0E11H        ;DECODED DATA
```

ISIS 8080 MACRO ASSEMBLER, V1.1                     PAGE 7
YDT

```
                                        ; BIT 7 - VALID CODE FLAG
                                        ; BIT 6 - OK TO TRANSMIT ID FLAG
                                        ; BITS 0,1,2 - BINARY CODE NUMBER

0E12        MAX     EQU     0E12H       ;MAX TIME BEFORE CLEARING CODE

0E18        CLOK1   EQU     0E18H       ;REAL TIME, UNITS = 1/18 SECOND

0EF0        OUT50   EQU     0EF0H       ;DATA TO OUTPUT PORT 50

0EF4        IN51    EQU     0EF4H       ;DATA FROM INPUT PORT 51
0EFD        IN41    EQU     0EFDH       ;DATA FROM INPUT PORT 41
0ED9        IN79    EQU     0ED9H       ;P SIGNAL DATA
0EEA        IN5E    EQU     0EEAH       ;BRAKE SIGNAL DATA

0E10        OUTTX   EQU     0E10H       ;BIT 5 - YDT RESPONSE

0E6C        ALTRX   EQU     0E6CH       ;BEGINNING OF A LEFT RX DATA
                                        ;   INPUT SHIFT REGISTER
0E60        BLTRX   EQU     0E60H       ;BEGINNING OF B LEFT RX DATA
                                        ;   INPUT SHIFT REGISTER

0000                END
```

ISIS 8080 MACRO ASSEMBLER, V1.1                     PAGE 8
YDT

```
ALTRX  0E6C      BLTRX  0E60      CLOK1  0E18      IN41   0EFD
IN51   0EF4      IN5E   0EEA      IN79   0ED9      MATCH  0581
MAX    0E12      MISS   0595      NONE   06BB      OUT50  0EF0
OUTTX  0E10      TEST   0573      YC1A   0693      YC3A   064F
YC3B   0654      YCDOK  061B      YCOD1  067E      YCOD2  0656
YCOD3  063D      YCOD5  0630      YCOD6  0623      YCOD7  0611
YCODE  0E11      YCOK1  0621      YDECD  0560      YDT1   05D2
YDTA   05B4      YDTA1  05BF      YDTB   069A      YDTB1  06A5
YDTRX  05A5      YDTTB  06CD
```

ISIS 8080 MACRO ASSEMBLER, V1.1                     PAGE 1

```
            ;       JANUARY 24, 1978        SUB 0
            ;       MAY 15, 1978            SUB 7

;RELOCATED
            ;
            ;
            ;
            ;       54 HZ INTERRUPT SUBROUTINE
            ;
            ;       THIS ROUTINE IS CALLED BY THE ID DISPLAY
            ;       54 HZ CLOCK INTERRUPT. THREE FUNCTIONS
            ;       ARE PERFORMED.
            ;
            ;       1. THE TAIL END BITS ARE MONITORED FOR AN
            ;       ACTIVE RECEPTION OF RX DATA.
            ;
            ;       2. THE ID DISPLAY OUTPUT ROUTINE SENDS ONE
            ;       BIT TO THE DISPLAY.
            ;
            ;       3. THE ID DISPLAY INPUT ROUTINE INPUTS ONE
            ;       BIT AND CHECK FOR A NEW ID.
```

```
06F0                        ORG     6F0H
06F0 C5         IDIDS:      PUSH    B           ;SAVE REGISTERS
06F1 D5                     PUSH    D
06F2 E5                     PUSH    H
06F3 DB44                   IN      44H         ;INPUT DISPLAY
06F5 2F                     CMA
06F6 32FF0E                 STA     IN44
;
;
;           TAIL END DATA
;
;           THIS ROUTINE CHECKS THE INPUTS FROM THE
;           TAIL END TO INSURE THE BITS ARE TOGGLING.
;
;           LTOK IS SET IF THE LEFT TAIL IS DYNAMIC.
;           RTOK IS SET IF THE RIGHT TAIL IS DYNAMIC.
;
;           THESE FLAGS ARE USED IN THE DOOR ROUTINE.
;
06F9 DB40       TDATA:      IN      40H
06FB 2F                     CMA
06FC E680                   ANI     80H         ;RIGHT DATA
06FE 219D0E                 LXI     H,RTPV      ;PAST VALUE
0701 BE                     CMP     M           ;CHANGE?
0702 CA0F07                 JZ      TD1         ;NO
```

ISIS 8080 MACRO ASSEMBLER, V1.1                             PAGE 2

```
0705 77                     MOV     M,A         ;YES, STORE NEW AS PV
0706 23                     INX     H           ;RTOK
0707 3601                   MVI     M,1         ;SET OK FLAG
0709 23                     INX     H           ;RTCT
070A 3600                   MVI     M,0         ;COUNT = 0
070C C31207                 JMP     TD2
070F 23         TD1:        INX     H           ;RTOK
0710 23                     INX     H           ;RTCT
0711 34                     INR     M           ;INC COUNT
0712 3E07       TD2:        MVI     A,7         ;COUNT = 7?
0714 BE                     CMP     M
0715 C21C07                 JNZ     TD3         ;NO, GO TO LEFT DATA
0718 AF                     XRA     A           ;YES
0719 77                     MOV     M,A         ;RTCT = 0
071A 2B                     DCX     H
071B 77                     MOV     M,A         ;RTOK = 0  NO TAIL DOOR
071C DB40       TD3:        IN      40H
071E 2F                     CMA
071F E640                   ANI     40H         ;LEFT DATA
0721 219D0E                 LXI     H,LTPV      ;PAST VALUE
0724 BE                     CMP     M           ;CHANGE?
0725 CA3207                 JZ      TD4         ;NO
0728 77                     MOV     M,A         ;YES, STORE NEW AS PV
0729 23                     INX     H           ;LTOK
072A 3601                   MVI     M,1         ;SET OK FLAG
072C 23                     INX     H           ;LTCT
072D 3600                   MVI     M,0         ;COUNT = 0
072F C33507                 JMP     TD5
0732 23         TD4:        INX     H           ;LTOK
0733 23                     INX     H           ;LTCT
0734 34                     INR     M           ;INC COUNT
0735 3E07       TD5:        MVI     A,7         ;COUNT = 7?
0737 BE                     CMP     M
0738 C23F07                 JNZ     TD6         ;NO, FINISHED
073B AF                     XRA     A           ;YES
```

```
073C  77              MOV   M,A     ;LTCT = 0
073D  2B              DCX   H
073E  77              MOV   M,A     ;LTOK = 0  NO TAIL DOOR
073F  C31A09  TD6:    JMP   IDOCN

;
                ;       ID DISPLAY INPUT ROUTINE
                ;
                ;       THIS ROUTINE CHECKS FOR A CORRECT PREAMBLE AND
                ;       THEN INPUTS AND STORES THE NEW ID. THE TRANSFORM
                ;       ROUTINE IS THEN CALLED
                ;
                ;
0742  3AFF0E  IDIN1:  LDA   IN44
```

ISIS 8080 MACRO ASSEMBLER, V1.1                         PAGE 3

```
0745  1F              RAR
0746  1F              RAR
0747  E601            ANI   01H
0749  4F              MOV   C,A       ;C HAS IN BIT
074A  21980E          LXI   H,IDISF   ;H HAS FLAG ADDRESS
074D  7E              MOV   A,M       ;CHECK FLAG
074E  E601            ANI   1
0750  C29907          JNZ   IDID1     ;=1
0753  23              INX   H         ;H COUNT ADDRESS
0754  3601            MVI   M,1       ;COUNT = 1
0756  11940E          LXI   D,IDINF+1 ;WORD2 ADDRESS
0759  1A              LDAX  D
075A  07              RLC
075B  12              STAX  D
075C  1B              DCX   D         ;WORD1 ADDRESS
075D  1A              LDAX  D
075E  17              RAL
075F  E60F            ANI   0FH       ;MASK OUT 4 HI BITS
0761  12              STAX  D
0762  3A940E          LDA   IDINF+1   ;WORD1
0765  E6FE            ANI   0FEH
0767  B1              ORA   C         ;PUT IN NEW BIT
0768  32940E          STA   IDINF+1
076B  3A950E          LDA   IDINF+2
076E  D607            SUI   7         ;CHECK FOR NEW COMING IN
0770  C28707          JNZ   IDID4     ;NO
0773  3AAE0E          LDA   BLNKF     ;SET DISPLAY TO ZERO
0776  B7              ORA   A
0777  C28707          JNZ   IDID4
077A  32900E          STA   IDIN
077D  32910E          STA   IDIN+1
0780  32920E          STA   IDIN+2
0783  3C              INR   A
0784  32AE0E          STA   BLNKF
0787  1A      IDID4:  LDAX  D         ;WORD2
0788  D60F            SUI   0FH       ;CHECK IF PREAMBLE
078A  C27009          JNZ   IDRET     ;NO
078D  13              INX   D         ;WORD3 ADDRESS
078E  1A              LDAX  D
078F  EEFF            XRI   0FFH      ;CHECK IF PREAMBLE
0791  C27009          JNZ   IDRET     ;NO
0794  2B              DCX   H         ;H FLAG ADDRESS
0795  34              INR   M         ;FLAG = 1
0796  C37009          JMP   IDRET
0799  11950E  IDID1:  LXI   D,IDINF+2 ;WORD3 ADDRESS
079C  1A              LDAX  D
079D  07              RLC
079E  12              STAX  D
079F  1B              DCX   D         ;WORD2 ADDRESS
07A0  1A              LDAX  D
```

```
07A1 17              RAL
07A2 12              STAX    D
07A3 1B              DCX     D       ;WORD1 ADDRESS
07A4 1A              LDAX    D
07A5 17              RAL
07A6 E603            ANI     03H     ;MASK OUT HI 6 BITS
07A8 12              STAX    D
07A9 3A950E          LDA     IDINP+2
07AC E6FE            ANI     0FEH
07AE B1              ORA     C       ;PUT IN NEW BIT
07AF 32950E          STA     IDINP+2
07B2 23              INX     H       ;H COUNT ADDRESS
07B3 3E12            MVI     A,18
07B5 96              SUB     M       ;COUNT = 18 ?
07B6 CABD07          JZ      IDID3   ;YES
07B9 34              INR     M       ;NO, INC COUNT
07BA C37009          JMP     IDRET   ;RETURN
07BD 2B      IDID3:  DCX     H       ;H FLAG ADDRESS
07BE 77              MOV     M,A     ;FLAG = 0
07BF 32AE0E          STA     BLNKF
07C2 01900E          LXI     B,IDIN
07C5 1A              LDAX    D       ;IDINP WORD1
07C6 02              STAX    B       ;IDIN  WORD1
07C7 13              INX     D
07C8 03              INX     B
07C9 1A              LDAX    D       ;IDINP WORD2
07CA 02              STAX    B       ;IDIN  WORD2
07CB 13              INX     D
07CC 03              INX     B
07CD 1A              LDAX    D       ;IDINP WORD3
07CE 02              STAX    B       ;IDIN  WORD3
07CF CDD507          CALL    IDTS
07D2 C37009          JMP     IDRET   ;FINISHED
                ;
                ;
                ;
                ;       ID TRANSFORMATION
                ;
                ;
                ;       THIS ROUTINE TAKES THE ID INPUT TABLE AND
                ;       TRANSFORMS IT INTO THE ID OUTPUT FORMAT
                ;
                ;
07D5 AF      IDTS:   XRA     A       ;ZERO ID OUT
07D6 F3              DI
07D7 118C0E          LXI     D,IDOW  ;WORKING STORAGE
07DA 12              STAX    D
07DB 13              INX     D
07DC 12              STAX    D

07DD 13              INX     D
07DE 12              STAX    D
07DF 13              INX     D
07E0 12              STAX    D
07E1 47              MOV     B,H     ;ZERO BREG  I = 0
07E2 218D0E          LXI     H,IDOW+1
07E5 3A900E          LDA     IDIN
07E8 0F              RRC
07E9 D2EE07          JNC     ID1
07EC 3620            MVI     M,20H   ;L1 BIT
```

```
07EE  0F        ID1:     RRC
07EF  D2F507             JNC     ID2
07F2  2B                 DCX     H
07F3  3608               MVI     M,08H           ;L2 BIT
07F5  21FB08    ID2:     LXI     H,IDKEY+1
07F8  3A910E             LDA     IDIN+1          ;GET 2ND IDIN WORD
07FB  07        IDTS2:   RLC                     ;CHECK FOR BIT
07FC  F5                 PUSH    PSW
07FD  DC2308             CC      PCKID           ;YES, PACK BIT
0800  23                 INX     H               ;NO, INC COUNTERS
0801  04                 INR     B
0802  23                 INX     H
0803  3E08               MVI     A,8             ;CHECK IF WORD COMPLETE
0805  90                 SUB     B
0806  CA0D08             JZ      IDTS1           ;YES, GET NEXT WORD
0809  F1                 POP     PSW             ;NO, CHECK NEXT BIT
080A  C3FB07             JMP     IDTS2
080D  F1        IDTS1:   POP     PSW
080E  3A920E             LDA     IDIN+2          ;GET 3RD IDIN WORD
0811  07        IDTS3:   RLC                     ;CHECK FOR BIT
0812  F5                 PUSH    PSW
0813  DC2308             CC      PCKID           ;YES, SET BIT
0816  23                 INX     H               ;NO, INC COUNTERS
0817  04                 INR     B
0818  23                 INX     H
0819  3E10               MVI     A,16            ;IS WORD COMPLETE
081B  90                 SUB     B
081C  CA3308             JZ      IDPAR           ;YES, FINISHED
081F  F1                 POP     PSW             ;NO, CHECK NEXT BIT
0820  C31108             JMP     IDTS3
                         ;
                         ;
                         ;
                         ;       PACK SUBROUTINE FOR ID TRANSFORMATION
                         ;
                         ;       ENTER WITH KEYWORD TABLE ADDRESS + 1 IN HLREG
                         ;
                         ;       MODIFIES A,C,D,E,REGISTERS + PSW
                         ;
                         ;
```

ISIS 8080 MACRO ASSEMBLER, V1.1                          PAGE 6

```
0823  2B        PCKID:   DCX     H               ;MODIFY ADDRESS
0824  1600               MVI     D,0H            ;ZERO D REG
0826  5E                 MOV     E,M             ;GET WORD BIAS
0827  23                 INX     H
0828  4E                 MOV     C,M             ;GET BIT CONFIG.
0829  E5                 PUSH    H               ;SAVE HL REG
082A  218C0E             LXI     H,IDOW          ;OUT TABLE ADDRESS
082D  19                 DAD     D               ;+ BIAS
082E  7E                 MOV     A,M             ;GET WORD
082F  B1                 ORA     C               ;SET BIT
0830  77                 MOV     M,A             ;STORE WORD
0831  E1                 POP     H               ;RELOAD HL REG
0832  C9                 RET
                         ;
                         ;
                         ;
                         ;       PARITY CALCULATION FOR IDOUT MESSAGE
                         ;
                         ;       AFTER PARITY IS FINISHED, THE NEW OUTPUT
                         ;       MESSAGE IS MOVED TO THREE NEW BUFFERS
                         ;
                         ;               IDODS,  DISPLAY
                         ;               IDOTX,  TRANSMITTER
                         ;               IDOM,   MASTER
                         ;
                         ;
```

```
0833 F1          IDPAR:  POP     PSW
0834 11920E              LXI     D,IDIN+2        ;DESTINATION ADDRESS
0837 018D0E              LXI     B,IDOW+1        ;OUT ID WORK AREA
083A 1A                  LDAX    D               ;GET DEST
083B E63C                ANI     3CH             ;D4,D10,D20,D40
083D E25708              JPO     PAR1            ;ODD
0840 03         PAR11:   INX     B               ;EVEN
0841 1A                  LDAX    D               ;GET DEST
0842 E61E                ANI     1EH             ;D2,D4,D10,D20
0844 E25E08              JPO     PAR2            ;ODD
0847 1A         PAR21:   LDAX    D               ;EVEN, GET DEST
0848 E60F                ANI     0FH             ;D1,D2,D4,D10
084A E26508              JPO     PAR3            ;ODD
084D 03         PAR31:   INX     B               ;EVEN
084E 1A                  LDAX    D               ;GET DEST
084F E627                ANI     27H             ;D1,D2,D4,D40
0851 E26C08              JPO     PAR4            ;ODD
0854 C37008              JMP     PAR41           ;EVEN, PARITY COMPLETE
0857 0A         PAR1:    LDAX    B               ;SET P1 IN IDOW
0858 F610                ORI     10H
085A 02                  STAX    B
085B C34008              JMP     PAR11
085E 0A         PAR2:    LDAX    B               ;SET P2 IN IDOW
085F F620                ORI     20H

ISIS 8080 MACRO ASSEMBLER, V1.1                         PAGE 7

0861 02                  STAX    B
0862 C34708              JMP     PAR21
0865 0A         PAR3:    LDAX    B               ;SET P3 IN IDOW
0866 F601                ORI     01H
0868 02                  STAX    B
0869 C34D08              JMP     PAR31
086C 0A         PAR4:    LDAX    B               ;SET P4 IN IDOW
086D F604                ORI     04H
086F 02                  STAX    B
                         ;
0870 11820E     PAR41:   LXI     D,IDOTX         ;TX BUFFER ADDRESS
0873 018C0E              LXI     B,IDOW          ;WORK AREA ADDRESS
0876 21870E              LXI     H,IDODS         ;DISPLAY BUFFER
0879 3E0F                MVI     A,0FH           ;00001111        WORD1
087B 12                  STAX    D               ;TX
087C 77                  MOV     M,A             ;DISPLAY
087D 32780E              STA     IDOM            ;MASTER
0880 327D0E              STA     IDOPM
0883 13                  INX     D
0884 23                  INX     H
0885 0A                  LDAX    B               ;WORD1 WORK AREA IDOUT
0886 F6C0                ORI     0C0H            ;HIGH ORDER BITS
0888 12                  STAX    D               ;TX BUFFER       WORD2
0889 77                  MOV     M,A             ;DISPLAY
088A 32790E              STA     IDOM+1          ;MASTER
088D 327E0E              STA     IDOPM+1
0890 13                  INX     D
0891 03                  INX     B
0892 23                  INX     H
0893 0A                  LDAX    B               ;WORD2
0894 12                  STAX    D               ;TX             WORD3
0895 77                  MOV     M,A             ;DISPLAY
0896 327A0E              STA     IDOM+2          ;MASTER
0899 327F0E              STA     IDOPM+2
089C 13                  INX     D
089D 03                  INX     B
089E 23                  INX     H
089F 0A                  LDAX    B               ;WORD3
08A0 12                  STAX    D               ;TX             WORD4
```

```
08A1 77                MOV    M,A        ;DISPLAY
08A2 327B0E            STA    IDOM+3     ;MASTER
08A5 32800E            STA    IDOPM+3
08A8 13                INX    D
08A9 03                INX    B
08AA 23                INX    H
08AB 0A                LDAX   B          ;WORD4
08AC 12                STAX   D          ;TX         WORD5
08AD 77                MOV    M,A        ;DISPLAY
08AE 327C0E            STA    IDOM+4     ;MASTER
08B1 32810E            STA    IDOPM+4
```

ISIS 8080 MACRO ASSEMBLER, V1.1                PAGE 8

```
                ;
                ;      PUT PM NUMBER INTO ID DISPLAY MESSAGE
                ;
08B4 217F0E            LXI    H,IDOPM+2  ;DISPLAY MASTER
08B7 11890E            LXI    D,IDODS+2  ;DISPLAY OUT
08BA 3AE00E            LDA    PMNO       ;PM NUMBER
08BD 0F                RRC
08BE 47                MOV    B,A        ;SAVE PM
08BF 7E                MOV    A,M
08C0 DAE508            JC     PAR5
08C3 E6DF              ANI    0DFH       ;L1 BIT NOT
08C5 77         PAR6:  MOV    M,A        ;MASTER WORD 3
08C6 12                STAX   D          ;OUTPUT
08C7 2B                DCX    H
08C8 1B                DCX    D
08C9 78                MOV    A,B
08CA 0F                RRC
08CB 47                MOV    B,A        ;SAVE PM
08CC 7E                MOV    A,M
08CD DAEA08            JC     PAR7
08D0 E6F7              ANI    0F7H       ;L2 BIT NOT
08D2 77         PAR8:  MOV    M,A        ;MASTER WORD 2
08D3 12                STAX   D          ;OUTPUT
08D4 23                INX    H
08D5 23                INX    H
08D6 13                INX    D
08D7 13                INX    D
08D8 78                MOV    A,B
08D9 0F                RRC
08DA 7E                MOV    A,M
08DB DAEF08            JC     PAR9
08DE E6FD              ANI    0FDH       ;L3 BIT NOT
08E0 77         PAR81: MOV    M,A        ;MASTER WORD 4
08E1 12                STAX   D          ;OUTPUT
08E2 C3F408            JMP    PAR10
08E5 F620       PAR5:  ORI    20H        ;L1 BIT
08E7 C3C508            JMP    PAR6
08EA F608       PAR7:  ORI    08H        ;L2 BIT
08EC C3D208            JMP    PAR8
08EF F602       PAR9:  ORI    02H        ;L3 BIT
08F1 C3E008            JMP    PAR81
08F4 AF         PAR10: XRA    A
08F5 32960E            STA    IDDSF      ;RESET DISPLAY MESSAGE
08F8 FB                EI
08F9 C9                RET
                ;
                ;
                ;
                ;      ID ROUTINE CONSTANTS   ROM
                ;
```

ISIS 8080 MACRO ASSEMBLER, V1.1                                    PAGE 9

```
                ;
                ;       THE KEYWORD TABLE IS USED BY THE PACK ROUTINE
                ;       TO SET BITS IN THE ID OUTPUT MESSAGE BASED ON
                ;       THE ID MESSAGE RECEIVED FROM THE DISPLAY OR RX.
                ;
                ;       TWO WORDS ARE ASSOCIATED WITH EACH ID INPUT BIT
                ;       THE FIRST WORD GIVES THE BIAS IN THE OUTPUT
                ;       TABLE. THE SECOND WORD CONTAINS THE BIT MASK.
                ;
                ;
                ;
                ;       KEYWORD TABLE    IDIN BITS
                ;
                ;
08FA 00         IDKEY:  DB      0          ;S200 WORD BIAS
08FB 10                 DB      10H        ;S200 BIT
08FC 00                 DB      0          ;S100
08FD 02                 DB      02H        ;S100
08FE 01                 DB      1          ;S80
08FF 40                 DB      40H        ;S80
0900 01                 DB      1          ;S40
0901 08                 DB      08H        ;S40
0902 01                 DB      1          ;S20
0903 01                 DB      01H        ;S20
0904 02                 DB      2          ;S10
0905 40                 DB      40H        ;S10
0906 02                 DB      2          ;S8
0907 04                 DB      04H        ;S8
0908 03                 DB      3          ;S4
0909 80                 DB      80H        ;S4
090A 03                 DB      3          ;S2
090B 10                 DB      10H        ;S2
090C 03                 DB      3          ;S1
090D 02                 DB      02H        ;S1
090E 00                 DB      0          ;D40
090F 04                 DB      04H        ;D40
0910 01                 DB      1          ;D20
0911 80                 DB      80H        ;D20
0912 01                 DB      1          ;D10
0913 02                 DB      02H        ;D10
0914 02                 DB      2          ;D4
0915 80                 DB      80H        ;D4
0916 02                 DB      2          ;D2
0917 08                 DB      08H        ;D2
0918 03                 DB      3          ;D1    WORD BIAS
0919 20                 DB      20H        ;D1    BIT
                ;
                ;
                ;       ID DISPLAY OUT ROUTINE
                ;
```

ISIS 8080 MACRO ASSEMBLER, V1.1                                    PAGE 10

```
                ;       THIS ROUTINE OUTPUTS A 40 BIT MESSAGE
                ;       TO THE DISPLAY WHEN CALLED. ONE BIT EACH
                ;       TIME IT IS CALLED.
                ;
                ;
091A 21960E     IDOCN:  LXI     H,IDOSF         ;FLAG ADDRESS
091D 7E                 MOV     A,M      ;FLAG = 1 ?
091E C600               ADI     0
0920 C22709             JNZ     IDOC1    ;YES
```

```
0923 34                    INR    M       ;NO, SET TO 1
0924 23                    INX    H       ;COUNT ADDRESS
0925 3C                    INR    A
0926 77                    MOV    M,A     ;COUNT = 1
0927 11B80E     IDOC1:     LXI    D,IDODS+4   ;SHIFT 5 WORD BUFFER
092A 1A                    LDAX   D       ;WORD5
092B 17                    RAL            ;SET CARRY FOR WORD4
092C 12                    STAX   D
092D 1B                    DCX    D
092E 1A                    LDAX   D       ;WORD4
092F 17                    RAL            ;SET CARRY FOR WORD3
0930 12                    STAX   D
0931 1B                    DCX    D
0932 1A                    LDAX   D       ;WORD3
0933 17                    RAL            ;SET CARRY FOR WORD2
0934 12                    STAX   D
0935 1B                    DCX    D
0936 1A                    LDAX   D       ;WORD2
0937 17                    RAL            ;SET CARRY FOR WORD1
0938 12                    STAX   D
0939 1B                    DCX    D
093A 1A                    LDAX   D       ;WORD1
093B 17                    RAL            ;SET CARRY FOR WORD5
093C 12                    STAX   D
093D 3E00                  MVI    A,0     ;CLEAR AREG
093F 17                    RAL            ;CARRY IN AREG
0940 47                    MOV    B,A     ;CARRY OR OUTPUT BIT
0941 3AB80E                LDA    IDODS+4
0944 E6FE                  ANI    0FEH
0946 B0                    ORA    B       ;CARRY BIT
0947 32B80E                STA    IDODS+4
094A 21970E                LXI    H,IDDSC ;COUNT ADDRESS
094D 7E                    MOV    A,M
094E D605                  SUI    5       ;COUNT OVER 5?
0950 F28709                JP     IDOXX   ;YES
0953 78         IDOC2:     MOV    A,B
0954 1F                    RAR            ;BIT = 0 OR 1
0955 DA7609                JC     IDOC3   ;BIT = 1
0958 3AF90E                LDA    OUT41   ;BIT = 0
095B E6F7                  ANI    0F7H
095D 32F90E                STA    OUT41   ;STORE IN BUFFER

ISIS 8080 MACRO ASSEMBLER, V1.1                PAGE 11

0960 7E         IDOC4:     MOV    A,M     ;COUNT
0961 D628                  SUI    40D     ;I = 40
0963 CA8109                JZ     IDOC5   ;YES, FLAG = 0
0966 34                    INR    M       ;NO, INC COUNT
0967 3AF90E     IDOC6:     LDA    OUT41
096A 2F                    CMA
096B D341                  OUT    41H
096D C34207                JMP    IDIN1
0970 E1         IDRET:     POP    H
0971 D1                    POP    D
0972 C1                    POP    B
0973 F1                    POP    PSW
0974 FB                    EI
0975 C9                    RET            ;RETURN
0976 3AF90E     IDOC3:     LDA    OUT41
0979 F608                  ORI    08H     ;SET OUT BIT = 1
097B 32F90E                STA    OUT41
097E C36009                JMP    IDOC4
0981 2B         IDOC5:     DCX    H       ;FLAG ADDRESS
0982 AF                    XRA    A
0983 77                    MOV    M,A     ;FLAG = 0 MESSAGE COMPLETE
```

```
0984 C36709              JMP     IDOC6   ;RETURN
                ;
                ;
                ;
0987 3AF90E     IDOXX:   LDA     OUT41   ;STORE SYNC OUTPUT
098A F640               ORI     40H
098C 32F90E             STA     OUT41
098F 7E                 MOV     A,M     ;COUNT
0990 D605               SUI     5
0992 CA5309             JZ      IDOC2   ;BIT = 1
0995 3AF90E             LDA     OUT41
0998 E6BF               ANI     0BFH
099A 32F90E             STA     OUT41
099D C35309             JMP     IDOC2   ;BIT = 0
                ;
                ;
                ;
                ;       ID ROUTINE VARIABLES
                ;
                ;
                ;
0E78                    ORG     0E78H
0E78 0F         IDOM:   DB      0FH     ;IDOUT MASTER MESSAGE AREA
0E79 00                 DB      0
0E7A 00                 DB      0
0E7B 00                 DB      0
0E7C 00                 DB      0
                ;
0E7D 00         IDOPM:  DB      0       ;IDOUT MASTER FOR DISPLAY
```

ISIS 8080 MACRO ASSEMBLER, V1.1                    PAGE 12

```
0E7E 00                 DB      0
0E7F 00                 DB      0
0E80 00                 DB      0
0E81 00                 DB      0
                ;
0E82 0F         IDOTX:  DB      0FH     ;IDOUT TRANSMITTER BUFFER
0E83 00                 DB      0
0E84 00                 DB      0
0E85 00                 DB      0
0E86 00                 DB      0
                ;
0E87 0F         IDODS:  DB      0FH     ;IDOUT DISPLAY BUFFER
0E88 00                 DB      0
0E89 00                 DB      0
0E8A 00                 DB      0
0E8B 00                 DB      0
                ;
0E8C 00         IDOW:   DB      0       ;IDOUT WORK BUFFER
0E8D 00                 DB      0
0E8E 00                 DB      0
0E8F 00                 DB      0
0E90 00         IDIN:   DB      0       ;INPUT FOR ID FROM
0E91 00                 DB      0       ;RX OR DISPLAY
0E92 00                 DB      0
                ;
0E93 00         IDINP:  DB      0       ;INPUT FROM DISPLAY
0E94 00                 DB      0
0E95 00                 DB      0
                ;
                ;
0E96 00         IDOSF:  DB      0       ;ID OUT DISPLAY FLAG
0E97 00         IDOSC:  DB      0       ;ID OUT DISPLAY COUNT
                ;
                ;
```

```
0E98 00         IDISF:  DB      0       ;ID IN DISPLAY FLAG
0E99 00         IDICT:  DB      0       ;ID IN DISPLAY COUNT
                ;
                ;
                ;               TAIL DATA VARIABLES
                ;
                ;               DO NOT CHANGE ORDER, RTPV, RTOK, RTCT, LTPV, LTOK, LTC
                ;
0E9A 00         RTPV:   DB      0       ;RIGHT TAIL     PAST VALUE
0E9B 00         RTOK:   DB      0       ;               DATA OK
0E9C 00         RTCT:   DB      0       ;               COUNT
                ;
0E9D 00         LTPV:   DB      0       ;LEFT  TAIL     PAST VALUE
0E9E 00         LTOK:   DB      0       ;               DATA OK
0E9F 00         LTCT:   DB      0       ;               COUNT
```

ISIS 8080 MACRO ASSEMBLER, V1.1                    PAGE 13

```
                ;
                ;
0EFF            IN44    EQU     0EFFH   ;ID DATA
0EF9            OUT41   EQU     0EF9H   ;ID OUT WORD
0EE0            PMNO    EQU     0EE0H   ;PM NUMBER
0EAE            BLNKF   EQU     0EAEH   ;ID DISPLAY BLANK FLAG
0000                    END
```

ISIS 8080 MACRO ASSEMBLER, V1.1                    PAGE 14

```
BLNKF  0EAE     ID1    07EE      ID2    07F5      IDDSC  0E97
IDDSF  0E96     IDICT  0E99      IDID1  0799      IDID3  07BD
IDID4  0787     IDIDS  06F0      IDIN   0E90      IDIN1  0742
IDINP  0E93     IDISF  0E98      IDKEY  08FA      IDOC1  0927
IDOC2  0953     IDOC3  0976      IDOC4  0960      IDOC5  0981
IDOC6  0967     IDOCN  091A      IDODS  0E87      IDOM   0E78
IDOPM  0E7D     IDOTX  0E82      IDOW   0E8C      IDOXX  0987
IDPAR  0833     IDRET  0970      IDTS   07D5      IDTS1  080D
IDTS2  07FB     IDTS3  0811      IN44   0EFF      LTCT   0E9F
LTOK   0E9E     LTPV   0E9D      OUT41  0EF9      PAR1   0857
PAR10  08F4     PAR11  0840      PAR2   085E      PAR21  0847
PAR3   0865     PAR31  084D      PAR4   086C      PAR41  0870
PAR5   08E5     PAR6   08C5      PAR7   08EA      PAR8   08D2
PAR81  08E0     PAR9   08EF      PCKID  0823      PMNO   0EE0
RTCT   0E9C     RTOK   0E9B      RTPV   0E9A      TD1    070F
TD2    0712     TD3    071C      TD4    0732      TD5    0735
TD6    073F     TDATA  06F9
```

ISIS 8080 MACRO ASSEMBLER, V1.1                    PAGE 1

```
                ;       JANUARY 24, 1978        SUB 0
                ;       MAY 15, 1978            SUB ?

;RELOCATED SOME VARIABLES, RELOCATED PROGRAM
                ;
                ;
                ;
```

```
;       ID TRANSMITTER OUT ROUTINE
;
;       THIS ROUTINE OUTPUTS A 40 BIT MESSAGE
;       TO THE TRANSMITTER WHEN CALLED, ONE BIT
;       EACH TIME CALLED.
;
;
;       THIS ROUTINE ALSO INCREMENTS 8 CLOCKS OR
;       TIMERS SINCE THE INTERRUPT IS ALWAYS IN
;       OPERATION.
;
;
;
09B0                    ORG     9B0H
09B0 C5         IDOTR:  PUSH    B               ;SAVE REGISTERS
09B1 D5                 PUSH    D
09B2 E5                 PUSH    H
09B3 21180E             LXI     H,CLOK1         ;INC 24 CLOCKS
09B6 0E17               MVI     C,23
09B8 34         DCK1:   INR     M
09B9 2C                 INR     L
09BA 0D                 DCR     C
09BB FAC509             JM      IDOT1           ;DONE
09BE C3B809             JMP     DCK1
09C1 00                 NOP
09C2 00                 NOP
09C3 00                 NOP
09C4 00                 NOP
        ;
09C5 110E0E     IDOT1:  LXI     D,IDOTX+4       ;SHIFT 5 WORD BUFFER
09C8 1A                 LDAX    D               ;WORD5
09C9 17                 RAL                     ;SET CARRY FOR WORD4
09CA 12                 STAX    D
09CB 1B                 DCX     D
09CC 1A                 LDAX    D               ;WORD4
09CD 17                 RAL                     ;SET CARRY FOR WORD3
09CE 12                 STAX    D
09CF 1B                 DCX     D
09D0 1A                 LDAX    D               ;WORD3
09D1 17                 RAL                     ;SET CARRY FOR WORD2
09D2 12                 STAX    D
09D3 1B                 DCX     D
09D4 1A                 LDAX    D               ;WORD2
```

ISIS 8080 MACRO ASSEMBLER, V1.1                         PAGE 2

```
09D5 17                 RAL                     ;SET CARRY FOR WORD1
09D6 12                 STAX    D
09D7 1B                 DCX     D
09D8 1A                 LDAX    D               ;WORD1
09D9 17                 RAL                     ;SET CARRY FOR WORD5
09DA 12                 STAX    D
09DB 3E00               MVI     A,0             ;CLEAR AREG
09DD 17                 RAL                     ;CARRY IN AREG
09DE 47                 MOV     B,A             ;CARRY OR OUTPUT BIT
09DF 3A860E             LDA     IDOTX+4         ;WORD5
09E2 E6FE               ANI     0FEH
09E4 B0                 ORA     B               ;CARRY BIT
09E5 32860E             STA     IDOTX+4
09E8 78                 MOV     A,B
09E9 1F                 RRR                     ;BIT = 0 OR 1
09EA DAF809             JC      IDOT3           ;BIT = 1
09ED 3A100E             LDA     OUTTX           ;BIT = 0
09F0 E6EF               ANI     0EFH
09F2 32100E             STA     OUTTX           ;STORE IN BUFFER
09F5 C3000A             JMP     IDOT2
```

```
09F8 3A100E    IDOT3:  LDA   OUTTX
09FB F610              ORI   10H       ;SET OUT BIT = 1
09FD 32100E            STA   OUTTX
0A00 3A110E    IDOT2:  LDA   YCODE     ;IS YDT FLAG SET?
0A03 17                RAL
0A04 D2250A            JNC   IDOT5     ;NO
0A07 17                RAL             ;YES, IS CODE = 1
0A08 DA2D0A            JC    IDOT9     ;YES, GO USE ID BIT FOR OUTPUT
0A0B 3A100E            LDA   OUTTX     ;NO, USE YDT BIT FOR OUTPUT
0A0E 1F                RAR
0A0F E610      IDOT6:  ANI   10H       ;IS BIT = 1?
0A11 C2330A            JNZ   IDOT7     ;YES
0A14 3AF90E            LDA   OUT41     ;NO, SET ID DATA = 0
0A17 E6EF              ANI   0EFH
0A19 32F90E    IDOT8:  STA   OUT41     ;STORE IN BUFFER
0A1C 2F                CMA
0A1D D341              OUT   41H       ;OUT TX WORD
0A1F E1                POP   H         ;RESTORE REGISTERS
0A20 D1                POP   D
0A21 C1                POP   B
0A22 F1                POP   PSW
0A23 FB                EI              ;ENABLE INTERRUPTS
0A24 C9                RET             ;RETURN

0A25 DB51      IDOT5:  IN    51H       ;ARE DOORS OPEN?
0A27 2F                CMA
0A28 E620              ANI   20H
0A2A CA330A            JZ    IDOT7     ;YES, GO SEND A ONE
0A2D 3A100E    IDOT9:  LDA   OUTTX     ;NO, GET ID DATA
0A30 C30F0A            JMP   IDOT6
```

ISIS 8080 MACRO ASSEMBLER, V1.1                    PAGE 3

```
0A33 3AF90E    IDOT7:  LDA   OUT41     ;DATA = 1
0A36 F610              ORI   10H       ;SEND OUT ONES
0A38 C3190A            JMP   IDOT8
               ;
               ;
               ;        18 HZ ID RX ROUTINE
               ;
               ;        THIS ROUTINE IS EXECUTED EACH 18 HZ ID RX
               ;        CLOCK CYCLE. THIS ROUTINE ACTS AS A MAIN
               ;        PROGRAM AND CALLS ITS OWN SUBROUTINES TO
               ;        PERFORM SPECIFIC FUNCTIONS. FIVE MAIN
               ;        FUNCTIONS ARE HANDLED.
               ;
               ;        SETUP/SHIFT    SHIFT 4 DATA BITS INTO
               ;                       THEIR 4 SHIFT REGISTERS
               ;
               ;        DROUT          DOOR FUNCTIONS
               ;
               ;        IDRUT          ID FUNCTION
               ;
               ;        YDTRX          YDT FUNCTION
               ;
               ;        PMRUT          PM FUNCTION
               ;
0A3B C5        IDRX:   PUSH  B         ;SAVE REGISTERS
0A3C D5                PUSH  D
0A3D E5                PUSH  H
0A3E DB40              IN    40H
0A40 2F                CMA
0A41 32AB0E            STA   RXTMP     ;RECEIVER INPUT
0A44 47                MOV   B,A       ;SAVE INPUTS
0A45 210C0E            LXI   H,IDRCK
```

```
0A48 34                    INR     H           ;DIAGONSTIC CLOCK
0A49 11770E                LXI     D,ARTRX+5   ;LAST SHIFT REGISTER
0A4C 0F                    RRC                 ;PUT INPUT BIT INTO CARRY
0A4D CD9A0A                CALL    SETUP       ;A RT SHIFT REGISTER
0A50 CD9A0A                CALL    SETUP       ;A LT
0A53 CD9A0A                CALL    SETUP       ;B RT
0A56 CDA10A                CALL    SHIFT       ;B LT
0A59 CDBA0A                CALL    DROUT       ;DOOR ROUTINE
0A5C 3AA20E                LDA     DRFLG       ;DOOR RECEIVED?
0A5F B7                    ORA     A
0A60 C26D0A                JNZ     RX3         ;YES
0A63 CD3F0D                CALL    IDRUT       ;NO, DO ID ROUTINE
0A66 3AAC0E                LDA     IDFG        ;ID RECEIVED?
0A69 B7                    ORA     A
0A6A C27A0A                JNZ     RX2         ;YES
0A6D DB51         RX3:     IN      51H         ;NO, YDT SWITCH ON?
0A6F 2F                    CMA
```

ISIS 8080 MACRO ASSEMBLER, V1.1                              PAGE 4

```
0A70 32F40E                STA     IN51
0A73 0F                    RRC
0A74 D2850A                JNC     RX1         ;NO
0A77 CDA505                CALL    YDTRX       ;YES, DO YDT ROUTINE
0A7A 3E00         RX2:     MVI     A,0
0A7C 00                    NOP
0A7D 00                    NOP
0A7E 00                    NOP
0A7F E1                    POP     H           ;RESTORE REGISTERS
0A80 D1                    POP     D
0A81 C1                    POP     B
0A82 F1                    POP     PSW
0A83 FB                    EI
0A84 C9                    RET                 ;RETURN
0A85 AF           RX1:     XRA     A           ;NOT IN YDT MODE
0A86 32110E                STA     YCODE
0A89 3AF00E                LDA     OUT50       ;CLEAR YDT HEAD ENDS, TACH
0A8C F61C                  ORI     1CH
0A8E 32F00E                STA     OUT50
0A91 2F                    CMA
0A92 D350                  OUT     50H
0A94 CD970C                CALL    PMRUT       ;DO PM ROUTINE
0A97 C37A0A                JMP     RX2
                     ;
                     ;
                     ;     SETUP/SHIFT SUBROUTINES
                     ;
                     ;     THESE ROUTINES SHIFT THE 4 DATA BITS
                     ;     INTO THEIR RESPECTIVE SHIFT REGISTERS.
                     ;
                     ;     ENTER WITH WORD6 ADDRESS IN DE REG
                     ;
                     ;
0A9A 47           SETUP:   MOV     B,A         ;SAVE INPUTS
0A9B CDA10A                CALL    SHIFT       ;GO DO 6 WORD SHIFT
0A9E 78                    MOV     A,B         ;RESTORE INPUTS
0A9F 0F                    RRC                 ;PUT BIT INTO CARRY
0AA0 C9                    RET
                     ;
                     ;
0AA1 1A           SHIFT:   LDAX    D           ;WORD6
0AA2 17                    RAL                 ;DATA IS IN CARRY
0AA3 12                    STAX    D
0AA4 1B                    DCX     D
0AA5 1A                    LDAX    D           ;WORD5
0AA6 17                    RAL
```

```
0AA7 12              STAX    D
0AA8 1B              DCX     D
0AA9 1A              LDAX    D       ;WORD4
0AAA 17              RAL
```

ISIS 8080 MACRO ASSEMBLER, V1.1                              PAGE 5

```
0AAB 12              STAX    D
0AAC 1B              DCX     D
0AAD 1A              LDAX    D       ;WORD3
0AAE 17              RAL
0AAF 12              STAX    D
0AB0 1B              DCX     D
0AB1 1A              LDAX    D       ;WORD2
0AB2 17              RAL
0AB3 12              STAX    D
0AB4 1B              DCX     D
0AB5 1A              LDAX    D       ;WORD1
0AB6 17              RAL
0AB7 12              STAX    D
0AB8 1B              DCX     D
0AB9 C9              RET
                     ;
                     ;
                     ;
                     ;
                     ;    DOOR SUBROUTINE
                     ;
                     ;    THIS ROUTINE SETS OR RESETS THE DOOR OPEN
                     ;    ENABLE BITS AS REQUIRED.
                     ;
                     ;    RETURNS WITH DRFLG = 0   NO DOOR CODE
                     ;                       = AA FOR DOOR CODE
                     ;
0ABA 3AD80E  DROUT:  LDA     IN61    ;STATUS WORD
0ABD 47              MOV     B,A     ;SAVE
0ABE E605            ANI     05H     ;ATO MODE?
0AC0 CA190C          JZ      D5      ;NO
0AC3 3AF50E          LDA     TACH4   ;YES, SPEED < 1 KPH?
0AC6 D603            SUI     3
0AC8 D2190C          JNC     D5      ;NO
0ACB 3AD80E          LDA     IN61    ;A TAIL?
0ACE E640            ANI     40H
0AD0 CAF50A          JZ      D1      ;NO
0AD3 21770E          LXI     H,ARTRX+5   ;YES, ART = DOOR?
0AD6 CD7D0C          CALL    DCODE
0AD9 0F              RRC
0ADA DA110B          JC      D2      ;YES
0ADD 21710E          LXI     H,ALTRX+5   ;NO, ALT = DOOR?
0AE0 CD7D0C          CALL    DCODE
0AE3 0F              RRC
0AE4 DA110B          JC      D2      ;YES
0AE7 3AF00E  D3:     LDA     OUT50   ;NO
0AEA E6BF            ANI     0BFH    ;BIT = 0
0AEC 32F00E  D4:     STA     OUT50
0AEF 2F              CMA
```

ISIS 8080 MACRO ASSEMBLER, V1.1                              PAGE 6

```
0AF0 D350            OUT     50H     ;SEND OUTPUT
0AF2 C3190B          JMP     D6
```

```
0AF5 3AD80E   D1:    LDA    IN61       ;B TAIL?
0AF8 E680            ANI    80H
0AFA CAE70A          JZ     D3         ;NO
0AFD 216B0E          LXI    H,BRTRX+5  ;YES, BRT = DOOR?
0B00 CD7D0C          CALL   DCODE
0B03 0F              RRC
0B04 DA110B          JC     D2         ;YES
0B07 21650E          LXI    H,BLTRX+5  ;NO, BLT = DOOR?
0B0A CD7D0C          CALL   DCODE
0B0D 0F              RRC
0B0E D2E70A          JNC    D3         ;NO
0B11 3AF00E   D2:    LDA    OUT50      ;YES
0B14 EE40            XRI    40H        ;TOGGLE BIT
0B16 C3EC0A          JMP    D4
0B19 21A00E   D6:    LXI    H,LTCNT    ;YES, DCR LEFT COUNTER
0B1C 35              DCR    M          ;BUT
0B1D F2220B          JP     DR2        ;HOLD TO ZERO
0B20 3600            MVI    M,0
0B22 21A10E   DR2:   LXI    H,RTCNT    ;DCR RIGHT COUNTER
0B25 35              DCR    M          ;BUT
0B26 F22B0B          JP     DR3        ;HOLD TO ZERO
0B29 3600            MVI    M,0
0B2B AF       DR3:   XRA    A
0B2C 32A20E          STA    DRFLG      ;FLAG = 0
0B2F 78              MOV    A,B        ;STATUS WORD
0B30 E610            ANI    10H        ;A HEAD?
0B32 CAA40B          JZ     DR4        ;NO
0B35 21770E          LXI    H,ARTRX+5  ;YES
0B38 CD7D0C          CALL   DCODE      ;ART RX = DOOR?
0B3B 0F              RRC
0B3C D26B0B          JNC    DR5        ;NO
0B3F 78              MOV    A,B        ;YES, GET STATUS WORD
0B40 E680            ANI    80H        ;B TAIL?
0B42 CA640B          JZ     DR6        ;NO
0B45 21650E          LXI    H,BLTRX+5  ;YES
0B48 CD7D0C          CALL   DCODE      ;BRT RX = DOOR?
0B4B 0F              RRC
0B4C D26B0B          JNC    DR5        ;NO
0B4F 21A00E   DR8:   LXI    H,LTCNT    ;YES, INC COUNTER
0B52 34              INR    M          ;TWO TIMES
0B53 34              INR    M          ;BUT
0B54 7E              MOV    A,M
0B55 D612            SUI    18         ;HOLD TO 18
0B57 FA5C0B          JM     DR7
0B5A 3612            MVI    M,18
0B5C 21A20E   DR7:   LXI    H,DRFLG    ;SET FLAG = AA
0B5F 36AA            MVI    M,0AAH
0B61 C36B0B          JMP    DR5
```

ISIS 8080 MACRO ASSEMBLER, V1.1                        PAGE 7

```
0B64 3A9B0E   DR6:   LDA    RTOK       ;RT TAIL DATA?
0B67 0F              RRC
0B68 DA4F0B          JC     DR8        ;YES, GO INC COUNT
0B6B 21710E   DR5:   LXI    H,ALTRX+5  ;NO
0B6E CD7D0C          CALL   DCODE      ;ALT RX = DOOR?
0B71 0F              RRC
0B72 D22E0C          JNC    DR9        ;NO
0B75 78              MOV    A,B        ;YES, GET STATUS
0B76 E680            ANI    80H        ;B TAIL?
0B78 CA9A0B          JZ     DR10       ;NO
0B7B 216B0E          LXI    H,BRTRX+5  ;YES
0B7E CD7D0C          CALL   DCODE      ;BLT RX = DOOR?
0B81 0F              RRC
0B82 D22E0C          JNC    DR9        ;NO
0B85 21A10E   DR11:  LXI    H,RTCNT    ;YES, INC COUNTER
```

```
0B88 34                    INR    M         ;TWO TIMES
0B89 34                    INR    M         ;BUT
0B8A 7E                    MOV    A,M
0B8B D612                  SUI    18        ;HOLD TO 18
0B8D FA920B                JM     DR12
0B90 3612                  MVI    M,18
0B92 21A20E       DR12:    LXI    H,DRFLG   ;SET FLAG = AA
0B95 36AA                  MVI    M,0AAH
0B97 C32E0C                JMP    DR9
0B9A 3A9E0E       DR10:    LDA    LTOK      ;LT TAIL DATA?
0B9D 0F                    RRC
0B9E DA850B                JC     DR11      ;YES, GO INC COUNT
0BA1 C32E0C                JMP    DR9       ;NO
0BA4 78           DR4:     MOV    A,B       ;GET STATUS WORD
0BA5 E620                  ANI    20H       ;B HEAD?
0BA7 CA240C                JZ     DR1       ;NO
0BAA 216B0E                LXI    H,BRTRX+5      ;YES
0BAD CD7D0C                CALL   DCODE     ;BRT RX= DOOR?
0BB0 0F                    RRC
0BB1 D2E00B                JNC    DR13      ;NO
0BB4 78                    MOV    A,B       ;YES, GET STATUS WORD
0BB5 E640                  ANI    40H       ;A TAIL?
0BB7 CAD90B                JZ     DR14      ;NO
0BBA 21710E                LXI    H,ALTRX+5      ;YES
0BBD CD7D0C                CALL   DCODE     ;ART RX = DOOR?
0BC0 0F                    RRC
0BC1 D2E00B                JNC    DR13      ;NO
0BC4 21A10E       DR15:    LXI    H,RTCNT   ;YES, INC COUNTER
0BC7 34                    INR    M         ;TWO TIMES
0BC8 34                    INR    M         ;BUT
0BC9 7E                    MOV    A,M
0BCA D612                  SUI    18        ;HOLD TO 18
0BCC FAD10B                JM     DR16
0BCF 3612                  MVI    M,18
0BD1 21A20E       DR16:    LXI    H,DRFLG   ;SET FLAG = AA
```

ISIS 8080 MACRO ASSEMBLER, V1.1                           PAGE 8

```
0BD4 36AA                  MVI    M,0AAH
0BD6 C3E00B                JMP    DR13
0BD9 3A9B0E       DR14:    LDA    RTOK      ;RT TAIL DATA?
0BDC 0F                    RRC
0BDD DAC40B                JC     DR15      ;YES, GO INC COUNT
0BE0 21650E       DR13:    LXI    H,BLTRX+5      ;NO
0BE3 CD7D0C                CALL   DCODE     ;BLT RX = DOOR?
0BE6 0F                    RRC
0BE7 D22E0C                JNC    DR9       ;NO
0BEA 78                    MOV    A,B       ;YES, GET STATUS WORD
0BEB E640                  ANI    40H       ;A TAIL?
0BED CA0F0C                JZ     DR17      ;NO
0BF0 21770E                LXI    H,ARTRX+5      ;YES
0BF3 CD7D0C                CALL   DCODE     ;ALT RX = DOOR?
0BF6 0F                    RRC
0BF7 D22E0C                JNC    DR9       ;NO
0BFA 21A00E       DR18:    LXI    H,LTCNT   ;YES, INC COUNTER
0BFD 34                    INR    M         ;TWO TIMES
0BFE 34                    INR    M         ;BUT
0BFF 7E                    MOV    A,M
0C00 D612                  SUI    18        ;HOLD TO 18
0C02 FA070C                JM     DR19
0C05 3612                  MVI    M,18
0C07 21A20E       DR19:    LXI    H,DRFLG   ;SET FLAG TO AA
0C0A 36AA                  MVI    M,0AAH
0C0C C32E0C                JMP    DR9
0C0F 3A9E0E       DR17:    LDA    LTOK      ;LT TAIL DATA?
0C12 0F                    RRC
```

```
0C13 DAFA0B             JC      DR18            ;YES, GO INC COUNT
0C16 C32E0C             JMP     DR9             ;NO
0C19 3AF00E    D5:      LDA     OUT50           ;9HZ BIT = 0
0C1C E6BF               ANI     0BFH
0C1E 32F00E             STA     OUT50
0C21 2F                 CMA
0C22 D350               OUT     50H
0C24 AF        DR1:     XRA     A               ;ZERO OUT
0C25 32A00E             STA     LTCNT           ;LEFT COUNTER
0C28 32A10E             STA     RTCNT           ;RIGHT COUNTER
0C2B 32A20E             STA     DRFLG           ;DOOR FLAG
0C2E 3AA00E    DR9:     LDA     LTCNT           ;CHECK WHICH LEFT DOOR ACTION
0C31 B7                 ORA     A
0C32 CA550C             JZ      DR20            ;CLOSE
0C35 D612               SUI     18
0C37 CA5F0C             JZ      DR21            ;OPEN
0C3A 3AA10E    DR22:    LDA     RTCNT           ;NOTHING, CHECK RIGHT SIDE
0C3D B7                 ORA     A
0C3E CA690C             JZ      DR23            ;CLOSE
0C41 D612               SUI     18
0C43 CA730C             JZ      DR24            ;OPEN
0C46 3AA40E    DR25:    LDA     DROPF           ;DO NOTHING, TOGGLE OUTPUT
```

ISIS 8080 MACRO ASSEMBLER, V1.1                     PAGE 9

```
0C49 47                 MOV     B,A
0C4A 3AF00E             LDA     OUT50
0C4D A8                 XRA     B
0C4E 32F00E             STA     OUT50
0C51 2F                 CMA
0C52 D350               OUT     50H             ;SEND OUTPUT
0C54 C9                 RET                     ;RETURN
0C55 21A40E    DR20:    LXI     H,DROPF         ;SET LEFT DOOR ENABLE = 0
0C58 7E                 MOV     A,M
0C59 E6FE               ANI     0FEH            ;   CLOSE LEFT DOORS
0C5B 77                 MOV     M,A
0C5C C33A0C             JMP     DR22
0C5F 21A40E    DR21:    LXI     H,DROPF         ;SET LEFT DOOR ENABLE = 1
0C62 7E                 MOV     A,M
0C63 F601               ORI     1               ;   OPEN LEFT DOORS
0C65 77                 MOV     M,A
0C66 C33A0C             JMP     DR22
0C69 21A40E    DR23:    LXI     H,DROPF         ;SET RIGHT DOOR ENABLE = 0
0C6C 7E                 MOV     A,M
0C6D E6FD               ANI     0FDH            ;   CLOSE RIGHT DOORS
0C6F 77                 MOV     M,A
0C70 C3460C             JMP     DR25
0C73 21A40E    DR24:    LXI     H,DROPF         ;SET RIGHT DOOR ENABLE = 1
0C76 7E                 MOV     A,M
0C77 F602               ORI     2               ;   OPEN RIGHT DOORS
0C79 77                 MOV     M,A
0C7A C3460C             JMP     DR25
                        ;
                        ;
                        ;
                        ;       DOOR CODE SUBROUTINE
                        ;
                        ;       THIS SUBROUTINE CHECKS THE LAST TWO
                        ;       WORDS OF THE SPECIFIED RX SHIFT REG
                        ;       TO SEE THAT THEY ARE THE SAME AND ARE
                        ;       EITHER 55 OR AA.
                        ;
                        ;       ENTER WITH LAST WORD OF RX REG IN HL
                        ;
                        ;       RETURNS WITH AREG = 0   NO DOOR CODE
```

```
;           AREG = 1  DOOR CODE
;
;
0C7D 7E         DCODE:  MOV     A,M             ;WORD6
0C7E 2B                 DCX     H               ;WORD5
0C7F BE                 CMP     M               ;ALIKE?
0C80 CA880C             JZ      DC1             ;YES
0C83 AF         DC3:    XRA     A               ;NO, ZERO FLAG
0C84 32A30E     DC4:    STA     DOROK
0C87 C9                 RET                     ;RETURN
```

ISIS 8080 MACRO ASSEMBLER, V1.1                     PAGE 10

```
0C88 FE55       DC1:    CPI     55H             ;= 55?
0C8A CA920C             JZ      DC2             ;YES, GO SET OK
0C8D FEAA               CPI     0AAH            ; = AA?
0C8F C2830C             JNZ     DC3             ;NO, DOOR CODE
0C92 3E01       DC2:    MVI     A,1             ;YES
0C94 C3840C             JMP     DC4             ;GO SET OK
                ;
                ;
                ;
                ;       PM SUBROUTINE
                ;
                ;       THIS ROUTINE CHECKS TO SEE IF A PM CODE
                ;       HAS BEEN RECEIVED. IF A NEW PM WAS RECEIVED
                ;       THE NEW PMNO IS STORED AND THE TRANSFORM
                ;       SUBROUTINE IS CALLED TO SET UP THE ID DISPLAY.
                ;
                ;       RETURNS WITH PMFLG = 0  NO PM CODE
                ;                    PMFLG = 1  PM CODE FOUND
                ;
                ;
0C97 AF         PMRUT:  XRA     A
0C98 32AF0E             STA     PMFLG           ;PM FLAG = 0
0C9B 3AD80E             LDA     IN61
0C9E E605               ANI     05H             ;ATO MODE?
0CA0 C8                 RZ                      ;NO, RETURN
0CA1 3AF50E             LDA     TACH4           ;YES
0CA4 D608               SUI     8               ;SPEED < 4 KPH?
0CA6 F8                 RM                      ;YES, RETURN
0CA7 3AD80E             LDA     IN61            ;NO
0CAA E610               ANI     10H             ;A HEAD?
0CAC CAD30C             JZ      PM1             ;NO, GO CHECK B HEAD
0CAF 21B80E             LXI     H,BRTRX+5       ;BRT RX = PM CODE?
0CB2 CDEE0C             CALL    CODE6
0CB5 B7                 ORA     A
0CB6 CAC90C             JZ      PM2             ;NO
0CB9 21E00E     PM3:    LXI     H,PMNO          ;YES, NEW PM?
0CBC 7E                 MOV     A,M
0CBD B8                 CMP     B
0CBE C8                 RZ                      ;NO, RET
0CBF 70                 MOV     M,B             ;YES, STORE NEW PMNO
0CC0 CDD507             CALL    IDTS            ;CALL TRANSFORM
0CC3 3E01               MVI     A,1
0CC5 32AF0E             STA     PMFLG           ;PMFLG=1
0CC8 C9                 RET
0CC9 21650E     PM2:    LXI     H,BLTRX+5       ;BLT RX = PM CODE?
0CCC CDEE0C             CALL    CODE6
0CCF B7                 ORA     A
0CD0 C2B90C             JNZ     PM3             ;YES, GO STORE IT
0CD3 3AD80E     PM1:    LDA     IN61            ;NO, B HEAD?
0CD6 E620               ANI     20H
```

```
0CD8 C8              RZ                    ; NO
0CD9 21770E          LXI    H,ARTRX+5      ; YES, ART RX = PM CODE?
0CDC CDEE0C          CALL   CODE6
0CDF B7              ORA    A
0CE0 C2B90C          JNZ    PM3            ; YES
0CE3 21710E          LXI    H,ALTRX+5      ; ALT RX = PM CODE?
0CE6 CDEE0C          CALL   CODE6
0CE9 B7              ORA    A
0CEA C2B90C          JNZ    PM3            ; YES, GO STORE IT
0CED C9              RET                   ; NO, RETURN
                ;
                ;
                ;
                ;
                ;
                ;      CODE6 SUBROUTINE
                ;
                ;      THIS SUBROUTINE CHECKS THE RX INPUT SHIFT REGISTERS
                ;      TO DETERMINE WHETHER OR NOT A 6BIT REPEATING CODE
                ;      IS BEING RECEIVED. THREE IDENTICAL CODES IN A ROW
                ;      MUST BE RECEIVED.
                ;
                ;      ENTER WITH THE ADDRESS OF THE LAST SHIFT REGISTER
                ;      LOCATION IN THE HL REG.
                ;
                ;      RETURNS WITH AREG = 0 IF NO LEGAL 6BIT CODE
                ;      IF LEGAL CODE AREG = VALUE
                ;      DREG = PAST VALUE
                ;      CREG = PAST PAST VALUE
                ;
                ;      JUMPS TO PMSUB TO CHECK IF PM CODE.
                ;
                ;
0CEE 5E       CODE6:  MOV    E,M            ; WORD6
0CEF 2B               DCX    H
0CF0 56               MOV    D,M            ; WORD5
0CF1 2B               DCX    H
0CF2 7E               MOV    A,M            ; WORD4
0CF3 E603             ANI    03H            ; MOVE BITS TO HIGH ORDER IN WORD
0CF5 0F               RRC
0CF6 0F               RRC
0CF7 4F               MOV    C,A            ; TEMP STORE
0CF8 7A               MOV    A,D            ; WORD5
0CF9 E6F0             ANI    0F0H           ; MASK HIGH ORDER NIBBLE
0CFB 1F               RAR
0CFC 1F               RAR
0CFD B1               ORA    C              ; WORD4 BITS
0CFE 1F               RAR
0CFF 1F               RAR
0D00 4F               MOV    C,A            ; PAST PAST VALUE IN CREG

0D01 7A               MOV    A,D            ; WORD5
0D02 E60F             ANI    0FH
0D04 17               RAL
0D05 17               RAL
0D06 57               MOV    D,A            ; TEMP STORE
0D07 7B               MOV    A,E            ; WORD6
0D08 07               RLC
0D09 07               RLC                   ; MOVE BITS TO LOW ORDER
0D0A E603             ANI    03H
```

```
0D0C  B2              ORA    D
0D0D  57              MOV    D,A          ;PAST VALUE IN DREG
0D0E  7B              MOV    A,E
0D0F  E63F            ANI    3FH          ;VALUE IN AREG
0D11  BA              CMP    D            ;PAST VALUE SAME?
0D12  CA180D          JZ     COD1         ;YES
0D15  AF      COD2:   XRA    A            ;NO, ZERO AREG
0D16  47              MOV    B,A
0D17  C9              RET
0D18  B9      COD1:   CMP    C            ;PAST PAST VALUE SAME?
0D19  CA1F0D          JZ     PMSUB        ;YES
0D1C  C3150D          JMP    COD2         ;NO, GO ZERO AREG
                ;
                ;
                ;       PM CODE SUBROUTINE
                ;
                ;       THIS ROUTINE TAKES A 6 BIT CODE AND
                ;       SEARCHES THE PM TABLE FOR A MATCH.
                ;       THE PM NUMBER IS DETERMINED.
                ;
                ;       ENTER WITH PM CODE IN AREG
                ;
                ;       RETURNS WITH PM NUMBER IN BREG
                ;       0 MEANS NO PM FOUND
                ;
                ;
0D1F  21E30D  PMSUB:   LXI    H,COMMA      ;COMMA FREE CODE TABLE
0D22  0601             MVI    B,1
0D24  BE               CMP    M
0D25  C8               RZ                  ;PM1
0D26  04               INR    B
0D27  23               INX    H
0D28  BE               CMP    M
0D29  C8               RZ                  ;PM2
0D2A  04               INR    B
0D2B  23               INX    H
0D2C  BE               CMP    M
0D2D  C8               RZ                  ;PM3
0D2E  04               INR    B
0D2F  23               INX    H
0D30  BE               CMP    M
```

ISIS 8080 MACRO ASSEMBLER, V1.1                                PAGE 13

```
0D31  C8               RZ                  ;PM4
0D32  04               INR    B
0D33  23               INX    H
0D34  BE               CMP    M
0D35  C8               RZ                  ;PM5
0D36  04               INR    B
0D37  23               INX    H
0D38  BE               CMP    M
0D39  C8               RZ                  ;PM6
0D3A  21E00E           LXI    H,PMNO       ;SAVE OLD PM
0D3D  46               MOV    B,M
0D3E  C9               RET
                ;
                ;
                ;       ID SUBROUTINE
                ;
                ;       THIS ROUTINE CHECKS TO SEE IF AN ID HAS
                ;       BEEN RECEIVED. IF AN ID IS RECEIVED, IT
                ;       IS STORED AND THE TRANSFORM ROUTINE IS
                ;       CALLED TO PREPARE THE OUTPUT. A FLAG
                ;       IS SET IF AN ID WAS RECEIVED.
                ;
```

```
                    ;       RETURNS WITH IDFG = 0   NO ID
                    ;            IDFG = 1   ID
                    ;
                    ;
0D3F AF     IDRUT:  XRA     A
0D40 32AC0E         STA     IDFG        ;IDFG = 0
0D43 3AD80E         LDA     IN61
0D46 47             MOV     B,A         ;SAVE STATUS WORD
0D47 E605           ANI     05H         ;ATO MODE?
0D49 C8             RZ                  ;NO, RETURN
0D4A 3AF50E         LDA     TACH4       ;YES
0D4D D608           SUI     8           ;SPEED < 4 KPH?
0D4F D0             RNC                 ;NO, RETURN
0D50 78             MOV     A,B         ;YES, GET STATUS
0D51 E610           ANI     10H         ;A HEAD?
0D53 CA740D         JZ      RT1         ;NO, CHECK B HEAD
0D56 11720E         LXI     D,ARTRX     ;YES
0D59 CD950D         CALL    IDSUB       ;ART RX = ID?
0D5C 3AAC0E         LDA     IDFG
0D5F B7             ORA     A
0D60 CA670D         JZ      RT2         ;NO
0D63 CDD507 RT3:    CALL    IDTS        ;YES, CALL TRANSFORM
0D66 C9             RET                 ;RETURN
0D67 116C0E RT2:    LXI     D,ALTRX
0D6A CD950D         CALL    IDSUB       ;ALT RX = ID?
0D6D 3AAC0E         LDA     IDFG
0D70 B7             ORA     A
0D71 C2630D         JNZ     RT3         ;YES, GO TRANSFORM

ISIS 8080 MACRO ASSEMBLER, V1.1                      PAGE 14

0D74 3AD80E RT1:    LDA     IN61        ;NO
0D77 E620           ANI     20H         ;B HEAD?
0D79 C8             RZ                  ;NO, RETURN
0D7A 11660E         LXI     D,BRTRX     ;YES
0D7D CD950D         CALL    IDSUB       ;BTR RX = ID?
0D80 3AAC0E         LDA     IDFG
0D83 B7             ORA     A
0D84 C2630D         JNZ     RT3         ;YES, GO TRANSFORM
0D87 11600E         LXI     D,BLTRX     ;NO
0D8A CD950D         CALL    IDSUB       ;BLT RX = ID?
0D8D 3AAC0E         LDA     IDFG
0D90 B7             ORA     A
0D91 C2630D         JNZ     RT3         ;YES, GO TRANSFORM
0D94 C9             RET                 ;NO, RETURN
                    ;
                    ;
                    ;       ID TABLE SEARCH SUBROUTINE
                    ;
                    ;       THIS ROUTINE LOOKS FOR A PREAMBLE IN A GIVEN
                    ;       RX SHIFT REGISTER AND IF IT FINDS ONE, IT
                    ;       STORES THE NEW ID OR DESTINATION . A FLAG DENOTE
                    ;       WHETHER AN ID WAS FOUND.
                    ;
                    ;       ENTER WITH WORD1 ADDRESS IN DE REG
                    ;
                    ;       RETURN WITH IDFG = 0   NO ID
                    ;            IDFG = 1   ID
                    ;
                    ;
0D95 1A     IDSUB:  LDAX    D           ;WORD1
0D96 D686           SUI     86H
0D98 C0             RNZ                 ;NO PREAMBLE
0D99 13             INX     D
0D9A 1A             LDAX    D           ;WORD2
0D9B D679           SUI     79H
```

```
0D9D C0              RNZ               ;NO PREAMBLE
0D9E 13              INX      D
0D9F 1A              LDAX     D        ;WORD3
0DA0 E6F0            ANI      0F0H
0DA2 D680            SUI      80H
0DA4 C0              RNZ               ;NO PREAMBLE
0DA5 1A              LDAX     D        ;WORD3
0DA6 D68F            SUI      8FH
0DA8 C2C80D          JNZ      DSTN
0DAB 13              INX      D
0DAC 1A              LDAX     D        ;WORD4
0DAD E6C0            ANI      0C0H
0DAF D6C0            SUI      0C0H
0DB1 C2C80D          JNZ      DSTN1
0DB4 01900E          LXI      B,IDIN
```

ISIS 8080 MACRO ASSEMBLER, V1.1                              PAGE 15

```
0DB7 1A              LDAX     D        ;WORD4
0DB8 E603            ANI      03H
0DBA 02              STAX     B        ;IDIN WORD1
0DBB 13              INX      D
0DBC 03              INX      B
0DBD 1A              LDAX     D        ;WORD5
0DBE 02              STAX     B        ;IDIN WORD2
0DBF 13              INX      D
0DC0 03              INX      B
0DC1 1A              LDAX     D        ;WORD6
0DC2 02              STAX     B        ;IDIN WORD3
0DC3 21AC0E  TRFRH:  LXI      H,IDFG   ;ID FLAG = 1
0DC6 34              INR      M
0DC7 C9              RET

0DC8 1B      DSTN1:  DCX      D
0DC9 1A      DSTN:   LDAX     D        ;WORD3
0DCA E60F            ANI      0FH
0DCC 17              RAL
0DCD 17              RAL
0DCE 4F              MOV      C,A      ;FIRST 4 BITS OF DEST
0DCF 13              INX      D
0DD0 1A              LDAX     D        ;WORD4
0DD1 E6C0            ANI      0C0H
0DD3 07              RLC
0DD4 07              RLC               ;5TH + 6TH BITS
0DD5 81              ADD      C
0DD6 47              MOV      B,A      ;NEW DESTINATION
0DD7 3A920E          LDA      IDIN+2
0DDA E6C0            ANI      0C0H
0DDC B0              ORA      B
0DDD 32920E          STA      IDIN+2   ;NEW DEST STORED
0DE0 C3C30D          JMP      TRFRH

0DE3 15      COMMA:  DB       00010101B     ;PM1
0DE4 07              DB       00000111B     ;PM2
0DE5 01              DB       00000001B     ;PM3
0DE6 0D              DB       00001101B     ;PM4
0DE7 19              DB       00011001B     ;PM5
0DE8 1F              DB       00011111B     ;PM6

;                    ID ROUTINE VARIABLES
;
0E78                 ORG      0E78H
```

```
0E78 0F        IDOM:    DB      0FH     ; IDOUT MASTER MESSAGE AREA
0E79 00                 DB      0
0E7A 00                 DB      0
0E7B 00                 DB      0
0E7C 00                 DB      0
               ;
0E7D 00        IDOFM:   DB      0       ; IDOUT MASTER FOR DISPLAY
0E7E 00                 DB      0
0E7F 00                 DB      0
0E80 00                 DB      0
0E81 00                 DB      0
               ;
0E82 0F        IDOTX:   DB      0FH     ; IDOUT TRANSMITTER BUFFER
0E83 00                 DB      0
0E84 00                 DB      0
0E85 00                 DB      0
0E86 00                 DB      0
               ;
0E87 0F        IDODS:   DB      0FH     ; IDOUT DISPLAY BUFFER
0E88 00                 DB      0
0E89 00                 DB      0
0E8A 00                 DB      0
0E8B 00                 DB      0
               ;
0E8C 00        IDOW:    DB      0       ; IDOUT WORK BUFFER
0E8D 00                 DB      0
0E8E 00                 DB      0
0E8F 00                 DB      0
               ;
0E90 00        IDIN:    DB      0       ; INPUT FOR ID FROM
0E91 00                 DB      0       ; RX OR DISPLAY
0E92 00                 DB      0
               ;
0E93 00        IDINP:   DB      0       ; INPUT FROM DISPLAY
0E94 00                 DB      0
0E95 00                 DB      0
               ;
               ;
0E96 00        IDDSF:   DB      0       ; ID OUT DISPLAY FLAG
0E97 00        IDDSC:   DB      0       ; ID OUT DISPLAY COUNT
               ;
               ;
0E98 00        IDISF:   DB      0       ; ID IN DISPLAY FLAG
0E99 00        IDICT:   DB      0       ; ID IN DISPLAY COUNT
               ;
               ;
0E60                    ORG     0E60H
0E60 00        BLTRX:   DB      0       ; B LT RX SHIFT
0E61 00                 DB      0       ; REGISTER
0E62 00                 DB      0

0E63 00                 DB      0
0E64 00                 DB      0
0E65 00                 DB      0
               ;
               ;
0E66 00        BRTRX:   DB      0       ; B RT RX SHIFT
0E67 00                 DB      0       ; REGISTER
0E68 00                 DB      0
0E69 00                 DB      0
```

```
0E6A 00                DB      0
0E6B 00                DB      0
                ;
                ;
0E6C 00        ALTRX:  DB      0       ;A LT RX SHIFT
0E6D 00                DB      0       ;REGISTER
0E6E 00                DB      0
0E6F 00                DB      0
0E70 00                DB      0
0E71 00                DB      0
                ;
                ;
0E72 00        ARTRX:  DB      0       ;A RT RX SHIFT
0E73 00                DB      0       ;REGISTER
0E74 00                DB      0
0E75 00                DB      0
0E76 00                DB      0
0E77 00                DB      0
                ;
                ;
0EA0                   ORG     0EA0H
0EA0 00        LTCNT:  DB      0       ;LEFT DOOR COUNTER
0EA1 00        RTCNT:  DB      0       ;RIGHT DOOR COUNTER

0EA2 00        DRFLG:  DB      0       ;DOOR CODE WAS FOUND
0EA3 00        DOROK:  DB      0       ;DOOR CODE RECEIVED
                ;
0EAC           IDFG    EQU     0EACH   ;ID HAS BEEN FOUND FLAG
0EAD           PMCOD   EQU     0EADH   ;PM CODE
0EE0           PMNO    EQU     0EE0H   ;PM NUMBER
0EAF           PMFLG   EQU     0EAFH   ;PM HAS BEEN FOUND FLAG
0EAB           RXTMP   EQU     0EABH   ;RX TEMP STORAGE
                ;
                ;
                ;       TAIL DATA VARIABLES
                ;
                ;       DO NOT CHANGE ORDER, RTPV, RTOK, RTCT, LTPV, LTOK, LTCT
                ;
                ;
0E9A                   ORG     0E9AH
0E9A 00        RTPV:   DB      0       ;RIGHT TAIL   PAST VALUE

ISIS 8080 MACRO ASSEMBLER, V1.1                    PAGE 18

0E9B 00        RTOK:   DB      0       ;             DATA OK
0E9C 00        RTCT:   DB      0       ;             COUNT

0E9D 00        LTPV:   DB      0       ;LEFT TAIL    PAST VALUE
0E9E 00        LTOK:   DB      0       ;             DATA OK
0E9F 00        LTCT:   DB      0       ;             COUNT

0E18                   ORG     0E18H
                ;
0E18 00        CLOK1:  DB      0       ;TIMERS FOR USE BY EVERYONE
0E19 00        CLOK2:  DB      0
0E1A 00        CLOK3:  DB      0
0E1B 00        CLOK4:  DB      0
0E1C 00        CLOK5:  DB      0
0E1D 00        CLOK6:  DB      0
0E1E 00        CLOK7:  DB      0
0E1F 00        CLOK8:  DB      0
                ;
0EFF           IN44    EQU     0EFFH   ;ID DATA
0ED8           IN61    EQU     0ED8H   ;CAR MODE WORD
0EF9           OUT41   EQU     0EF9H   ;TX OUT WORD
0EF0           OUT50   EQU     0EF0H   ;DOOR WORD
```

```
0E11    YCODE   EQU    0E11H    ;YDT CODE WORD
0EA4    DROPF   EQU    0EA4H    ;DOOR OPEN ENABLE FLAG
05A5    YDTRX   EQU    05A5H    ;YDT SUBROUTINE
0EF5    TACH4   EQU    0EF5H    ;TACH 4A STORAGE
0E10    OUTTX   EQU    0E10H    ;TEMP ID TX OUT
07D5    IDTS    EQU    07D5H    ;TRANSFORM SUBROUTINE LOCATION
0EF4    IN51    EQU    0EF4H    ;IN PORT 51 DATA
0E0C    IDRCK   EQU    0E0CH    ;DIAGONISTIC CLOCK
0000            END
```

ISIS 8080 MACRO ASSEMBLER, V1.1                    PAGE 19

```
ALTRX  0E6C    ARTRX  0E72    BLTRX  0E60    BRTRX  0E66
CLOK1  0E18    CLOK2  0E19    CLOK3  0E1A    CLOK4  0E1B
CLOK5  0E1C    CLOK6  0E1D    CLOK7  0E1E    CLOK8  0E1F
COD1   0D18    COD2   0D15    CODE6  0CEE    COMMA  0DE3
D1     0AF5    D2     0B11    D3     0AE7    D4     0AEC
D5     0C19    D6     0B19    DC1    0C88    DC2    0C92
DC3    0C83    DC4    0C84    DCK1   09B8    DCODE  0C7D
DOROK  0EA3    DR1    0C24    DR10   0B9A    DR11   0B85
DR12   0B92    DR13   0BE0    DR14   0BD9    DR15   0BC4
DR16   0BD1    DR17   0C0F    DR18   0BFA    DR19   0C07
DR2    0B22    DR20   0C55    DR21   0C5F    DR22   0C3A
DR23   0C69    DR24   0C73    DR25   0C46    DR3    0B2B
DR4    0BA4    DR5    0B6B    DR6    0B64    DR7    0B5C
DR8    0B4F    DR9    0C2E    DRFLG  0EA2    DROPF  0EA4
DROUT  0ABA    DSTN   0DC9    DSTN1  0DC8    IDDSC  0E97
IDDSF  0E96    IDFG   0EAC    IDICT  0E99    IDIN   0E90
IDINP  0E93    IDISF  0E98    IDODS  0E87    IDOM   0E78
IDOPM  0E7D    IDOT1  09C5    IDOT2  0A00    IDOT3  09F8
IDOT5  0A25    IDOT6  0A0F    IDOT7  0A33    IDOT8  0A19
IDOT9  0A2D    IDOTR  09B0    IDOTX  0E82    IDOW   0E8C
IDRCK  0E0C    IDRUT  0D3F    IDRX   0A3B    IDSUB  0D95
IDTS   07D5    IN44   0EFF    IN51   0EF4    IN61   0ED8
LTCNT  0EA0    LTCT   0E9F    LTOK   0E9E    LTPV   0E9D
OUT41  0EF9    OUT50  0EF0    OUTTX  0E10    PM1    0CD3
PM2    0CC9    PM3    0CB9    PMCOD  0EAD    PMFLG  0EAF
PMNO   0EE0    PMRUT  0C97    PMSUB  0D1F    RT1    0D74
RT2    0D67    RT3    0D63    RTCNT  0EA1    RTCT   0E9C
RTOK   0E9B    RTPV   0E9A    RX1    0A85    RX2    0A7A
RX3    0A6D    RXTMP  0EAB    SETUP  0A9A    SHIFT  0AA1
TACH4  0EF5    TRFRM  0DC3    YCODE  0E11    YDTRX  05A5
```

ISIS 8080 MACRO ASSEMBLER, V1.1                    PAGE 1
CONT2B

```
        ;       JAN 24, 1978 SUB 0
        ;       MAY 16, 1978 SUB ?

;ADDED INITF, MEMORY SUBTEST

TITLE   'CONT2B'

;INTERUPT HANDLER MACRO ROUTINE

INTER   MACRO   RESAR, ADDR
                PUSH    PSW
                MVI     A, 10H*(7-RESAR)+8
                OUT     0FH
                JMP     ADDR
                ENDM
```

```
;PRESET MEMORY AND OUTPUTS MACRO ROUTINE
;INVERTING PORTS

PREST   MACRO   PORT
                      LDAX    D
                      MOV     M,A
                      CMA
                      OUT     PORT
                      INR     L
                      INX     D
                      ENDM

;NONINVERTING PORTS

PRSTN   MACRO   PORT
                      LDAX    D
                      MOV     M,A
                      NOP
                      OUT     PORT
                      INR     L
                      INX     D
                      ENDM

;MAIN CONTROL PROGRAM FOR CPU 2

;FEB 11, 77

0000                  ORG     0
0000 F3               DI
0001 31FF0F           LXI     SP,0FFFH        ;SET STACK TO TOP OF PAGE F
0004 00               NOP
0005 C34B00           JMP     INIT
```

ISIS 8080 MACRO ASSEMBLER, V1.1                 PAGE 2
CONT2B

```
                      ;RESTART 1

+    INTER   1,PS
0008 F5          +    PUSH    PSW
0009 3E68        +    MVI     A,10H*(7-00001H)+8
000B D30F        +    OUT     0FH
000D C31008      +    JMP     00810H

;RESTART 2

+    INTER   2,RETRN
0010 F5          +    PUSH    PSW
0011 3E58        +    MVI     A,10H*(7-00002H)+8
0013 D30F        +    OUT     0FH
0015 C3B300      +    JMP     000B3H

;RESTART 3

+    INTER   3,ANNUN
0018 F5          +    PUSH    PSW
0019 3E48        +    MVI     A,10H*(7-00003H)+8
001B D30F        +    OUT     0FH
001D C30001      +    JMP     00100H

;RESTART 4

+    INTER   4,SC0
0020 F5          +    PUSH    PSW
```

```
0021 3E38     +          MVI     A,10H*(7-00004H)+8
0023 D30F     +          OUT     0FH
0025 C3C002   +          JMP     002C0H

;RESTART 5

+          INTER   5,SC1
0028 F5       +          PUSH    PSW
0029 3E28     +          MVI     A,10H*(7-00005H)+8
002B D30F     +          OUT     0FH
002D C3C302   +          JMP     002C3H

;RESTART 6

+          INTER   6,TNSFR

ISIS 8080 MACRO ASSEMBLER, V1.1                PAGE 3
CONT2B

0030 F5       +          PUSH    PSW
0031 3E18     +          MVI     A,10H*(7-00006H)+8
0033 D30F     +          OUT     0FH
0035 C38102   +          JMP     00281H

;RESTART 7

0038 C30000              JMP     0        ;START OVER
003B 00                  NOP
003C 00                  NOP
003D 00                  NOP
003E 00                  NOP
003F 00                  NOP

;REINITIALIZE, FROM ERROR DETECT

0040 F3          INITP:  DI
0041 31FF0F              LXI     SP,0FFFH
0044 21AF0E              LXI     H,0EAFH
0047 AF                  XRA     A
0048 C34F00              JMP     INIT1

;INITIALIZE ROUTINE
                         ;CLEAR MEMORY 004B 21FF0E     INIT:    LXI     H,0EFFH  ;POINT TO TOP OF MEMORY
004E AF                  XRA     A
004F 77         INIT1:   MOV     M,A      ;CLEAR MEMORY
0050 2D                  DCR     L        ;POINT TO NEXT
0051 C24F00              JNZ     INIT1    ;CLEAR NEXT
0054 77                  MOV     M,A

;       MEMORY TEST 0055 21230E              LXI     H,0E23H  ;POINT TO 1ST TESTED LOC.
0058 0E06                MVI     C,6      ;TESTING 6 LOCATIONS
005A 3E55       MTEST:   MVI     A,55H    ;1ST
005C 77                  MOV     M,A
005D AF                  XRA     A
005E 7E                  MOV     A,M
005F FE55                CPI     55H
0061 C24000              JNZ     INITP    ;BAD MEMORY
0064 3EAA                MVI     A,0AAH   ;2ND
```

```
0066 77            MOV     M,A
0067 AF            XRA     A
0068 7E            MOV     A,M
0069 FEAA          CPI     0AAH
006B C24000        JNZ     INITP       ;BAD MEMORY
006E AF            XRA     A           ;RECLEAR MEMORY
```

ISIS 8080 MACRO ASSEMBLER, V1.1                    PAGE 4
CONT2B

```
006F 77            MOV     M,A
0070 0D            DCR     C
0071 C25A00        JNZ     MTEST       ;NOT DONE YET

;PRESET OUTPUT WORDS AND PORTS 0074 11E500        LXI     D,TBLPS     ;POINT TO PRESET DATA
0077 21F00E        LXI     H,OUT70     ;POINT TO MEMORY WORDS
              +    PREST   70H
007A 1A       +    LDAX    D
007B 77       +    MOV     M,A
007C 2F       +    CMA
007D D370     +    OUT     00070H
007F 2C       +    INR     L
0080 13       +    INX     D

+    PREST   71H
0081 1A       +    LDAX    D
0082 77       +    MOV     M,A
0083 2F       +    CMA
0084 D371     +    OUT     00071H
0086 2C       +    INR     L
0087 13       +    INX     D 0088 2EF8          MVI     L,OUT60 AND 0FFH         ;POINT TO MEMOR
              +    PREST   60H
008A 1A       +    LDAX    D
008B 77       +    MOV     M,A
008C 2F       +    CMA
008D D360     +    OUT     00060H
008F 2C       +    INR     L
0090 13       +    INX     D

+    PREST   61H
0091 1A       +    LDAX    D
0092 77       +    MOV     M,A
0093 2F       +    CMA
0094 D361     +    OUT     00061H
0096 2C       +    INR     L
0097 13       +    INX     D 0098 2C            INR     L           ;SKIP OUT62 MEM LOCATION
              +    PRSTN   64H
0099 1A       +    LDAX    D
009A 77       +    MOV     M,A
009B 00       +    NOP
009C D364     +    OUT     00064H
009E 2C       +    INR     L
009F 13       +    INX     D
```

```
                        ; PRESET MEMORY

00A0 CDEA01             CALL    MPS

; CLEAR INTERUPTS

00A3 3E60               MVI     A,60H
00A5 D610      RESET:   SUI     10H
00A7 D30F               OUT     0FH
00A9 C2A500             JNZ     RESET
00AC 3E68               MVI     A,68H
00AE D30F               OUT     0FH
00B0 C3B700             JMP     START

; DUMMY RETURNS
                        ; FROM INTERUPTS
00B3 F1        RETRN:   POP     PSW
00B4 FB                 EI
00B5 C9                 RET

; FROM CALLS
00B6 C9        NONE:    RET

; MAIN PROGRAM LOOP

00B7 FB        START:   EI
00B8 00                 NOP
00B9 CDD400             CALL    MONT    ; DO MONITER ROUTINE
00BC CDAF01             CALL    TRST
00BF CDFD01             CALL    CKSUM
00C2 CDB600             CALL    NONE
00C5 CD7701             CALL    ANUN2
00C8 CDB600             CALL    NONE
00CB 00                 NOP
00CC 00                 NOP
00CD 00                 NOP             ; TO BE ADDED   ; DIAGONISTICS
00CE CDB600             CALL    NONE
00D1 C3B700             JMP     START

00D4 DB74     MONT:     IN      74H
00D6 E608               ANI     08H
00D8 C0                 RNZ             ; SKIP MONITER
00D9 260E               MVI     H,0EH   ; POINT TO PAGE E
00DB DB62               IN      62H     ; GET ADDRESS
00DD 6F                 MOV     L,A     ; POINT TO DATA
00DE 7E                 MOV     A,M     ; GET DATA
00DF D362               OUT     62H     ; DISPLAY DATA
00E1 32E60E             STA     TNS6    ; SEND TO OTHER CPU

00E4 C9                 RET

; TABLE OF PRESET CONSTANTS

00E5 FF       TBLPS:    DB      0FFH    ; OUT70 DATA
00E6 FF                 DB      0FFH    ; OUT71
00E7 00                 DB      0       ; OUT60
00E8 20                 DB      20H     ; OUT61
00E9 00                 DB      0       ; OUT64
```

```
0EF0                OUT70   EQU     0EF0H   ;OUTPUT PORT 70 DATA
0EF8                OUT60   EQU     0EF8H   ;OUTPUT PORT 60 DATA
0810                PS      EQU     0810H   ;PROG. STOP ROUTINE
0100                ANNUN   EQU     0100H   ;ANNUNICATOR ROUTINE
02C0                SC0     EQU     02C0H   ;SPEED DECODE ZEROS
02C3                SC1     EQU     02C3H   ;SPEED DECODE ONES
0281                TNSFR   EQU     0281H   ;TRANSFER INTERUPT
0177                ANUN2   EQU     0177H
01AF                TRST    EQU     01AFH
0EE6                TNS6    EQU     0EE6H

01EA                MPS     EQU     01EAH
01FD                CKSUM   EQU     01FDH
1380                DIOG    EQU     1380H

0000                        END     0
```

ISIS 8080 MACRO ASSEMBLER, V1.1                     PAGE 7
CONT2B

```
ANNUN  0100     ANUN2  0177     CKSUM 01FD     DIOG   1380
INIT   004B     INIT1  004F     INITP 0040     INTER  7F85
MONT   00D4     MPS    01EA     MTEST 005A     NONE   00B6
OUT60  0EF8     OUT70  0EF0     PREST 7F51     PRSTN  7F1D
PS     0810     RESET  00A5     RETRN 00B3     SC0    02C0
SC1    02C3     START  00B7     TBLFS 00E5     TNS6   0EE6
TNSFR  0281     TRST   01AF
```

ISIS 8080 MACRO ASSEMBLER, V1.1                     PAGE 1
ANNUN

```
                        ;       JAN 24, 1978 SUB 0
                        ;       MAY 16, 1978 SUB ?

;ADDED MPS AND CKSUM
                        ; RELOCATED

;ANNUNCIATOR AND SPEED CODE DISPLAY ROUTINE

TITLE   'ANNUN'

0100                            ORG     100H

0100 C5         ANNUN:  PUSH    B
0101 D5                 PUSH    D
0102 E5                 PUSH    H
0103 3AF90E             LDA     OUT61   ;GET OUTPUT WORD
0106 E6BF               ANI     0BFH    ;ZERO ANNUN BIT
0108 5F                 MOV     E,A     ;TEMP SAVE
0109 212F0E             LXI     H,ANN2  ;SHIFT 2ND 8 BITS
010C 7E                 MOV     A,M
010D 17                 RAL
010E 77                 MOV     M,A
010F 2D                 DCR     L       ;POINT TO 1ST 8 BITS
0110 7E                 MOV     A,M     ;SHIFT 2ND 8 BITS
0111 17                 RAL
0112 77                 MOV     M,A
0113 1F                 RAR             ;MOVE CARRY BIT TO
0114 1F                 RAR             ;ANNUN OUTPUT BIT POSITION
0115 E640               ANI     40H
0117 B3                 ORA     E       ;ADD OTHER 7 BITS
0118 32F90E             STA     OUT61
011B 2F                 CMA
```

```
011C D361              OUT      61H
011E 2D                DCR      L           ;POINT TO COUNTER
011F 34                INR      M           ;INCREMENT COUNTER
0120 7E                MOV      A,M
0121 FE10              CPI      16          ;COUNT < 16 ?
0123 DA6E01            JC       ADONE       ;YES
0126 AF                XRA      A           ;ZERO COUNTER
0127 77                MOV      M,A

; REPACK SPEED AND ANNUN DATA 0128 1100E0            LXI      D,0E000H    ;INITIALIZE OUTPUT 2 WORDS
012B 3ADF0E            LDA      OU51T       ;GET ANNUN DATA
012E 4F                MOV      C,A
012F 3AF10E            LDA      OUT71       ;GET SPEED DATA
0132 00                NOP
0133 0F                RRC
0134 0F                RRC
```

ISIS 8080 MACRO ASSEMBLER, V1.1                    PAGE 2
ANNUN

```
0135 0F                RRC
0136 47                MOV      B,A
0137 E618              ANI      18H         ;MASK FOR 100, 87
0139 B2                ORA      D
013A 57                MOV      D,A
013B 78                MOV      A,B
013C 0F                RRC
013D 47                MOV      B,A
013E E603              ANI      03H         ;MASK FOR 75, 62
0140 B2                ORA      D
0141 57                MOV      D,A
0142 79                MOV      A,C
0143 0F                RRC
0144 0F                RRC
0145 4F                MOV      C,A
0146 E604              ANI      04H         ;MASK FOR PS
0148 B2                ORA      D
0149 2C                INR      L           ;POINT TO 1ST 8 BITS
014A 77                MOV      M,A         ;SAVE DATA
014B 78                MOV      A,B
014C 0F                RRC
014D 47                MOV      B,A
014E E660              ANI      60H         ;MASK FOR 44, 30
0150 5F                MOV      E,A
0151 78                MOV      A,B
0152 0F                RRC
0153 E60C              ANI      0CH         ;MASK FOR 10, 0
0155 B3                ORA      E
0156 5F                MOV      E,A
0157 79                MOV      A,C
0158 0F                RRC
0159 4F                MOV      C,A
015A E680              ANI      80H         ;MASK FOR HANDBACK
015C B3                ORA      E
015D 5F                MOV      E,A
015E 79                MOV      A,C
015F 0F                RRC
0160 0F                RRC
0161 4F                MOV      C,A
0162 E610              ANI      10H         ;MASK FOR ATC STATUS
0164 B3                ORA      E
0165 5F                MOV      E,A
0166 79                MOV      A,C
0167 0F                RRC
0168 0F                RRC
```

```
0169 E602              ANI     02H        ;MASK FOR OVERSPEED
016B B3                ORA     E
016C 2C                INR     L          ;POINT TO 2ND 8 BITS
016D 77                MOV     M,A
```

ISIS 8080 MACRO ASSEMBLER, V1.1                    PAGE 3
ANNUN

```
016E C3DD01  ADONE:    JMP     CL54       ;GO DO CLOCK , TRANSFER
0171 E1      ADON1:    POP     H
0172 D1                POP     D
0173 C1                POP     B
0174 F1                POP     PSW
0175 FB                EI
0176 C9                RET

0177 DB70    ANUN2:    IN      70H
0179 32F30E            STA     IN70
017C 0F                RRC
017D 0F                RRC
017E 0F                RRC
017F E601              ANI     01H        ;MASK FOR NOT OVERSPEED
0181 47                MOV     B,A
0182 DB73              IN      73H
0184 2F                CMA
0185 32F60E            STA     IN73
0188 07                RLC
0189 07                RLC
018A 07                RLC
018B 07                RLC
018C E610              ANI     10H        ;MASK FOR PS ACTIVE
018E B0                ORA     B
018F 32E70E            STA     TANN1      ;SEND TO OTHER CPU

0192 F3      TSET:     DI
0193 3AF90E            LDA     OUT61
0196 F608              ORI     08H        ;SET RESET TOGGLE
0198 32F90E            STA     OUT61
019B 2F                CMA
019C D361              OUT     61H
019E DB7A              IN      7AH        ;GET PSIG SAMPLE
01A0 DB7A              IN      7AH
01A2 DB7A              IN      7AH
01A4 DB7A              IN      7AH
01A6 2F                CMA
01A7 32E10E            STA     IN7AT      ;SENT TO OTHER CPU
01AA 32E90E            STA     IN7A
01AD FB                EI
01AE C9                RET

01AF F3      TRST:     DI
01B0 3AF90E            LDA     OUT61
01B3 E6F7              ANI     0F7H       ;RESET RESET TOGGLE
01B5 32F90E            STA     OUT61
01B8 2F                CMA
01B9 D361              OUT     61H
01BB DB7E              IN      7EH        ;GET BRK SIG SAMPLE
```

ISIS 8080 MACRO ASSEMBLER, V1.1                    PAGE 4
ANNUN

```
01BD DB7E              IN      7EH
01BF DB7E              IN      7EH
01C1 DB7E              IN      7EH
01C3 2F                CMA
```

```
01C4 32EA0E          STA    IN7E    ; SEND TO CPU1
01C7 FB              EI
01C8 DB61            IN     61H
01CA 2F              CMA
01CB 32FD0E          STA    IN61
01CE 32E00E          STA    IN61T
01D1 DB74            IN     74H
01D3 32F70E          STA    IN74
01D6 DB71            IN     71H
01D8 2F              CMA
01D9 32F40E          STA    IN71
01DC C9              RET

01DD 00      CL54:   NOP            ; CALL PROG STOP HANDBACK
01DE 00              NOP
01DF 00              NOP
01E0 CD5002          CALL   TSFR    ; TRANSFER
01E3 218F0E          LXI    H,D54CK
01E6 34              INR    M       ; INCREMENT REAL TIME
01E7 C37101          JMP    ADON1

; MEMORY PRESET ON INITIALIZATION

01EA 3E24    MPS:    MVI    A,36
01EC 321F0E          STA    ECNT
01EF 3E00            MVI    A,0A0H
01F1 32210E          STA    ZRCHK
01F4 3E01            MVI    A,0A1H
01F6 32200E          STA    ONCHK
01F9 AF              XRA    A
01FA 32D70E          STA    TCNTR

; CHECK SUM PROGRAM, SAME AS IN CPU 1

01FD 3A820E  CKSUM:  LDA    SUM
0200 0F              RRC
0201 2A800E          LHLD   POINT
0204 AE              XRA    M
0205 32820E          STA    SUM
0208 7D              MOV    A,L
0209 FEFF            CPI    0FFH
020B C23602          JNZ    NEXT
020E 5C              MOV    E,H
020F 1600            MVI    D,0
0211 21B00E          LXI    H,STOR
```

ISIS 8080 MACRO ASSEMBLER, V1.1                          PAGE 5
ANNUN

```
0214 19              DAD    D
0215 3A820E          LDA    SUM
0218 77              MOV    M,A
0219 21001E          LXI    H,CSTBL
021C 19              DAD    D
021D BE              CMP    M
021E C2211E          JNZ    ERROR
0221 AF      NEXT2:  XRA    A
0222 32820E          STA    SUM
0225 2A800E          LHLD   POINT
0228 3A201E          LDA    LAST
022B BC              CMP    H
022C C23B02          JNZ    NEXT1
022F 210000          LXI    H,0
0232 22800E          SHLD   POINT
0235 C9              RET
0236 23      NEXT:   INX    H
```

```
0237 22800E              SHLD    POINT
                         RET
023B 3E0D    NEXT1:      MVI     A,0DH
023D BC                  CMP     H
023E C23602              JNZ     NEXT
0241 210010              LXI     H,1000H
0244 22800E              SHLD    POINT
0247 C9                  RET

1E00                     ORG     1E00H

1E00 00      CSTBL:      DB      0       ;PROPER CHECKSUM TABLE
1E01 00                  DB      0
1E02 00                  DB      0
1E03 00                  DB      0
1E04 00                  DB      0
1E05 00                  DB      0
1E06 00                  DB      0
1E07 00                  DB      0
1E08 00                  DB      0
1E09 00                  DB      0
1E0A 00                  DB      0
1E0B 00                  DB      0
1E0C 00                  DB      0
1E0D 00                  DB      0
1E0E 00                  DB      0
1E0F 00                  DB      0
1E10 00                  DB      0
1E11 00                  DB      0
1E12 00                  DB      0
1E13 00                  DB      0
1E14 00                  DB      0
1E15 00                  DB      0
```

ISIS 8080 MACRO ASSEMBLER, V1.1                    PAGE 6
ANNUN

```
1E16 00                  DB      0
1E17 00                  DB      0
1E18 00                  DB      0
1E19 00                  DB      0
1E1A 00                  DB      0
1E1B 00                  DB      0
1E1C 00                  DB      0
1E1D 00                  DB      0
1E1E 00                  DB      0
1E1F 00                  DB      0
1E20 1F      LAST:       DB      31

;ERROR ROUTINE

1E21 00      ERROR:      NOP
1E22 00                  NOP
1E23 00                  NOP
1E24 C32102              JMP     NEXT2

;VARIABLE DEFINITIONS
0E2F         ANN2        EQU     0E2FH   ;2ND 8 BITS OF FORMATTED WORD
0E2E         ANN1        EQU     0E2EH
0E2D         ACNT        EQU     0E2DH
0EF9         OUT61       EQU     0EF9H
0EF1         OUT71       EQU     0EF1H
0EDF         OU51T       EQU     0EDFH
0EE7         TANN1       EQU     0EE7H
0EF3         IN70        EQU     0EF3H
0EF6         IN73        EQU     0EF6H
0EFD         IN61        EQU     0EFDH
```

```
0EE0            IN61T    EQU     0EE0H
0EF7            IN74     EQU     0EF7H
0EF4            IN71     EQU     0EF4H
0EE1            IN7AT    EQU     0EE1H
0EEA            IN7E     EQU     0EEAH
0EE9            IN7A     EQU     0EE9H       ;P-SIG SAMPLE

0E8F            D54CK    EQU     0E8FH       ;54HZ REAL TIME CLOCK

0EB0            STOR     EQU     0EB0H
0E80            POINT    EQU     0E80H
0E82            SUM      EQU     0E82H
0E1F            ECNT     EQU     0E1FH
0E20            ONCHK    EQU     0E20H
0E21            ZRCHK    EQU     0E21H
0ED7            TCNTR    EQU     0ED7H
0250            TSFR     EQU     0250H

0000                     END
```

ISIS 8080 MACRO ASSEMBLER, V1.1                      PAGE 7
ANNUN

```
ACNT   0E2D    ADON1  0171    ADONE  016E    ANN1   0E2E
ANN2   0E2F    ANNUN  0100    ANUN2  0177    CKSUM  01FD
CL54   01DD    CSTBL  1E00    D54CK  0E8F    ECNT   0E1F
ERROR  1E21    IN61   0EFD    IN61T  0EE0    IN70   0EF3
IN71   0EF4    IN73   0EF6    IN74   0EF7    IN7A   0EE9
IN7AT  0EE1    IN7E   0EEA    LAST   1E20    MPS    01EA
NEXT   0236    NEXT1  023B    NEXT2  0221    ONCHK  0E20
OU51T  0EDF    OUT61  0EF9    OUT71  0EF1    POINT  0E80
STOR   0EB0    SUM    0E82    TANN1  0EE7    TCNTR  0ED7
TRST   01AF    TSET   0192    TSFR   0250    ZRCHK  0E21
```

ISIS 8080 MACRO ASSEMBLER, V1.1                      PAGE 1
TNSFR2

```
                   ;       JAN 24, 1978 SUB 0
                   ;       MAY 17, 1978 SUB 7

;RELOCATED

TITLE    'TNSFR2'

;TRANSFER DATA TO CPU1 AND FROM CPU1
                   ;RESIDES IN CPU2

;PART IS IN MAIN CONTROL PROGRAM (DATA TO CPU1)
                   ;PART IS IN INTERUPT (DATA FROM CPU1)

;MAIN PROGRAM
                           ;DATA TO CPU1

0250                       ORG 250H

0250 DB64       TNSFR:  IN      64H
0252 E602               ANI     02H        ;CONT 2 = 1 ?
0254 C8                 RZ                 ;YES, DONT CHANGE OUTPUT NOW
0255 F3                 DI
0256 21D70E             LXI     H,TCNTR    ;POINT TO COUNTER
0259 7E                 MOV     A,M        ;GET COUNT
025A 47                 MOV     B,A
025B 85                 ADD     L          ;POINT TO OUTPUT DATA
025C C609               ADI     09         ; (START + COUNT)
```

```
025E 6F              MOV    L,A
025F 7E              MOV    A,M     ;GET DATA
0260 D360            OUT    60H     ;OUTPUT IT
0262 78              MOV    A,B     ;GET COUNT
0263 E6FF            ANI    0FFH    ;TEST FOR ZERO
0265 3AF90E          LDA    OUT61
0268 CA7C02          JZ     TNSF1   ;COUNT = 0
026B E6FE            ANI    0FEH    ;CLEAR CONTROL
026D 2F      TNSF2:  CMA
026E E6FB            ANI    0FBH    ;TOGGLE INTERUPT
0270 D361            OUT    61H
0272 F604            ORI    04H
0274 D361            OUT    61H
0276 2F              CMA
0277 32F90E          STA    OUT61   ;SAVE OUTPUT WORD
027A FB              EI
027B C9              RET

027C F601    TNSF1:  ORI    01H     ;SET CONTROL
027E C36D02          JMP    TNSF2

;INTERUPT ROUTINE
```

ISIS 8080 MACRO ASSEMBLER, V1.1                    PAGE 2
TNSFR2

```
0281 C5      CPUI0:  PUSH   B
0282 D5              PUSH   D
0283 E5              PUSH   H
0284 21D70E          LXI    H,TCNTR ;POINT TO COUNTER
0287 DB64            IN     64H     ;GET CONTROL
0289 2F              CMA
028A 32FF0E          STA    IN64
028D E601            ANI    01H     ;CONTROL = 1 ?
028F CA9402          JZ     CPUI1   ;NO
0292 AF              XRA    A       ;YES, ZERO COUNT
0293 77              MOV    M,A
0294 7E      CPUI1:  MOV    A,M     ;GET COUNT
0295 47              MOV    B,A
0296 85              ADD    L       ;POINT TO INPUT DATA LOCATION
0297 3C              INR    A       ; (START + COUNT)
0298 6F              MOV    L,A
0299 DB63            IN     63H     ;INPUT DATA
029B 77              MOV    M,A     ;SAVE IT
029C 78              MOV    A,B     ;GET COUNT
029D 3C              INR    A       ;INCREMENT COUNT
029E FE08            CPI    08      ;COUNTER > MAX ?
02A0 DAA402          JC     CPUI2   ;NO
02A3 AF              XRA    A       ;YES, ZERO COUNTER
02A4 32D70E  CPUI2:  STA    TCNTR   ;SAVE COUNT
02A7 E1              POP    H
02A8 D1              POP    D
02A9 C1              POP    B
02AA F1              POP    PSW
02AB FB              EI
02AC C9              RET

;VARIABLE DEFINITION

0ED7         TCNTR   EQU    0ED7H   ;COUNT OF WORDS TRANSFERED
0EFF         IN64    EQU    0EFFH   ;INPUT PORT 64 DATA
0EF9         OUT61   EQU    0EF9H   ;OUTPUT PORT 61 DATA

;16 LOCATIONS FOLLOWING TCNTR ARE FOR DATA STORAGE
             ;    8 FOR DATA FROM CPU1
             ;    8 FOR DATA TO CPU1

0000                 END
```

ISIS 8080 MACRO ASSEMBLER, V1.1                    PAGE 3
TNSFR2

.CPUI0 0281      CPUI1 0294      CPUI2 02A4      IN64  0EFF
 OUT61 0EF9      TCNTR 0ED7      TNSF1 027C      TNSF2 026D
 TNSFR 0250

ISIS 8080 MACRO ASSEMBLER, V1.1                    PAGE 1

;       JANUARY 24, 1978        SUB 0
                    ;       MAY 12, 1978            SUB 1
                    ;           CHECK IN/CHECK OUT ADDED
                    ;           DOUBLE STORE ADDED
                    ;           SPEED ERROR OFFSET ADDED
                    ;           ANALOG CPU1 SPEED ERROR COMP.
                    ;           DECODE CHANGE FOR N PVS
                    ;           RELOCATED
                    ;           CLEAR PROG. STOP ON NOT ATO
                    ;
                    ;
                    ;
                    ;           SPEED DECODING ROUTINE # 2
                    ;
                    ;           THE ONES AND ZEROS ARE DECODED INDEPENDENTLY.
                    ;           TWO SEPARATE ROUTINES ARE USED . TWO SEPARATE
                    ;           CLOCK INTERRUPTS CALL THE ROUTINES.
                    ;
                    ;
                    ;
 02C0                       ORG     02C0H
 02C0 C36106                JMP     SCZRO       ;ZEROS ROUTINE
 02C3 E5        SCONE:      PUSH    H           ;ONES ROUTINE
 02C4 D5                    PUSH    D
 02C5 C5                    PUSH    B
 02C6 3A200E                LDA     ONCHK       ;CHECK OUT NO. LOC
 02C9 D6A1                  SUI     0A1H
 02CB C24000                JNZ     INITP       ;***** GO RESET
 02CE 3E51                  MVI     A,51H       ;SET CHECK IN NO.
 02D0 32200E                STA     ONCHK       ;STORE FOR ENTRY TO ONES
 02D3 00                    NOP
 02D4 3AFD0E                LDA     IN61        ;CHECK IF IN ATO ?
 02D7 E605                  ANI     05H
 02D9 CAE402                JZ      SC0A        ;NOT IN ATO
 02DC DB73                  IN      73H
 02DE 00                    NOP
 02DF E602                  ANI     02          ;IS PS ACTIVE = 0
 02E1 C2E702                JNZ     SC0         ;NO CONTINUE
 02E4 32370E    SC0A:       STA     PSFLG       ;YES, RESET PS FLAG
 02E7 DB73      SC0:        IN      73H         ;INPUT DATA WORD
 02E9 2F                    CMA
 02EA 0600                  MVI     B,0
 02EC 32F60E                STA     IN73
 02EF E608                  ANI     08H         ;BIT 0
 02F1 CAF602                JZ      SC1         ;IS A ZERO
 02F4 0604                  MVI     B,4         ;IS A ONE
 02F6 11000E    SC1:        LXI     D,ONES
 02F9 1A                    LDAX    D
 02FA 17                    RAL
 02FB B0                    ORA     B           ;OR BIT INTO WORD

ISIS 8080 MACRO ASSEMBLER, V1.1                              PAGE 2

```
02FC 12                     STAX    D       ;ONES
02FD 47                     MOV     B,A     ;ONES IN B
02FE 0F                     RRC
02FF 4F                     MOV     C,A     ;SHIFT RIGHT
0300 E602                   ANI     2
0302 CA0703                 JZ      SC11
0305 3E80                   MVI     A,80H
0307 B1          SC11:      ORA     C
0308 E6FC                   ANI     0FCH
030A 4F                     MOV     C,A     ;ONES SHIFTED FOR PV
030B 13                     INX     D
030C 1A                     LDAX    D       ;ONES PV
030D 21010E                 LXI     H,ONEPV
0310 70                     MOV     M,B     ;NEW PV
0311 B9                     CMP     C
0312 CA5A03                 JZ      SC5     ;ONES = PV
0315 AF                     XRA     A
0316 32050E                 STA     CDFGO   ;GOOD CODE FLAG
0319 C32004                 JMP     CONF1
031C 3A000E      SC41:      LDA     ONES    ;ONES IN A
031F E6FC                   ANI     0FCH    ;ONES INPUT WORD
0321 1606                   MVI     D,6
0323 1E08                   MVI     E,8
0325 0600                   MVI     B,0
0327 21A207                 LXI     H,SCTB0
032A 4E          SC4:       MOV     C,M     ;SPEED CODE IN TABLE
032B B9          SC3:       CMP     C
032C CA4C03                 JZ      SC2     ;YES
032F 17                     RAL             ;SHIFT LEFT
0330 D23503                 JNC     SC31
0333 F604                   ORI     4
0335 E6FC       SC31:       ANI     0FCH
0337 15                     DCR     D       ;COUNTER FOR SHIFTS
0338 C22B03                 JNZ     SC3     ;GET NEXT SHIFT
033B 1606                   MVI     D,6
033D 23                     INX     H
033E 04                     INR     B
033F 1D                     DCR     E       ;COUNTER FOR SPEED CODES
0340 C22A03                 JNZ     SC4     ;GET NEXT CODE
0343 AF                     XRA     A       ;SEND ZERO TO CONSOLE
0344 32F10E                 STA     OUT71
0347 D371                   OUT     71H
0349 C32004                 JMP     CONF1   ;NO AGREEMENT
034C 78          SC2:       MOV     A,B     ;BIAS
034D 32080E                 STA     SCBIS   ;ONES SPEED CODE BIAS
0350 32250E                 STA     BIAS2
0353 79                     MOV     A,C     ;SPEED CODE
0354 32020E                 STA     ONESC   ;ONE SPEED COMMAND .
0357 C36A03                 JMP     SC51
035A 3A050E      SC5:       LDA     CDFGO   ;GOOD CODE?
```

ISIS 8080 MACRO ASSEMBLER, V1.1                              PAGE 3

```
035D FE01                   CPI     1       ;***3 BIT COMP
035F CA1C03                 JZ      SC41
0362 C601                   ADI     1       ;INCREASE FLAG BY 1
0364 32050E                 STA     CDFGO
0367 C32004                 JMP     CONF1
036A 21020E      SC51:      LXI     H,ONESC ;COMPARE ONES & ZEROS
036D 3A120E                 LDA     ZROSC   ;ZEROS
0370 96                     SUB     M       ;ONES B
0371 C21A04                 JNZ     CONF    ;DIFFERENT
```

```
0374 1600              MVI     D,0
0376 3A080E            LDA     SCBIS
0379 47                MOV     B,A         ;DOUBLE COMP
037A 3A250E            LDA     BIAS2
037D B8                CMP     B           ;SAME?
037E C24000            JNZ     INITF       ;**** GO RESET
0381 FE07              CPI     7           ;0 SPEED CODE
0383 C29003            JNZ     SC10
0386 3E01              MVI     A,1
0388 D371              OUT     71H
038A 32F10E            STA     OUT71
038D C32004            JMP     CONF1
0390 5F       SC10:    MOV     E,A
0391 21CA07            LXI     H,CTIMO
0394 19                DAD     D
0395 7E                MOV     A,M
0396 32060E            STA     TMAX0       ;SET CONF ZONE TIMER
0399 32270E            STA     TMX02
039C 21AA07            LXI     H,SCVLO     ;SPEED CODE VELOCITY TABLE
039F 19                DAD     D           ;ADD SC BIAS
03A0 7E                MOV     A,M
03A1 32030E            STA     OVLSC       ;ONES SPEED CODE VELOCITY
03A4 32040E            STA     OVLRF       ;ONES REFERENCE VELOCITY
03A7 DB73     SC6:     IN      73H
03A9 2F                CMA
03AA E640              ANI     40H         ;CUT OUT CAR 71?
03AC C2BD03            JNZ     SC7         ;NO
03AF 21BA07            LXI     H,C71VO
03B2 19                DAD     D
03B3 46                MOV     B,M         ;COC1 VEL
03B4 21040E            LXI     H,OVLRF
03B7 7E                MOV     A,M         ;ONES VEL
03B8 90                SUB     B
03B9 DABD03            JC      SC7         ;OVLRF IS LESS, CONTINUE
03BC 70                MOV     M,B         ;COC1 IS LESS, STORE
03BD DB73     SC7:     IN      73H
03BF 2F                CMA
03C0 E620              ANI     20H         ;CUT OUT CAR 86?
03C2 C2D303            JNZ     SC8         ;NO
03C5 21C207            LXI     H,C86VO
03C8 19                DAD     D
```

ISIS 8080 MACRO ASSEMBLER, V1.1                          PAGE 4

```
03C9 46                MOV     B,M         ;COC1 VEL
03CA 21040E            LXI     H,OVLRF
03CD 7E                MOV     A,M         ;ONES VEL
03CE 90                SUB     B
03CF DAD303            JC      SC8         ;OVLRF IS LESS, CONTINUE
03D2 70                MOV     M,B         ;COC2 IS LESS, STORE
03D3 21040E   SC8:     LXI     H,OVLRF     ;COMPARE ONES & ZEROS
03D6 3A140E            LDA     ZVLRF       ;ZEROS REF VEL
03D9 96                SUB     M           ;ONES REF VEL
03DA C21A04            JNZ     CONF
03DD 1600              MVI     D,0
03DF 3A080E            LDA     SCBIS
03E2 5F                MOV     E,A
03E3 21B207            LXI     H,SPEED     ;LIGHTS FOR DISPLAY
03E6 19                DAD     D
03E7 7E                MOV     A,M
03E8 32F10E            STA     OUT71
03EB D371              OUT     71H
03ED 3A070E            LDA     TIME0       ;CHECK TIMER DOUBLE STORE
03F0 47                MOV     B,A
03F1 3A230E            LDA     TIM02
03F4 B8                CMP     B           ;SAME?
```

```
03F5 C24000            JNZ     INITP       ;**** GO RESET
03F8 3A270E            LDA     TMX02       ;CHECK MAX TIMER
03FB 4F                MOV     C,A
03FC 3A060E            LDA     TMAX0
03FF B9                CMP     C           ;SAME?
0400 C24000            JNZ     INITP       ;**** GO RESET
0403 90                SUB     B           ;COMP TIMER WITH MAX
0404 CA4804            JZ      SERRT       ;EQUAL
0407 FA1504            JM      SC9         ;TIMED MAX
040A 78                MOV     A,B         ;GET TIMER
040B 3C                INR     A           ;ADD 1
040C 32070E    SC12:   STA     TIME0       ;DOUBLE STORE
040F 32230E            STA     TIM02
0412 C34804            JMP     SERRT
0415 78        SC9:    MOV     A,B         ;GET TIMER
0416 3D                DCR     A           ;SUB 1
0417 C30C04            JMP     SC12

041A AF        CONF:   XRA     A           ;BLANK DISPLAY
041B 32F10E            STA     OUT71
041E D371              OUT     71H
0420 3A070E    CONF1:  LDA     TIME0       ;CHECK TIMER, DOUBLE STORED
0423 47                MOV     B,A
0424 3A230E            LDA     TIM02
0427 B8                CMP     B           ;SAME?
0428 C24000            JNZ     INITP       ;**** GO RESET
042B 3D                DCR     A           ;SUB 1
042C 32070E            STA     TIME0       ;DOUBLE STORE
```

ISIS 8080 MACRO ASSEMBLER, V1.1                          PAGE 5

```
042F 32230E            STA     TIM02
0432 F24804            JP      SERRT       ;HAS NOT EXPIRED
0435 AF                XRA     A           ;SET TO ZERO
0436 32070E            STA     TIME0
0439 32230E            STA     TIM02
043F 32030E            STA     OVLSC       ;ONES SPEED CODE
0442 32040E            STA     OVLRF       ;ONES REFERENCE VELOCITY
0445 C34804            JMP     SERRT       ;SPEED ERROR ROUTINE
;
;
;
;
;
;         SPEED ERROR ROUTINE
;
;         THIS ROUTINE DOES SIX THINGS, EXECUTED AT 18 HZ
;
;         1. INPUTS AND STORES TACH 4A
;         2. COMPUTES SPEED ERROR
;         3. FITS ERROR TO ENHANCED CURVE
;         4. OUTPUTS ADJUSTED SPEED ERROR
;         5. TOGGLES WATCHDOG TIMER BIT
;         6. COMPARES ERROR WITH CPU1 ERROR
;
;
;
0448 DB72     SERRT:   IN      72H         ;TACH 4A
044A 00                NOP
044B 47                MOV     B,A
044C DB72              IN      72H         ;NEED TWO IN A ROW ALIKE
044E 00                NOP
044F B8                CMP     B
0450 CA5504            JZ      SE1
0453 DB72              IN      72H         ;VALID TACH = ACTUAL SPEED
0455 32F50E    SE1:    STA     IN72
0458 3C                INR     A           ;ADD 0.5 TO ACT SPEED
```

```
0459 47              MOV    B,A        ;ACTUAL SPEED
045A 21040E          LXI    H,OVLRF
045D 96              SUB    M          ;ACT MINUS REQ
045E DA6A04          JC     SE21       ;UNDERSPEED
0461 321B0E          STA    OVER
0464 321A0E          STA    SPER       ;OVERSPEED
0467 C37B04          JMP    SE22
046A 7E      SE21:   MOV    A,M
046B 90              SUB    B          ;REQ MINUS ACT
046C 321C0E          STA    UNDER
046F 2F              CMA               ;COMP
0470 C601            ADI    1
0472 321A0E          STA    SPER       ;SPEED ERROR
0475 3A1C0E          LDA    UNDER
0478 C38B04          JMP    SE13
```

ISIS 8080 MACRO ASSEMBLER, V1.1                    PAGE 6

```
047B CAD804  SE22:   JZ     SE11       ;= 0
047E FE1E            CPI    30         ;15 TO 100
0480 D29804          JNC    SE2
0483 FE0A            CPI    10         ;5 TO 15
0485 D2A204          JNC    SE3
0488 C3A704          JMP    SE4        ;-5 TO 5
048B FE0A    SE13:   CPI    10         ;-5 TO 5
048D DAAD04          JC     SE5
0490 FE1E            CPI    30         ;-5 TO 15
0492 DAB604          JC     SE6
0495 C3BC04          JMP    SE7        ;-15 TO -100
        ;
        ;
0498 D61E    SE2:    SUI    30         ;DIFF - 15
049A 1F              RAR               ;DIV BY 2
049B E67F            ANI    7FH
049D C614            ADI    20         ;+20 (2ND OFFSET)
049F C3C704          JMP    SE8
        ;
04A2 D60A    SE3:    SUI    10         ;DIFF - 5
04A4 C3C704          JMP    SE8
        ;
04A7 17      SE4:    RAL               ;DIFF * 2
04A8 E6FE            ANI    0FEH
04AA C3C904          JMP    SE9
        ;
04AD 17      SE5:    RAL               ;DIFF * 2
04AE E6FE            ANI    0FEH
04B0 47              MOV    B,A        ;BREG = DIFF*2
04B1 3E8A            MVI    A,138      ;ADD 138 OR MIDPOINT
04B3 C3DD04          JMP    SE10
        ;
04B6 47      SE6:    MOV    B,A        ;BREG = DIFF
04B7 3E76            MVI    A,118      ;ADD 138 - 20
04B9 C3DD04          JMP    SE10
        ;
04BC D61E    SE7:    SUI    30
04BE 1F              RAR               ;DIV BY 2
04BF E67F            ANI    7FH
04C1 47              MOV    B,A        ;DIFF - 15 / 2
04C2 3E62            MVI    A,98       ;ADD 138 - 40
04C4 C3DD04          JMP    SE10
        ;
        ;
04C7 C614    SE8:    ADI    20         ;1ST OFFSET
04C9 C68A    SE9:    ADI    138        ;MIDPOINT
04CB DAD304          JC     SE14
04CE C614            ADI    20         ;ADJUST FOR OVER SPEED
04D0 D2E204          JNC    SE12
04D3 F6FF    SE14:   ORI    0FFH       ;SET TO 255
```

ISIS 8080 MACRO ASSEMBLER, V1.1                             PAGE 7

```
04D5 C3E204                 JMP     SE12
04D8 3E8A       SE11:       MVI     A,138       ;MIDPOINT
04DA C3E204                 JMP     SE12
                ;
04DD 90         SE10:       SUB     B
04DE D2E204                 JNC     SE12
04E1 AF                     XRA     A           ;UNDERFLOW
04E2 32F00E     SE12:       STA     OUT70       ;ADJUSTED SPEED ERROR
                ;
                ;           SPEED ERROR COMPARISON
                ;
04E5 F3                     DI
04E6 DB7C                   IN      7CH         ;ANALOG ERROR
04E8 DB7C                   IN      7CH
04EA DB7C                   IN      7CH
04EC DB7C                   IN      7CH
04EE FB                     EI
04EF 2F                     CMA
04F0 32EC0E                 STA     IN7C        ;STORE ANALOG ERROR
04F3 00                     NOP
04F4 47                     MOV     B,A         ;AE IN B
04F5 3AF00E                 LDA     OUT70       ;SPEED ERROR
04F8 4F                     MOV     C,A         ;DE IN C
04F9 FEE5                   CPI     229         ;SAT POINT
04FB DA0705                 JC      ERR1        ;DE UNDER 229
04FE 78                     MOV     A,B         ;DE OVER 229, GET AE
04FF FEB3                   CPI     179
0501 DA2505                 JC      ERR2        ;AE UNDER 179 ***ERROR
0504 C33205                 JMP     ERR3        ;OK, RESET COUNTER
0507 78         ERR1:       MOV     A,B         ;GET AE
0508 B9                     CMP     C           ;AE VS DE
0509 DA1A05                 JC      ERR4        ;AE < DE
050C D632                   SUI     50          ;AE > DE, SUB TOL
050E D21305                 JNC     ERR5        ;HOLD TO ZERO
0511 3E00                   MVI     A,0
0513 B9         ERR5:       CMP     C           ;AE-50 VS DE
0514 D22505                 JNC     ERR2        ;AE-50 > DE, ***ERROR
0517 C33205                 JMP     ERR3        ;OK, RESET COUNTER
051A C632       ERR4:       ADI     50          ;AE < DE, ADD TOL
051C D22105                 JNC     ERR6        ;HOLD TO 255
051F 3EFF                   MVI     A,255
0521 B9         ERR6:       CMP     C           ;AE+50 VS DE
0522 D23205                 JNC     ERR3        ;OK, RESET CONTER
0525 3A1F0E     ERR2:       LDA     ECNT        ;AE+50 < DE ***ERROR
0528 3D                     DCR     A
0529 CA3A05                 JZ      ERR7        ;*** LOG ERROR
052C 321F0E                 STA     ECNT
052F C34205                 JMP     SE15        ;OK, RESUME PROGRAM
0532 3E24       ERR3:       MVI     A,36
0534 321F0E                 STA     ECNT        ;GOOD PASS, RESET COUNTER
```

ISIS 8080 MACRO ASSEMBLER, V1.1                             PAGE 8

```
0537 C34205                 JMP     SE15
053A 3E01       ERR7:       MVI     A,1         ;SET ERROR FLAG
053C 32E40E                 STA     SEFLG
053F C34205                 JMP     SE15
                ;
0542 3A200E     SE15:       LDA     ONCHK       ;CHECK OUT OF ROUTINE
0545 D651                   SUI     51H
0547 C24000                 JNZ     INITP       ;**** GO RESET
054A 3EA1                   MVI     A,0A1H      ;SET CHECK OUT NO.
```

```
054C 32200E            STA    ONCHK
054F 3A F00E           LDA    OUT70
0552 D370              OUT    70H     ; OUTPUT ADJUSTED SPEED ERROR
0554 3A F90E           LDA    OUT61   ; TOGGLE BIT
0557 EE80              XRI    80H     ; CHANGE BIT
0559 32F90E            STA    OUT61   ; AND STORE
055C 2F                CMA
055D D361              OUT    61H     ; AND OUTPUT
             ;
             ;
             ;
             ;        SPEED CONTROL ROUTINE
             ;
             ;        THIS ROUTINE CHECKS PRESTART CONDITIONS
             ;        AND CALCULATES THE ACTION VELOCITY
             ;        FOR THE PI CONTROL ROUTINE
             ;
             ;
055F 3A040E   SPCON:   LDA    OVLRF
0562 320C0E            STA    VELRF
0565 320D0E            STA    VELAC
0568 3AD80E            LDA    PMNO
056B B7                ORA    A
056C C27005            JNZ    SP1
056F 3C                INR    A
0570 D601     SP1:     SUI    1
0572 32220E            STA    PMBIS   ; TABLE LOC IN PM
0575 1600              MVI    D,0
0577 5F                MOV    E,A
0578 21FA07            LXI    H,PMVEL
057B 19                DAD    D       ; PM BIAS
057C 7E                MOV    A,M
057D 320A0E            STA    VELPM
0580 47                MOV    B,A     ; PM VEL
0581 210008            LXI    H,PMACC ; PM ACC TABLE
0584 19                DAD    D       ; PM BIAS
0585 7E                MOV    A,M
0586 320E0E            STA    ACCPM   ; PM SLOW ACC
0589 3A0C0E            LDA    VELRF
058C 90                SUB    B
```

ISIS 8080 MACRO ASSEMBLER, V1.1                    PAGE 9

```
058D DA9705            JC     SP2     ; REF IS LESS, CONTINUE
0590 78                MOV    A,B
0591 320C0E            STA    VELRF
0594 320D0E            STA    VELAC
0597 3A370E   SP2:     LDA    PSFLG
059A B7                ORA    A
059B C2A305            JNZ    SP4
059E 3EFF              MVI    A,0FFH  ; *****
05A0 32090E            STA    VELPS
05A3 21090E   SP4:     LXI    H,VELPS ; PROG STOP VEL
05A6 46                MOV    B,M
05A7 210C0E            LXI    H,VELRF ; REF VEL
05AA 7E                MOV    A,M
05AB B8                CMP    B
05AC DAB005            JC     STUP    ; REF VEL IS LESS
05AF 70                MOV    M,B
             ;
             ;
             ;
             ;        STARTUP CONDITIONS
             ;
05B0 3AD90E   STUP:    LDA    IN51
05B3 00                NOP
05B4 E620              ANI    20H     ; DOORS ALL CLOSED?
```

```
05B6 CA5706            JZ      KPH0
05B9 DB74              IN      74H     ;YES
05BB 00                NOP
05BC E602              ANI     02H     ;ROLLBACK CPU2 ?
05BE C21706            JNZ     ST4     ;YES
05C1 3ADA0E            LDA     IN54
05C4 E602              ANI     02H     ;ROLLBACK CPU1 ?
05C6 C21706            JNZ     ST4     ;YES
05C9 DB71              IN      71H     ;NO
05CB 2F                CMA
05CC E602              ANI     02H     ;EMERGENCY BRAKE OFF?
05CE CA0706            JZ      ST1     ;YES
05D1 3A0C0E     ST5:   LDA     VELRF   ;COMMANDED SPEED < 5 KPH?
05D4 FE0A              CPI     10
05D6 DA0706            JC      ST1     ;YES
05D9 3AF50E            LDA     IN72
05DC FE0A              CPI     10
05DE D20706            JNC     ST1     ;SPEED > 5 KPH
05E1 DB61              IN      61H     ;YES
05E3 2F                CMA
05E4 E605              ANI     05H     ;ATO?
05E6 CAF705            JZ      ST2     ;NO
05E9 3AF90E     ST3:   LDA     OUT61   ;YES, SET STARTUP ENABLE
05EC E6EF              ANI     0EFH
05EE 32F90E            STA     OUT61
05F1 2F                CMA
```

ISIS 8080 MACRO ASSEMBLER, V1.1                    PAGE 10

```
05F2 D361              OUT     61H     ;OUTPUT ENABLE
05F4 C32A06            JMP     PICON
05F7 DB61      ST2:    IN      61H
05F9 2F                CMA
05FA E60A              ANI     0AH     ;MCS?
05FC CA0706            JZ      ST1     ;NO
05FF DB71              IN      71H     ;YES
0601 2F                CMA
0602 E601              ANI     01H     ;BR2 POWER REQUEST?
0604 C2E905            JNZ     ST3     ;YES
0607 3AF90E    ST1:    LDA     OUT61   ;NO, RESET ENABLE
060A F610              ORI     10H
060C 32F90E            STA     OUT61
060F 2F                CMA
0610 D361              OUT     61H     ;OUTPUT ENABLE NOT
0612 00                NOP
0613 00                NOP
0614 C32A06            JMP     PICON   ;YES
0617 3E33      ST4:    MVI     A,33H   ;NO
0619 320F0E            STA     PSIG    ;PSIG = 20 MA
061C 00                NOP
061D D364              OUT     64H
061F 3AF90E            LDA     OUT61   ;SET BRK = 1
0622 F620              ORI     20H
0624 32F90E            STA     OUT61
0627 2F                CMA
0628 D361              OUT     61H     ;OUTPUT BRK
                       ;
                       ;
                       ;
062A 0600      OOUT:   MVI     B,0     ;OUTPUT VELRF TO HEX DISPLAY
062C 3A0C0E            LDA     VELRF
062F 1F                RAR
0630 E67F              ANI     7FH
0632 D60A      BH3:    SUI     10
0634 CA4C06            JZ      BH1
0637 FA4306            JM      BH2
063A 4F                MOV     C,A
```

```
063B 78              MOV    A,B
063C C610            ADI    10H
063E 47              MOV    B,A
063F 79              MOV    A,C
0640 C33206          JMP    BH3
0643 C60A    BH2:    ADI    10
0645 80              ADD    B
0646 32190E  BH4:    STA    HKPH
0649 D363            OUT    63H
064B C35406          JMP    BH5
064E 78      BH1:    MOV    A,B
064F C610            ADI    10H
```

ISIS 8080 MACRO ASSEMBLER, V1.1                    PAGE 11

```
0651 C34606          JMP    BH4
0654 C30010  BH5:    JMP    SPMAT    ;PI ****
             ;
0657 AF      KPH0:   XRA    A
0658 320D0E          STA    VELAC
065B 320C0E          STA    VELRF
065E C30706          JMP    ST1
             ;
             ;
             ;       ZEROS DECODING ROUTINE
             ;
             ;       THIS ROUTINE DECODES THE ZEROS DATA
             ;       AT AN 18 HZ RATE BASED ON THE ZEROS
             ;       CLOCK INTERRUPT.
             ;
             ;
             ;
             ;
0661 E5      SCZRO:  PUSH   H        ;ZEROS ROUTINE
0662 D5              PUSH   D
0663 C5              PUSH   B
0664 3A210E          LDA    ZRCHK    ;CHECK IN/CHECK OUT
0667 D6A0            SUI    0A0H
0669 C24000          JNZ    INITP    ;**** GO RESET
066C 3E50            MVI    A,50H    ;CHECK IN
066E 32210E          STA    ZRCHK
0671 FB              EI
0672 DB73            IN     73H      ;INPUT DATA WORD
0674 0600            MVI    B,0
0676 2F              CMA
0677 32F60E          STA    IN73
067A 2F              CMA
067B E610            ANI    10H      ;BIT 1
067D CA8206          JZ     SC1Z     ;IS A ZERO
0680 0604            MVI    B,4      ;IS A ONE
0682 11100E  SC1Z:   LXI    D,ZEROS
0685 1A              LDAX   D
0686 17              RAL
0687 B0              ORA    B        ;OR BIT INTO WORD
0688 12              STAX   D        ;ZEROS
0689 47              MOV    B,A      ;ZEROS IN B
068A 0F              RRC             ;SHIFT RIGHT
068B 4F              MOV    C,A
068C E602            ANI    2
068E CA9306          JZ     SC11Z
0691 3E80            MVI    A,80H
0693 B1      SC11Z:  ORA    C
0694 E6FC            ANI    0FCH
0696 4F              MOV    C,A      ;ZEROS SHIFTED FOR PV
0697 13              INX    D
```

ISIS 8080 MACRO ASSEMBLER, V1.1                                    PAGE 12

```
0698 1A                 LDAX    D           ;ZEROS PV
0699 21110E             LXI     H,ZROPV
069C 70                 MOV     M,B         ;NEW PV
069D B9                 CMP     C
069E CAD206             JZ      SC5Z        ;ZEROS = PV
06A1 AF         SC42Z:  XRA     A           ;GOOD CODE FLAG
06A2 32150E             STA     CDFGZ
06A5 C36D07             JMP     CONFZ
06A8 3A100E     SC41Z:  LDA     ZEROS       ;ZEROS IN A
06AB E6FC               ANI     0FCH        ;ZEROS INPUT WORD
06AD 1606               MVI     D,6
06AF 1E08               MVI     E,8
06B1 0600               MVI     B,0
06B3 21D207             LXI     H,SCTBZ
06B6 4E         SC4Z:   MOV     C,M         ;SPEED CODE IN TABLE
06B7 B9         SC3Z:   CMP     C
06B8 CAE206             JZ      SC52Z       ;YES
06BB 17                 RAL                 ;SHIFT LEFT
06BC D2C106             JNC     SC31Z
06BF F604               ORI     4
06C1 E6FC      SC31Z:   ANI     0FCH
06C3 15                 DCR     D           ;COUNTER FOR SHIFTS
06C4 C2B706             JNZ     SC3Z        ;GET NEXT SHIFT
06C7 1606               MVI     D,6
06C9 23                 INX     H
06CA 04                 INR     B
06CB 1D                 DCR     E           ;COUNTER FOR SPEED CODES
06CC C2B606             JNZ     SC4Z        ;GET NEXT CODE
06CF C3A106             JMP     SC42Z       ;NO AGREEMENT
06D2 3A150E     SC5Z:   LDA     CDFGZ       ;IS THIS A GOOD CODE?
06D5 FE01               CPI     1           ;3 BIT COMPARE
06D7 CAA806             JZ      SC41Z       ;YES
06DA C601               ADI     1
06DC 32150E             STA     CDFGZ
06DF C36D07             JMP     CONFZ
06E2 78         SC52Z:  MOV     A,B
06E3 32180E             STA     SCBIZ       ;STORE BIAS
06E6 32260E             STA     BIAZ2
06E9 79                 MOV     A,C         ;GET NEW SPEED CODE
06EA 32120E             STA     ZROSC       ;STORE IT
06ED 3A170E             LDA     TIMEZ       ;CHECK TIMER DOUBLE STORE
06F0 47                 MOV     B,A
06F1 3A240E             LDA     TIMZ2
06F4 B8                 CMP     B           ;SAME?
06F5 C24000             JNZ     INITP       ;**** GO RESET
06F8 3A280E             LDA     TMXZ2       ;CHECK MAX DOUBLE STORE
06FB 4F                 MOV     C,A
06FC 3A160E             LDA     TMAXZ
06FF B9                 CMP     C           ;SAME?
0700 C24000             JNZ     INITP       ;**** GO RESET
```

ISIS 8080 MACRO ASSEMBLER, V1.1                                    PAGE 13

```
0703 90                 SUB     B           ;COMP MAX AND TIMER
0704 CA1A07             JZ      SC2Z        ;TIMER = MAX
0707 FA1507             JM      SC51Z       ;MAX < TIMER
070A 78                 MOV     A,B         ;GET TIMER
070B 3C                 INR     A           ;ADD 1
070C 32170E     SC61Z:  STA     TIMEZ       ;DOUBLE STORE
070F 32240E             STA     TIMZ2
0712 C31A07             JMP     SC2Z
0715 78         SC51Z:  MOV     A,B         ;GET TIMER
```

```
0716 3D                DCR     A         ;SUB 1
0717 C30C07            JMP     SC61Z
071A 1600      SC2Z:   MVI     D,0
071C 3A180E            LDA     SCBIZ     ;TABLE BIAS
071F 47                MOV     B,A
0720 3A260E            LDA     BIAZ2
0723 B8                CMP     B         ;SAME?
0724 C24000            JNZ     INITP     ;**** GO RESET
0727 5F                MOV     E,A
0728 21F207            LXI     H,CTIMZ
072B 19                DAD     D
072C 7E                MOV     A,M
072D 32160E            STA     TMAXZ     ;SET CONF ZONE MAX TIME
0730 32280E            STA     TMXZ2
0733 21DA07            LXI     H,SCVLZ   ;SPEED CODE VELOCITY TABLE
0736 19                DAD     D         ;ADD SC BIAS
0737 7E                MOV     A,M
0738 32130E            STA     ZVLSC
073B 32140E            STA     ZVLRF     ;ZEROS SPEED CODE VELOCITY
073E DB73              IN      73H
0740 2F                CMA
0741 E640              ANI     40H       ;CUT OUT CAR 71?
0743 C25407            JNZ     SC7Z      ;NO
0746 21E207            LXI     H,C71VZ
0749 19                DAD     D
074A 46                MOV     B,M       ;COC1 VEL
074B 21140E            LXI     H,ZVLRF
074E 7E                MOV     A,M       ;ZEROS VEL
074F 90                SUB     B
0750 DA5407            JC      SC7Z      ;ZVLRF IS LESS, CONTINUE
0753 70                MOV     M,B       ;COC1 IS LESS, STORE
0754 DB73      SC7Z:   IN      73H
0756 2F                CMA
0757 E620              ANI     20H       ;CUT OUT CAR 86?
0759 C26A07            JNZ     SC8Z      ;NO
075C 21EA07            LXI     H,C86VZ
075F 19                DAD     D
0760 46                MOV     B,M       ;COC2 VEL
0761 21140E            LXI     H,ZVLRF
0764 7E                MOV     A,M       ;ZEROS VEL
0765 90                SUB     B
```

ISIS 8080 MACRO ASSEMBLER, V1.1                    PAGE 14

```
0766 DA6A07            JC      SC8Z      ;ZVLRF IS LESS, CONTINUE
0769 70                MOV     M,B       ;COC2 IS LESS, STORE
076A C38F07    SC8Z:   JMP     ZOUT
076D 3A170E    CONFZ:  LDA     TIMEZ     ;CHECK DOUBLE
0770 47                MOV     B,A
0771 3A240E            LDA     TIMZ2
0774 B8                CMP     B         ;SAME?
0775 C24000            JNZ     INITP     ;**** GO RESET
0778 3D                DCR     A         ;SUB 1
0779 32170E            STA     TIMEZ
077C 32240E            STA     TIMZ2
077F F28F07            JP      ZOUT      ;HAS NOT EXPIRED
0782 AF                XRA     A         ;SET TO ZERO
0783 32170E            STA     TIMEZ
0786 32240E            STA     TIMZ2
0789 32140E            STA     ZVLRF     ;ZEROS REF VELOCITY
078C 32120E            STA     ZROSC
078F 3A210E    ZOUT:   LDA     ZRCHK     ;CHECK OUT
0792 D650              SUI     50H
0794 C24000            JNZ     INITP     ;**** GO RESET
0797 3EA0              MVI     A,0A0H
0799 32210E            STA     ZRCHK
```

```
079C C1              POP   B
079D D1              POP   D
079E E1              POP   H
079F F1              POP   PSW
07A0 00              NOP
07A1 C9              RET
              ;
              ;
              ;
              ;     SPEED DECODING AND PM TABLES
              ;
              ;
              ;     ONES SPEED CODE TABLE
              ;
07A2 BC       SCTBO: DB    10111100B    ;100 KPH
07A3 9C              DB    10011100B    ; 87 KPH
07A4 AC              DB    10101100B    ; 75 KPH
07A5 8C              DB    10001100B    ; 62 KPH
07A6 94              DB    10010100B    ; 44 KPH
07A7 A4              DB    10100100B    ; 30 KPH
07A8 84              DB    10000100B    ; 10 KPH
07A9 80              DB    10000000B    ;  0 KPH
              ;
              ;     ONES SPEED COMMAND VELOCITY TABLE
              ;
07AA C8       SCVLO: DB    200          ;100 KPH
07AB AE              DB    174          ; 87 KPH
```

ISIS 8080 MACRO ASSEMBLER, V1.1                            PAGE 15

```
07AC 94              DB    148          ; 74 KPH
07AD 7B              DB    123          ; 61.5 KPH
07AE 58              DB    88           ; 44 KPH
07AF 3C              DB    60           ; 30 KPH
07B0 14              DB    20           ; 10 KPH
07B1 00              DB    0            ;  0 KPH
              ;
              ;     ONES SPEED FOR CONSOLE
              ;
07B2 80       SPEED: DB    80H          ;100 KPH
07B3 40              DB    40H          ; 87 KPH
07B4 20              DB    20H          ; 75 KPH
07B5 10              DB    10H          ; 62 KPH
07B6 08              DB    08           ; 44 KPH
07B7 04              DB    04           ; 30 KPH
07B8 02              DB    02           ; 10 KPH
07B9 01              DB    01           ;  0 KPH
              ;
              ;     ONES 71% CUT OUT CAR VELOCITY TABLE
              ;
07BA 8D       C71VO: DB    141          ; 70.5 KPH
07BB 7A              DB    122          ; 61 KPH
07BC 68              DB    104          ; 52 KPH
07BD 56              DB    86           ; 43 KPH
07BE 3E              DB    62           ; 31 KPH
07BF 2A              DB    42           ; 21 KPH
07C0 0E              DB    14           ;  7 KPH
07C1 00              DB    0            ;  0 KPH
              ;
              ;     ONES 86% CUT OUT CAR VELOCITY TABLE
              ;
07C2 AC       C86VO: DB    172          ; 87 KPH
07C3 95              DB    149          ; 74.5 KPH
07C4 7F              DB    127          ; 63.5 KPH
07C5 6A              DB    106          ; 53 KPH
07C6 4B              DB    75           ; 37.5 KPH
```

```
07C7 33              DB      51           ;25.5 KPH
07C8 11              DB      17           ;8.5 KPH
07C9 00              DB      0            ;0 KPH
         ;
         ;          ONES CONFUSION ZONE TIMER TABLE
         ;
07CA 22      CTIMO:  DB      34           ;100 KPH 1.9 SEC
07CB 22              DB      34           ;87 KPH 1.9 SEC
07CC 22              DB      34           ;75 KPH 1.9 SEC
07CD 22              DB      34           ;62 KPH 1.9 SEC
07CE 22              DB      34           ;44 KPH 1.9 SEC
07CF 10              DB      16           ;30 KPH .9 SEC
07D0 10              DB      16           ;10 KPH .9 SEC
07D1 10              DB      16           ;0 KPH .9 SEC
```

ISIS 8080 MACRO ASSEMBLER, V1.1                    PAGE 16

```
         ;
         ;          ZEROS SPEED CODE TABLE
         ;
07D2 BC      SCTBZ:  DB      10111100B    ;100 KPH
07D3 9C              DB      10011100B    ;87 KPH
07D4 AC              DB      10101100B    ;75 KPH
07D5 8C              DB      10001100B    ;62 KPH
07D6 94              DB      10010100B    ;44 KPH
07D7 A4              DB      10100100B    ;30 KPH
07D8 84              DB      10000100B    ;10 KPH
07D9 80              DB      10000000B    ;0 KPH
         ;
         ;          ZEROS SPEED COMMAND VELOCITY TABLE
         ;
07DA C8      SCVLZ:  DB      200          ;100 KPH
07DB AE              DB      174          ;87 KPH
07DC 94              DB      148          ;74 KPH
07DD 7B              DB      123          ;62.5 KPH
07DE 58              DB      88           ;44 KPH
07DF 3C              DB      60           ;30 KPH
07E0 14              DB      20           ;10 KPH
07E1 00              DB      0            ;0 KPH
         ;
         ;          ZEROS 71% CUT OUT CAR VELOCITY TABLE
         ;
07E2 8D      C71VZ:  DB      141          ;70.5 KPH
07E3 7A              DB      122          ;61 KPH
07E4 68              DB      104          ;52 KPH
07E5 56              DB      86           ;43 KPH
07E6 3E              DB      62           ;31 KPH
07E7 2A              DB      42           ;21 KPH
07E8 0E              DB      14           ;7 KPH
07E9 00              DB      0            ;0 KPH
         ;
         ;          ZEROS 86% CUT OUT CAR VELOCITY TABLE
         ;
07EA AC      C86VZ:  DB      172          ;86 KPH
07EB 95              DB      149          ;74.5 KPH
07EC 7F              DB      127          ;63.5 KPH
07ED 6A              DB      106          ;53 KPH
07EE 4B              DB      75           ;37.5 KPH
07EF 33              DB      51           ;25.5 KPH
07F0 11              DB      17           ;8.5 KPH
07F1 00              DB      0            ;0 KPH
         ;
         ;          ZEROS CONFUSION ZONE TIMER TABLE
         ;
07F2 22      CTIMZ:  DB      34           ;100 KPH 1.9 SEC
07F3 22              DB      34           ;87 KPH 1.9 SEC
07F4 22              DB      34           ;75 KPH 1.9 SEC
```

```
07F5 22              DB      34      ;62 KPH 1.9 SEC
07F6 22              DB      34      ;44 KPH 1.9 SEC
07F7 10              DB      16      ;30 KPH .9 SEC
07F8 10              DB      16      ;10 KPH .9 SEC
07F9 10              DB      16      ;0 KPH .9 SEC
          ;
          ;         PM VELOCITY TABLE
          ;
07FA C8   PMVEL:     DB      200     ;100 KPH
07FB 88              DB      136     ;68 KPH
07FC 88              DB      136     ;68 KPH SLOW ACC
07FD 6E              DB      110     ;55 KPH
07FE 6E              DB      110     ;55 KPH SLOW ACC
07FF 58              DB      88      ;44 KPH SLOW ACC
          ;
          ;         PM SLOW ACCELERATION TABLE
          ;              80=SLOW
          ;
0800 00   PMACC:     DB      0       ;NORM ACC
0801 00              DB      0       ;NORM
0802 80              DB      80H     ;SLOW
0803 00              DB      0       ;NORM
0804 80              DB      80H     ;SLOW
0805 80              DB      80H     ;SLOW
          ;
          ;
          ;
          ;         SPEED DECODING VARIABLES
          ;
0E00                 ORG     0E00H
0E00 00   ONES:      DB      0       ;SHIFT REGISTER FOR ONES DATA
0E01 00   ONEPV:     DB      0       ;PAST VALUE OF ONES
0E02 00   ONESC:     DB      0       ;ONES SPEED CODE
          ;
0E03 00   OVLSC:     DB      0       ;ONES SPEED COMMAND VELOCITY
0E04 00   OVLRF:     DB      0       ;ONES REFERENCE VELOCITY
          ;
0E05 00   CDFGO:     DB      0       ;GOOD CODE FLAG
0E06 00   TMAXO:     DB      0       ;ONES CONFUSION ZONE TIMER
0E07 00   TIMEO:     DB      0       ;ONES TIMER
0E08 00   SCBIS:     DB      0       ;ONES SC TABLE BIAS
          ;
          ;
0E09 00   VELPS:     DB      0       ;PS VELOCITY
0E0A 00   VELPM:     DB      0       ;PM VELOCITY
0E0B 00   VELSC:     DB      0       ;SPEED CODE VELOCITY
0E0C 00   VELRF:     DB      0       ;REFERENCE VELOCITY
0E0D 00   VELAC:     DB      0       ;ACTION VELOCITY
          ;
          ;

0E0E 00   ACCPM:     DB      0       ;PM ACCELERATION
0E0F 00   PSIG:      DB      0       ;P SIGNAL
          ;
          ;
          ;
0E10 00   ZEROS:     DB      0       ;SHIFT REGISTER FOR ZEROS DATA
0E11 00   ZROPV:     DB      0       ;PAST VALUE OF ZEROS
0E12 00   ZROSC:     DB      0       ;ZEROS SPEED CODE
          ;
0E13 00   ZVLSC:     DB      0       ;ZEROS SPEED COMMAND VELOCITY
```

```
0E14 00          ZVLRF:  DB      0       ;ZEROS REFERENCE VELOCITY
                 ;
0E15 00          CDFGZ:  DB      0       ;GOOD CODE FLAG
0E16 00          TMAXZ:  DB      0       ;CONFUSION ZONE TIMER FOR ZEROS
0E17 00          TIMEZ:  DB      0       ;ZEROS TIMER
0E18 00          SCBIZ:  DB      0       ;ZERO SPEED CODE TABLE BIAS
                 ;
0E19 00          HKPH:   DB      0       ;DISPLAY HEX
0E1A 00          SPER:   DB      0       ;SPEED ERROR
                 ;
                 ;
0ED8             PMNO    EQU     0ED8H   ;PM NUMBER
                 ;
0EDA             IN54    EQU     0EDAH   ;ROLLBACK FROM CPU1
0ED9             IN51    EQU     0ED9H   ;DOORS CLOSED WORD
0EF5             IN72    EQU     0EF5H   ;TACH 4A
0EF6             IN73    EQU     0EF6H   ;ONES & ZEROS DATA
0EEC             IN7C    EQU     0EECH   ;ANALOG SPEED ERROR 1
0EF9             OUT61   EQU     0EF9H   ;ENABLE, BRK, WDT
0EFB             OUT64   EQU     0EFBH   ;AN OUT
0EF0             OUT70   EQU     0EF0H   ;SPEED ERROR
0EF1             OUT71   EQU     0EF1H   ;CONSOLE LIGHTS
                 ;
0E1B 00          OVER:   DB      0       ;OVERSPEED
0E1C 00          UNDER:  DB      0       ;UNDERSPEED
0E1D 00                  DB      0
0E1E 00                  DB      0
0E1F 24          ECNT:   DB      36      ;COMP ERROR COUNTER, 2 SEC.
0E20 A1          ONCHK:  DB      0A1H    ;ONES CHECK IN/OUT LOC
0E21 A0          ZRCHK:  DB      0A0H    ;ZEROS CHECK IN/OUT LOC
0E22 00          PMBIS:  DB      0       ;PM TABLE BIAS
0E23 00          TIMO2:  DB      0       ;DOUBLE STORE LOCATIONS
0E24 00          TIMZ2:  DB      0
0E25 00          BIAS2:  DB      0
0E26 00          BIAZ2:  DB      0
0E27 00          TMXO2:  DB      0
0E28 00          TMXZ2:  DB      0
                 ;
0E37             PSFLG   EQU     0E37H   ;PROGRAM STOP FLAG
0EE4             SEFLG   EQU     0EE4H   ;SPEED ERROR FLAG

ISIS 8080 MACRO ASSEMBLER, V1.1                         PAGE 19

0EFD             IN61    EQU     0EFDH   ;MODE INPUT WORD
                 ;
062A             PICON   EQU     OOUT
1000             SPMAT   EQU     1000H
0040             INITP   EQU     0040H
0000                     END

ISIS 8080 MACRO ASSEMBLER, V1.1                         PAGE 20

ACCPM 0E0E       BH1     064E    BH2     0643    BH3     0632
BH4   0646       BH5     0654    BIAS2   0E25    BIAZ2   0E26
C71VO 07BA       C71VZ   07E2    C86VO   07C2    C86VZ   07EA
CDFGO 0E05       CDFGZ   0E15    CONF    041A    CONF1   0420
CONFZ 076D       CTIMO   07CA    CTIMZ   07F2    ECNT    0E1F
ERR1  0507       ERR2    0525    ERR3    0532    ERR4    051A
ERR5  0513       ERR6    0521    ERR7    053A    HKPH    0E19
IN51  0ED9       IN54    0EDA    IN61    0EFD    IN72    0EF5
IN73  0EF6       IN7C    0EEC    INITP   0040    KPH0    0657
ONCHK 0E20       ONEPV   0E01    ONES    0E00    ONESC   0E02
```

| | | | | | | | |
|---|---|---|---|---|---|---|---|
| OOUT | 062A | OUT61 | 0EF9 | OUT64 | 0EFB | OUT70 | 0EF0 |
| OUT71 | 0EF1 | OVER | 0E1B | OVLRF | 0E04 | OVLSC | 0E03 |
| PICON | 062A | PMACC | 0800 | PMBIS | 0E22 | PMNO | 0ED8 |
| PMVEL | 07FA | PSFLG | 0E37 | PSIG | 0E0F | SC0 | 02E7 |
| SC0A | 02E4 | SC1 | 02F6 | SC10 | 0390 | SC11 | 0307 |
| SC11Z | 0693 | SC12 | 040C | SC1Z | 0682 | SC2 | 034C |
| SC2Z | 071A | SC3 | 032B | SC31 | 0335 | SC31Z | 06C1 |
| SC3Z | 06B7 | SC4 | 032A | SC41 | 031C | SC41Z | 06A8 |
| SC42Z | 06A1 | SC4Z | 06B6 | SC5 | 035A | SC51 | 036A |
| SC51Z | 0715 | SC52Z | 06E2 | SC5Z | 06D2 | SC6 | 03A7 |
| SC61Z | 070C | SC7 | 03BD | SC7Z | 0754 | SC8 | 03D3 |
| SC8Z | 076A | SC9 | 0415 | SCBIS | 0E08 | SCBIZ | 0E18 |
| SCONE | 02C3 | SCTBO | 07A2 | SCTBZ | 07D2 | SCVLO | 07AA |
| SCVLZ | 07DA | SCZRO | 0661 | SE1 | 0455 | SE10 | 04DD |
| SE11 | 04D8 | SE12 | 04E2 | SE13 | 048B | SE14 | 04D3 |
| SE15 | 0542 | SE2 | 0498 | SE21 | 046A | SE22 | 047B |
| SE3 | 04A2 | SE4 | 04A7 | SE5 | 04AD | SE6 | 04B6 |
| SE7 | 04BC | SE8 | 04C7 | SE9 | 04C9 | SEFLG | 0EE4 |
| SERRT | 0448 | SP1 | 0570 | SP2 | 0597 | SP4 | 05A3 |
| SPCON | 055F | SPEED | 07B2 | SPER | 0E1A | SPMAT | 1000 |
| ST1 | 0607 | ST2 | 05F7 | ST3 | 05E9 | ST4 | 0617 |
| ST5 | 05D1 | STUP | 05B0 | TIMEO | 0E07 | TIMEZ | 0E17 |
| TIMO2 | 0E23 | TIMZ2 | 0E24 | TMAXO | 0E06 | TMAXZ | 0E16 |
| TMXO2 | 0E27 | TMXZ2 | 0E28 | UNDER | 0E1C | VELAC | 0E0D |
| VELPM | 0E0A | VELPS | 0E09 | VELRF | 0E0C | VELSC | 0E0B |
| ZEROS | 0E10 | ZOUT | 078F | ZRCHK | 0E21 | ZROPV | 0E11 |
| ZROSC | 0E12 | ZVLRF | 0E14 | ZVLSC | 0E13 | | |

ISIS 8080 MACRO ASSEMBLER, V1.1                       PAGE 1

```
                    ;   JANUARY 24, 1978      SUB 0
                    ;   MAY 18, 1978          SUB 1
                    ;     HANDBACK ADDED
                    ;     RELOCATED
                    ;
                    ;
                    ;   PROGRAM STOP INTERRUPT ROUTINE
                    ;
                    ;
                    ;   THIS ROUTINE DETERMINES THE CORRECT PROGRAM
                    ;   STOP PROFILE AND SELECTS THE DESIRED VELOCITY
                    ;   FOR THE SPEED CONTROL ROUTINE.
                    ;
                    ;   A LOOK AHEAD ONE SECOND VELOCITY IS ALSO
                    ;   CALCULATED.
                    ;
                    ;
0810                        ORG     0810H
0810 E5      PSTOP:  PUSH    H       ;SAVE REGISTERS
0811 D5              PUSH    D
0812 C5              PUSH    B
0813 00              NOP
0814 213F0E          LXI     H,DPSCK
0817 34              INR     M       ;DIAGNOSTIC CROSSOVER COUNTER
0818 DB73            IN      73H     ;PS DATA WORD
081A 2F              CMA
081B 47              MOV     B,A
081C DB61            IN      61H     ;STATUS WORD
081E 2F              CMA
081F 4F              MOV     C,A
0820 E605            ANI     05H     ;ATO MODE?
0822 CA7108          JZ      PST1    ;NO
0825 DB73            IN      73H
0827 E604            ANI     04H     ;HANDBACK?
0829 CA7108          JZ      PST1    ;YES
082C 78              MOV     A,B     ;YES, GET PS DATA
082D E602            ANI     02      ;PS ACTIVE = 0?
```

```
082F C27108            JNZ    PST1         ;NO
0832 3A370E            LDA    PSFLG        ;YES, FIRST TIME THROUGH
0835 B7                ORA    A            ;ROUTINE?
0836 C29A09            JNZ    PS1A         ;NO
0839 79                MOV    A,C          ;YES, GET STATUS
083A E610              ANI    10H          ;A HEAD?
083C CA5C08            JZ     PST2         ;NO, CHECK B HEAD
083F 2AA609    PST3:   LHLD   ADTGO        ;YES, PRESET
0842 22320E            SHLD   DTGO         ;COUNTERS
0845 2AA809            LHLD   AVTGO        ;FOR
0848 22300E            SHLD   VTGO         ;A HEAD END
084B AF        PST4:   XRA    A            ;ZERO TABLE STEP FLAGS
084C 32390E            STA    FLG2
```

ISIS 8080 MACRO ASSEMBLER, V1.1                              PAGE 2

```
084F 32380E            STA    FLG4
0852 3C                INR    A
0853 32370E            STA    PSFLG        ;PSFLG = 1
0856 CD7F08            CALL   PS1
0859 C37908            JMP    PS3
085C 79        PST2:   MOV    A,C          ;GET STATUS WORD
085D E620              ANI    20H          ;B HEAD?
085F CA7108            JZ     PST1         ;NO, RETURN
0862 2AAA09            LHLD   BDTGO        ;YES, PRESET
0865 22320E            SHLD   DTGO         ;COUNTERS
0868 2AAC09            LHLD   BVTGO        ;FOR
086B 22300E            SHLD   VTGO         ;B HEAD END
086E C34B08            JMP    PST4
0871 3EFF     PST1:    MVI    A,255        ;SET PS VEL AND
0873 32090E            STA    VELPS        ;LOOK AHEAD VEL
0876 32360E            STA    VELLA        ;TO MAX
0879 C1       PS3:     POP    B            ;RESTORE REGISTERS
087A D1                POP    D
087B E1                POP    H
087C F1                POP    PSW
087D FB                EI                  ;ENABLE INTERRUPTS
087E C9                RET                 ;RETURN
087F 2A320E   PS1:     LHLD   DTGO
0882 2B                DCX    H            ;DEC DTG COUNTER
0883 22320E            SHLD   DTGO
0886 EB                XCHG                ;COUNT IN DE
0887 2AA009            LHLD   BRK1
088A 19                DAD    D
088B DAAB08            JC     PS4          ;COUNT > OR =  384
088E 2AA209            LHLD   BRK2
0891 19                DAD    D
0892 DABD08            JC     PS5          ;COUNT > OR =  128
0895 2AA409            LHLD   BRK3
0898 19                DAD    D
0899 DAED08            JC     PS6          ;COUNT > 0
089C 3E01     PS11:    MVI    A,1
089E 32320E            STA    DTGO
08A1 AF                XRA    A
08A2 32090E            STA    VELPS
08A5 32360E            STA    VELLA
08A8 C3E608            JMP    PS2
08AB 21380E   PS4:     LXI    H,FLG4
08AE 7E                MOV    A,M
08AF C600              ADI    0
08B1 CAB808            JZ     PS7
08B4 35                DCR    M            ;DCR FLAG4
08B5 C3E608            JMP    PS2
08B8 3603     PS7:     MVI    M,3          ;FLAG4 = 3
08BA C3CC08            JMP    PS61         ;GET NEXT VEL
08BD 21390E   PS5:     LXI    H,FLG2
```

ISIS 8080 MACRO ASSEMBLER, V1.1                                    PAGE 3

```
08C0 7E              MOV     A,M
08C1 C600            ADI     0
08C3 CACA08          JZ      PS8
08C6 35              DCR     M           ; DCR FLAG2
08C7 C3E608          JMP     PS2
08CA 3601    PS8:    MVI     M,1         ; FLAG2 = 1
08CC 2A300E  PS61:   LHLD    VTGO
08CF 23              INX     H           ; INC VEL#
08D0 22300E          SHLD    VTGO
08D3 DB73            IN      73H         ; COC WORD
08D5 00              NOP
08D6 E660            ANI     60H         ; DEGRADED MODE = 1
08D8 C2E708          JNZ     PS9         ; YES, USE PROFILE 2 TABLE
08DB 21000A          LXI     H,PROF1     ; PROFILE 1 TABLE ADDRESS
08DE EB      PS10:   XCHG                ; ADDRESS IN DE
08DF 2A300E          LHLD    VTGO
08E2 19              DAD     D           ; VELOCITY TABLE ADDRESS
08E3 CDF508          CALL    VEL         ; GO GET VELPS, VELLA
08E6 C9      PS2:    RET
08E7 21000C  PS9:    LXI     H,PROF2     ; PROFILE 2 TABLE ADDRESS
08EA C3DE08          JMP     PS10
08ED 7C      PS6:    MOV     A,H         ; COUNT = 0?
08EE B5              ORA     L
08EF CA9C08          JZ      PS11        ; YES
08F2 C3CC08          JMP     PS61
             ;
             ;
             ;       VEL SUBROUTINE
             ;
             ;       GETS PROGRAM STOP VELOCITY
             ;       AND LOOK AHEAD VELOCITY
             ;       FROM REQUESTED PROFILE TABLE.
             ;
             ;
08F5 7E      VEL:    MOV     A,M
08F6 1F              RAR
08F7 E67F            ANI     7FH
08F9 32090E          STA     VELPS       ; STORE DESIRED VELOCITY
08FC 22340E          SHLD    VTMP
08FF 3AF50E          LDA     IN72        ; TACH 4A
0902 47              MOV     B,A         ; TACH IN B
0903 2A320E          LHLD    DTGO
0906 EB              XCHG
0907 2AA009          LHLD    BRK1
090A 19              DAD     D
090B DA2F09          JC      VEL1
090E 2AA209          LHLD    BRK2
0911 19              DAD     D
0912 DA3809          JC      VEL2
0915 2A300E  VEL3:   LHLD    VTGO        ; TABLE BIAS
```

ISIS 8080 MACRO ASSEMBLER, V1.1                                    PAGE 4

```
0918 1600            MVI     D,0
091A 58              MOV     E,B         ; TACH
091B 19              DAD     D           ; BIAS + TACH
091C 7C              MOV     A,H
091D D602            SUI     2           ; IS NEW BIAS > 511?
091F F23C09          JP      VEL6        ; GO GET MAX
0922 2A340E          LHLD    VTMP        ; VEL TABLE BIAS
0925 58              MOV     E,B         ; TACH
0926 19              DAD     D           ; BIAS + TACH
0927 7E      VEL5:   MOV     A,M
```

```
0928 1F              RAR
0929 E67F            ANI   7FH
092B 32360E   VEL7:  STA   VELLA   ;LOOK AHEAD VELOCITY
092E C9              RET
092F 78       VEL1:  MOV   A,B     ;GET TACH/4 + BIAS
0930 1F              RAR
0931 1F       VEL4:  RAR
0932 E63F            ANI   3FH
0934 47              MOV   B,A     ;TACH IN B
0935 C31509          JMP   VEL3
0938 78       VEL2:  MOV   A,B     ;GET TACH/2 + BIAS
0939 C33109          JMP   VEL4
093C AF       VEL6:  XRA   A       ;VELLA = 0
093D C32B09          JMP   VEL7
              ;
              ;
              ;     HANDBACK FOR PROGRAM STOP
              ;
              ;     ENTERED FROM 54 HZ INT ROUT
              ;
0940 DB73     HBPS:  IN    73H
0942 E604            ANI   04H     ;IN HANDBACK
0944 C29909          JNZ   HPS3    ;NO
0947 DB64            IN    64H
0949 32FF0E          STA   IN64    ;MTL PS DATA
094C 47              MOV   B,A     ;SAVE
094D E604            ANI   4       ;MTL PS VALID
094F CA9109          JZ    HPS1
0952 DB61            IN    61H
0954 E601            ANI   1       ;A ATO?
0956 CA9109          JZ    HPS1    ;NO
0959 3A370E          LDA   PSFLG
095C B7              ORA   A       ;FIRST PASS?
095D C27709          JNZ   HPS2    ;NO
0960 2AA609          LHLD  ADTGO   ;YES, INITIALIZE
0963 22320E          SHLD  DTGO
0966 2AA809          LHLD  AVTGO
0969 22300E          SHLD  VTGO
096C AF              XRA   A       ;ZERO FLAGS
096D 32390E          STA   FLG2
```

ISIS 8080 MACRO ASSEMBLER, V1.1                    PAGE 5

```
0970 32380E          STA   FLG4
0973 3C              INR   A
0974 32370E          STA   PSFLG   ;SET FIRST PASS FLAG
0977 78       HPS2:  MOV   A,B     ;GET DATA
0978 1F              RAR
0979 1F              RAR
097A 1F              RAR
097B E607            ANI   7
097D 323A0E          STA   CNTS    ;MTL NO. OF XOVERS
0980 CA9909   HPS4:  JZ    HPS3    ;ZERO COUNTS
0983 3D              DCR   A       ;SUB 1
0984 323A0E          STA   CNTS
0987 CD7F08          CALL  PS1     ;GO DO PS ROUTINE
098A 3A3A0E          LDA   CNTS    ;GET REMAINING COUNTS
098D B7              ORA   A
098E C38009          JMP   HPS4
0991 3EFF     HPS1:  MVI   A,255   ;NOT IN PS
0993 32360E          STA   VELLA
0996 32090E          STA   VELPS
0999 C9       HPS3:  RET
099A CD7F08   PS1A:  CALL  PS1
099D C37908          JMP   PS3
              ;
              ;
```

```
09A0 80FE    BRK1:   DW      -384
09A2 80FF    BRK2:   DW      -128
09A4 FFFF    BRK3:   DW      -1
09A6 F002    ADTGO:  DW      752     ;A HEAD COUNTS TO GO
09A8 A500    AVTGO:  DW      165     ;A HEAD VEL TABLE BIAS
09AA BC02    BDTGO:  DW      700     ;B HEAD COUNTS TO GO
09AC B200    BVTGO:  DW      178     ;B HEAD VEL TABLE BIAS
09AE FF01    DTGMX:  DW      511     ;TABLE BIAS MAX
0E30                 ORG     0E30H
0E30 0000    VTGO:   DW      0       ;NO. OF VELOCITIES FROM TABLE START
0E32 0000    DTGO:   DW      0       ;NO. OF COUNTS TO GO
0E34 0000    VTMP:   DW      0       ;PROFILE POINTER FOR VELPS TABLE
0E36 00      VELLA:  DB      0       ;LOOK AHEAD VELOCITY
0E37 00      PSFLG:  DB      0       ;INITIALIZE COUNT FLAG
0E38 00      FLG4:   DB      0
0E39 00      FLG2:   DB      0
0E3A 00      CNTS:   DB      0       ;MTL PS XOVER COUNTS
0E09         VELPS   EQU     0E09H
0EFF         IN64    EQU     0EFFH   ;MTL PS DATA
0EF5         IN72    EQU     0EF5H   ;TACH 4 A
0A00         PROF1   EQU     0A00H
0C00         PROF2   EQU     0C00H
0E3F         DPSCK   EQU     0E3FH   ;DIAGONISTIC COUNTER
0000                 END
```

ISIS 8080 MACRO ASSEMBLER, V1.1                 PAGE 6

```
ADTGO 09A6    AVTGO 09A8    BDTGO 09AA    BRK1  09A0
BRK2  09A2    BRK3  09A4    BVTGO 09AC    CNTS  0E3A
DPSCK 0E3F    DTGMX 09AE    DTGO  0E32    FLG2  0E39
FLG4  0E38    HBPS  0940    HPS1  0991    HPS2  0977
HPS3  0999    HPS4  0980    IN64  0EFF    IN72  0EF5
PROF1 0A00    PROF2 0C00    PS1   087F    PS10  08DE
PS11  089C    PS1A  099A    PS2   08E6    PS3   0879
PS4   08AB    PS5   08BD    PS6   08ED    PS61  08CC
PS7   08B8    PS8   08CA    PS9   08E7    PSFLG 0E37
PST1  0871    PST2  085C    PST3  083F    PST4  084B
PSTOP 0810    VEL   08F5    VEL1  092F    VEL2  0938
VEL3  0915    VEL4  0931    VEL5  0927    VEL6  093C
VEL7  092B    VELLA 0E36    VELPS 0E09    VTGO  0E30
VTMP  0E34
```

ISIS 8080 MACRO ASSEMBLER, V1.1                 PAGE 1

;       JANUARY 24, 1978    SUB 0
                ;
                ;
                ;       PROFILE 1 VELOCITY TABLE
                ;
                ;       THIS TABLE CONTAINS THE DESIRED VELOCITIES
                ;       FOR A PROGRAM STOP AT THE VARIOUS DIS-
                ;       TANCES TO GO.
                ;
                ;
```
0A00                 ORG     0A00H
0A00 FF      PROF1:  DB      255     ;68.6994
0A01 FF              DB      255     ;68.6016
0A02 FF              DB      255     ;68.5037
0A03 FF              DB      255     ;68.4057
0A04 FF              DB      255     ;68.3075
```

```
0A05 FF              DB    255      ;68.2091
0A06 FF              DB    255      ;68.1107
0A07 FF              DB    255      ;68.012
0A08 FF              DB    255      ;67.9133
0A09 FF              DB    255      ;67.8143
0A0A FF              DB    255      ;67.7153
0A0B FF              DB    255      ;67.6161
0A0C FF              DB    255      ;67.5167
0A0D FF              DB    255      ;67.4172
0A0E FF              DB    255      ;67.3176
0A0F FF              DB    255      ;67.2178
0A10 FF              DB    255      ;67.1179
0A11 FF              DB    255      ;67.0178
0A12 FF              DB    255      ;66.9175
0A13 FF              DB    255      ;66.8171
0A14 FF              DB    255      ;66.7165
0A15 FF              DB    255      ;66.6159
0A16 FF              DB    255      ;66.5151
0A17 FF              DB    255      ;66.4141
0A18 FF              DB    255      ;66.3129
0A19 FF              DB    255      ;66.2116
0A1A FF              DB    255      ;66.1102
0A1B FF              DB    255      ;66.0086
0A1C FF              DB    255      ;65.9068
0A1D FF              DB    255      ;65.8049
0A1E FF              DB    255      ;65.7028
0A1F FF              DB    255      ;65.6005
0A20 FF              DB    255      ;65.4981
0A21 FF              DB    255      ;65.3956
0A22 FF              DB    255      ;65.2928
0A23 FF              DB    255      ;65.1899
0A24 FF              DB    255      ;65.0869
0A25 FF              DB    255      ;64.9837

ISIS 8080 MACRO ASSEMBLER, V1.1                              PAGE 2

0A26 FF              DB    255      ;64.8803
0A27 FF              DB    255      ;64.7768
0A28 FF              DB    255      ;64.673
0A29 FF              DB    255      ;64.5692
0A2A FF              DB    255      ;64.4651
0A2B FF              DB    255      ;64.3609
0A2C FF              DB    255      ;64.2555
0A2D FF              DB    255      ;64.152
0A2E FF              DB    255      ;64.0472
0A2F FF              DB    255      ;63.9424
0A30 FF              DB    255      ;63.8373
0A31 FE              DB    254      ;63.7321
0A32 FE              DB    254      ;63.6267
0A33 FE              DB    254      ;63.521
0A34 FD              DB    253      ;63.4153
0A35 FD              DB    253      ;63.3094
0A36 FC              DB    252      ;63.2033
0A37 FC              DB    252      ;63.0969
0A38 FB              DB    251      ;62.9905
0A39 FB              DB    251      ;62.8838
0A3A FB              DB    251      ;62.777
0A3B FA              DB    250      ;62.67
0A3C FA              DB    250      ;62.5628
0A3D F9              DB    249      ;62.4554
0A3E F9              DB    249      ;62.3478
0A3F F8              DB    248      ;62.24
0A40 F8              DB    248      ;62.1321
0A41 F8              DB    248      ;62.024
0A42 F7              DB    247      ;61.9157
0A43 F7              DB    247      ;61.8071
0A44 F6              DB    246      ;61.6984
```

```
0A45 F6              DB    246    ;61.5895
0A46 F5              DB    245    ;61.4805
0A47 F5              DB    245    ;61.3712
0A48 F5              DB    245    ;61.2617
0A49 F4              DB    244    ;61.152
0A4A F4              DB    244    ;61.0422
0A4B F3              DB    243    ;60.9321
0A4C F3              DB    243    ;60.8218
0A4D F2              DB    242    ;60.7114
0A4E F2              DB    242    ;60.6007
0A4F F1              DB    241    ;60.4898
0A50 F1              DB    241    ;60.3787
0A51 F1              DB    241    ;60.2675
0A52 F0              DB    240    ;60.156
0A53 F0              DB    240    ;60.0443
0A54 EF              DB    239    ;59.9324
0A55 EF              DB    239    ;59.8203
0A56 EE              DB    238    ;59.708
0A57 EE              DB    238    ;59.5955
```

ISIS 8080 MACRO ASSEMBLER, V1.1                              PAGE 3

```
0A58 ED              DB    237    ;59.4827
0A59 ED              DB    237    ;59.3698
0A5A ED              DB    237    ;59.2566
0A5B EC              DB    236    ;59.1432
0A5C EC              DB    236    ;59.0296
0A5D EB              DB    235    ;58.9158
0A5E EB              DB    235    ;58.8017
0A5F EA              DB    234    ;58.6874
0A60 EA              DB    234    ;58.573
0A61 E9              DB    233    ;58.4583
0A62 E9              DB    233    ;58.3433
0A63 E8              DB    232    ;58.2281
0A64 E8              DB    232    ;58.1127
0A65 E7              DB    231    ;57.9971
0A66 E7              DB    231    ;57.8813
0A67 E7              DB    231    ;57.7652
0A68 E6              DB    230    ;57.6488
0A69 E6              DB    230    ;57.5323
0A6A E5              DB    229    ;57.4155
0A6B E5              DB    229    ;57.2984
0A6C E4              DB    228    ;57.1812
0A6D E4              DB    228    ;57.0637
0A6E E3              DB    227    ;56.9459
0A6F E3              DB    227    ;56.8279
0A70 E2              DB    226    ;56.7097
0A71 E2              DB    226    ;56.5912
0A72 E1              DB    225    ;56.4724
0A73 E1              DB    225    ;56.3535
0A74 E0              DB    224    ;56.2342
0A75 E0              DB    224    ;56.1147
0A76 DF              DB    223    ;55.995
0A77 DF              DB    223    ;55.8749
0A78 DF              DB    223    ;55.7547
0A79 DE              DB    222    ;55.6342
0A7A DE              DB    222    ;55.5134
0A7B DD              DB    221    ;55.3923
0A7C DD              DB    221    ;55.271
0A7D DC              DB    220    ;55.1494
0A7E DC              DB    220    ;55.0276
0A7F DB              DB    219    ;54.9055
0A80 DB              DB    219    ;54.7831
0A81 DA              DB    218    ;54.6604
0A82 DA              DB    218    ;54.5374
0A83 D9              DB    217    ;54.4142
0A84 D9              DB    217    ;54.2907
```

| | | | | |
|---|---|---|---|---|
| 0A85 D8 | | DB | 216 | ;54.1669 |
| 0A86 D8 | | DB | 216 | ;54.0429 |
| 0A87 D7 | | DB | 215 | ;53.9185 |
| 0A88 D7 | | DB | 215 | ;53.7939 |
| 0A89 D6 | | DB | 214 | ;53.6689 |

ISIS 8080 MACRO ASSEMBLER, V1.1                            PAGE 4

| | | | | |
|---|---|---|---|---|
| 0A8A D6 | | DB | 214 | ;53.5437 |
| 0A8B D5 | | DB | 213 | ;53.4182 |
| 0A8C D5 | | DB | 213 | ;53.2924 |
| 0A8D D4 | | DB | 212 | ;53.1663 |
| 0A8E D4 | | DB | 212 | ;53.0399 |
| 0A8F D3 | | DB | 211 | ;52.9132 |
| 0A90 D3 | | DB | 211 | ;52.7862 |
| 0A91 D2 | | DB | 210 | ;52.6589 |
| 0A92 D2 | | DB | 210 | ;52.5312 |
| 0A93 D1 | | DB | 209 | ;52.4033 |
| 0A94 D1 | | DB | 209 | ;52.275 |
| 0A95 D0 | | DB | 208 | ;52.1464 |
| 0A96 D0 | | DB | 208 | ;52.0176 |
| 0A97 CF | | DB | 207 | ;51.8884 |
| 0A98 CF | | DB | 207 | ;51.7588 |
| 0A99 CE | | DB | 206 | ;51.629 |
| 0A9A CD | | DB | 205 | ;51.4988 |
| 0A9B CD | | DB | 205 | ;51.3683 |
| 0A9C CC | | DB | 204 | ;51.2374 |
| 0A9D CC | | DB | 204 | ;51.1063 |
| 0A9E CB | | DB | 203 | ;50.9748 |
| 0A9F CB | | DB | 203 | ;50.8429 |
| 0AA0 CA | | DB | 202 | ;50.7107 |
| 0AA1 CA | | DB | 202 | ;50.5782 |
| 0AA2 C9 | | DB | 201 | ;50.4453 |
| 0AA3 C9 | | DB | 201 | ;50.312 |
| 0AA4 C8 | | DB | 200 | ;50.1784 |
| 0AA5 C8 | | DB | 200 | ;50.0445 |
| 0AA6 C7 | | DB | 199 | ;49.9102 |
| 0AA7 C7 | | DB | 199 | ;49.7755 |
| 0AA8 C6 | | DB | 198 | ;49.6404 |
| 0AA9 C6 | | DB | 198 | ;49.505 |
| 0AAA C5 | | DB | 197 | ;49.3693 |
| 0AAB C4 | | DB | 196 | ;49.2331 |
| 0AAC C4 | | DB | 196 | ;49.0966 |
| 0AAD C3 | | DB | 195 | ;48.9597 |
| 0AAE C3 | | DB | 195 | ;48.8224 |
| 0AAF C2 | | DB | 194 | ;48.6847 |
| 0AB0 C2 | | DB | 194 | ;48.5466 |
| 0AB1 C1 | | DB | 193 | ;48.4081 |
| 0AB2 C1 | | DB | 193 | ;48.2693 |
| 0AB3 C0 | | DB | 192 | ;48.13 |
| 0AB4 BF | | DB | 191 | ;47.9903 |
| 0AB5 BF | | DB | 191 | ;47.8502 |
| 0AB6 BE | | DB | 190 | ;47.7098 |
| 0AB7 BE | | DB | 190 | ;47.5688 |
| 0AB8 BD | | DB | 189 | ;47.4275 |
| 0AB9 BD | | DB | 189 | ;47.2858 |
| 0ABA BC | | DB | 188 | ;47.1436 |
| 0ABB BC | | DB | 188 | ;47.001 |

ISIS 8080 MACRO ASSEMBLER, V1.1                            PAGE 5

| | | | | |
|---|---|---|---|---|
| 0ABC BB | | DB | 187 | ;46.858 |
| 0ABD BA | | DB | 186 | ;46.7145 |
| 0ABE BA | | DB | 186 | ;46.5706 |

```
0ABF B9        DB    185    ;46.4262
0AC0 B9        DB    185    ;46.2814
0AC1 B8        DB    184    ;46.1361
0AC2 B7        DB    183    ;45.9904
0AC3 B7        DB    183    ;45.8442
0AC4 B6        DB    182    ;45.6976
0AC5 B6        DB    182    ;45.5504
0AC6 B5        DB    181    ;45.4028
0AC7 B5        DB    181    ;45.2547
0AC8 B4        DB    180    ;45.1062
0AC9 B3        DB    179    ;44.9571
0ACA B3        DB    179    ;44.8075
0ACB B2        DB    178    ;44.6575
0ACC B2        DB    178    ;44.5069
0ACD B1        DB    177    ;44.3558
0ACE B0        DB    176    ;44.2042
0ACF B0        DB    176    ;44.0521
0AD0 AF        DB    175    ;43.8995
0AD1 AE        DB    174    ;43.7463
0AD2 AE        DB    174    ;43.5926
0AD3 AD        DB    173    ;43.4383
0AD4 AD        DB    173    ;43.2835
0AD5 AC        DB    172    ;43.1282
0AD6 AB        DB    171    ;42.9722
0AD7 AB        DB    171    ;42.8158
0AD8 AA        DB    170    ;42.6587
0AD9 AA        DB    170    ;42.501
0ADA A9        DB    169    ;42.3428
0ADB A8        DB    168    ;42.184
0ADC A8        DB    168    ;42.0245
0ADD A7        DB    167    ;41.8645
0ADE A6        DB    166    ;41.7039
0ADF A6        DB    166    ;41.5426
0AE0 A5        DB    165    ;41.3807
0AE1 A4        DB    164    ;41.2181
0AE2 A4        DB    164    ;41.055
0AE3 A3        DB    163    ;40.8911
0AE4 A2        DB    162    ;40.7267
0AE5 A2        DB    162    ;40.5615
0AE6 A1        DB    161    ;40.3957
0AE7 A0        DB    160    ;40.2292
0AE8 A0        DB    160    ;40.0619
0AE9 9F        DB    159    ;39.894
0AEA 9E        DB    158    ;39.7254
0AEB 9E        DB    158    ;39.5561
0AEC 9D        DB    157    ;39.386
0AED 9C        DB    156    ;39.2152
```

ISIS 8080 MACRO ASSEMBLER, V1.1                    PAGE 6

```
0AEE 9C        DB    156    ;39.0437
0AEF 9B        DB    155    ;38.8714
0AF0 9A        DB    154    ;38.6983
0AF1 9A        DB    154    ;38.5244
0AF2 99        DB    153    ;38.3498
0AF3 98        DB    152    ;38.1744
0AF4 97        DB    151    ;37.9981
0AF5 97        DB    151    ;37.821
0AF6 96        DB    150    ;37.6431
0AF7 95        DB    149    ;37.4644
0AF8 95        DB    149    ;37.2848
0AF9 94        DB    148    ;37.1043
0AFA 93        DB    147    ;36.923
0AFB 92        DB    146    ;36.7407
0AFC 92        DB    146    ;36.5576
0AFD 91        DB    145    ;36.3735
0AFE 90        DB    144    ;36.1885
```

```
0AFF 90        DB    144    ;36.0025
0B00 8F        DB    143    ;35.8156
0B01 8E        DB    142    ;35.7217
0B02 8E        DB    142    ;35.6276
0B03 8E        DB    142    ;35.5333
0B04 8D        DB    141    ;35.4387
0B05 8D        DB    141    ;35.3439
0B06 8C        DB    140    ;35.2488
0B07 8C        DB    140    ;35.1535
0B08 8C        DB    140    ;35.0579
0B09 8B        DB    139    ;34.962
0B0A 8B        DB    139    ;34.8659
0B0B 8B        DB    139    ;34.7695
0B0C 8A        DB    138    ;34.6728
0B0D 8A        DB    138    ;34.5759
0B0E 89        DB    137    ;34.4787
0B0F 89        DB    137    ;34.3812
0B10 89        DB    137    ;34.2834
0B11 88        DB    136    ;34.1854
0B12 88        DB    136    ;34.0871
0B13 87        DB    135    ;33.9884
0B14 87        DB    135    ;33.8896
0B15 87        DB    135    ;33.7904
0B16 86        DB    134    ;33.6909
0B17 86        DB    134    ;33.5911
0B18 85        DB    133    ;33.4911
0B19 85        DB    133    ;33.3907
0B1A 85        DB    133    ;33.29
0B1B 84        DB    132    ;33.1891
0B1C 84        DB    132    ;33.0878
0B1D 83        DB    131    ;32.9862
0B1E 83        DB    131    ;32.8843
0B1F 83        DB    131    ;32.7821
```

ISIS 8080 MACRO ASSEMBLER, V1.1                     PAGE 7

```
0B20 82        DB    130    ;32.6795
0B21 82        DB    130    ;32.5766
0B22 81        DB    129    ;32.4735
0B23 81        DB    129    ;32.3699
0B24 81        DB    129    ;32.2661
0B25 80        DB    128    ;32.1619
0B26 80        DB    128    ;32.0574
0B27 7F        DB    127    ;31.9525
0B28 7F        DB    127    ;31.8473
0B29 7E        DB    126    ;31.7417
0B2A 7E        DB    126    ;31.6358
0B2B 7E        DB    126    ;31.5295
0B2C 7D        DB    125    ;31.4229
0B2D 7D        DB    125    ;31.3159
0B2E 7C        DB    124    ;31.2086
0B2F 7C        DB    124    ;31.1008
0B30 7B        DB    123    ;30.9927
0B31 7B        DB    123    ;30.8842
0B32 7B        DB    123    ;30.7754
0B33 7A        DB    122    ;30.6661
0B34 7A        DB    122    ;30.5565
0B35 79        DB    121    ;30.4464
0B36 79        DB    121    ;30.336
0B37 78        DB    120    ;30.2252
0B38 78        DB    120    ;30.1139
0B39 78        DB    120    ;30.0023
0B3A 77        DB    119    ;29.8902
0B3B 77        DB    119    ;29.7777
0B3C 76        DB    118    ;29.6647
0B3D 76        DB    118    ;29.5514
0B3E 75        DB    117    ;29.4376
```

| | | | | |
|---|---|---|---|---|
| 0B3F | 75 | DB | 117 | ;29.3234 |
| 0B40 | 74 | DB | 116 | ;29.2087 |
| 0B41 | 74 | DB | 116 | ;29.0935 |
| 0B42 | 73 | DB | 115 | ;28.978 |
| 0B43 | 73 | DB | 115 | ;28.8619 |
| 0B44 | 72 | DB | 114 | ;28.7454 |
| 0B45 | 72 | DB | 114 | ;28.6284 |
| 0B46 | 72 | DB | 114 | ;28.5109 |
| 0B47 | 71 | DB | 113 | ;28.3929 |
| 0B48 | 71 | DB | 113 | ;28.2745 |
| 0B49 | 70 | DB | 112 | ;28.1555 |
| 0B4A | 70 | DB | 112 | ;28.0361 |
| 0B4B | 6F | DB | 111 | ;27.9161 |
| 0B4C | 6F | DB | 111 | ;27.7956 |
| 0B4D | 6E | DB | 110 | ;27.6746 |
| 0B4E | 6E | DB | 110 | ;27.553 |
| 0B4F | 6D | DB | 109 | ;27.431 |
| 0B50 | 6D | DB | 109 | ;27.3083 |
| 0B51 | 6C | DB | 108 | ;27.1852 |

ISIS 8080 MACRO ASSEMBLER, V1.1                    PAGE 8

| | | | | |
|---|---|---|---|---|
| 0B52 | 6C | DB | 108 | ;27.0614 |
| 0B53 | 6B | DB | 107 | ;26.9371 |
| 0B54 | 6B | DB | 107 | ;26.8122 |
| 0B55 | 6A | DB | 106 | ;26.6867 |
| 0B56 | 6A | DB | 106 | ;26.5607 |
| 0B57 | 69 | DB | 105 | ;26.434 |
| 0B58 | 69 | DB | 105 | ;26.3067 |
| 0B59 | 68 | DB | 104 | ;26.1788 |
| 0B5A | 68 | DB | 104 | ;26.0503 |
| 0B5B | 67 | DB | 103 | ;25.9212 |
| 0B5C | 67 | DB | 103 | ;25.7913 |
| 0B5D | 66 | DB | 102 | ;25.6609 |
| 0B5E | 66 | DB | 102 | ;25.5298 |
| 0B5F | 65 | DB | 101 | ;25.398 |
| 0B60 | 65 | DB | 101 | ;25.2655 |
| 0B61 | 64 | DB | 100 | ;25.1323 |
| 0B62 | 63 | DB | 99 | ;24.9984 |
| 0B63 | 63 | DB | 99 | ;24.8637 |
| 0B64 | 62 | DB | 98 | ;24.7284 |
| 0B65 | 62 | DB | 98 | ;24.5923 |
| 0B66 | 61 | DB | 97 | ;24.4554 |
| 0B67 | 61 | DB | 97 | ;24.3178 |
| 0B68 | 60 | DB | 96 | ;24.1794 |
| 0B69 | 60 | DB | 96 | ;24.0402 |
| 0B6A | 5F | DB | 95 | ;23.9002 |
| 0B6B | 5F | DB | 95 | ;23.7593 |
| 0B6C | 5E | DB | 94 | ;23.6176 |
| 0B6D | 5D | DB | 93 | ;23.4751 |
| 0B6E | 5D | DB | 93 | ;23.3317 |
| 0B6F | 5C | DB | 92 | ;23.1874 |
| 0B70 | 5C | DB | 92 | ;23.0422 |
| 0B71 | 5B | DB | 91 | ;22.896 |
| 0B72 | 5A | DB | 90 | ;22.749 |
| 0B73 | 5A | DB | 90 | ;22.601 |
| 0B74 | 59 | DB | 89 | ;22.452 |
| 0B75 | 59 | DB | 89 | ;22.302 |
| 0B76 | 58 | DB | 88 | ;22.151 |
| 0B77 | 57 | DB | 87 | ;21.9989 |
| 0B78 | 57 | DB | 87 | ;21.8458 |
| 0B79 | 56 | DB | 86 | ;21.6917 |
| 0B7A | 56 | DB | 86 | ;21.5364 |
| 0B7B | 55 | DB | 85 | ;21.38 |
| 0B7C | 54 | DB | 84 | ;21.2224 |
| 0B7D | 54 | DB | 84 | ;21.0637 |

| | | | |
|---|---|---|---|
| 0B7E 53 | DB | 83 | ;20.9037 |
| 0B7F 52 | DB | 82 | ;20.7425 |
| 0B80 52 | DB | 82 | ;20.5801 |
| 0B81 51 | DB | 81 | ;20.4984 |
| 0B82 51 | DB | 81 | ;20.4165 |
| 0B83 51 | DB | 81 | ;20.334 |

ISIS 8080 MACRO ASSEMBLER, V1.1                    PAGE 9

| | | | |
|---|---|---|---|
| 0B84 51 | DB | 81 | ;20.2513 |
| 0B85 50 | DB | 80 | ;20.1682 |
| 0B86 50 | DB | 80 | ;20.0849 |
| 0B87 50 | DB | 80 | ;20.0011 |
| 0B88 4F | DB | 79 | ;19.9171 |
| 0B89 4F | DB | 79 | ;19.8326 |
| 0B8A 4E | DB | 78 | ;19.7478 |
| 0B8B 4E | DB | 78 | ;19.6627 |
| 0B8C 4E | DB | 78 | ;19.5771 |
| 0B8D 4D | DB | 77 | ;19.4912 |
| 0B8E 4D | DB | 77 | ;19.4049 |
| 0B8F 4D | DB | 77 | ;19.3183 |
| 0B90 4C | DB | 76 | ;19.2312 |
| 0B91 4C | DB | 76 | ;19.1437 |
| 0B92 4C | DB | 76 | ;19.0559 |
| 0B93 4B | DB | 75 | ;18.9676 |
| 0B94 4B | DB | 75 | ;18.8789 |
| 0B95 4B | DB | 75 | ;18.7898 |
| 0B96 4A | DB | 74 | ;18.7003 |
| 0B97 4A | DB | 74 | ;18.6103 |
| 0B98 4A | DB | 74 | ;18.5199 |
| 0B99 49 | DB | 73 | ;18.4291 |
| 0B9A 49 | DB | 73 | ;18.3378 |
| 0B9B 48 | DB | 72 | ;18.2461 |
| 0B9C 48 | DB | 72 | ;18.1539 |
| 0B9D 48 | DB | 72 | ;18.0612 |
| 0B9E 47 | DB | 71 | ;17.968 |
| 0B9F 47 | DB | 71 | ;17.8744 |
| 0BA0 47 | DB | 71 | ;17.7803 |
| 0BA1 46 | DB | 70 | ;17.6856 |
| 0BA2 46 | DB | 70 | ;17.5905 |
| 0BA3 45 | DB | 69 | ;17.4948 |
| 0BA4 45 | DB | 69 | ;17.3986 |
| 0BA5 45 | DB | 69 | ;17.3019 |
| 0BA6 44 | DB | 68 | ;17.2046 |
| 0BA7 44 | DB | 68 | ;17.1068 |
| 0BA8 44 | DB | 68 | ;17.0084 |
| 0BA9 43 | DB | 67 | ;16.9095 |
| 0BAA 43 | DB | 67 | ;16.81 |
| 0BAB 42 | DB | 66 | ;16.7098 |
| 0BAC 42 | DB | 66 | ;16.6091 |
| 0BAD 42 | DB | 66 | ;16.5077 |
| 0BAE 41 | DB | 65 | ;16.4058 |
| 0BAF 41 | DB | 65 | ;16.3032 |
| 0BB0 40 | DB | 64 | ;16.1999 |
| 0BB1 40 | DB | 64 | ;16.096 |
| 0BB2 3F | DB | 63 | ;15.9914 |
| 0BB3 3F | DB | 63 | ;15.8861 |
| 0BB4 3F | DB | 63 | ;15.7801 |
| 0BB5 3E | DB | 62 | ;15.6734 |

ISIS 8080 MACRO ASSEMBLER, V1.1                    PAGE 10

| | | | |
|---|---|---|---|
| 0BB6 3E | DB | 62 | ;15.566 |
| 0BB7 3D | DB | 61 | ;15.4578 |
| 0BB8 3D | DB | 61 | ;15.3488 |

| | | | | |
|---|---|---|---|---|
| 0BB9 | 3C | DB | 60 | ;15.2391 |
| 0BBA | 3C | DB | 60 | ;15.1286 |
| 0BBB | 3C | DB | 60 | ;15.0172 |
| 0BBC | 3B | DB | 59 | ;14.9051 |
| 0BBD | 3B | DB | 59 | ;14.7921 |
| 0BBE | 3A | DB | 58 | ;14.6782 |
| 0BBF | 3A | DB | 58 | ;14.5634 |
| 0BC0 | 39 | DB | 57 | ;14.4477 |
| 0BC1 | 39 | DB | 57 | ;14.3311 |
| 0BC2 | 38 | DB | 56 | ;14.2135 |
| 0BC3 | 38 | DB | 56 | ;14.0949 |
| 0BC4 | 37 | DB | 55 | ;13.9754 |
| 0BC5 | 37 | DB | 55 | ;13.8548 |
| 0BC6 | 36 | DB | 54 | ;13.7331 |
| 0BC7 | 36 | DB | 54 | ;13.6104 |
| 0BC8 | 35 | DB | 53 | ;13.4865 |
| 0BC9 | 35 | DB | 53 | ;13.3615 |
| 0BCA | 34 | DB | 52 | ;13.2353 |
| 0BCB | 34 | DB | 52 | ;13.1079 |
| 0BCC | 33 | DB | 51 | ;12.9792 |
| 0BCD | 33 | DB | 51 | ;12.8493 |
| 0BCE | 32 | DB | 50 | ;12.718 |
| 0BCF | 32 | DB | 50 | ;12.5854 |
| 0BD0 | 31 | DB | 49 | ;12.4513 |
| 0BD1 | 31 | DB | 49 | ;12.3158 |
| 0BD2 | 30 | DB | 48 | ;12.1788 |
| 0BD3 | 30 | DB | 48 | ;12.0402 |
| 0BD4 | 2F | DB | 47 | ;11.9 |
| 0BD5 | 2F | DB | 47 | ;11.7581 |
| 0BD6 | 2E | DB | 46 | ;11.6145 |
| 0BD7 | 2D | DB | 45 | ;11.4691 |
| 0BD8 | 2D | DB | 45 | ;11.3219 |
| 0BD9 | 2C | DB | 44 | ;11.1727 |
| 0BDA | 2C | DB | 44 | ;11.0214 |
| 0BDB | 2B | DB | 43 | ;10.8681 |
| 0BDC | 2A | DB | 42 | ;10.7126 |
| 0BDD | 2A | DB | 42 | ;10.5548 |
| 0BDE | 29 | DB | 41 | ;10.3946 |
| 0BDF | 28 | DB | 40 | ;10.2318 |
| 0BE0 | 28 | DB | 40 | ;10.0665 |
| 0BE1 | 27 | DB | 39 | ;9.89837 |
| 0BE2 | 26 | DB | 38 | ;9.72736 |
| 0BE3 | 26 | DB | 38 | ;9.55328 |
| 0BE4 | 25 | DB | 37 | ;9.37597 |
| 0BE5 | 24 | DB | 36 | ;9.19525 |
| 0BE6 | 24 | DB | 36 | ;9.01089 |
| 0BE7 | 23 | DB | 35 | ;8.82269 |

ISIS 8080 MACRO ASSEMBLER, V1.1　　　　　　　　　PAGE 11

| | | | | |
|---|---|---|---|---|
| 0BE8 | 22 | DB | 34 | ;8.63039 |
| 0BE9 | 21 | DB | 33 | ;8.4337 |
| 0BEA | 20 | DB | 32 | ;8.23231 |
| 0BEB | 20 | DB | 32 | ;8.02588 |
| 0BEC | 1F | DB | 31 | ;7.81399 |
| 0BED | 1E | DB | 30 | ;7.59619 |
| 0BEE | 1D | DB | 29 | ;7.37196 |
| 0BEF | 1C | DB | 28 | ;7.14069 |
| 0BF0 | 1B | DB | 27 | ;6.90168 |
| 0BF1 | 1A | DB | 26 | ;6.65409 |
| 0BF2 | 19 | DB | 25 | ;6.39692 |
| 0BF3 | 18 | DB | 24 | ;6.12897 |
| 0BF4 | 17 | DB | 23 | ;5.84876 |
| 0BF5 | 16 | DB | 22 | ;5.55443 |
| 0BF6 | 14 | DB | 20 | ;5.2436 |
| 0BF7 | 13 | DB | 19 | ;4.91315 |
| 0BF8 | 12 | DB | 18 | ;4.55881 |

```
0BF9 10              DB      16      ;4.14269
0BFA 0E              DB      14      ;3.73618
0BFB 0D              DB      13      ;3.30656
0BFC 0B              DB      11      ;2.84739
0BFD 09              DB      9       ;2.34821
0BFE 07              DB      7       ;1.7896
0BFF 04              DB      4       ;1.12478
0000                 END
```

ISIS 8080 MACRO ASSEMBLER, V1.1                    PAGE 12

'PROF1 0A00

ISIS 8080 MACRO ASSEMBLER, V1.1                    PAGE 1

```
                ;       JANUARY 24, 1978           SUB 0
                ;
                ;
                ;       PROFILE 2 VELOCITY TABLE
                ;
                ;       THIS TABLE IS USED FOR PROGRAM
                ;       STOPPING AT ANY TIME THAT ANY
                ;       DEGRADED OPERATION IS IN EFFECT.
                ;
                ;
0C00                    ORG     0C00H
0C00 C2         PROF2:  DB      194     ;48.6051
0C01 C2                 DB      194     ;48.5361
0C02 C1                 DB      193     ;48.4668
0C03 C1                 DB      193     ;48.3976
0C04 C1                 DB      193     ;48.3281
0C05 C1                 DB      193     ;48.2587
0C06 C0                 DB      192     ;48.189
0C07 C0                 DB      192     ;48.1193
0C08 C0                 DB      192     ;48.0495
0C09 BF                 DB      191     ;47.9796
0C0A BF                 DB      191     ;47.9096
0C0B BF                 DB      191     ;47.8395
0C0C BF                 DB      191     ;47.7693
0C0D BE                 DB      190     ;47.699
0C0E BE                 DB      190     ;47.6286
0C0F BE                 DB      190     ;47.5581
0C10 BD                 DB      189     ;47.4875
0C11 BD                 DB      189     ;47.4167
0C12 BD                 DB      189     ;47.3459
0C13 BD                 DB      189     ;47.2749
0C14 BC                 DB      188     ;47.2039
0C15 BC                 DB      188     ;47.1327
0C16 BC                 DB      188     ;47.0615
0C17 BB                 DB      187     ;46.9901
0C18 BB                 DB      187     ;46.9186
0C19 BB                 DB      187     ;46.847
0C1A BB                 DB      187     ;46.7753
0C1B BA                 DB      186     ;46.7035
0C1C BA                 DB      186     ;46.6316
0C1D BA                 DB      186     ;46.5596
0C1E B9                 DB      185     ;46.4874
0C1F B9                 DB      185     ;46.4152
0C20 B9                 DB      185     ;46.3428
0C21 B9                 DB      185     ;46.2703
0C22 B8                 DB      184     ;46.1978
0C23 B8                 DB      184     ;46.125
0C24 B8                 DB      184     ;46.0522
0C25 B7                 DB      183     ;45.9793
0C26 B7                 DB      183     ;45.9062
```

ISIS 8080 MACRO ASSEMBLER, V1.1                          PAGE 2

```
0C27 B7         DB      183     ;45.8331
0C28 B7         DB      183     ;45.7598
0C29 B6         DB      182     ;45.6864
0C2A B6         DB      182     ;45.6128
0C2B B6         DB      182     ;45.5392
0C2C B5         DB      181     ;45.4654
0C2D B5         DB      181     ;45.3916
0C2E B5         DB      181     ;45.3175
0C2F B4         DB      180     ;45.2434
0C30 B4         DB      180     ;45.1692
0C31 B4         DB      180     ;45.0948
0C32 B4         DB      180     ;45.0203
0C33 B3         DB      179     ;44.9457
0C34 B3         DB      179     ;44.871
0C35 B3         DB      179     ;44.7961
0C36 B2         DB      178     ;44.7211
0C37 B2         DB      178     ;44.646
0C38 B2         DB      178     ;44.5708
0C39 B1         DB      177     ;44.4954
0C3A B1         DB      177     ;44.4199
0C3B B1         DB      177     ;44.3443
0C3C B1         DB      177     ;44.2686
0C3D B0         DB      176     ;44.1927
0C3E B0         DB      176     ;44.1166
0C3F B0         DB      176     ;44.0405
0C40 AF         DB      175     ;43.9642
0C41 AF         DB      175     ;43.8878
0C42 AF         DB      175     ;43.8113
0C43 AE         DB      174     ;43.7346
0C44 AE         DB      174     ;43.6578
0C45 AE         DB      174     ;43.5809
0C46 AE         DB      174     ;43.5038
0C47 AD         DB      173     ;43.4266
0C48 AD         DB      173     ;43.3492
0C49 AD         DB      173     ;43.2717
0C4A AC         DB      172     ;43.1941
0C4B AC         DB      172     ;43.1163
0C4C AC         DB      172     ;43.0384
0C4D AB         DB      171     ;42.9603
0C4E AB         DB      171     ;42.8821
0C4F AB         DB      171     ;42.8038
0C50 AA         DB      170     ;42.7253
0C51 AA         DB      170     ;42.6467
0C52 AA         DB      170     ;42.5679
0C53 A9         DB      169     ;42.489
0C54 A9         DB      169     ;42.4099
0C55 A9         DB      169     ;42.3307
0C56 A9         DB      169     ;42.2513
0C57 A8         DB      168     ;42.1718
0C58 A8         DB      168     ;42.0922
```

ISIS 8080 MACRO ASSEMBLER, V1.1                          PAGE 3

```
0C59 A8         DB      168     ;42.0124
0C5A A7         DB      167     ;41.9324
0C5B A7         DB      167     ;41.8523
0C5C A7         DB      167     ;41.772
0C5D A6         DB      166     ;41.6916
0C5E A6         DB      166     ;41.611
0C5F A6         DB      166     ;41.5303
0C60 A5         DB      165     ;41.4494
0C61 A5         DB      165     ;41.3683
0C62 A5         DB      165     ;41.2871
```

| | | | |
|---|---|---|---|
| 0C63 A4 | DB | 164 | ;41.2057 |
| 0C64 A4 | DB | 164 | ;41.1242 |
| 0C65 A4 | DB | 164 | ;41.0425 |
| 0C66 A3 | DB | 163 | ;40.9606 |
| 0C67 A3 | DB | 163 | ;40.8786 |
| 0C68 A3 | DB | 163 | ;40.7964 |
| 0C69 A2 | DB | 162 | ;40.7141 |
| 0C6A A2 | DB | 162 | ;40.6316 |
| 0C6B A2 | DB | 162 | ;40.5489 |
| 0C6C A1 | DB | 161 | ;40.466` |
| 0C6D A1 | DB | 161 | ;40.383 |
| 0C6E A1 | DB | 161 | ;40.2998 |
| 0C6F A0 | DB | 160 | ;40.2164 |
| 0C70 A0 | DB | 160 | ;40.1329 |
| 0C71 A0 | DB | 160 | ;40.0492 |
| 0C72 9F | DB | 159 | ;39.9653 |
| 0C73 9F | DB | 159 | ;39.8812 |
| 0C74 9F | DB | 159 | ;39.797 |
| 0C75 9E | DB | 158 | ;39.7125 |
| 0C76 9E | DB | 158 | ;39.6279 |
| 0C77 9E | DB | 158 | ;39.5431 |
| 0C78 9D | DB | 157 | ;39.4582 |
| 0C79 9D | DB | 157 | ;39.373 |
| 0C7A 9D | DB | 157 | ;39.2877 |
| 0C7B 9C | DB | 156 | ;39.2022 |
| 0C7C 9C | DB | 156 | ;39.1164 |
| 0C7D 9C | DB | 156 | ;39.0306 |
| 0C7E 9B | DB | 155 | ;38.9445 |
| 0C7F 9B | DB | 155 | ;38.8582 |
| 0C80 9B | DB | 155 | ;38.7717 |
| 0C81 9A | DB | 154 | ;38.6851 |
| 0C82 9A | DB | 154 | ;38.5982 |
| 0C83 9A | DB | 154 | ;38.5111 |
| 0C84 99 | DB | 153 | ;38.4239 |
| 0C85 99 | DB | 153 | ;38.3364 |
| 0C86 98 | DB | 152 | ;38.2488 |
| 0C87 98 | DB | 152 | ;38.1609 |
| 0C88 98 | DB | 152 | ;38.0729 |
| 0C89 97 | DB | 151 | ;37.9846 |
| 0C8A 97 | DB | 151 | ;37.8962 |

ISIS 8080 MACRO ASSEMBLER, V1.1                          PAGE 4

| | | | |
|---|---|---|---|
| 0C8B 97 | DB | 151 | ;37.8075 |
| 0C8C 96 | DB | 150 | ;37.7186 |
| 0C8D 96 | DB | 150 | ;37.6295 |
| 0C8E 96 | DB | 150 | ;37.5402 |
| 0C8F 95 | DB | 149 | ;37.4507 |
| 0C90 95 | DB | 149 | ;37.361 |
| 0C91 95 | DB | 149 | ;37.271 |
| 0C92 94 | DB | 148 | ;37.1809 |
| 0C93 94 | DB | 148 | ;37.0905 |
| 0C94 94 | DB | 148 | ;36.9999 |
| 0C95 93 | DB | 147 | ;36.9091 |
| 0C96 93 | DB | 147 | ;36.818 |
| 0C97 92 | DB | 146 | ;36.7268 |
| 0C98 92 | DB | 146 | ;36.6353 |
| 0C99 92 | DB | 146 | ;36.5435 |
| 0C9A 91 | DB | 145 | ;36.4516 |
| 0C9B 91 | DB | 145 | ;36.3594 |
| 0C9C 91 | DB | 145 | ;36.267 |
| 0C9D 90 | DB | 144 | ;36.1743 |
| 0C9E 90 | DB | 144 | ;36.0814 |
| 0C9F 8F | DB | 143 | ;35.9883 |
| 0CA0 8F | DB | 143 | ;35.8949 |
| 0CA1 8F | DB | 143 | ;35.8013 |
| 0CA2 8E | DB | 142 | ;35.7074 |

| | | | | |
|---|---|---|---|---|
| 0CA3 8E | | DB | 142 | ;35.6133 |
| 0CA4 8E | | DB | 142 | ;35.5189 |
| 0CA5 8D | | DB | 141 | ;35.4243 |
| 0CA6 8D | | DB | 141 | ;35.3294 |
| 0CA7 8C | | DB | 140 | ;35.2343 |
| 0CA8 8C | | DB | 140 | ;35.1389 |
| 0CA9 8C | | DB | 140 | ;35.0432 |
| 0CAA 8B | | DB | 139 | ;34.9473 |
| 0CAB 8B | | DB | 139 | ;34.8512 |
| 0CAC 8B | | DB | 139 | ;34.7547 |
| 0CAD 8A | | DB | 138 | ;34.658 |
| 0CAE 8A | | DB | 138 | ;34.561 |
| 0CAF 89 | | DB | 137 | ;34.4638 |
| 0CB0 89 | | DB | 137 | ;34.3663 |
| 0CB1 89 | | DB | 137 | ;34.2685 |
| 0CB2 88 | | DB | 136 | ;34.1704 |
| 0CB3 88 | | DB | 136 | ;34.072 |
| 0CB4 87 | | DB | 135 | ;33.9734 |
| 0CB5 87 | | DB | 135 | ;33.8744 |
| 0CB6 87 | | DB | 135 | ;33.7752 |
| 0CB7 86 | | DB | 134 | ;33.6757 |
| 0CB8 86 | | DB | 134 | ;33.5759 |
| 0CB9 85 | | DB | 133 | ;33.4758 |
| 0CBA 85 | | DB | 133 | ;33.3754 |
| 0CBB 85 | | DB | 133 | ;33.2746 |
| 0CBC 84 | | DB | 132 | ;33.1736 |

ISIS 8080 MACRO ASSEMBLER, V1.1                    PAGE 5

| | | | |
|---|---|---|---|
| 0CBD 84 | DB | 132 | ;33.0723 |
| 0CBE 83 | DB | 131 | ;32.9707 |
| 0CBF 83 | DB | 131 | ;32.8687 |
| 0CC0 83 | DB | 131 | ;32.7664 |
| 0CC1 82 | DB | 130 | ;32.6638 |
| 0CC2 82 | DB | 130 | ;32.5609 |
| 0CC3 81 | DB | 129 | ;32.4577 |
| 0CC4 81 | DB | 129 | ;32.3541 |
| 0CC5 81 | DB | 129 | ;32.2502 |
| 0CC6 80 | DB | 128 | ;32.146 |
| 0CC7 80 | DB | 128 | ;32.0414 |
| 0CC8 7F | DB | 127 | ;31.9365 |
| 0CC9 7F | DB | 127 | ;31.8312 |
| 0CCA 7E | DB | 126 | ;31.7256 |
| 0CCB 7E | DB | 126 | ;31.6196 |
| 0CCC 7E | DB | 126 | ;31.5133 |
| 0CCD 7D | DB | 125 | ;31.4066 |
| 0CCE 7D | DB | 125 | ;31.2996 |
| 0CCF 7C | DB | 124 | ;31.1921 |
| 0CD0 7C | DB | 124 | ;31.0844 |
| 0CD1 7B | DB | 123 | ;30.9762 |
| 0CD2 7B | DB | 123 | ;30.8677 |
| 0CD3 7B | DB | 123 | ;30.7587 |
| 0CD4 7A | DB | 122 | ;30.6494 |
| 0CD5 7A | DB | 122 | ;30.5397 |
| 0CD6 79 | DB | 121 | ;30.4296 |
| 0CD7 79 | DB | 121 | ;30.3191 |
| 0CD8 78 | DB | 120 | ;30.2082 |
| 0CD9 78 | DB | 120 | ;30.0969 |
| 0CDA 77 | DB | 119 | ;29.9852 |
| 0CDB 77 | DB | 119 | ;29.873 |
| 0CDC 77 | DB | 119 | ;29.7605 |
| 0CDD 76 | DB | 118 | ;29.6475 |
| 0CDE 76 | DB | 118 | ;29.5341 |
| 0CDF 75 | DB | 117 | ;29.4202 |
| 0CE0 75 | DB | 117 | ;29.3059 |
| 0CE1 74 | DB | 116 | ;29.1911 |
| 0CE2 74 | DB | 116 | ;29.0759 |

```
0CE3 73          DB      115     ;28.9603
0CE4 73          DB      115     ;28.8441
0CE5 72          DB      114     ;28.7275
0CE6 72          DB      114     ;28.6105
0CE7 71          DB      113     ;28.4929
0CE8 71          DB      113     ;28.3749
0CE9 71          DB      113     ;28.2564
0CEA 70          DB      112     ;28.1373
0CEB 70          DB      112     ;28.0178
0CEC 6F          DB      111     ;27.8977
0CED 6F          DB      111     ;27.7772
0CEE 6E          DB      110     ;27.6561
```

ISIS 8080 MACRO ASSEMBLER, V1.1                    PAGE 6

```
0CEF 6E          DB      110     ;27.5345
0CF0 6D          DB      109     ;27.4123
0CF1 6D          DB      109     ;27.2896
0CF2 6C          DB      108     ;27.1663
0CF3 6C          DB      108     ;27.0425
0CF4 6B          DB      107     ;26.9181
0CF5 6B          DB      107     ;26.7931
0CF6 6A          DB      106     ;26.6675
0CF7 6A          DB      106     ;26.5414
0CF8 69          DB      105     ;26.4146
0CF9 69          DB      105     ;26.2873
0CFA 68          DB      104     ;26.1593
0CFB 68          DB      104     ;26.0307
0CFC 67          DB      103     ;25.9014
0CFD 67          DB      103     ;25.7715
0CFE 66          DB      102     ;25.6409
0CFF 66          DB      102     ;25.5097
0D00 65          DB      101     ;25.3778
0D01 65          DB      101     ;25.3116
0D02 64          DB      100     ;25.2452
0D03 64          DB      100     ;25.1786
0D04 64          DB      100     ;25.1119
0D05 64          DB      100     ;25.045
0D06 63          DB      99      ;24.9779
0D07 63          DB      99      ;24.9106
0D08 63          DB      99      ;24.8431
0D09 63          DB      99      ;24.7755
0D0A 62          DB      98      ;24.7077
0D0B 62          DB      98      ;24.6396
0D0C 62          DB      98      ;24.5714
0D0D 62          DB      98      ;24.503
0D0E 61          DB      97      ;24.4345
0D0F 61          DB      97      ;24.3657
0D10 61          DB      97      ;24.2967
0D11 60          DB      96      ;24.2276
0D12 60          DB      96      ;24.1582
0D13 60          DB      96      ;24.0886
0D14 60          DB      96      ;24.0189
0D15 5F          DB      95      ;23.9489
0D16 5F          DB      95      ;23.8787
0D17 5F          DB      95      ;23.8083
0D18 5E          DB      94      ;23.7377
0D19 5E          DB      94      ;23.6669
0D1A 5E          DB      94      ;23.5959
0D1B 5E          DB      94      ;23.5247
0D1C 5D          DB      93      ;23.4533
0D1D 5D          DB      93      ;23.3816
0D1E 5D          DB      93      ;23.3097
0D1F 5C          DB      92      ;23.2376
0D20 5C          DB      92      ;23.1653
```

ISIS 8080 MACRO ASSEMBLER, V1.1                                PAGE 7

```
0D21 5C          DB      92          ;23.0927
0D22 5C          DB      92          ;23.0199
0D23 5B          DB      91          ;22.9469
0D24 5B          DB      91          ;22.8737
0D25 5B          DB      91          ;22.8002
0D26 5A          DB      90          ;22.7265
0D27 5A          DB      90          ;22.6525
0D28 5A          DB      90          ;22.5783
0D29 5A          DB      90          ;22.5038
0D2A 59          DB      89          ;22.4291
0D2B 59          DB      89          ;22.3542
0D2C 59          DB      89          ;22.279
0D2D 58          DB      88          ;22.2036
0D2E 58          DB      88          ;22.1278
0D2F 58          DB      88          ;22.0519
0D30 57          DB      87          ;21.9756
0D31 57          DB      87          ;21.8991
0D32 57          DB      87          ;21.8224
0D33 56          DB      86          ;21.7453
0D34 56          DB      86          ;21.668.
0D35 56          DB      86          ;21.5905
0D36 56          DB      86          ;21.5126
0D37 55          DB      85          ;21.4344
0D38 55          DB      85          ;21.356
0D39 55          DB      85          ;21.2773
0D3A 54          DB      84          ;21.1982
0D3B 54          DB      84          ;21.1189
0D3C 54          DB      84          ;21.0393
0D3D 53          DB      83          ;20.9594
0D3E 53          DB      83          ;20.8792
0D3F 53          DB      83          ;20.7987
0D40 52          DB      82          ;20.7178
0D41 52          DB      82          ;20.6367
0D42 52          DB      82          ;20.5552
0D43 51          DB      81          ;20.4734
0D44 51          DB      81          ;20.3912
0D45 51          DB      81          ;20.3088
0D46 50          DB      80          ;20.226
0D47 50          DB      80          ;20.1428
0D48 50          DB      80          ;20.0594
0D49 4F          DB      79          ;19.9755
0D4A 4F          DB      79          ;19.8913
0D4B 4F          DB      79          ;19.8068
0D4C 4E          DB      78          ;19.7219
0D4D 4E          DB      78          ;19.6366
0D4E 4E          DB      78          ;19.551
0D4F 4D          DB      77          ;19.4649
0D50 4D          DB      77          ;19.3785
0D51 4D          DB      77          ;19.2917
0D52 4C          DB      76          ;19.2045
```

ISIS 8080 MACRO ASSEMBLER, V1.1                                PAGE 8

```
0D53 4C          DB      76          ;19.117
0D54 4C          DB      76          ;19.029
0D55 4B          DB      75          ;18.9406
0D56 4B          DB      75          ;18.8518
0D57 4B          DB      75          ;18.7625
0D58 4A          DB      74          ;18.6729
0D59 4A          DB      74          ;18.5828
0D5A 49          DB      73          ;18.4923
0D5B 49          DB      73          ;18.4013
0D5C 49          DB      73          ;18.3099
```

```
0D5D  48              DB     72         ;18.218
0D5E  48              DB     72         ;18.1256
0D5F  48              DB     72         ;18.0328
0D60  47              DB     71         ;17.9395
0D61  47              DB     71         ;17.8457
0D62  47              DB     71         ;17.7514
0D63  46              DB     70         ;17.6567
0D64  46              DB     70         ;17.5613
0D65  45              DB     69         ;17.4655
0D66  45              DB     69         ;17.3692
0D67  45              DB     69         ;17.2723
0D68  44              DB     68         ;17.1749
0D69  44              DB     68         ;17.0769
0D6A  43              DB     67         ;16.9783
0D6B  43              DB     67         ;16.8792
0D6C  43              DB     67         ;16.7795
0D6D  42              DB     66         ;16.6792
0D6E  42              DB     66         ;16.5782
0D6F  41              DB     65         ;16.4767
0D70  41              DB     65         ;16.3745
0D71  41              DB     65         ;16.2717
0D72  40              DB     64         ;16.1683
0D73  40              DB     64         ;16.0641
0D74  3F              DB     63         ;15.9593
0D75  3F              DB     63         ;15.8538
0D76  3E              DB     62         ;15.7476
0D77  3E              DB     62         ;15.6407
0D78  3E              DB     62         ;15.533
0D79  3D              DB     61         ;15.4246
0D7A  3D              DB     61         ;15.3154
0D7B  3C              DB     60         ;15.2055
0D7C  3C              DB     60         ;15.0947
0D7D  3B              DB     59         ;14.9831
0D7E  3B              DB     59         ;14.8707
0D7F  3B              DB     59         ;14.7574
0D80  3A              DB     58         ;14.6432
0D81  3A              DB     58         ;14.5858
0D82  3A              DB     58         ;14.5282
0D83  39              DB     57         ;14.4703
0D84  39              DB     57         ;14.4122
```

ISIS 8080 MACRO ASSEMBLER, V1.1                              PAGE 9

```
0D85  39              DB     57         ;14.3539
0D86  39              DB     57         ;14.2953
0D87  38              DB     56         ;14.2365
0D88  38              DB     56         ;14.1774
0D89  38              DB     56         ;14.1181
0D8A  38              DB     56         ;14.0586
0D8B  37              DB     55         ;13.9987
0D8C  37              DB     55         ;13.9387
0D8D  37              DB     55         ;13.8783
0D8E  37              DB     55         ;13.8178
0D8F  37              DB     55         ;13.7569
0D90  36              DB     54         ;13.6958
0D91  36              DB     54         ;13.6344
0D92  36              DB     54         ;13.5727
0D93  36              DB     54         ;13.5107
0D94  35              DB     53         ;13.4485
0D95  35              DB     53         ;13.3859
0D96  35              DB     53         ;13.3231
0D97  35              DB     53         ;13.26
0D98  34              DB     52         ;13.1965
0D99  34              DB     52         ;13.1328
0D9A  34              DB     52         ;13.0688
0D9B  34              DB     52         ;13.0044
0D9C  33              DB     51         ;12.9397
```

| | | | |
|---|---|---|---|
| 0D9D 33 | DB | 51 | ;12.8747 |
| 0D9E 33 | DB | 51 | ;12.8094 |
| 0D9F 32 | DB | 50 | ;12.7437 |
| 0DA0 32 | DB | 50 | ;12.6777 |
| 0DA1 32 | DB | 50 | ;12.6113 |
| 0DA2 32 | DB | 50 | ;12.5446 |
| 0DA3 31 | DB | 49 | ;12.4775 |
| 0DA4 31 | DB | 49 | ;12.4101 |
| 0DA5 31 | DB | 49 | ;12.3423 |
| 0DA6 31 | DB | 49 | ;12.2741 |
| 0DA7 30 | DB | 48 | ;12.2056 |
| 0DA8 30 | DB | 48 | ;12.1366 |
| 0DA9 30 | DB | 48 | ;12.0673 |
| 0DAA 2F | DB | 47 | ;11.9976 |
| 0DAB 2F | DB | 47 | ;11.9274 |
| 0DAC 2F | DB | 47 | ;11.8569 |
| 0DAD 2F | DB | 47 | ;11.7859 |
| 0DAE 2E | DB | 46 | ;11.7145 |
| 0DAF 2E | DB | 46 | ;11.6426 |
| 0DB0 2E | DB | 46 | ;11.5704 |
| 0DB1 2D | DB | 45 | ;11.4976 |
| 0DB2 2D | DB | 45 | ;11.4244 |
| 0DB3 2D | DB | 45 | ;11.3507 |
| 0DB4 2D | DB | 45 | ;11.2765 |
| 0DB5 2C | DB | 44 | ;11.2019 |
| 0DB6 2C | DB | 44 | ;11.1267 |

ISIS 8080 MACRO ASSEMBLER, V1.1                          PAGE 10

| | | | |
|---|---|---|---|
| 0DB7 2C | DB | 44 | ;11.0511 |
| 0DB8 2B | DB | 43 | ;10.9749 |
| 0DB9 2B | DB | 43 | ;10.8981 |
| 0DBA 2B | DB | 43 | ;10.8209 |
| 0DBB 2A | DB | 42 | ;10.7431 |
| 0DBC 2A | DB | 42 | ;10.6647 |
| 0DBD 2A | DB | 42 | ;10.5857 |
| 0DBE 2A | DB | 42 | ;10.5061 |
| 0DBF 29 | DB | 41 | ;10.426 |
| 0DC0 29 | DB | 41 | ;10.3452 |
| 0DC1 29 | DB | 41 | ;10.2637 |
| 0DC2 28 | DB | 40 | ;10.1817 |
| 0DC3 28 | DB | 40 | ;10.0989 |
| 0DC4 28 | DB | 40 | ;10.0155 |
| 0DC5 27 | DB | 39 | ;9.93135 |
| 0DC6 27 | DB | 39 | ;9.84651 |
| 0DC7 27 | DB | 39 | ;9.76092 |
| 0DC8 26 | DB | 38 | ;9.67457 |
| 0DC9 26 | DB | 38 | ;9.58745 |
| 0DCA 25 | DB | 37 | ;9.49953 |
| 0DCB 25 | DB | 37 | ;9.41079 |
| 0DCC 25 | DB | 37 | ;9.3212 |
| 0DCD 24 | DB | 36 | ;9.23074 |
| 0DCE 24 | DB | 36 | ;9.13939 |
| 0DCF 24 | DB | 36 | ;9.04711 |
| 0DD0 23 | DB | 35 | ;8.95389 |
| 0DD1 23 | DB | 35 | ;8.85968 |
| 0DD2 23 | DB | 35 | ;8.76446 |
| 0DD3 22 | DB | 34 | ;8.6682 |
| 0DD4 22 | DB | 34 | ;8.57085 |
| 0DD5 21 | DB | 33 | ;8.47239 |
| 0DD6 21 | DB | 33 | ;8.37276 |
| 0DD7 21 | DB | 33 | ;8.27194 |
| 0DD8 20 | DB | 32 | ;8.16988 |
| 0DD9 20 | DB | 32 | ;8.06652 |
| 0DDA 1F | DB | 31 | ;7.96182 |
| 0DDB 1F | DB | 31 | ;7.85573 |
| 0DDC 1E | DB | 30 | ;7.74818 |

```
0DDD  1E                    DB      30        ;7.63912
0DDE  1E                    DB      30        ;7.52848
0DDF  1D                    DB      29        ;7.41619
0DE0  1D                    DB      29        ;7.30217
0DE1  1C                    DB      28        ;7.18634
0DE2  1C                    DB      28        ;7.06862
0DE3  1B                    DB      27        ;6.9489
0DE4  1B                    DB      27        ;6.82708
0DE5  1A                    DB      26        ;6.70305
0DE6  1A                    DB      26        ;6.57668
0DE7  19                    DB      25        ;6.44784
0DE8  19                    DB      25        ;6.31636
```

ISIS 8080 MACRO ASSEMBLER, V1.1                    PAGE 11

```
0DE9  18                    DB      24        ;6.18209
0DEA  18                    DB      24        ;6.04484
0DEB  17                    DB      23        ;5.9044
0DEC  17                    DB      23        ;5.76054
0DED  16                    DB      22        ;5.61299
0DEE  15                    DB      21        ;5.46146
0DEF  15                    DB      21        ;5.3056
0DF0  14                    DB      20        ;5.14502
0DF1  13                    DB      19        ;4.97926
0DF2  13                    DB      19        ;4.8078
0DF3  12                    DB      18        ;4.62998
0DF4  11                    DB      17        ;4.44506
0DF5  11                    DB      17        ;4.25211
0DF6  10                    DB      16        ;4.04997
0DF7  0F                    DB      15        ;3.83721
0DF8  0E                    DB      14        ;3.61192
0DF9  0D                    DB      13        ;3.37162
0DFA  0C                    DB      12        ;3.11283
0DFB  0B                    DB      11        ;2.83047
0DFC  0A                    DB      10        ;2.51662
0DFD  08                    DB      8         ;2.1576
0DFE  06                    DB      6         ;1.72542
0DFF  04                    DB      4         ;1.1397
0000                        END
```

ISIS 8080 MACRO ASSEMBLER, V1.1                    PAGE 12

PROF2 0C00

ISIS 8080 MACRO ASSEMBLER, V1.1                    PAGE 1
SPEED CONTROL PROGRAM

```
                   ;        JAN 24,1978 SUB 0
                   ;        MAY 17, 1978 SUB 7

;RELOCATED

TITLE   "SPEED CONTROL PROGRAM"
1000                        ORG     1000H
1000 F3                     DI
1001 DB74                   IN      74H       ;CHECK ROLLBACK
1003 E602                   ANI     02H
1005 C28411                 JNZ     SM1       ;ROLLBACK
1008 3AF50E                 LDA     ACTSP     ;TEST FOR OVERSPEED
```

```
100B 47                    MOV    B,A
100C 3A0D0E                LDA    VELSC
100F 90                    SUB    B
1010 DA2B10                JC     OVSP    ; IN OVERSPEED
1013 CA2B10                JZ     OVSP    ;    "
1016 78                    MOV    A,B     ; GET ACTUAL SPEED
1017 B7                    ORA    A       ; SPEED = 0
1018 C23010                JNZ    BEGIN   ; NO
101B 3AF90E                LDA    OUT61   ; START UP
101E E610                  ANI    10H
1020 CA3010                JZ     BEGIN   ; YES
1023 3E99                  MVI    A,153   ; SET PSIG = 60 MA
1025 320F0E                STA    PSIG
1028 C33010                JMP    BEGIN 102B 3E99      OVSP:       MVI    A,153   ; SET PSIG1 = 60 MA
102D C38611                JMP    SM1A 1030 00        BEGIN:      NOP
1031 00                    NOP
1032 00                    NOP
1033 00                    NOP
1034 00                    NOP
1035 00                    NOP
1036 3A0D0E                LDA    VELAC
1039 B7                    ORA    A       ; ZERO SPEED COMMAND ?
103A CA8411                JZ     SM1     ; YES
103D 47                    MOV    B,A
103E 3A5E0E                LDA    PSFG1   ; IN PROG STOP ?
1041 B7                    ORA    A
1042 CA4C10                JZ     BGN2    ; NO
1045 3A090E                LDA    VELPS   ; YES, GET PROG STOP VELOCITY
1048 47                    MOV    B,A
1049 C37410                JMP    SMPS    ; GO TO PROG STOP 104C 3A0F0E    BGN2:       LDA    PSIG
104F D6AD                  SUI    173     ; TEMP=PSIG - 68 MA
```

ISIS 8080 MACRO ASSEMBLER, V1.1                     PAGE 2
SPEED CONTROL PROGRAM

```
1051 F25510                JP     BGN3
1054 AF                    XRA    A
1055 1F        BGN3:       RAR            ; TEMP=1/8 TEMP
1056 1F                    RAR
1057 1F                    RAR
1058 00                    NOP
1059 00                    NOP
105A 00                    NOP
105B 00                    NOP
105C E61F                  ANI    1FH
105E 4F                    MOV    C,A
105F 3AF50E                LDA    ACTSP   ; TEMP=ACTSP+TEMP
1062 81                    ADD    C
1063 4F                    MOV    C,A
1064 3A360E                LDA    VELLA   ; ACT SPEED+TEMP > VELLA ?
1067 91                    SUB    C
1068 D28210                JNC    BGN1    ; NO, GO TO SPEED MAINT.
106B 3EFF                  MVI    A,0FFH  ; YES, TO TO PROG STOP
106D 325E0E                STA    PSFG1
1070 3A090E                LDA    VELPS
1073 47                    MOV    B,A
1074 3AF50E    SMPS:       LDA    ACTSP
1077 C614                  ADI    20
1079 B8                    CMP    B       ; ACTSP+10KPH < VELPS ?
107A 78                    MOV    A,B
107B D2F310                JNC    SM2     ; NO, CONTINUE PROG STOP
107E 3A0D0E                LDA    VELAC   ; YES, GO TO SPEED MAINT.
```

```
1081 47              MOV    B,A
1082 78       BGN1:  MOV    A,B     ;SPEED MAINT.
1083 D605            SUI    05
1085 47              MOV    B,A
1086 AF              XRA    A
1087 325E0E          STA    PSFG1   ;CLEAR PROG STOP FLAGS
108A 325B0E          STA    PSFLG
108D 3AF50E          LDA    ACTSP
1090 B8              CMP    B       ;TACH > VELAC-2KPH ?
1091 D2D410          JNC    SM3     ;YES, GO TO BRAKE MODE
1094 C603            ADI    03
1096 B8              CMP    B       ;TACH < VELAC-4KPH
1097 D2BD10          JNC    SM4     ;NO, LEAVE MODE AS IS
109A 78       SM5:   MOV    A,B     ;POWER MODE
109B D603            SUI    03      ;SET REF = VELAC-4KPH
109D 47              MOV    B,A
109E 3AF90E          LDA    OUT61
10A1 E6DF            ANI    0DFH    ;SET POWER MODE
10A3 32F90E          STA    OUT61
10A6 FB              EI
10A7 3E80            MVI    A,80H   ;STORE GAIN CONSTANTS
10A9 32500E          STA    K1
10AC 3E10            MVI    A,16
```

ISIS 8080 MACRO ASSEMBLER, V1.1                      PAGE 3
SPEED CONTROL PROGRAM

```
10AE 32510E          STA    K2
10B1 3E00            MVI    A,0
10B3 32520E          STA    K3
10B6 AF              XRA    A
10B7 325B0E          STA    PSFLG
10BA C3A211          JMP    CONTL   ;GO TO CONTROL ROUTINE

10BD FB       SM4:   EI             ;LEAVE MODE AS IS
10BE 3AF90E          LDA    OUT61   ;IN BRAKE ?
10C1 E620            ANI    20H
10C3 C2CD10          JNZ    SM6     ;YES
10C6 78              MOV    A,B     ;IN POWER
10C7 D603            SUI    03      ;SET REF = VELAC-4KPH
10C9 47              MOV    B,A
10CA C3A211          JMP    CONTL

10CD 78       SM6:   MOV    A,B     ;IN BRAKE
10CE C601            ADI    01      ;SET REF = VELAC-2KPH
10D0 47              MOV    B,A
10D1 C3A211          JMP    CONTL

10D4 78       SM3:   MOV    A,B     ;IN BRAKE
10D5 C601            ADI    01      ;SET REF = VELAC-2KPH
10D7 47              MOV    B,A
10D8 3AF90E          LDA    OUT61
10DB F620            ORI    20H     ;SET BRAKE MODE
10DD 32F90E          STA    OUT61
10E0 FB              EI
10E1 3E80            MVI    A,80H   ;STORE GAIN CONSTANTS
10E3 32500E          STA    K1
10E6 3E10            MVI    A,16
10E8 32510E          STA    K2
10EB 3E00            MVI    A,0
10ED 32520E          STA    K3
10F0 C3A211          JMP    CONTL   ;GO TO CONTROL ROUTINE

10F3 47       SM2:   MOV    B,A     ;IN PROG STOP
10F4 3AF60E          LDA    IN73
10F7 E660            ANI    60H
10F9 D660            SUI    60H     ;CUT OUT CAR ?
10FB CA0011          JZ     COC1    ;NO
```

```
10FE 3EFF            MVI    A,0FFH   ;YES, SET FLAG
1100 5F      COC1:   MOV    E,A
1101 FB              EI
1102 7B              MOV    A,E
1103 B7              ORA    A        ;CUT OUT CAR ?
1104 C20D11          JNZ    SM2D     ;YES
1107 78              MOV    A,B
1108 FE11            CPI    17       ;VELPS < 8.5KPH ?
110A DA4F11          JC     SM2A     ;YES
```

ISIS 8080 MACRO ASSEMBLER, V1.1                      PAGE 4
SPEED CONTROL PROGRAM

```
110D 78      SM2D:   MOV    A,B
110E FE0A            CPI    10       ;VELPS < 5KPH ?
1110 DA4F11          JC     SM2A     ;YES
1113 3A5B0E          LDA    PSFLG    ;IN PROG STOP BEFORE ?
1116 B7              ORA    A
1117 C2A211          JNZ    CONTL    ;YES, GO TO CONTROL ROUTINE
111A 3EA0            MVI    A,0A0H   ;NO, SET GAIN CONSTANTS
111C 32500E          STA    K1
111F 3E08            MVI    A,8
1121 32510E          STA    K2
1124 3AF50E          LDA    ACTSP    ;K3= TACH/2 + 40
1127 00              NOP
1128 00              NOP
1129 00              NOP
112A 1F              RAR
112B E67F            ANI    07FH
112D C628            ADI    40
112F 4F              MOV    C,A
1130 32500E          STA    K3TMP
1133 7B              MOV    A,E      ;CUT OUT CAR ?
1134 B7              ORA    A
1135 CA3D11          JZ     SM2B     ;NO
1138 79              MOV    A,C      ;YES, SET K3= 1/2 K3
1139 1F              RAR
113A E67F            ANI    7FH
113C 4F              MOV    C,A
113D 79      SM2B:   MOV    A,C
113E 32520E          STA    K3
1141 210000          LXI    H,0      ;RESET INTEGRAL PORTION
1144 22540E          SHLD   PI
1147 3EFF            MVI    A,0FFH   ;SET IN PROG STOP BEFORE
1149 325B0E          STA    PSFLG
114C C3A211          JMP    CONTL    ;GO TO CONTROL ROUTINE

;LOW SPEED FLARE OUT 114F 1601    SM2A:   MVI    D,01
1151 7B              MOV    A,E      ;CUT OUT CAR ?
1152 B7              ORA    A
1153 C25811          JNZ    SM2A2    ;YES, LEAVE TEMP=1
1156 1602            MVI    D,02     ;NO, SET TEMP=2
1158 3A5D0E  SM2A2:  LDA    K3TMP
115B 92              SUB    D        ;K3= K3 - TEMP
115C F26011          JP     SM2A1    ;K3 < 0 ?
115F AF              XRA    A        ;YES, HOLD AT 0
1160 32500E  SM2A1:  STA    K3TMP
1163 4F              MOV    C,A
1164 3AF60E          LDA    IN73     ;IN CUT OUT CAR ?
1167 E660            ANI    60H
1169 FE60            CPI    60H
```

ISIS 8080 MACRO ASSEMBLER, V1.1                PAGE 5
SPEED CONTROL PROGRAM

```
116B CA7311              JZ      SM2C        ;NO
116E 79                  MOV     A,C         ;YES
116F 1F                  RAR                 ;SET K3 = 1/2 K3
1170 E67F                ANI     7FH
1172 4F                  MOV     C,A
1173 79         SM2C:    MOV     A,C
1174 32520E              STA     K3
1177 3EC0                MVI     A,0C0H      ;SET K1,K2
1179 32500E              STA     K1
117C 3E08                MVI     A,8
117E 32510E              STA     K2
1181 C3A211              JMP     CONTL 1184 3E33       SM1:     MVI     A,51        ;TEMP = 20 MA
1186 32530E     SM1A:    STA     PSIG1       ;PSIG1 = TEMP
1189 AF                  XRA     A           ;CLEAR PROG STOP FLAGS
118A 32B0E               STA     PSFLG
118D 325E0E              STA     PSFG1
1190 210000              LXI     H,0         ;SET INTEGRATOR = 0
1193 22540E              SHLD    PI
1196 3AF90E              LDA     OUT61       ;SET BRAKE MODE
1199 E6DF                ANI     0DFH
119B 32F90E              STA     OUT61
119E FB                  EI
119F C30A13              JMP     JEK         ;GO TO JERK LIMITER

;CONTROL ROUTINE

11A2 3AF50E     CONTL:   LDA     ACTSP
11A5 4F                  MOV     C,A
11A6 78                  MOV     A,B
11A7 91                  SUB     C
11A8 00                  NOP
11A9 00                  NOP
11AA 325C0E              STA     SPDER
11AD 79                  MOV     A,C         ;REF < TACH ?
11AE B8                  CMP     B
11AF DABC11              JC      CNTL1       ;NO
11B2 3E00                MVI     A,00        ;YES, SET OVER
11B4 32580E              STA     UNDER
11B7 79                  MOV     A,C         ;SE = TACH - REF
11B8 90                  SUB     B
11B9 C3C311              JMP     CNTL2

11BC 3EFF       CNTL1:   MVI     A,0FFH      ;SET UNDER
11BE 32580E              STA     UNDER
11C1 78                  MOV     A,B         ;SE = REF - TACH
11C2 91                  SUB     C

11C3 FE0F       CNTL2:   CPI     15          ;SE > 15 ?
```

ISIS 8080 MACRO ASSEMBLER, V1.1                PAGE 6
SPEED CONTROL PROGRAM

```
11C5 DACA11              JC      CNTL3       ;NO
11C8 3E0F                MVI     A,15        ;YES, SE = 15
11CA 47         CNTL3:   MOV     B,A         ;TEMP= 16*SE
11CB 17                  RAL
11CC 17                  RAL
11CD 17                  RAL
11CE 17                  RAL
11CF E6F0                ANI     0F0H
11D1 5F                  MOV     E,A
11D2 3A500E              LDA     K1          ;PP = K1*16*SE
```

```
11D5 CD4213           CALL    MULT
11D8 7C               MOV     A,H
11D9 FE66             CPI     102      ;PP > 102 ?
11DB DAE011           JC      CNTL4    ;NO
11DE 3E66             MVI     A,102    ;YES, PP = 102
11E0 32590E   CNTL4:  STA     PP
11E3 58               MOV     E,B      ;PI1 = K2*SE
11E4 3A510E           LDA     K2
11E7 CD4213           CALL    MULT
11EA 22560E           SHLD    PI1
11ED 3A580E           LDA     UNDER    ;UNDERSPEED ?
11F0 B7               ORA     A
11F1 CA2A12           JZ      OVER     ;NO

11F4 3A590E   UNSP:   LDA     PP       ;UNDERSPEED
11F7 47               MOV     B,A
11F8 3E66             MVI     A,102    ;PIMAX = 102 - PP
11FA 90               SUB     B
11FB 325A0E           STA     PIMAX
11FE 2A540E           LHLD    PI       ;PI = PI + PI1
1201 EB               XCHG
1202 2A560E           LHLD    PI1
1205 19               DAD     D
1206 7C               MOV     A,H
1207 B7               ORA     A
1208 FA1512           JM      UNSP2    ;PI NEGATIVE, PIMAX NOT USED
120B 00               NOP
120C 67       UNSP1:  MOV     H,A      ;PI > PIMAX ?
120D 3A5A0E           LDA     PIMAX
1210 BC               CMP     H
1211 DA1512           JC      UNSP2    ;YES, SET PI = PIMAX
1214 7C               MOV     A,H      ;NO, LEAVE PI AS IS
1215 67       UNSP2:  MOV     H,A
1216 22540E           SHLD    PI
1219 C699             ADI     153      ;PSIG1 = 153+PP+PI-K3
121B 47               MOV     B,A
121C 3A590E           LDA     PP
121F 80               ADD     B
1220 47               MOV     B,A
1221 3A520E           LDA     K3
```

ISIS 8080 MACRO ASSEMBLER, V1.1                 PAGE 7
SPEED CONTROL PROGRAM

```
1224 4F               MOV     C,A
1225 78               MOV     A,B
1226 91               SUB     C
1227 C38A12           JMP     DONE 122A 3A590E   OVER:   LDA     PP       ;PIMAX = 102-PP-K3
122D 47               MOV     B,A
122E 3A520E           LDA     K3
1231 4F               MOV     C,A
1232 3E66             MVI     A,102
1234 91               SUB     C
1235 90               SUB     B
1236 D23B12           JNC     OVER1    ;PIMAX >= 0
1239 3E00             MVI     A,0      ;PIMAX = 0
123B 325A0E   OVER1:  STA     PIMAX
123E 2A560E           LHLD    PI1      ;PI = PI - PI1
1241 EB               XCHG
1242 2A540E           LHLD    PI
1245 7D               MOV     A,L
1246 93               SUB     E
1247 6F               MOV     L,A
1248 7C               MOV     A,H
1249 9A               SBB     D
124A 67               MOV     H,A
```

```
124B 7C              MOV    A,H
124C B7              ORA    A
124D F26212          JP     OVER3    ;PI POSITIVE, PIMAX NOT USED
1250 2F              CMA
1251 3C              INR    A
1252 57              MOV    D,A
1253 3A5A0E          LDA    PIMAX    ;!PI! > PIMAX ?
1256 BA              CMP    D
1257 D25B12          JNC    OVER5    ;NO
125A 57              MOV    D,A      ;YES, SET PI = -PIMAX
125B 7A      OVER5:  MOV    A,D
125C 3D              DCR    A
125D F26112          JP     OVER6
1260 AF              XRA    A
1261 2F      OVER6:  CMA
1262 67      OVER3:  MOV    H,A      ;PSIG1 = 153-PP+PI-K3
1263 22540E          SHLD   PI
1266 3A590E          LDA    PP
1269 47              MOV    B,A
126A 3A550E          LDA    PI+1
126D 4F              MOV    C,A
126E 3A520E          LDA    K3
1271 57              MOV    D,A
1272 3E99            MVI    A,153
1274 92              SUB    D
1275 81              ADD    C
```

ISIS 8080 MACRO ASSEMBLER, V1.1                    PAGE 8
SPEED CONTROL PROGRAM

```
1276 B7              ORA    A
1277 00              NOP
1278 00              NOP
1279 90              SUB    B
127A DA8512          JC     OVER4    ;PSIG1 < 0
127D FE33            CPI    51
127F DA8512          JC     OVER4    ;PSIG1 < 20 MA
1282 C38A12          JMP    DONE 1285 3E33    OVER4:  MVI    A,51     ;SET PSIG1 = 20 MA
1287 C38A12          JMP    DONE 128A 47      DONE:   MOV    B,A
128B 3A5E0E          LDA    PSFG1    ;IN PROG STOP ?
128E B7              ORA    A
128F CABD12          JZ     DONE1    ;NO
1292 78              MOV    A,B      ;YES
1293 32530E          STA    PSIG1
1296 FEA0            CPI    160      ;PSIG > 60 MA
1298 D2A312          JNC    DONPR    ;YES, SET POWER
129B FE93            CPI    147      ;PSIG < 57 MA ?
129D DAB012          JC     DONBR    ;YES, SET BRAKE
12A0 C30A13          JMP    JEK

12A3 F3      DONPR:  DI              ;SET POWER
12A4 3AF90E          LDA    OUT61
12A7 E6DF            ANI    0DFH
12A9 32F90E          STA    OUT61
12AC FB              EI
12AD C30A13          JMP    JEK

12B0 F3      DONBR:  DI              ;SET BRAKE
12B1 3AF90E          LDA    OUT61
12B4 F620            ORI    20H
12B6 32F90E          STA    OUT61
12B9 FB              EI
12BA C30A13          JMP    JEK
```

```
12BD 3AF90E    DONE1:  LDA     OUT61           ; IN POWER ?
12C0 E620              ANI     20H
12C2 C2F912            JNZ     BRK             ; NO

12C5 78        PWR:    MOV     A,B             ; IN POWER
12C6 FE99              CPI     153             ; PSIG1 < 60 MA ?
12C8 D2D312            JNC     PWR1            ; NO
12CB 210000            LXI     H,0             ; YES, RESET PI
12CE 22540E            SHLD    PI
12D1 3E99              MVI     A,153           ; SET PSIG1 = 60 MA
12D3 47        PWR1:   MOV     B,A
12D4 3A0E0E            LDA     PMACC           ; 1/2 ACC. LIMIT ?
```

ISIS 8080 MACRO ASSEMBLER, V1.1                    PAGE 9
SPEED CONTROL PROGRAM

```
12D7 B7                ORA     A
12D8 00                NOP
12D9 CAF212            JZ      PWR2            ; NO
12DC 78                MOV     A,B             ; YES, PSIG1 > 82 MA ?
12DD FEDC              CPI     220
12DF DAF212            JC      PWR2            ; NO
12E2 3A550E            LDA     PI+1            ; YES
12E5 B7                ORA     A               ; PI > 0 ?
12E6 CAF012            JZ      PWR3            ; NO
12E9 FAF012            JM      PWR3
12EC 3D                DCR     A               ; YES, PI = PI - 1
12ED 32550E            STA     PI+1
12F0 06DC      PWR3:   MVI     B,220           ; HOLD PSIG1 = 82 MA
12F2 78        PWR2:   MOV     A,B
12F3 32530E            STA     PSIG1
12F6 C30A13            JMP     JEK

12F9 78        BRK:    MOV     A,B             ; IN BRAKE
12FA FE99              CPI     153             ; PSIG > 60 MA ?
12FC DA0713            JC      BRK1            ; NO
12FF 210000            LXI     H,0             ; YES, RESET PI
1302 22540E            SHLD    PI
1305 3E99              MVI     A,153           ; HOLD PSIG1=60 MA
1307 32530E    BRK1:   STA     PSIG1

; JERK LIMITER ROUTINE 130A 3A0F0E    JEK:    LDA     PSIG
130D 47                MOV     B,A
130E 3A530E            LDA     PSIG1           ; PSIG1 < PSIG ?
1311 90                SUB     B
1312 DA2013            JC      JEK1            ; YES
1315 FE06              CPI     6               ; DIFF > 6 ?
1317 DA1C13            JC      JEK2            ; NO
131A 3E06              MVI     A,6             ; YES, SET DIFF = 6
131C 80        JEK2:   ADD     B               ; PSIG = PSIG + DIFF
131D C32C13            JMP     JEK4

1320 2F        JEK1:   CMA                     ; PSIG1 < PSIG
1321 3C                INR     A
1322 FE06              CPI     6               ; DIFF > 6 ?
1324 DA2913            JC      JEK3            ; NO
1327 3E06              MVI     A,6             ; YES, SET DIFF = 6
1329 4F        JEK3:   MOV     C,A
132A 78                MOV     A,B
132B 91                SUB     C
132C 320F0E    JEK4:   STA     PSIG            ; OUTPUT P-SIGNAL
132F D364              OUT     64H
1331 3AF90E            LDA     OUT61           ; OUTPUT MODE TO CONTROL BRK-SIG GEN
```

```
ISIS 8080 MACRO ASSEMBLER, V1.1                              PAGE 10
SPEED CONTROL PROGRAM 1334 2F              CMA
 1335 D361            OUT     61H 1337 00              NOP
 1338 00              NOP
 1339 00              NOP
 133A 00              NOP
 133B 00              NOP
 133C 00              NOP

133D C1              POP     B
 133E D1              POP     D
 133F E1              POP     H
 1340 F1              POP     PSW
 1341 C9              RET

; MULTIPLY SUBROUTINE
                      ;       (A)*(E)=(H,L)
                      ;       A,C,D,E,H,L REGS USED 1342 210000  MULT:   LXI     H,0
 1345 1600            MVI     D,0
 1347 0E08            MVI     C,8
 1349 1F      MUL1:   RAR
 134A D24E13          JNC     MUL2
 134D 19              DAD     D
 134E EB      MUL2:   XCHG
 134F 29              DAD     H
 1350 EB              XCHG
 1351 0D              DCR     C
 1352 C8              RZ
 1353 C34913          JMP     MUL1

0E50                 ORG     0E50H
 0E50 00      K1:     DB      0       ; PROP GAIN CONSTANT
 0E51 00      K2:     DB      0       ; INTEGRAL GAIN CONSTANT
 0E52 00      K3:     DB      0       ; OFFSET CONSTANT
 0E53 00      PSIG1:  DB      0       ; PSIG BEFORE JERK LIMIT
 0E54 0000    PI:     DW      0       ; INTEGRAL PART
 0E56 0000    PI1:    DW      0       ; DELTA INTEGRAL PART
 0E58 00      UNDER:  DB      0       ; TACH < REF FLAG
 0E59 00      PP:     DB      0       ; PROP PART
 0E5A 00      PIMAX:  DB      0       ; LIMIT ON INTEGRAL
 0E5B 00      PSFLG:  DB      0       ; IN PROG STOP BEFORE
 0E5C 00      SPDER:  DB      0
 0E5D 00      K3TMP:  DB      0
 0E5E 00      PSFG1:  DB      0       ; IN PROG STOP

0EF9         OUT61   EQU     0EF9H   ; BIT 5 = BRK-SIG CONTROL
 0E0C         VELRF   EQU     0E0CH

ISIS 8080 MACRO ASSEMBLER, V1.1                              PAGE 11
SPEED CONTROL PROGRAM

0E09         VELPS   EQU     0E09H   ; PROG STOP SPEED
 0E36         VELLA   EQU     0E36H   ; PROG STOP LOOK AHEAD
 0E0E         PMACC   EQU     0E0EH   ; 1/2 ACC LIMIT
 0E0F         PSIG    EQU     0E0FH   ; PSIG AFTER JERK LIMIT
 0EF5         ACTSP   EQU     0EF5H   ; TACH
 0E0D         VELAC   EQU     0E0DH   ; LESSER OF SPEED COMM., PM SPEED
 0E0D         VELSC   EQU     0E0DH
 0EF6         IN73    EQU     0EF6H   ; CUT OUT CAR DATA

0000                 END
```

ISIS 8080 MACRO ASSEMBLER, V1.1   PAGE 12
SPEED CONTROL PROGRAM

| | | | |
|---|---|---|---|
| ACTSP 0EF5 | BEGIN 1030 | BGN1 1082 | BGN2 104C |
| BGN3 1055 | BRK 12F9 | BRK1 1307 | CNTL1 11BC |
| CNTL2 11C3 | CNTL3 11CA | CNTL4 11E0 | COC1 1100 |
| CONTL 11A2 | DONBR 12B0 | DONE 128A | DONE1 12BD |
| DONPR 12A3 | IN73 0EF6 | JEK 130A | JEK1 1320 |
| JEK2 131C | JEK3 1329 | JEK4 132C | K1 0E50 |
| K2 0E51 | K3 0E52 | K3TMP 0E5D | MUL1 1349 |
| MUL2 134E | MULT 1342 | OUT61 0EF9 | OVER 122A |
| OVER1 123B | OVER3 1262 | OVER4 1285 | OVER5 125B |
| OVER6 1261 | OVSP 102B | PI 0E54 | PI1 0E56 |
| PIMAX 0E5A | PMACC 0E0E | PP 0E59 | PSFG1 0E5E |
| PSFLG 0E5B | PSIG 0E0F | PSIG1 0E53 | PWR 12C5 |
| PWR1 12D3 | PWR2 12F2 | PWR3 12F0 | SM1 1184 |
| SM1A 1186 | SM2 10F3 | SM2A 114F | SM2A1 1160 |
| SM2A2 1158 | SM2B 113D | SM2C 1173 | SM2D 110D |
| SM3 10D4 | SM4 10BD | SM5 109A | SM6 10CD |
| SMPS 1074 | SPDER 0E5C | UNDER 0E58 | UNSP 11F4 |
| UNSP1 120C | UNSP2 1215 | VELAC 0E0D | VELLA 0E36 |
| VELPS 0E09 | VELRF 0E0C | VELSC 0E0D | |

I claim:

1. In apparatus for determining the program stop velocity of a passenger vehicle moving along a track and in response to vehicle track provided control signals establishing successive actual locations of that vehicle moving along said track in relation to controlling the vehicle movement in relation to a desired stopping position in accordance with a provided distance versus velocity relationship, the combination of:

first means coupled with the vehicle for sensing the actual velocity of the vehicle, second means including signal receiver apparatus and responsive to said control signal for determining the remaining travel distance for said vehicle to reach said desired position for each said location, third means responsive to the actual velocity of the vehicle to provide for said vehicle a first desired program stop control velocity for said remaining travel distance in relation to the present time and in accordance with a first established desired relationship with that travel distance, fourth means responsive to the actual velocity of the vehicle to provide for said vehicle a second desired program stop control velocity for said remaining travel distance in relation to a predetermined future time and in accordance with a second established desired relationship with that travel distance, and fifth means controlling the velocity of said vehicle in response to each of said first and second program stop velocities.

2. The apparatus of claim 1, with said apparatus including a programmed computer system having a memory and with each of said first and second established relationships being set forth in a distance versus velocity profile table stored in said memory.

3. The apparatus of claim 1, with said second desired control velocity being a look-ahead velocity in relation to where the vehicle is anticipated to be located at said predetermined future time.

4. The apparatus of claim 1, with said apparatus including a signal storage memory having a distance to go table stored in said memory for operation in relation to said second means and having a desired control velocity table stored in said memory for operation in relation to said third and fourth means.

5. The apparatus of claim 1, with the fourth means being operative with said fifth means to better smooth out the vehicle velocity control in relation to the stopping of said vehicle at the desired stopping position.

6. The apparatus of claim 1, with said successive locations being established in relation to a plurality of desired stopping positions, and with said remaining travel distance being determined for each said location in relation to a selected one of said stopping positions.

7. The apparatus of claim 1, with said first established relationship including provided discontinuities in relation to respective predetermined operational actual velocities of said vehicle.

8. The apparatus of claim 1, including a storage memory, and with said first established relationship being a table stored in said memory of travel distance versus the desired velocity the vehicle is supposed to be going at each of said locations of the vehicle.

9. The apparatus of claim 1, including signal counter means for counting a predetermined group of said control signals in relation to a larger vehicle travel distance and counting every control signal in relation to a smaller travel distance.

10. The apparatus of claim 1 including a counter for responding to less than every control signal when the vehicle is more than a predetermined remaining distance from the desired stopping position and for responding to every control signal when the vehicle is less than said predetermined remaining distance to the desired stopping position.

11. The apparatus of claim 1, with said third means providing an adjustable flare-out of the vehicle actual velocity before the vehicle reaches said desired position.

12. In a method of determining the program stop velocity of a vehicle moving along a track and in relation to a passenger station desired stopping position in accordance with track provided control signals indicating respective actual locations of that vehicle along said track as a function of said desired stopping position, the steps of:

determining the actual velocity of said vehicle, determining the remaining travel distance from each said actual location for said vehicle to reach said stopping position, determining a program stop desired control velocity for each said actual location as a function of the remaining travel distance from that location to said stopping position, determining a look-ahead desired control velocity for each said actual location as a function of the remaining travel distance from the location where the vehicle is anticipated to be after a predetermined future time period, and controlling the actual velocity of the vehicle in response to a predetermined comparison of said determined actual velocity with at least one of said program stop desired control velocity and said look-ahead desired control velocity.

13. The method of claim 12, including the step of smoothing out the stopping of said vehicle in relation to said position in response to each said determined look-ahead control velocity.

14. The method of claim 12, with said program stop control velocity for each said location being determined in response to less than every control signal when said vehicle is in a first predetermined relationship to said stopping position and being determined in response to every control signal when said vehicle is in a second predetermined relationship to said stopping position.

* * * * *